US012651420B2

(12) United States Patent
Lacey et al.

(10) Patent No.: US 12,651,420 B2
(45) Date of Patent: Jun. 9, 2026

(54) TRANSMODAL INPUT FUSION FOR A WEARABLE SYSTEM

(71) Applicant: Magic Leap, Inc., Plantation, FL (US)

(72) Inventors: Paul Lacey, Plantation, FL (US); Samuel A. Miller, Hollywood, FL (US); Nicholas Atkinson Kramer, Ft. Lauderdale, FL (US); David Charles Lundmark, Los Altos, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 19/213,849

(22) Filed: May 20, 2025

(65) Prior Publication Data

US 2025/0349089 A1 Nov. 13, 2025

Related U.S. Application Data

(62) Division of application No. 18/629,740, filed on Apr. 8, 2024, now Pat. No. 12,444,146, which is a division (Continued)

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/012* (2013.01); *G06F 3/013* (2013.01); *G06F 3/017* (2013.01);
(Continued)

(58) Field of Classification Search
CPC .................................................. G06T 19/006
See application file for complete search history.

(56) References Cited

U.S. PATENT DOCUMENTS

| 6,850,221 B1 | 2/2005 | Tickle |
| 9,081,426 B2 | 7/2015 | Armstrong |

(Continued)

FOREIGN PATENT DOCUMENTS

| EP | 3046006 A1 | 7/2016 |
| JP | 2015043209 A | 3/2015 |

(Continued)

OTHER PUBLICATIONS

ARToolKit:https://web.archive.org/web/20051013062315/http:www.hitl.washington.edu:80/artoolkit/documentation/hardware.htm, archived Oct. 13, 2005.

(Continued)

*Primary Examiner* — Nathan P Brittingham
(74) *Attorney, Agent, or Firm* — Seed Intellectual Property Law Group LLP

(57) ABSTRACT

Examples of wearable systems and methods can use multiple inputs (e.g., gesture, head pose, eye gaze, voice, totem, and/or environmental factors (e.g., location)) to determine a command that should be executed and objects in the three-dimensional (3D) environment that should be operated on. The wearable system can detect when different inputs converge together, such as when a user seeks to select a virtual object using multiple inputs such as eye gaze, head pose, hand gesture, and totem input. Upon detecting an input convergence, the wearable system can perform a transmodal filtering scheme that leverages the converged inputs to assist in properly interpreting what command the user is providing or what object the user is targeting.

14 Claims, 90 Drawing Sheets

Related U.S. Application Data of application No. 17/090,115, filed on Nov. 5, 2020, now Pat. No. 11,983,823, which is a division of application No. 16/418,820, filed on May 21, 2019, now Pat. No. 10,861,242.

(60) Provisional application No. 62/692,519, filed on Jun. 29, 2018, provisional application No. 62/675,164, filed on May 22, 2018.

(51) Int. Cl.
| | | |
|---|---|---|
| *G06F 3/16* | (2006.01) | |
| *G06T 5/20* | (2006.01) | |
| *G06T 7/70* | (2017.01) | |

(52) U.S. Cl.
CPC ............... *G06F 3/167* (2013.01); *G06T 5/20* (2013.01); *G06T 7/70* (2017.01); *G06T 2200/04* (2013.01); *G06T 2200/24* (2013.01)

(56) References Cited

U.S. PATENT DOCUMENTS

| | | | |
|---|---|---|---|
| 9,215,293 | B2 | 12/2015 | Miller |
| 9,341,844 | B2 | 5/2016 | Orhand et al. |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,600,767 | B1 | 3/2017 | Nogin et al. |
| 9,671,566 | B2 | 6/2017 | Abovitz et al. |
| 9,740,006 | B2 | 8/2017 | Gao |
| 9,791,700 | B2 | 10/2017 | Schowengerdt |
| 9,851,563 | B2 | 12/2017 | Gao et al. |
| 9,857,591 | B2 | 1/2018 | Welch et al. |
| 9,874,749 | B2 | 1/2018 | Bradski et al. |
| 10,078,919 | B2 | 9/2018 | Powderly et al. |
| 10,477,157 | B1 | 11/2019 | Shahdi et al. |
| 10,489,651 | B2 | 11/2019 | Luccin et al. |
| 10,684,682 | B2 | 6/2020 | Yasuda et al. |
| 10,861,242 | B2 | 12/2020 | Lacey et al. |
| 2006/0028436 | A1 | 2/2006 | Armstrong |
| 2007/0081123 | A1 | 4/2007 | Lewis |
| 2007/0208544 | A1 | 9/2007 | Kulach et al. |
| 2009/0273687 | A1 | 11/2009 | Tsukizawa et al. |
| 2012/0113092 | A1 | 5/2012 | Bar-Zeev et al. |
| 2012/0127062 | A1 | 5/2012 | Bar-Zeev et al. |
| 2012/0162549 | A1 | 6/2012 | Gao et al. |
| 2012/0249590 | A1 | 10/2012 | Maciocci et al. |
| 2013/0046544 | A1 | 2/2013 | Kay et al. |
| 2013/0082922 | A1 | 4/2013 | Miller |
| 2013/0104085 | A1 | 4/2013 | Mlyniec et al. |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2013/0265229 | A1 | 10/2013 | Forutanpour et al. |
| 2014/0003762 | A1 | 1/2014 | Macnamara |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt et al. |
| 2014/0306866 | A1 | 10/2014 | Miller et al. |
| 2015/0016777 | A1 | 1/2015 | Abovitz et al. |
| 2015/0026181 | A1 | 1/2015 | Milton et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | Tekolste et al. |

| | | | |
|---|---|---|---|
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0077344 | A1* | 3/2016 | Burns ..................... G06F 3/012 |
| | | | 345/419 |
| 2016/0129346 | A1* | 5/2016 | Mikhailov ........... H04N 13/271 |
| | | | 463/33 |
| 2016/0357266 | A1 | 12/2016 | Patel et al. |
| 2017/0060230 | A1 | 3/2017 | Faaborg et al. |
| 2017/0075421 | A1 | 3/2017 | Na et al. |
| 2017/0078825 | A1 | 3/2017 | Mangiat et al. |
| 2017/0109936 | A1 | 4/2017 | Powderly et al. |
| 2017/0237899 | A1 | 8/2017 | Wexler et al. |
| 2017/0287218 | A1 | 10/2017 | Nuernberger et al. |
| 2017/0371421 | A1 | 12/2017 | Parshionikar |
| 2018/0020951 | A1 | 1/2018 | Kaifosh et al. |
| 2018/0020978 | A1 | 1/2018 | Kaifosh et al. |
| 2018/0024634 | A1 | 1/2018 | Kaifosh et al. |
| 2018/0024635 | A1 | 1/2018 | Kaifosh et al. |
| 2018/0039341 | A1 | 2/2018 | Du Bois et al. |
| 2018/0045963 | A1 | 2/2018 | Hoover et al. |
| 2018/0052512 | A1 | 2/2018 | Overly |
| 2018/0082482 | A1 | 3/2018 | Motta et al. |
| 2018/0091390 | A1 | 3/2018 | Yang et al. |
| 2018/0133593 | A1 | 5/2018 | Wilson |
| 2018/0136486 | A1 | 5/2018 | Macnamara et al. |
| 2018/0307303 | A1 | 10/2018 | Powderly et al. |
| 2018/0356636 | A1 | 12/2018 | Kimura et al. |
| 2019/0121305 | A1 | 4/2019 | Kaifosh et al. |
| 2019/0182415 | A1 | 6/2019 | Sivan |
| 2019/0228243 | A1* | 7/2019 | Yamaoka ............... G06V 40/19 |
| 2019/0362557 | A1 | 11/2019 | Lacey et al. |

FOREIGN PATENT DOCUMENTS

| | | |
|---|---|---|
| JP | 2015135674 A | 7/2015 |
| JP | 2017129898 A | 7/2017 |
| WO | 0033257 A1 | 6/2000 |
| WO | 2004042553 A1 | 5/2004 |
| WO | 2015116475 A1 | 8/2015 |
| WO | 2016021034 A1 | 2/2016 |
| WO | 2017115618 A1 | 7/2017 |
| WO | 2019226691 A1 | 11/2019 |

OTHER PUBLICATIONS

Bernsen, "Speech and 2D deictic gesture reference to virtual scenes," in André et al. (eds.), International Tutorial and Research Workshop on Perception and Interactive Technologies for Speech-Based Systems, Springer, Berlin, Heidelberg, 2006, pp. 129-140. (12 pages).

Bolt, "'Put-That-There': Voice and Gesture at the Graphics Interface," 7th Annual Conference on Computer Graphics and Interactive Techniques, New York, NY, USA, Jul. 1, 1980, pp. 262-270. (9 pages).

Casiez et al., "1 € Filter: A Simple Speed-based Low-pass Filter for Noisy Input in Interactive Systems," CHI '12: Proceedings of the SIGCHI Conference on Human Factors in Computing Systems, Austin, TX, USA, May 5-10, 2012, pp. 2527-2530. (4 pages).

Debarba et al., "Disambiguation Canvas: a precise selection technique for virtual environments," Conference: Interact 2013, Sep. 2013, pp. 388-405. (18 pages).

Haruno et al., "MOSAIC Model for Sensorimotor Learning and Control," Neural Computation 12(10):2201-2220, Oct. 2001. (20 pages).

Haruno et al., "Multiple Paired Forward-Inverse Models for Human Motor Learning and Control," Advances in Neural Information Processing Systems 11:31-37, Dec. 1, 1998. (7 pages).

Heidemann et al., "Multimodal Interaction in an Augmented Reality Scenario," Proceedings of the 6th International Conference on Multimodal Interfaces, State College, PA, USA, Oct. 13-15, 2004. (8 pages).

International Preliminary Report on Patentability, dated Nov. 24, 2020, for International Patent Application No. PCT/US2019/033378. (8 pages).

(56) References Cited

OTHER PUBLICATIONS

International Search Report and Written Opinion, dated Oct. 4, 2019, for International Patent Application No. PCT/US2019/033378. (11 pages).

Jacob, "Eye Tracking in Advanced Interface Design," in Woodrow Barfield and Thomas A Furness III, Virtual Environments and Advanced Interface Design, Oxford Academic, https://doi.org/10.1093/oso/9780195075557.003.0015, Jul. 1995.

Kaiser et al., "Mutual Disambiguation of 3D Multimodal Interaction in Augmented and Virtual Reality," Proceedings of the 5th International Conference on Multimodal Interfaces, Vancouver, British Columbia, Canada, Nov. 5-7, 2003. (8 pages).

Tanriverdi et al., "Interacting With Eye Movements in Virtual Environments," ACM CHI 200 Human Factors in Computing Systems Conference, Tufts University, Medford, MA, 2000, pp. 265-272, Addison-Wesley/ACM Press, 2000.

U.S. National Science Foundation, "Complexity of eye-hand coordination," Aug. 1, 2014, URL=https://new.nsf.gov/news/complexity-eye-hand-coordination, retrieved on Feb. 20, 2024. (6 pages).

Wired, "Brain-Machine Interface Isn't Sci-fi Anymore," Sep. 13, 2017, URL=https://www.wired.com/story/brain-machine-interface-isnt-sci-fi-anymore/, retrieved on Feb. 20, 2024. (28 pages).

Azuma, "A Survey of Augmented Reality," In Presence: Teleoperators and Virtual Environments 6(4):355-385, http://www.cs.unc.edu/~azuma, Aug. 1997.

Azuma, "Predictive Tracking for Augmented Reality," Dissertation, TR95-007, Doctor of Philosophy, Department of Computer Science, UNC-Chapel Hill, NC, Feb. 1995. (262 pages).

Bimber, et al., "Spatial Augmented Reality—Merging Real and Virtual Worlds," 2005 .<https://web.media.mit.edu/~raskar/book/BimberRaskarAugmentedRealityBook.pdf>.

Invitation to Pay Additional Fees, dated Jul. 29, 2019, for International Patent Application No. PCT/US2019/033378. (2 pages).

Weiss et al., "Motion Estimation and Segmentation Using a Recurrent Mixture-of-Experts Architecture," Proceedings of IEEE workshop on Neural Nets for Signal Processing V, 1995, pp. 293-303. (13 pages).

Kainz et al., Approach to Hand Tracking and Gesture Recognition Based on Depth-Sensing Cameras and EMG Monitoring, Acta Informatica Pragensia, 3(1), 2014, p. 104-112 (Year: 2014).

Digital Filters, Wikipedia page (Year: 2018).

* cited by examiner

800

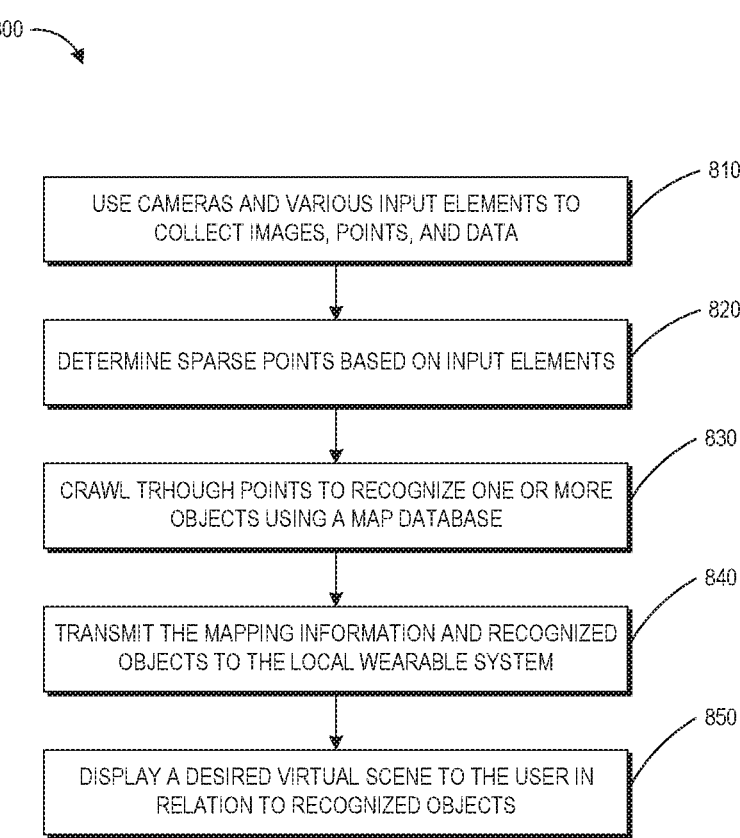

810
USE CAMERAS AND VARIOUS INPUT ELEMENTS TO COLLECT IMAGES, POINTS, AND DATA

820
DETERMINE SPARSE POINTS BASED ON INPUT ELEMENTS

830
CRAWL TRHOUGH POINTS TO RECOGNIZE ONE OR MORE OBJECTS USING A MAP DATABASE

840
TRANSMIT THE MAPPING INFORMATION AND RECOGNIZED OBJECTS TO THE LOCAL WEARABLE SYSTEM

850
DISPLAY A DESIRED VIRTUAL SCENE TO THE USER IN RELATION TO RECOGNIZED OBJECTS

FIG. 8

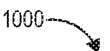
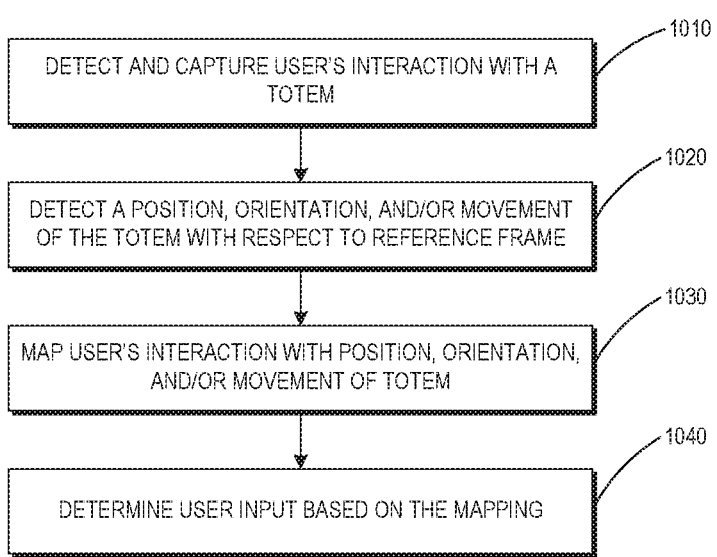
FIG. 10

1100

IDENTIFY A VIRTUAL UI — 1110

GENERATE DATA FOR THE VIRTUAL UI — 1120

SEND THE DATA TO A USER DEVICE — 1130

DISPLAY THE VIRTUAL UI BASED ON THE SENT DATA — 1140

WAIT FOR A COMMAND FROM A USER — 1150

RECOGNIZE GESTURE OR OTHER COMMAND? — 1160

NO

YES

GENERATE VIRTUAL CONTENT/PERFORM ACTION BASED ON THE COMMAND — 1170

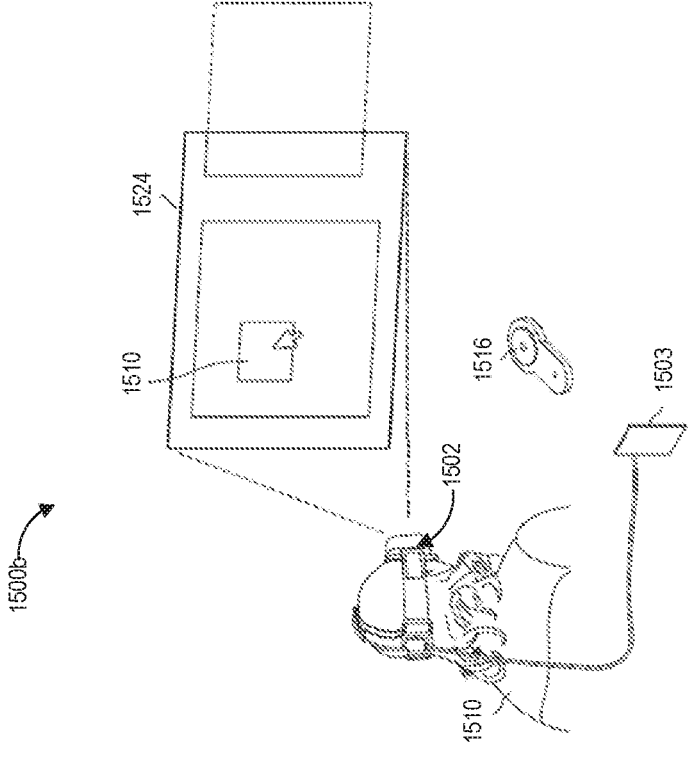
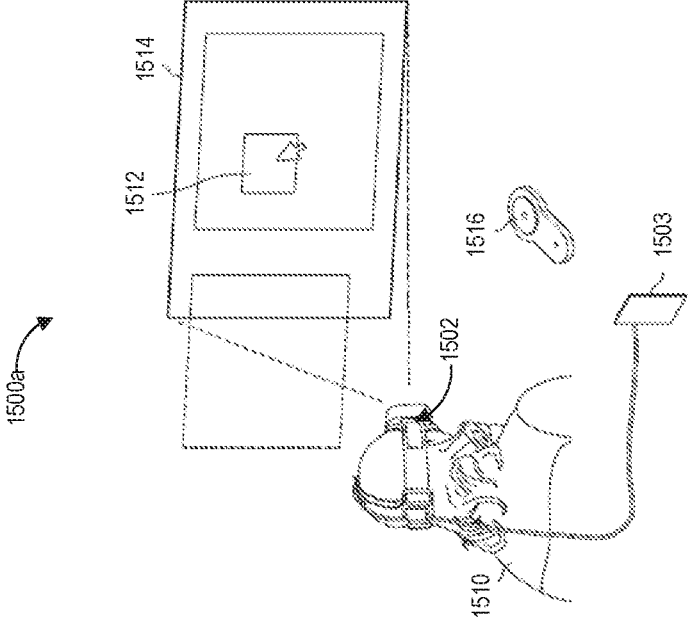
FIG. 15

2300

2310

DETECT AN INITIATION CONDITION

2320

RECEIVE MULTI-MODAL INPUTS FOR A USER INTERACTION

2330

IDENTIFY A SUBJECT, A COMMAND, AND A PARAMETER OF THE USER INTERACTION BASED ON THE MULTI-MODAL INPUTS

2340

EXECUTE THE USER INTERACTION

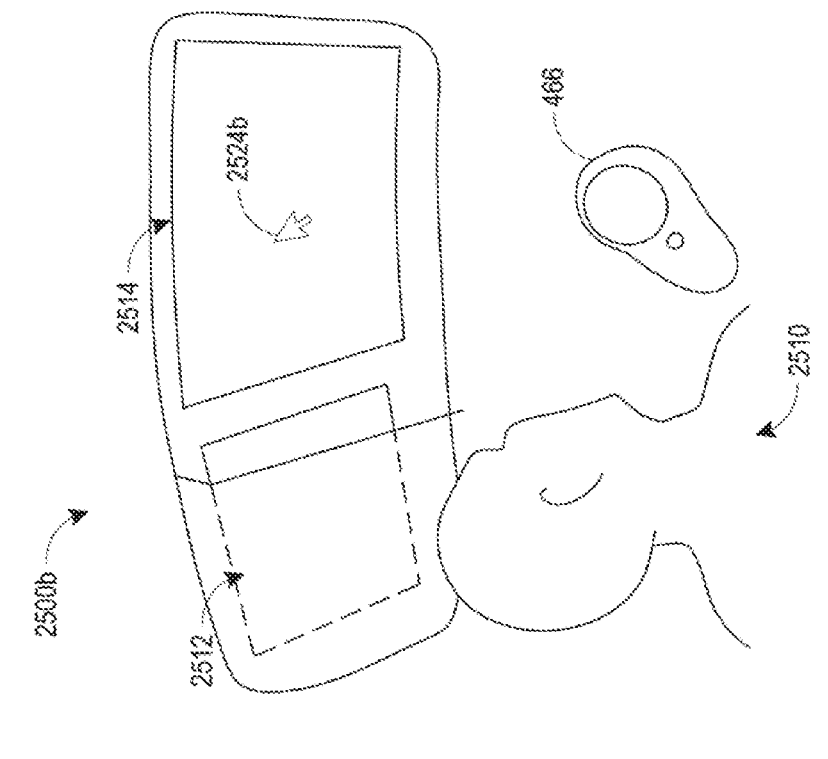
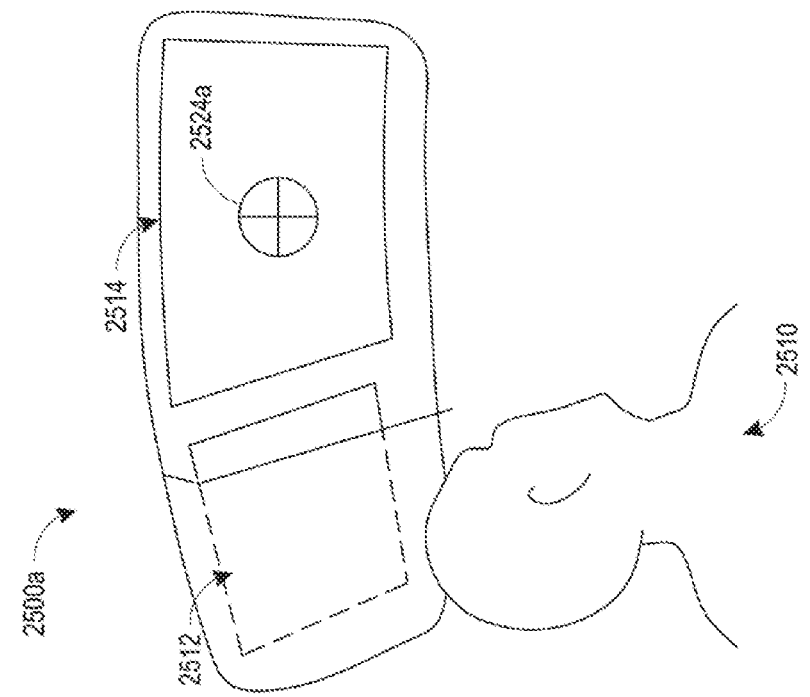
FIG. 25

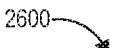
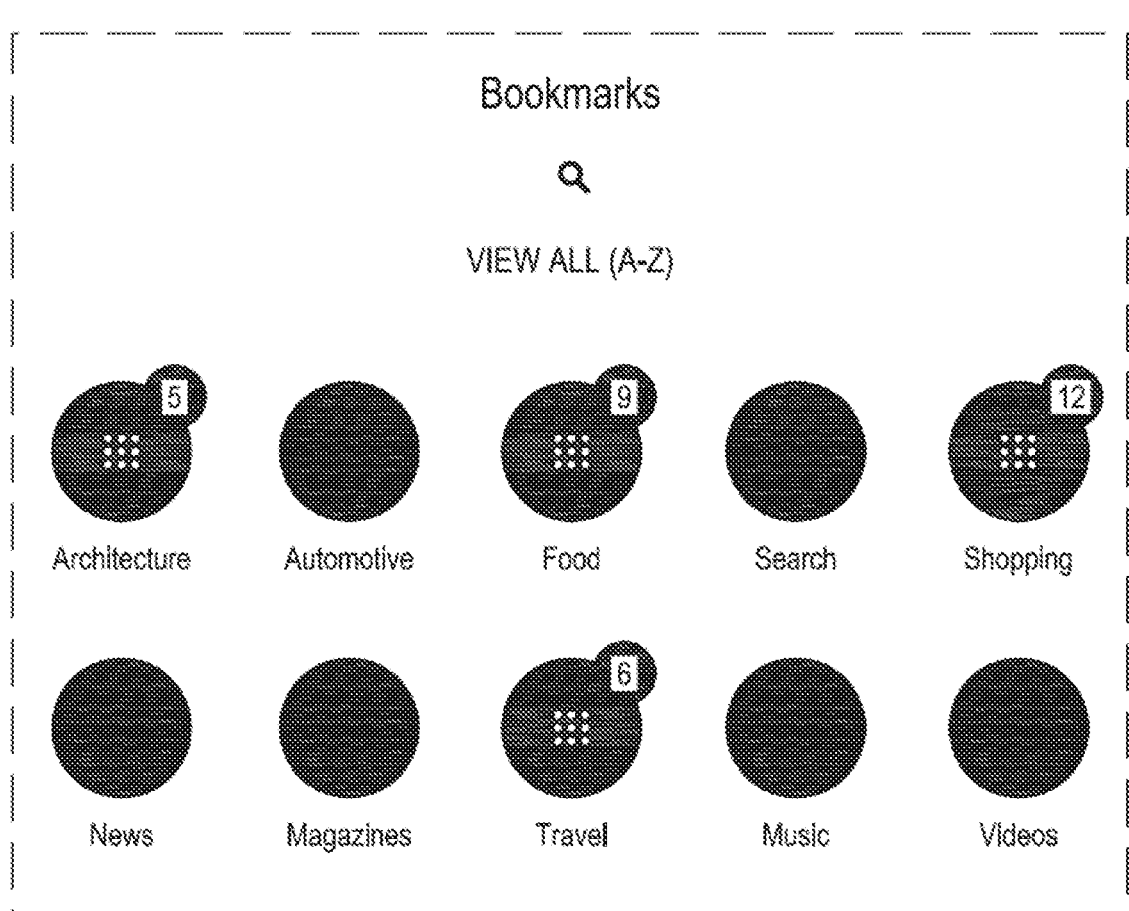
FIG. 26

To: John Smith

I'm flying in from Boston and will be there around 7:00. Let's meet at the quarter near the office.

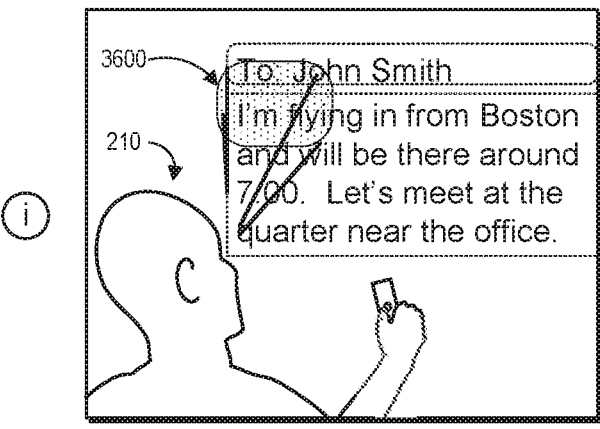
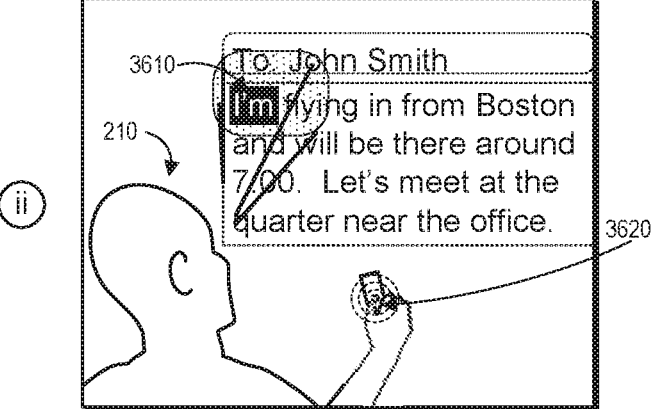
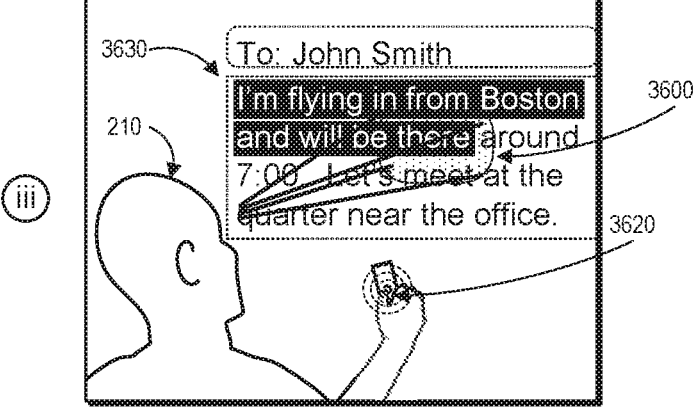
FIG. 36

3800

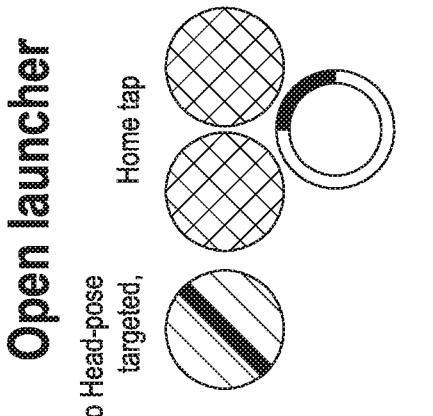
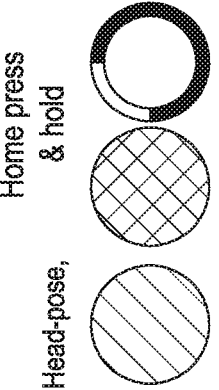
FIG. 41C

Hand swipe
Direct point
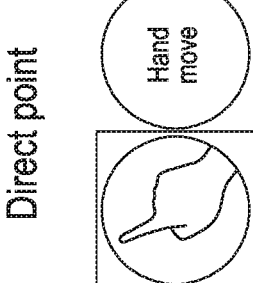
Thumb and drag
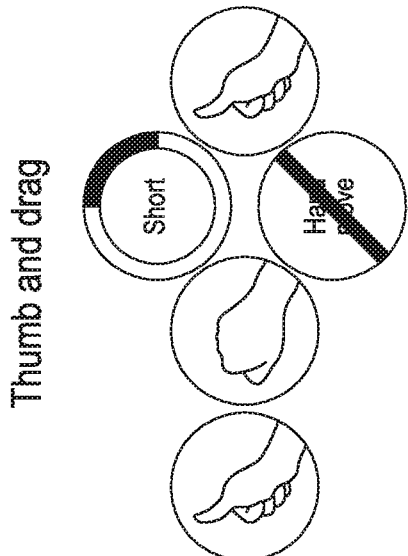
Thumb tap
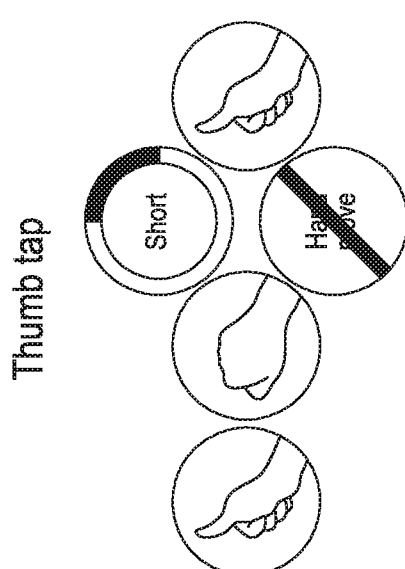
FIG. 42B NFO: Near Field Outer Bounds 1.25m
NF: Near Field 1m
NFI: Near Field Inner Bounds 0.75m MF: Mid Field 4m WorkSpace TaskSpace MF: MidField 4m
NFO: Near Field Outer 1.2m (Extended Workspace)
NF: Near Field 1m
NFI: Near Field Inner 0.7m
WS: WorkSpace 0.3-0.7m
TS: TaskSpace 0.4-0.6m
HS: HeadSpace 0.3m

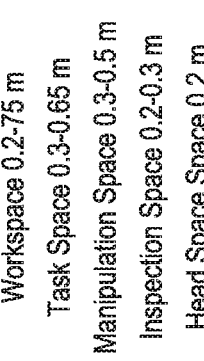
Workspace 0.2-75 m
Task Space 0.3-0.65 m
Manipulation Space 0.3-0.5 m
Inspection Space 0.2-0.3 m
Head Space Space 0.2 m
CP2: Clipping plane 0.50 m
CP1: Clipping plane 0.37 m
CP0: Clipping plane 0.22 m
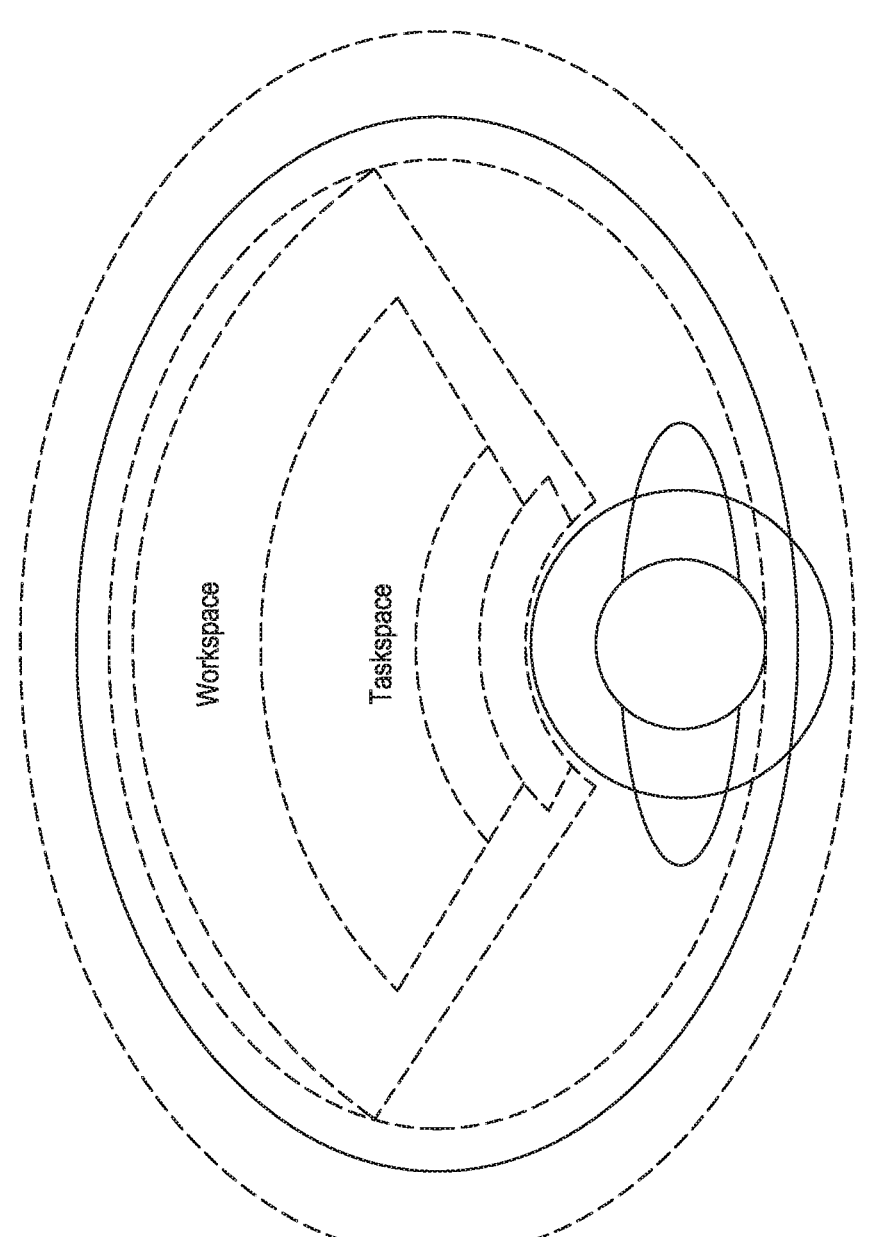
Workspace
Taskspace
FIG. 44C Independent input modes with exclusive controls (eg. *Touch Move + Tap*)

Touch

Touch
Gesture

Independent input & interchangeable controls that leverage multiple concurrent input modes (eg. *Head Gaze Targeting + Button Select*)

Touch
Gesture
Head Gaze

Eye Gaze

Hand Gesture

Touch

Head

Eye

Hand

Multimodal Interactions
*(eg. Head Gaze Targeting + Button Select)*

Touch
Gesture
Head Gaze
Eye Gaze
6DOF Controller

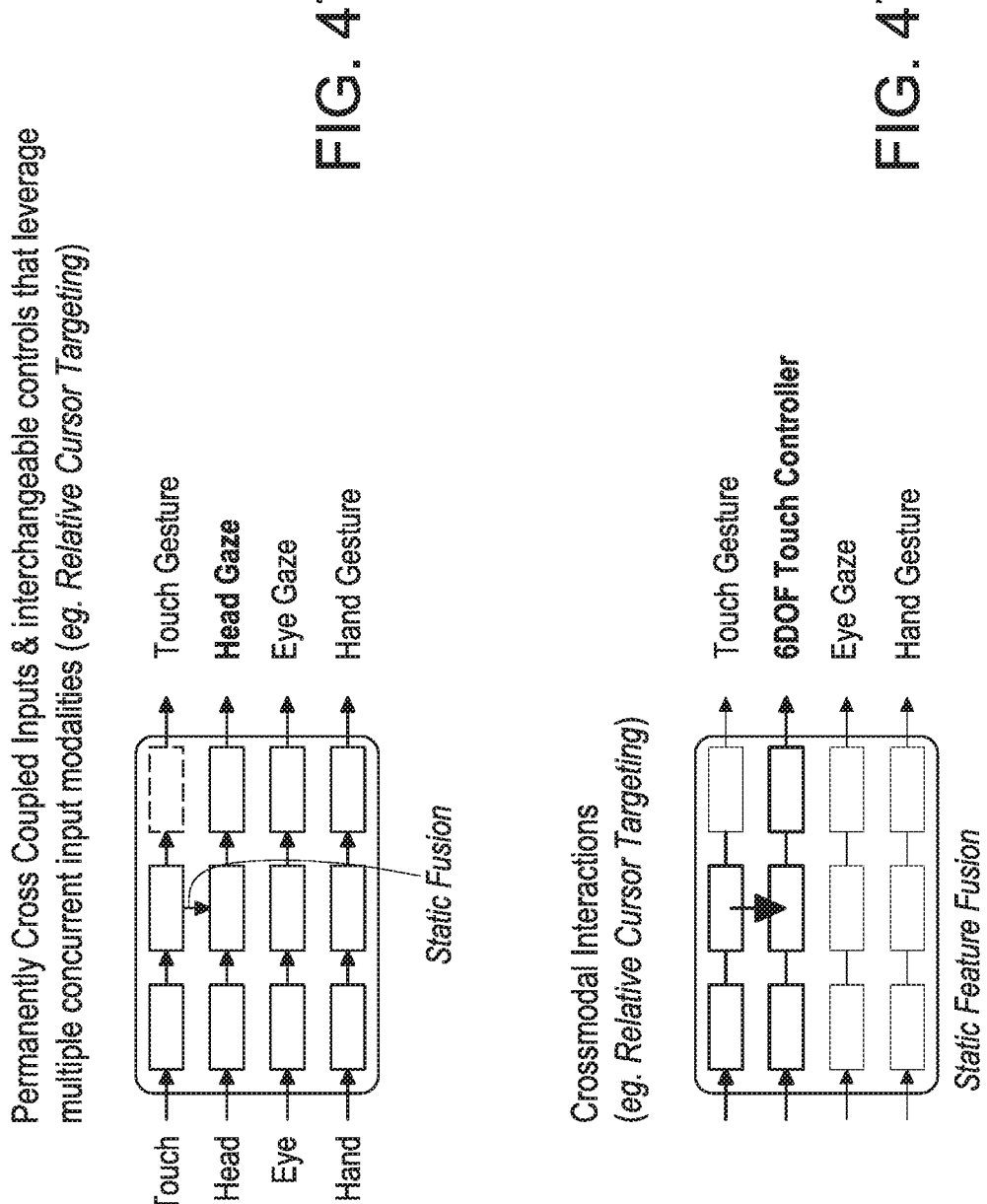

Permanently Cross Coupled Inputs & interchangeable controls that leverage multiple concurrent input modalities (*eg. Relative Cursor Targeting*)

Touch Gesture
Head Gaze
Eye Gaze
Hand Gesture

Touch
Head
Eye
Hand

*Static Fusion*

FIG. 47A

Crossmodal Interactions
(*eg. Relative Cursor Targeting*)

Touch Gesture
6DOF Touch Controller
Eye Gaze
Hand Gesture

*Static Feature Fusion*

FIG. 47B

Crossmodal Targeting (static cross coupled targeting, static objects)
{Near-field & Mid-field}

| 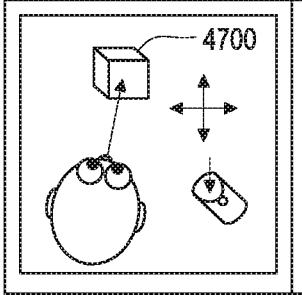 | 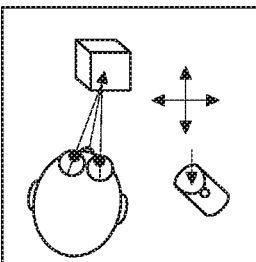 | 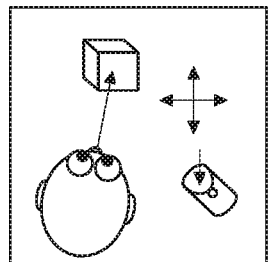 | 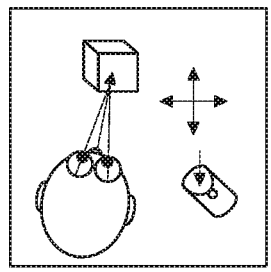 |
|---|---|---|---|
| Head raycast center + 6dof move delta + touch tap | Eye raycast center + 6dof move delta + touch tap | Head raycast center + 3dof move delta + touch tap | Eye raycast center + 3dof move delta + touch tap |

| 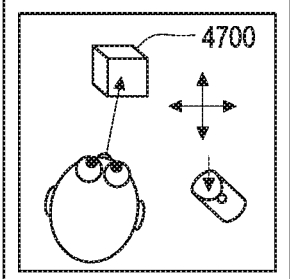 | 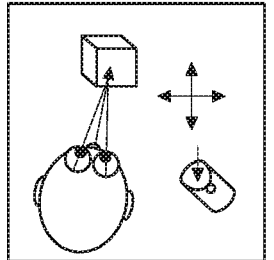 |
|---|---|
| Head raycast center + touch move delta + touch tap | Eye raycast center + touch move delta + touch tap |

| 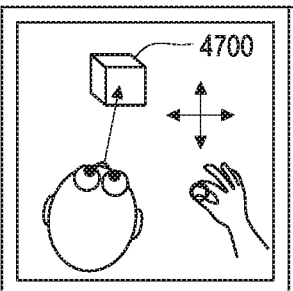 | 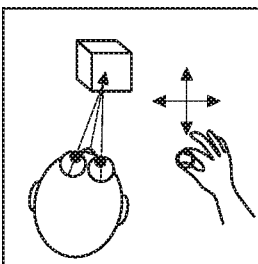 |
|---|---|
| Head raycast center + touch move delta + touch tap | Eye raycast center + touch move delta + touch tap |

FIG. 47C

Transmodal Targeting (dynamic cross coupled targeting, static objects)

Head & Eye {near-field & mid-field} Dwell

| | | | |
|---|---|---|---|
| Head + Eye Lock (vergence) | Head + Eye Lock (dwell) | Head + Eye Lock (ballistic pursuit) | Head + Eye Lock (ballistic pursuit) |

Head + Eye + Hand (controller/gesture) {near-field & mid-field} vergence

| | | | |
|---|---|---|---|
| Head-Eye-Hand Lock (controller near field vergence) | Head-Eye-Hand Lock (hand gesture mid-field vergence) | Head-Eye-Hand Lock (controller mid-field vergence) | Head-Eye-Hand Lock (hand gesture mid-field vergence) |

Head + Eye + Hand (controller/gesture) {near-field & mid-field} Dwell

| | | | |
|---|---|---|---|
| Head-Eye-Hand Lock (controller near field dwell) | Head-Eye-Hand Lock (hand gesture mid-field dwell) | Head-Eye-Hand Lock (controller mid-field vergence) | Head-Eye-Hand Lock (hand gesture mid-field dwell) |

Head + Eye + Hand (controller/gesture) {near-field & mid-field} Pursuit - Ballistic

| | | | |
|---|---|---|---|
| Head-Eye-Hand Lock (controller near field pursuit-ballistic) | Head-Eye-Hand Lock (hand gesture mid-field pursuit-ballistic) | Head-Eye-Hand Lock (controller mid-field pursuit-ballistic) | Head-Eye-Hand Lock (hand gesture mid-field pursuit-ballistic) |

Head + Eye + Hand (controller/gesture) {near-field & mid-field} Pursuit - Smooth

| | | | |
|---|---|---|---|
| Head-Eye-Hand Lock (controller near field pursuit-smooth) | Head-Eye-Hand Lock (hand gesture mid-field pursuit-ballistic-smooth) | Head-Eye-Hand Lock (controller mid-field pursuit-smooth) | Head-Eye-Hand Lock (hand gesture mid-field pursuit-smooth) |

5002 — CLASSIFY MODAL INTERACTION AND CONVERGENCE

5004 — APPLY FILTERING TO INPUTS

5006 — INTEGRATE CONVERGED INPUTS

5008 — PROVIDE OPTIONAL USER FEEDBACK

H-E-Ha @
Palm-
Fingertip
Raycast
Intersect

H-E-Ha @
Palm-
Fingertip
Raycast
Intersect

H-E-Ha @
Palm-
Fingertip
Raycast
Intersect

H-E-Ha @
Fingertip
NF Position

E-Ha @ Palm
Fingertip
Raycast intersect
FF Position

E-Ha @ Palm
Fingertip
Raycast intersect
MF Position

E-Ha @ Palm
Fingertip
Raycast intersect
NF Position

5606

5607

H-Ha @
Palm-
Fingertip
Raycast
Intersect
FF Position

5604

5605

H-Ha @
Palm-
Fingertip
Raycast
Intersect
MF Position

5603

5602

H-Ha @
Palm-
Fingertip
Raycast
Intersect
NF Position

5601

5600

H-Ha @
Palm-
Fingertip
Raycast
Intersect
NF Position

TRANSMODAL INPUT FUSION FOR A WEARABLE SYSTEM

CROSS-REFERENCE TO RELATED APPLICATIONS

This application is a divisional application of U.S. patent application Ser. No. 18/629,740 filed Apr. 8, 2024, which is a divisional application of U.S. patent application Ser. No. 17/090,115 filed Nov. 5, 2020, which is a divisional application of U.S. patent application Ser. No. 16/418,820, filed May 21, 2019, which is entitled "Transmodal Input Fusion for a Wearable System," which claims the benefit of priority to U.S. Provisional Patent Application No. 62/675,164, filed on May 22, 2018, which is entitled "Electromyographic Sensor Prediction in Augmented Reality," and to U.S. Provisional Patent Application No. 62/692,519, filed on Jun. 29, 2018, which is entitled "Transmodal Input Fusion for a Wearable System;" the disclosures of which are hereby incorporated by reference herein in their entireties.

COPYRIGHT NOTICE

BACKGROUND

Technical Field

The present disclosure relates to virtual reality and augmented reality imaging and visualization systems and more particularly to dynamically fusing multiple modes of user input to facilitate interacting with virtual objects in a three-dimensional (3D) environment.

Description of the Related Art

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

BRIEF SUMMARY

Examples of wearable systems and methods described herein can use multiple inputs (e.g., gesture, head pose, eye gaze, voice, from user input devices, or environmental factors (e.g., location)) to determine a command that should be executed or objects in the three dimensional (3D) environment that should be operated on or selected. The multiple inputs can also be used by the wearable device to permit a user to interact with physical objects, virtual objects, text, graphics, icons, user interfaces, and so forth.

For example, a wearable display device can be configured to dynamically parse multiple sensor inputs for execution of a task or targeting an object. The wearable device can dynamically use a combination of multiple inputs such as head pose, eye gaze, hand, arm, or body gestures, voice commands, user input devices, environmental factors (e.g., the user's location or the objects around the users) to determine which object in the user's environment the user intends to select or actions the wearable device may perform. The wearable device can dynamically choose a set of sensor inputs that together indicate the user's intent to select a target object (inputs that provide independent or supplemental indications of the user's intent to select a target object may called convergent or converging inputs). The wearable device can combine or fuse the inputs from this set (e.g., to enhance the quality of the user interaction as described herein). If a sensor input from this set later shows divergence from the target object, the wearable device can cease using (or reduce the relative weight given to) the divergent sensor input.

The process of dynamically using converged sensor inputs while ignoring (or reducing the relative weight given to) diverged sensor inputs is sometimes referred to herein as transmodal input fusion (or simply transmodal fusion) and can provide substantial advantages over techniques that simply accept inputs from multiple sensors. Transmodal input fusion can anticipate or even predict, on a dynamic, real-time basis, which of the many possible sensor inputs are the appropriate modal inputs that convey the user's intent to target or operate on a real or virtual object in the user's 3D AR/MR/VR environment.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE SEVERAL VIEWS OF THE DRAWINGS

FIG. 8 is a process flow diagram of an example of a method of rendering virtual content in relation to recognized objects.

FIG. 10 is a process flow diagram of an example of a method for determining user input to a wearable system.

FIG. 15 illustrates an example of interacting with a virtual object using a combination of direct user inputs.

FIG. 25 illustrates an example of user experience with multimodal input.

FIG. 26 illustrates an example user interface with a variety of bookmarked applications.

FIG. 36 illustrates examples of interacting with a phrase using multimodal inputs.

FIG. 41C illustrates examples of user inputs, received through various modes of user input, for interacting with a wearable system.

FIGS. 42A, 42B, and 42C illustrate examples of user inputs in the form of fine finger gestures and hand movements.

FIGS. 44A, 44B, and 44C illustrate examples of different interactive regions, whereby a wearable system may receive and respond to user inputs differently depending on which interactive region the user is interactive with.

FIGS. 47A, 47B, and 47C illustrate examples of cross-modal user interactions.

FIGS. 48A, 48B, and 49 illustrate examples of transmodal user interactions.

Figure 1:
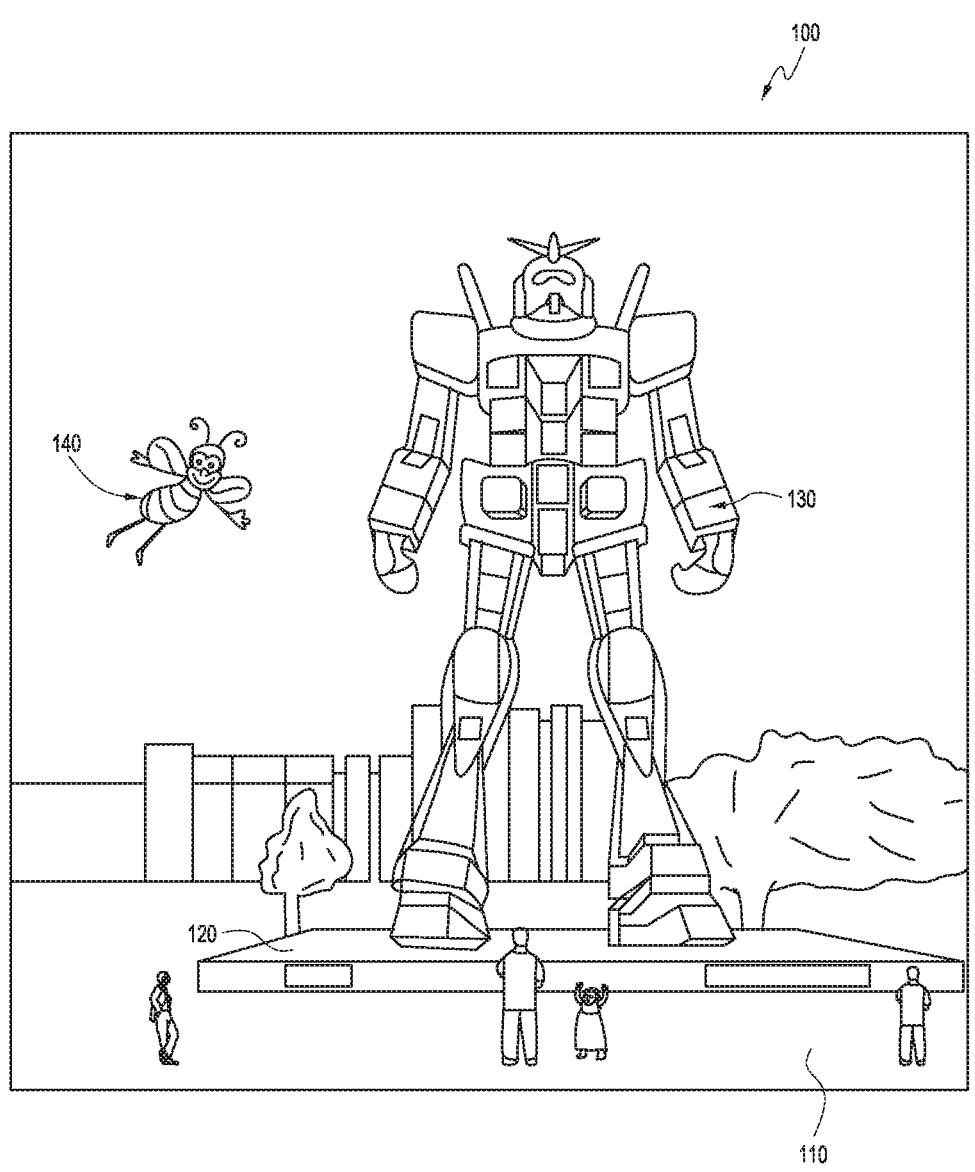
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Modern computing systems can possess a variety of user interactions. A wearable device can present an interactive VR/AR/MR environment which can comprise data elements that may be interacted with by a user through a variety of inputs. Modern computing systems are typically engineered to generate a given output based on a single direct input. For example, a keyboard will relay text input as received from finger strokes of a user. A voice recognition application can create an executable data string based on a user's voice as a direct input. A computer mouse can guide a cursor in response to a user's direct manipulation (e.g., the user's hand movement or gesture). The various ways a user can interact with the system are sometimes referred to herein as modes of user inputs. For example, a user input via a mouse or keyboard is a hand-gesture-based mode of interaction (because the fingers of a hand press keys on a keyboard or the hand moves a mouse).

However, conventional input techniques, such as keyboard, user input device, gestures, etc., in a data rich and dynamic interaction environment (e.g., the AR/VR/MR environment) may require a high degree of specificity to accomplish a desired task. Otherwise, in the absence of precise inputs, the computing systems may suffer a high error rate and may cause incorrect computer operations to be performed. For example, when a user intends a move an object in a 3D space using a touchpad, the computing systems may not be able to correctly interpret a move command if the user does not specify a destination or specify the object using the touchpad. As another example, inputting a string of text using a virtual keyboard (e.g., as manipulated with a user input device or by gesture) as the only mode of input can be slow and physically fatiguing, because it requires prolonged fine motor control to type the described keys in mid-air or on a physical surface (e.g., a desk) where the virtual keyboard is rendered.

To reduce the degree of specificity required in an input command and to reduce error rate associated with an imprecise command, the wearable system described herein can be programmed to dynamically apply multiple inputs for identification of an object to be selected or acted upon, execution of an interaction event associated with the object, such as, e.g., a task for selecting, moving, resizing, or targeting a virtual object. The interaction event can include causing an application (sometimes referred to as an app) associated with the virtual object to execute (e.g., if the target object is a media file, the interaction event can comprise causing a media player to play the media file (e.g., a song or video)). Selecting the target virtual object can comprise executing an application associated with the target virtual object. As described below, the wearable device can dynamically select which of two or more types of input (or inputs from multiple input channels or sensors) to generate the command for execution of a task or to identify the target object on which the command is to be executed.

The particular sensor inputs that are used at any point in time can change dynamically as the user interacts with the 3D environment. An input mode can be dynamically added (or "fused" as further described herein) when the device determines that the input mode is providing additional information to aid in the targeting of a virtual object, and an input mode can be dynamically removed if that input mode no longer provides relevant information. For example, the wearable device may determine that a user's head pose and eye gaze are directed at a target object. The device can use these two input modes to assist in selection of the target object. If the device determines that the user is also pointing a totem at the target object, the device can dynamically add the totem input to the head pose and eye gaze inputs, which may provide further certainty that the user intends to select the target object. It can be said that the totem input has "converged" with the head pose input and the eye gaze input. Continuing with this example, if the user glances away from the target object so that the user's eye gaze is no longer directed at the target object, the device may cease using eye gaze input while continuing to use totem input and head pose input. In this case, it can be said that the eye gaze input has "diverged" from the totem input and the head pose input.

The wearable device can dynamically determine divergence and convergence events occurring among the multiple input modes and can dynamically select, from among these multiple input modes, a subset of input modes that are relevant to the user's interaction with the 3D environment. For example, the system can use the input modes that have converged and can disregard input modes that have diverged. The number of input modes that can be dynamically fused or filtered in response to input convergence is not limited to the three modes described in this example (totem, head pose, eye gaze), and can dynamically switch among 1, 2, 3, 4, 5, 6, or more sensor inputs (as different input modes converge or diverge).

The wearable device can use convergent inputs by accepting the inputs for analysis, by increasing computing resources available or assigned to the convergent inputs (e.g., to the input sensor assemblies), by selecting a particular filter to apply to one or more of the convergent inputs, by taking other suitable action, and/or by any combination of these actions. The wearable device may not use, cease using, or reduce the weight given to sensor inputs that are divergent or diverging.

Input modes may be said to converge, for example, when a variance between input vectors of the inputs are less than a threshold. Once the system has recognized that inputs are converged, the system may filter the converged inputs and fuse them together to create a new conditioned input that can then be used to do useful work and be utilized to perform a task with greater confidence and accuracy (than could be accomplished by using the inputs separately). In various embodiments, the system may apply dynamic filtering (e.g., dynamically fuse inputs together) in response to the relative convergence of inputs. The system may continually evaluate whether inputs are convergent. In some embodiments, the system may scale the intensity of input fusion (e.g., how strongly the system fuses inputs together) in relation to the intensity of input convergence (e.g., how closely the input vectors of two or more inputs are matched).

The process of dynamically using converged sensor inputs while ignoring (or reducing the relative weight given to) diverged sensor inputs is sometimes referred to herein as transmodal input fusion (or simply transmodal fusion) and can provide substantial advantages over techniques that simply accept inputs from multiple sensors. Transmodal input fusion can anticipate or even predict, on a dynamic, real-time basis, which of the many possible sensor inputs are the appropriate modal inputs that convey the user's intent to target or operate on a real or virtual object in the user's 3D AR/MR/VR environment.

As will be further explained herein, input modes can include, but are not limited to, hand or finger gestures, arm gestures, body gestures, head pose, eye gaze, body pose, voice commands, environmental inputs (e.g., position of the user or objects in the user's environment), a shared pose from another user, etc. The sensors used to detect these input modes can include, for example, an outward-facing camera (e.g., to detect hand or body gestures), an inward-facing camera (e.g., to detect eye gaze), an inertial measurement unit (IMU, e.g., an accelerometer, a gravimeter, a magnetometer), an electromagnetic tracking sensor system, a global positioning system (GPS) sensor, a radar or lidar sensor, etc. (see, e.g., the description of examples of sensors with reference to FIGS. 2A and 2B).

As another example, when a user says "move that there", the wearable system can use a combination of head pose, eye gaze, hand gestures, along with other environmental factors (e.g., the user's location or the location of objects around the user), in combination with the voice command to determine which object should be moved (e.g., which object is "that") and which destination is intended (e.g., "there") in response to an appropriate dynamic selection of these multiple inputs.

As will further be described herein, the techniques for transmodal inputs are not merely an aggregation of multiple user input modes. Rather, the wearable system employing such transmodal techniques can advantageously support the added depth dimension in 3D (as compared to traditional 2D interactions) provided in the wearable system. The added dimension not only enables additional types of user interactions (e.g., rotations, or movements along the additional axis in a Cartesian coordinate system), but also requires a high degree of precision of a user input to provide the correct outcome.

The user inputs for interacting with virtual objects, however, are not always accurate due to a user's limitations on motor controls. Although traditional input techniques can calibrate and adjust to the inaccuracies of a user's motor controls in 2D space, such inaccuracies are magnified in 3D space due to the added dimension. Traditional input methods, such as keyboard input, however, are not well suited for adjusting such inaccuracies in 3D space. One benefit provided by the transmodal input techniques (among other benefits) is to adapt input methods into fluid and more accurate interactions with objects in the 3D space.

Accordingly, embodiments of the transmodal input techniques can dynamically monitor which input modes have converged and use this set of converged input modes to more accurately determine or predict that the user intends to interact with that target. Embodiments of the transmodal input techniques can dynamically monitor which input modes have diverged (e.g., indicative of an input mode no longer being relevant to a potential target) and cease using these diverged input modes (or reduce the weight given to diverged input modes in comparison to converged input modes). The group of sensor input modes that have converged is typically temporary and continuously changing. For example, different sensor input modes dynamically converge and diverge as the user moves his or her hands, body, head, or eyes, while providing user input on a totem or using voice commands. Thus, a potential advantage of transmodal input techniques is that just the right set of sensor input modes are used at any particular time or for any particular target object in the 3D environment. In some embodiments, the system may assign a greater weight (than normally assigned) to a given input based on a physiological context. As an example, the system may determine that a user is trying to grasp and move a virtual object. In response, the system may assign a greater weight to a hand pose input, and less weight to other inputs such as an eye gaze input. The system may also time any shift in input weighting in a suitable manner. As an example, the system may shift weight to the hand pose input as the hand pose converges on the virtual object.

In addition, advantageously, in some embodiments, the techniques described herein can reduce the hardware requirements and cost of the wearable system. For example, a wearable device may use low resolution eye-tracking cameras in connection with a voice command or a head pose to execute a task (e.g., by determining that some or all of these input modes have converged on a target object) rather than employ a high resolution eye-tracking camera (which can be expensive and complex to utilize) by itself to determine the task. In this example, the use of the user's voice command can compensate for the lower resolution at which the eye-tracking is performed. Accordingly, transmodal combinations of a plurality of user input modes, allowing for dynamic selection of which of the plurality of user input modes to be used, can provide for lower cost, less complex, and more robust user interactions with AR/VR/MR devices than the use of a single input mode. Additional benefits and examples of techniques related to transmodal sensor fusion techniques for interacting with real or virtual objects are further described below with reference to FIGS. 13-59B.

Transmodal fusion techniques can provide substantial advantages, compared to simply aggregation of multiple sensor inputs, for functionalities such as, e.g., targeting small objects, targeting objects in a field of view containing many objects, targeting moving objects, managing the transition between nearfield, midfield, and farfield targeting methods, manipulating virtual objects, and so forth. In some implementations, transmodal fusion techniques are referred to as providing a TAMDI interaction model for: Targeting (e.g., specifying a cursor vector toward an object), Activation (e.g., selection of a specific object or area or volume in the 3D environment), Manipulation (e.g., directly moving or changing a selection), Deactivation (e.g., disengaging the selection), and Integration (e.g., putting the previous selection back into the environment, if necessary).

Examples of 3D Display of a Wearable System

A wearable system (also referred to herein as an augmented reality (AR) system) can be configured to present 2D or 3D virtual images to a user. The images may be still images, frames of a video, or a video, in combination or the like. The wearable system can include a wearable device that can present VR, AR, or MR content in an environment, alone or in combination, for user interaction. The wearable device can be a head-mounted device (HMD) which can includes a head-mounted display. In some situations, the wearable device is referred to interchangeably as an AR device (ARD).

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of rendering planes are provided to a viewer. A rendering plane can correspond to a depth plane or multiple depth planes. The images may be different for each rendering plane (e.g., provide slightly different presentations of a scene or object) and may be separately focused by the viewer's eyes, thereby helping to provide the user with depth cues based on the accommodation of the eye required to bring into focus different image features for the scene located on different rendering plane or based on observing different image features on different rendering planes being out of focus. As discussed elsewhere herein, such depth cues provide credible perceptions of depth.

Figure 2A:
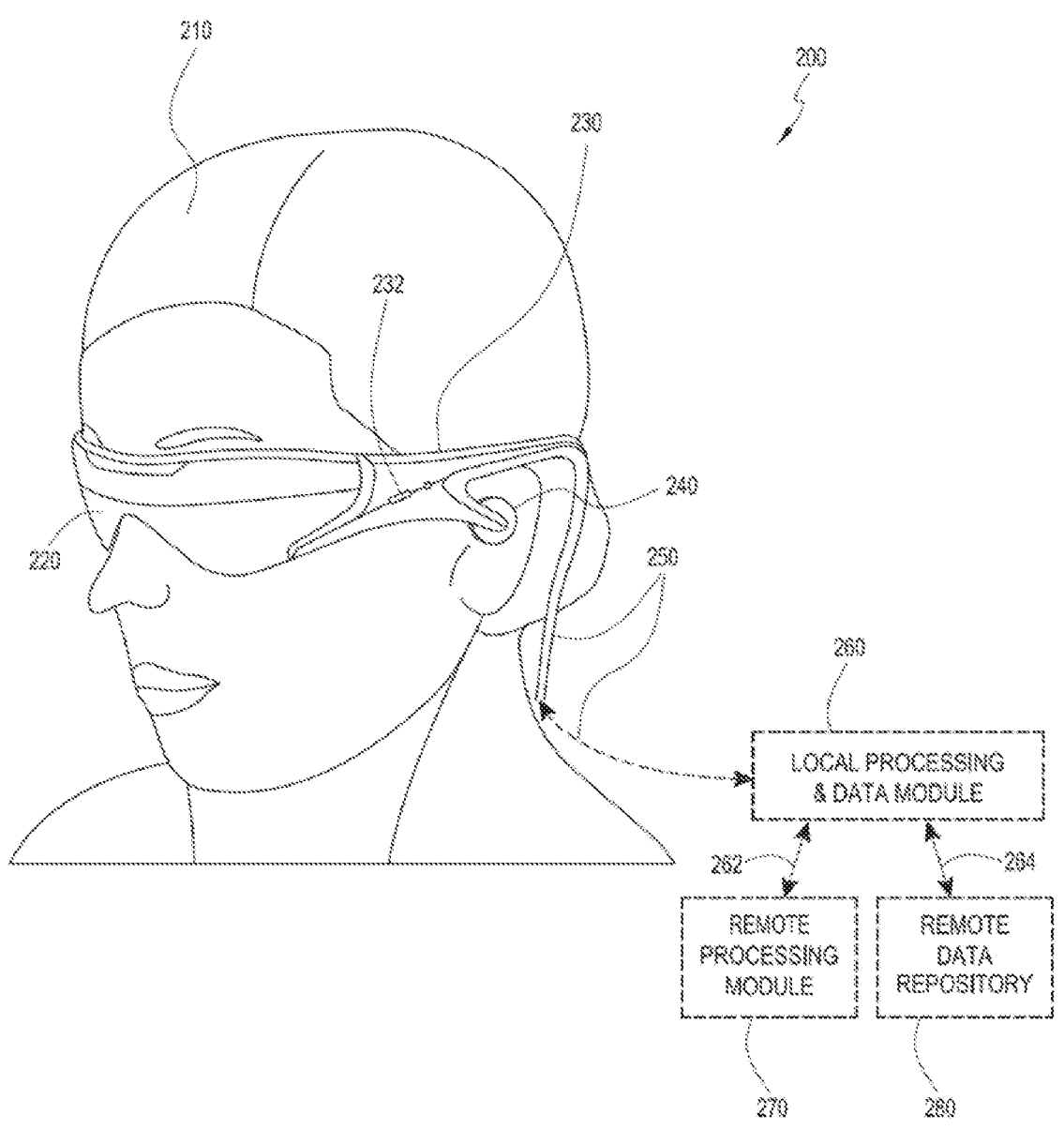
FIGS. 2A and 2B schematically illustrate examples of a wearable system that can be configured to use the transmodal input fusion techniques described herein.

FIG. 2A illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor 232 (e.g., a microphone) for detecting an audio stream from the environment on which to perform voice recognition.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user (e.g., a gesture). The images may be still images, frames of a video, or a video, in combination or the like. The wearable system 200 can include other sensors such as electromyogram (EMG) sensors that sense signals indicative of the action of muscle groups (see, e.g., the description with reference to FIGS. 60A and 60B).

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from environmental sensors (which may be, e.g., operatively coupled to the frame 230 or otherwise attached to the user 210), audio sensors 232 (e.g., microphones); or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data and/or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

In addition to or in alternative to the components described in FIG. 2A or FIG. 2B (described below), the wearable system 200 can include environmental sensors to detect objects, stimuli, people, animals, locations, or other aspects of the world around the user. The environmental sensors may include image capture devices (e.g., cameras, inward-facing imaging system, outward-facing imaging system, etc.), microphones, inertial measurement units (IMUs) (e.g., accelerometers, gyroscopes, magnetometers (compasses)), global positioning system (GPS) units, radio devices, altimeters, barometers, chemical sensors, humidity sensors, temperature sensors, external microphones, light sensors (e.g., light meters), timing devices (e.g., clocks or calendars), or any combination or subcombination thereof. In certain embodiments, an IMU may be a 9-axis IMU which can include a triple-axis gyroscope, a triple-axis accelerometer, and a triple-axis magnetometer.

Environmental sensors may also include a variety of physiological sensors. These sensors can measure or estimate the user's physiological parameters such as heart rate, respiratory rate, galvanic skin response, blood pressure, encephalographic state, and so on. Environmental sensors may further include emissions devices configured to receive signals such as laser, visible light, invisible wavelengths of light, or sound (e.g., audible sound, ultrasound, or other frequencies). In some embodiments, one or more environmental sensors (e.g., cameras or light sensors) may be configured to measure the ambient light (e.g., luminance) of the environment (e.g., to capture the lighting conditions of the environment). Physical contact sensors, such as strain gauges, curb feelers, or the like, may also be included as environmental sensors.

Figure 2B:
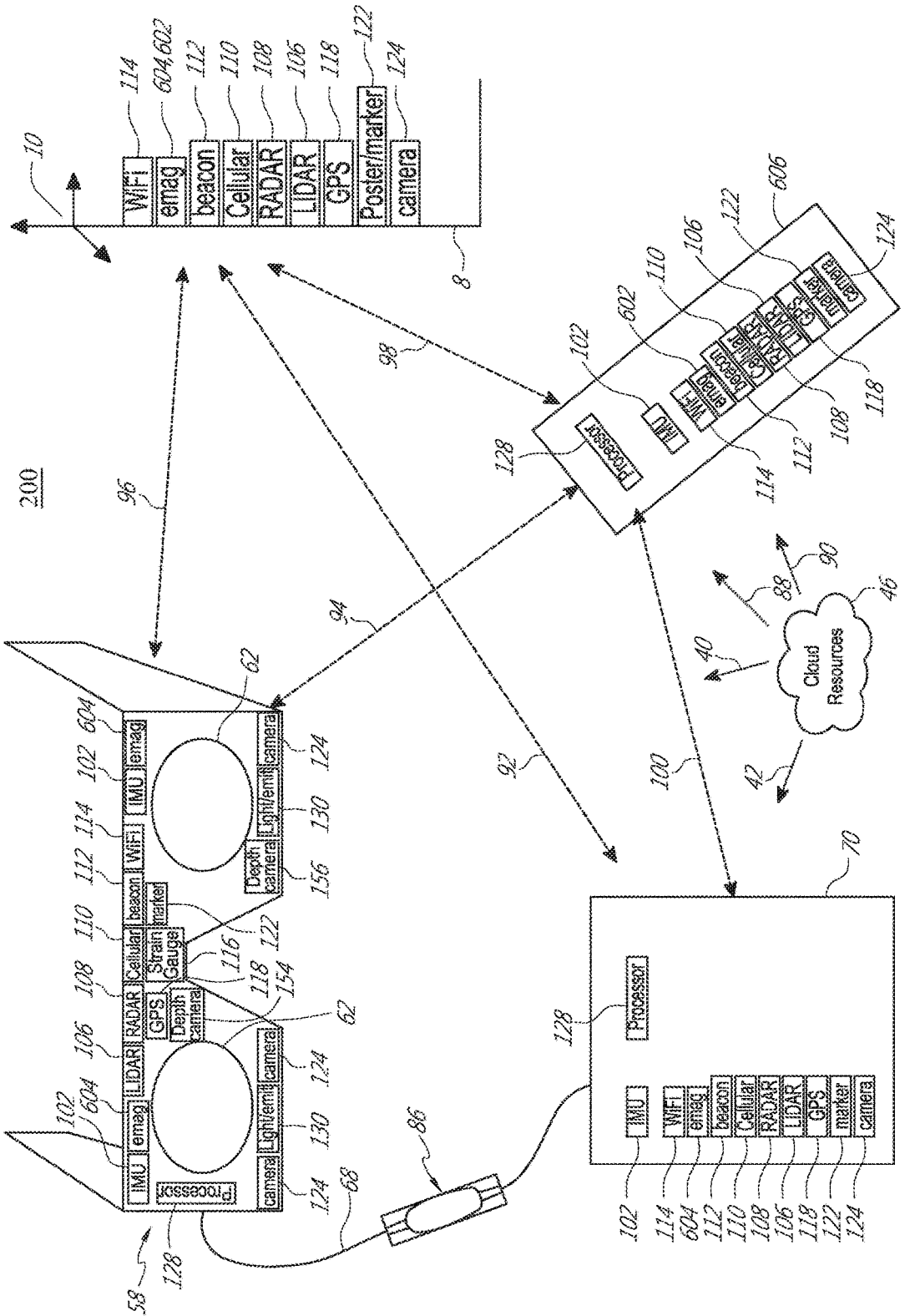

FIG. 2B illustrates another example of a wearable system 200, which includes examples of many sensors. Inputs from any of these sensors can be used by the system in the transmodal sensor fusion techniques described herein. A head mounted wearable component 200 is shown operatively coupled (68) to a local processing and data module (70), such as a belt pack, here using a physical multicore lead which also features a control and a quick release module (86) as connecting the belt pack to the head-mounted display. The head mounted wearable component 200 is also referred to with the reference numeral 58 in FIG. 2B and in the following. The local processing and data module (70) is operatively coupled (100) to a hand held component (606), here by a wireless connection such as low power Bluetooth; the hand held component (606) may also be operatively coupled (94) directly to the head mounted wearable component (58), such as by a wireless connection such as low power Bluetooth. Generally where IMU data is passed to coordinate pose detection of various components, a high-frequency connection is desirable, such as in the range of hundreds or thousands of cycles/second or higher; tens of cycles per second may be adequate for electromagnetic localization sensing, such as by the sensor (604) and transmitter (602) pairings. Also shown is a global coordinate system (10), representative of fixed objects in the real world around the user, such as a wall (8).

Cloud resources (46) also may be operatively coupled (42, 40, 88, 90) to the local processing and data module (70), to the head mounted wearable component (58), to resources which may be coupled to the wall (8) or other item fixed relative to the global coordinate system (10), respectively. The resources coupled to the wall (8) or having known positions and/or orientations relative to the global coordinate system (10) may include a wireless transceiver (114), an electromagnetic emitter (602) and/or receiver (604), a beacon or reflector (112) configured to emit or reflect a given type of radiation, such as an infrared LED beacon, a cellular network transceiver (110), a RADAR emitter or detector (108), a LIDAR emitter or detector (106), a GPS transceiver (118), a poster or marker having a known detectable pattern (122), and a camera (124).

The system 200 can include a depth camera or depth sensor (154), which may, for example, be either a stereo triangulation style depth sensor (such as a passive stereo depth sensor, a texture projection stereo depth sensor, or a structured light stereo depth sensor) or a time or flight style depth sensor (such as a LIDAR depth sensor or a modulated emission depth sensor). The system 200 can include a forward facing "world" camera (124, which may be a grayscale camera, having a sensor capable of 720p range resolution, for example) as well as a relatively high-resolution "picture camera" (156, which may be a full color camera, having a sensor capable of two megapixel or higher resolution, for example).

The head mounted wearable component (58) features similar components, as illustrated, in addition to lighting emitters (130) configured to assist the camera (124) detectors, such as infrared emitters (130) for an infrared camera (124); also featured on the head mounted wearable component (58) are one or more strain gauges (116), which may be fixedly coupled to the frame or mechanical platform of the head mounted wearable component (58) and configured to determine deflection of such platform in between components such as electromagnetic receiver sensors (604) or display elements (220), wherein it may be valuable to understand if bending of the platform has occurred, such as at a thinned portion of the platform, such as the portion above the nose on the eyeglasses-like platform depicted in FIG. 2B.

The head mounted wearable component (58) also features a processor (128) and one or more IMUs (102). Each of the components preferably is operatively coupled to the processor (128). The hand held component (606) and local processing and data module (70) are illustrated featuring similar components. As shown in FIG. 2B, with so many sensing and connectivity mechanisms, such a system may be utilized to provide a very high level of connectivity, system component integration, and position/orientation tracking. For example, with such a configuration, the various main mobile components (58, 70, 606) may be localized in terms of position relative to the global coordinate system using WiFi, GPS, or Cellular signal triangulation; beacons, electromagnetic tracking, RADAR, and LIDAR systems may provide yet further location and/or orientation information and feedback. Markers and cameras also may be utilized to provide further information regarding relative and absolute position and orientation. For example, the various camera components (124), such as those shown coupled to the head mounted wearable component (58), may be utilized to capture data which may be utilized in simultaneous localization and mapping protocols, or "SLAM", to determine where the component (58) is and how it is oriented relative to other components.

The description with reference to FIGS. 2A and 2B describes an illustrative and non-limiting list of types of sensors and input modes that can be used with the wearable system 200. However, not all of these sensors or input modes need be used in every embodiment. Further, additional or alternative sensors can be used as well. The choice of sensors and input modes for a particular embodiment of the wearable system 200 can be based on factors such as cost, weight, size, complexity, etc. Many permutations and combinations of sensors and input modes are contemplated. Wearable systems including sensors such as those described with reference to FIGS. 2A and 2B advantageously can utilize transmodal input fusion techniques described herein to dynamically select a subset of these sensor inputs to assist the user in selecting, targeting, or interacting with real or virtual objects. The subset of sensor inputs (which is typically less than the set of all possible sensor inputs) can include sensor inputs that have converged on a target object and can exclude (or reduce reliance upon) sensor inputs that have diverged from the subset or have not converged onto the target object.

The human visual system is complicated and providing a realistic perception of depth is challenging. Without being limited by theory, it is believed that viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
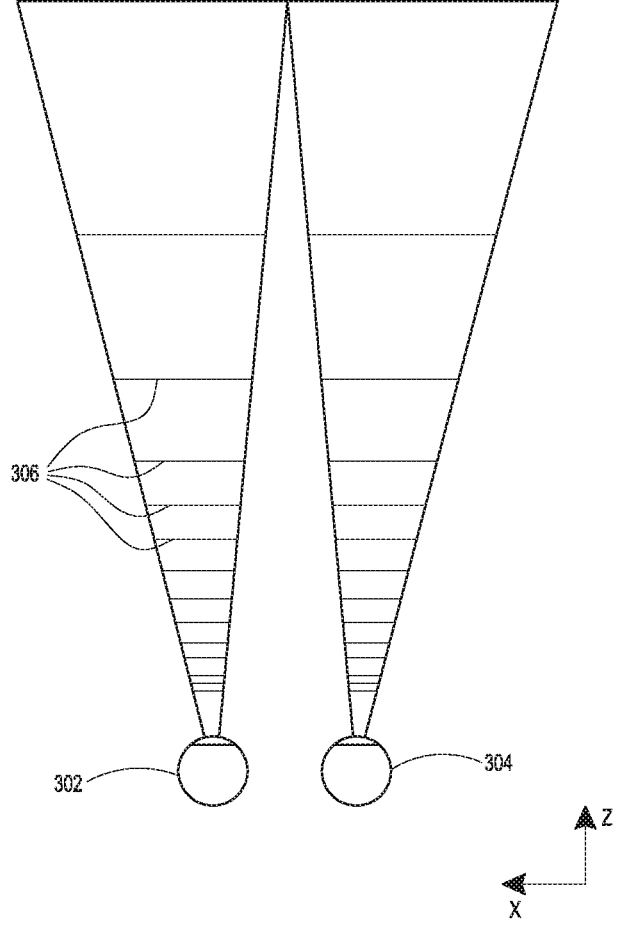
FIG. 3 schematically illustrates aspects of an approach for simulating three-dimensional imagery using multiple depth planes.

FIG. 3 illustrates aspects of an approach for simulating a three-dimensional imagery using multiple rendering planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of rendering planes 306, with has an associated focal distance, such that objects or parts of objects in a particular rendering plane are in focus when the eye is in the accommodated state for that rendering plane. In some embodiments, three-dimensional imagery may be simulated by providing different presentations of an image for each of the eyes 302 and 304, and also by providing different presentations of the image corresponding to each of the rendering planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a rendering plane may be curved in physical space, such that all features in a rendering plane are in focus with the eye in a particular accommodated state. Without being limited by theory, it is believed that the human eye typically can interpret a finite number of rendering planes to provide depth perception. Consequently, a highly believable simulation of perceived depth may be achieved by providing, to the eye, different presentations of an image corresponding to each of these limited number of rendering planes.

Waveguide Stack Assembly

Figure 4:
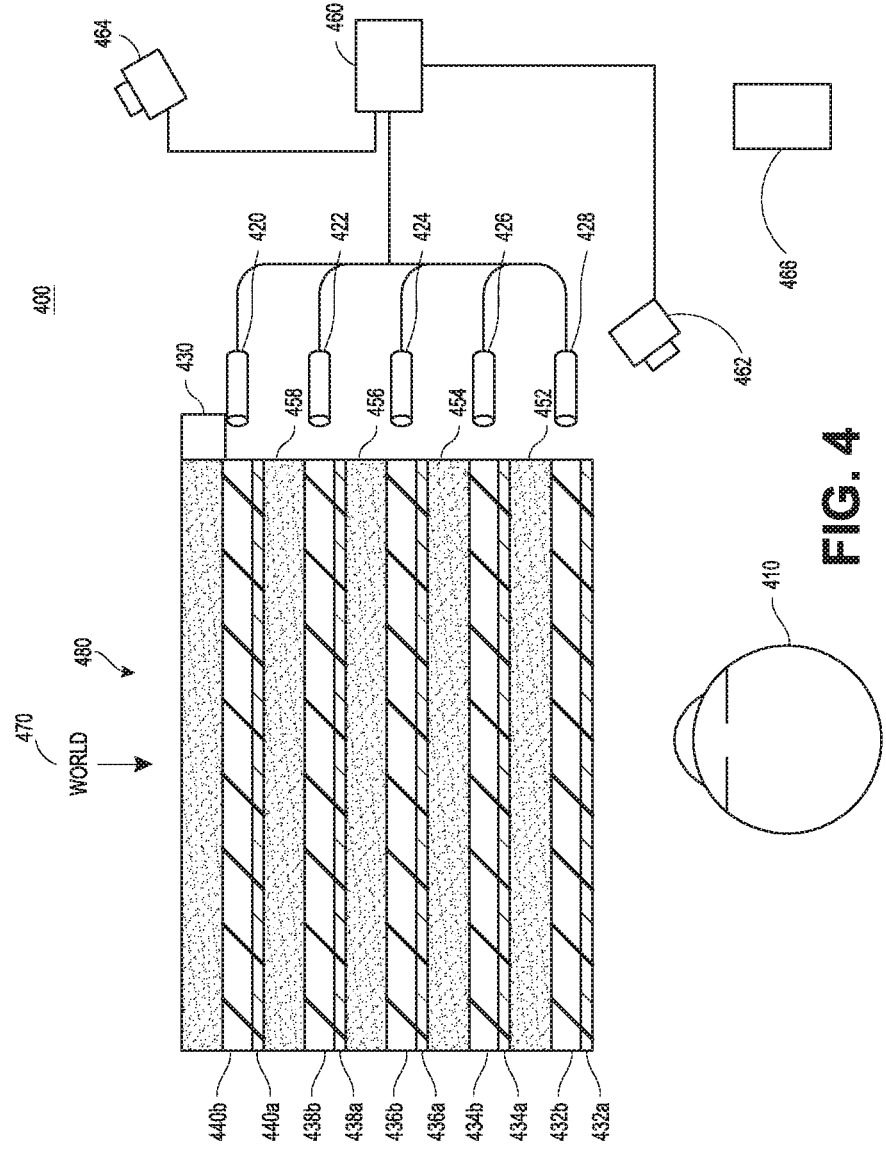
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2A or 2B, with FIG. 4 schematically showing some parts of that wearable system 200 in greater detail. For example, in some embodiments, the waveguide assembly 480 may be integrated into the display 220 of FIGS. 2A and 2B.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular rendering plane and may be configured to output image information corresponding to that rendering plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the rendering plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIGS. 2A, 2B) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a mono-lithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particu-lar rendering plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain inter-prets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly con-figured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodi-ments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular render-ing plane associated with the waveguide. As a result, wave-guides having different associated rendering planes may have different configurations of light extracting optical ele-ments, which output light with a different amount of diver-gence depending on the associated rendering plane. In some embodiments, as discussed herein, the light extracting opti-cal elements 440a, 438a, 436a, 434a, 432a may be volu-metric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffrac-tion gratings, are described in U.S. Patent Publication No. 2015/0178939, published Jun. 25, 2015, which is incorpo-rated by reference herein in its entirety.

In some embodiments, the light extracting optical ele-ments 440a, 438a, 436a, 434a, 432a are diffractive features that form a diffraction pattern, or "diffractive optical ele-ment" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be swit-chable between "on" state in which they actively diffract, and "off" state in which they do not significantly diffract. For instance, a switchable DOE may comprise a layer of poly-mer dispersed liquid crystal, in which microdroplets com-prise a diffraction pattern in a host medium, and the refrac-tive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of rendering planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart rendering planes used to present different images to the viewer may be decreased with the decreased pupil size. For example, a viewer may not be able to clearly perceive the details of both a first rendering plane and a second rendering plane at one pupil size without adjusting the accommodation of the eye away from one rendering plane and to the other rendering plane. These two rendering planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two rendering planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include 471 steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 462 (e.g., a digital camera), which observes the movements of the user, such as the eye movements and the facial movements. The inward-facing imaging system 462 may be used to capture images of the eye 410 to determine the size and/or orientation of the pupil of the eye 304. The inward-facing imaging system 462 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 462 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
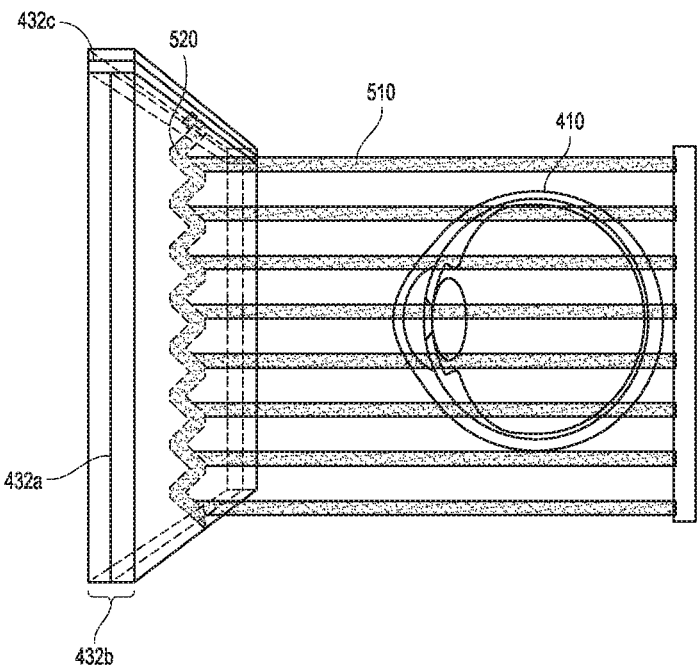
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the rendering plane associated with the waveguide 432b. It will be appreciated that substantially parallel exit beams may be indicative of a waveguide with light extracting optical elements that outcouple light to form images that appear to be set on a rendering plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
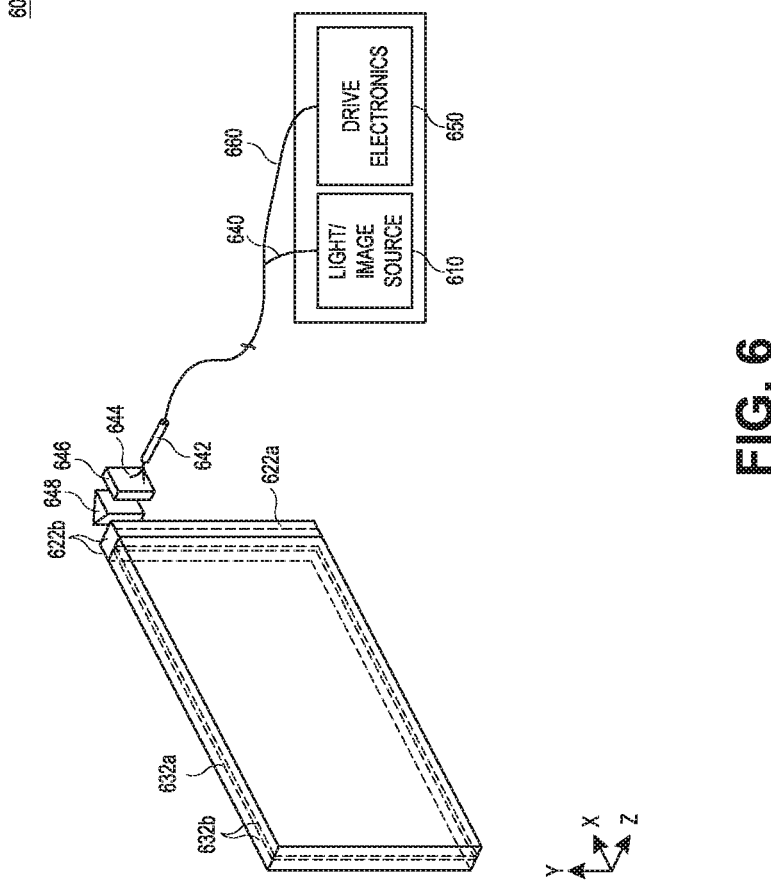
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2A or 2B.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 4 in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, and/or yielding different fill patterns at the exit pupil. Different fill patterns at the exit pupil can be beneficially used to create a light field display with multiple rendering planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
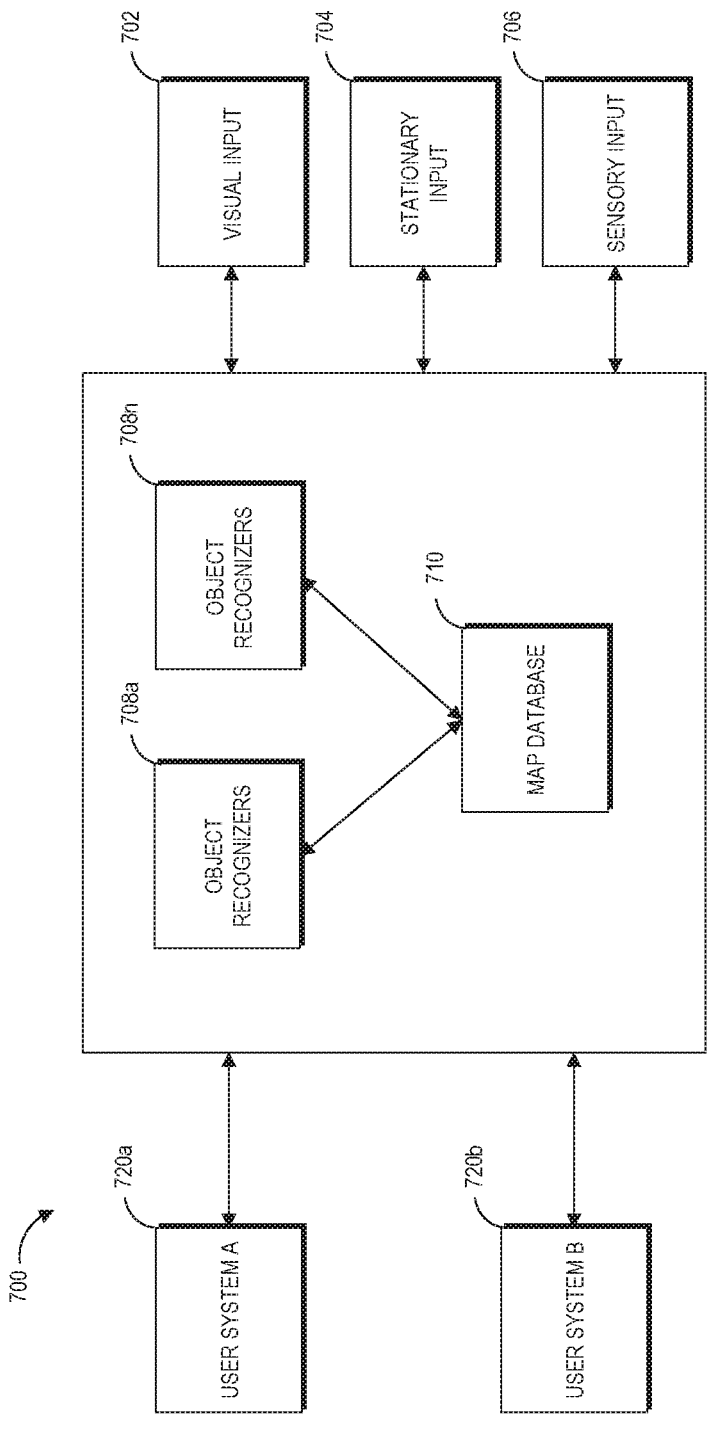
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466, etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, other objects in the user's environment, etc. One or more object recognizers may be specialized for object with certain characteristics. For example, the object recognizer 708a may be used to recognize faces, while another object recognizer may be used recognize totems, while another object recognizer may be used to recognize hand, finger, arm, or body gestures.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as, e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects, etc., such that the scene may be accurately "passed over" to a second user, who may be in a different part of the world. The environment 700 may also use a topological map for localization purposes.

FIG. 8 is a process flow diagram of an example of a method 800 of rendering virtual content in relation to recognized objects. The method 800 describes how a virtual scene may be represented to a user of the wearable system. The user may be geographically remote from the scene. For example, the user may be New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
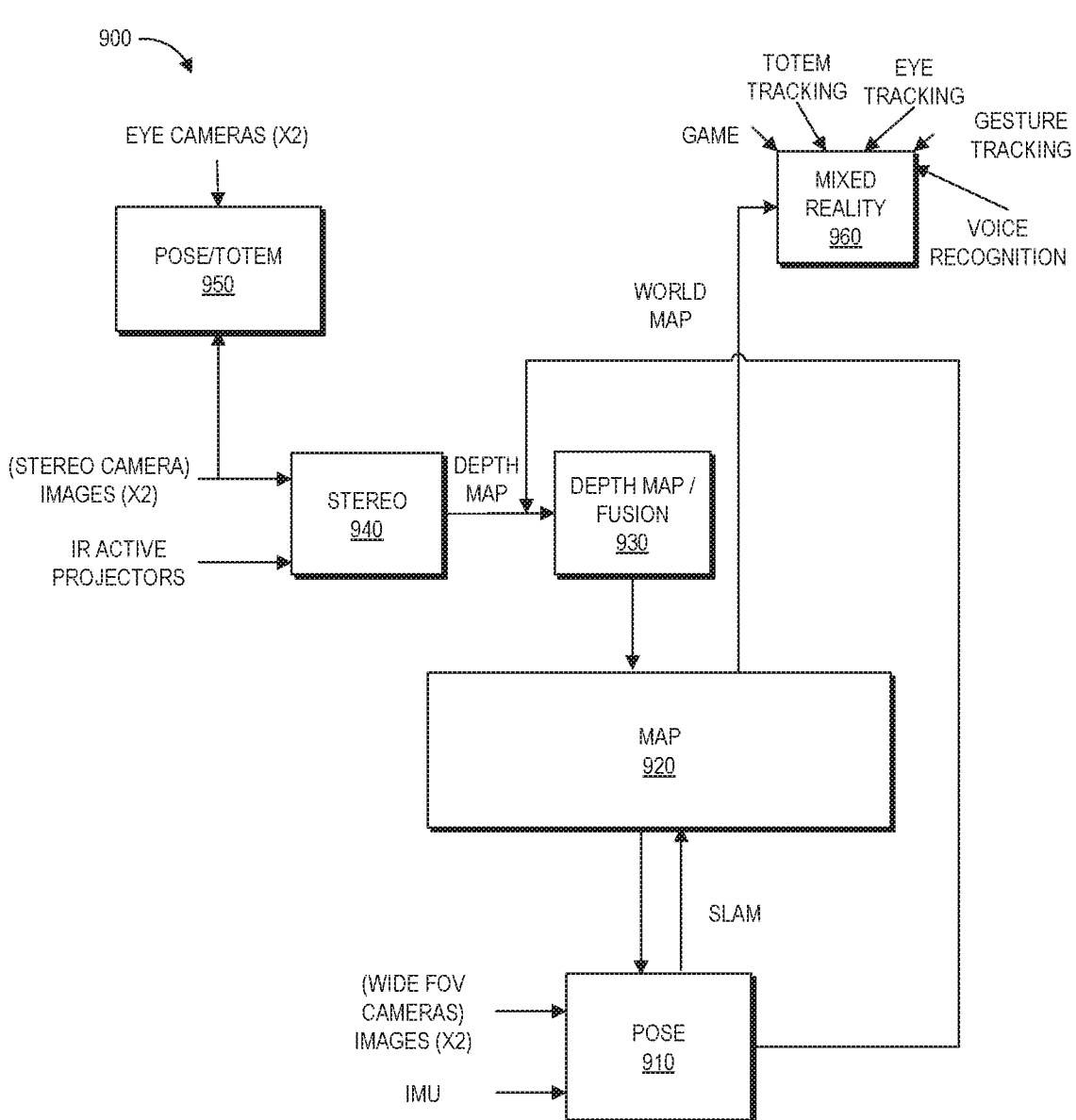
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 (e.g., head or eye pose) may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/ visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g., a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

Voice recognition is another input, which can be used alone or in combination with other inputs (e.g., totem tracking, eye tracking, gesture tracking, etc.). The system 900 can include an audio sensor 232 (e.g., a microphone) that receives an audio stream from the environment. The received audio stream can be processed (e.g., by processing modules 260, 270 or central server 1650) to recognize a user's voice (from other voices or background audio), to extract commands, subjects, parameters, etc., from the audio stream. For example, the system 900 may identify from an audio stream that the phrase "move that there" was said, identify that this phrase was said by the wearer of the system 900 (rather than another person in the user's environment), and extract from the phrase that there is an executable command ("move") and an object to be moved ("that") to a location ("there"). The object to be operated upon by the command may be referred to as the subject of the command, and other information provided as a parameter to the command. In this example, the location of where the object is to be moved is a parameter for the move command. Parameters can include, for example, a location, a time, other objects to be interacted with (e.g., "move that next to the red chair" or "give the magic wand to Linda"), how the command is to be executed (e.g., "play my music using the upstairs speakers"), and so forth.

As another example, the system 900 can process an audio stream with speech recognition techniques to input a string of text or to modify content of a text. The system 900 can incorporate speaker recognition technology to determine who is speaking as well as speech recognition technology to determine what is being said. Voice recognition techniques can include hidden Markov models, Gaussian mixture models, pattern matching algorithms, neural networks, matrix representation, Vector Quantization, speaker diarisation, decision trees, and dynamic time warping (DTW) techniques, alone or in combination. Voice recognition techniques can also include anti-speaker techniques, such as cohort models, and world models. Spectral features may be used in representing speaker characteristics.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward facing system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a rendering plane on which the user is focusing. In some implementations, the wearable system can use cone casting techniques to determine which real or virtual objects are along the direction of the user's head pose or eye pose. Cone casting techniques, described generally, can project an invisible cone in the direction the user is looking and identify any objects that intersect with the cone. The cone castings can involve casting thin, pencil rays with substantially little transverse width or casting rays with substantial transverse width (e.g., cones or frustums) from an AR display (of the wearable system) toward physical or virtual objects. Cone casting with a single ray may also be referred to as ray casting. Detailed examples of cone casting techniques are described in U.S. application Ser. No. 15/473,444, titled "Interactions with 3D Virtual Objects Using Poses and Multiple-DOF Controllers", filed Mar. 29, 2017, the disclosure of which is hereby incorporated by reference in its entirety.

The user interface may be projected by the display system as described herein (such as the display 220 in FIG. 2A or 2B). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
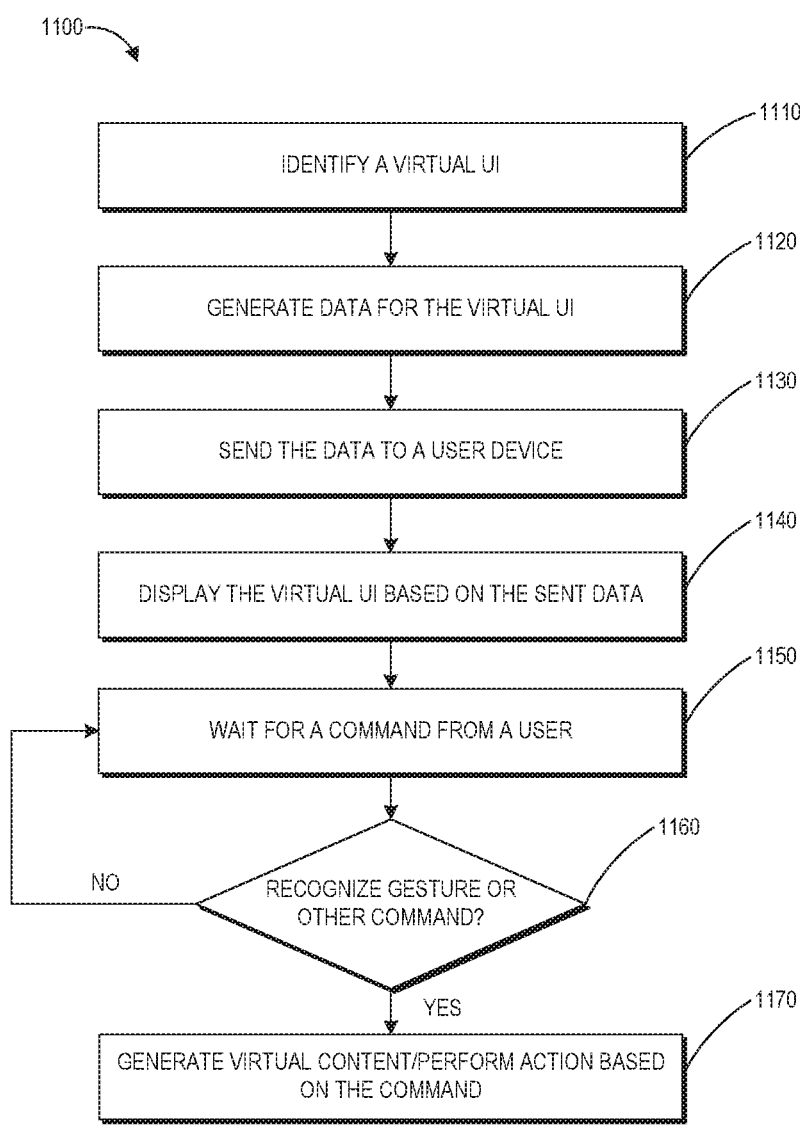
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI, etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170). As an example, the wearable system may wait for user's hand gestures before mixing multiple steam tracks.

Additional examples of wearable systems, UIs, and user experiences (UX) are described in U.S. Patent Publication No. 2015/0016777, which is incorporated by reference herein in its entirety.

Examples Objects in the Field of Regard (FOR) and Field of View (FOV)

Figure 12A:
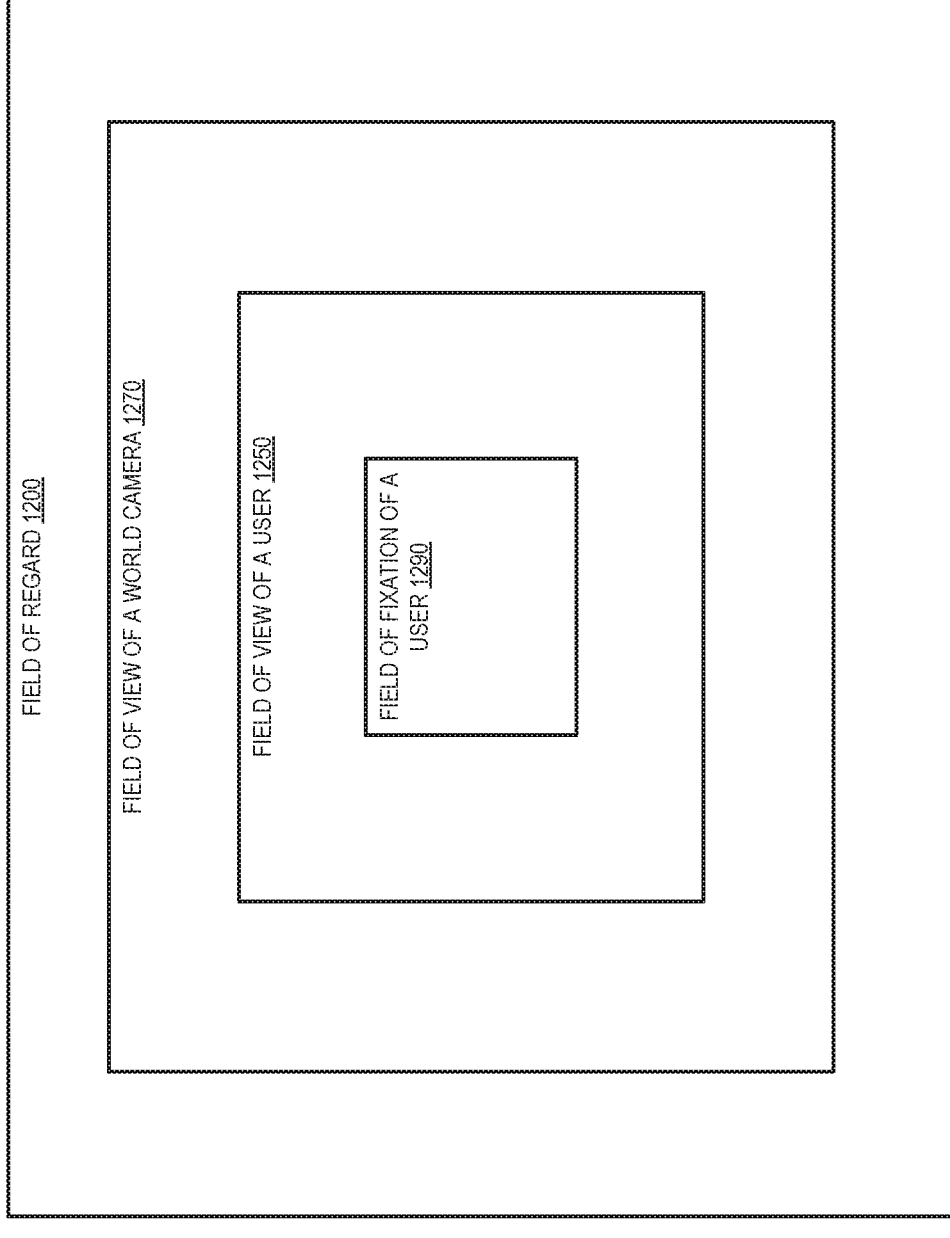
FIG. 12A schematically illustrates an example of a field of regard (FOR), a field of view (FOV) of a world camera, a field of view of a user, and a field of fixation of a user.

FIG. 12A schematically illustrates an example of a field of regard (FOR) 1200, a field of view (FOV) of a world camera 1270, a field of view of a user 1250, and a field of fixation of a user 1290. As described with reference to FIG. 4, the FOR 1200 comprises a portion of the environment around the user that is capable of being perceived by the user via the wearable system. The FOR may include 4π steradians of solid angle surrounding the wearable system because the wearer can move his body, head, or eyes to perceive substantially any direction in space. In other contexts, the wearer's movements may be more constricted, and accordingly the wearer's FOR may subtend a smaller solid angle.

The field of view of a world camera 1270 can include a portion of the user's FOR that is currently observed by an outward-facing imaging system 464. With reference to FIG. 4, the field of view of a world camera 1270 may include the world 470 that is observed by the wearable system 400 at a given time. The size of the FOV of the world camera 1270 may depend on the optical characteristics of the outward-facing imaging system 464. For example, the outward-facing imaging system 464 can include a wide angle camera that can image a 190 degree space around the user. In certain implementations, the FOV of the world camera 1270 may be larger than or equal to a natural FOV of a user's eyes.

The FOV of a user 1250 can comprise the portion of the FOR 1200 that a user perceives at a given time. The FOV can depend on the size or optical characteristics of the display of a wearable device. For example, an AR/MR display may include optics that provides AR/MR functionality when the user looks through a particular portion of the display. The FOV 1250 may correspond to the solid angle that is perceivable by the user when looking through an AR/MR display such as, e.g., the stacked waveguide assembly 480 (FIG. 4) or the planar waveguide 600 (FIG. 6). In certain embodiments, the FOV of a user 1250 may be smaller than the natural FOV of the user's eyes.

The wearable system can also determine a user's field of fixation 1290. The field of fixation 1290 can include a portion of the FOV 1250 at which the user's eyes can fixate (e.g., maintain visual gaze at that portion). The field of fixation 1290 may correspond to the fovea region of the eyes that a light falls on. The field of fixation 1290 can be smaller than the FOV 1250 of a user, for example, the field of fixation may be a few degrees to about 5 degrees across. As a result, even though the user can perceive some virtual objects in the FOV 1250 that are not in the field of fixation 1290 but which are in a peripheral field of view of the user.

Figure 12B:
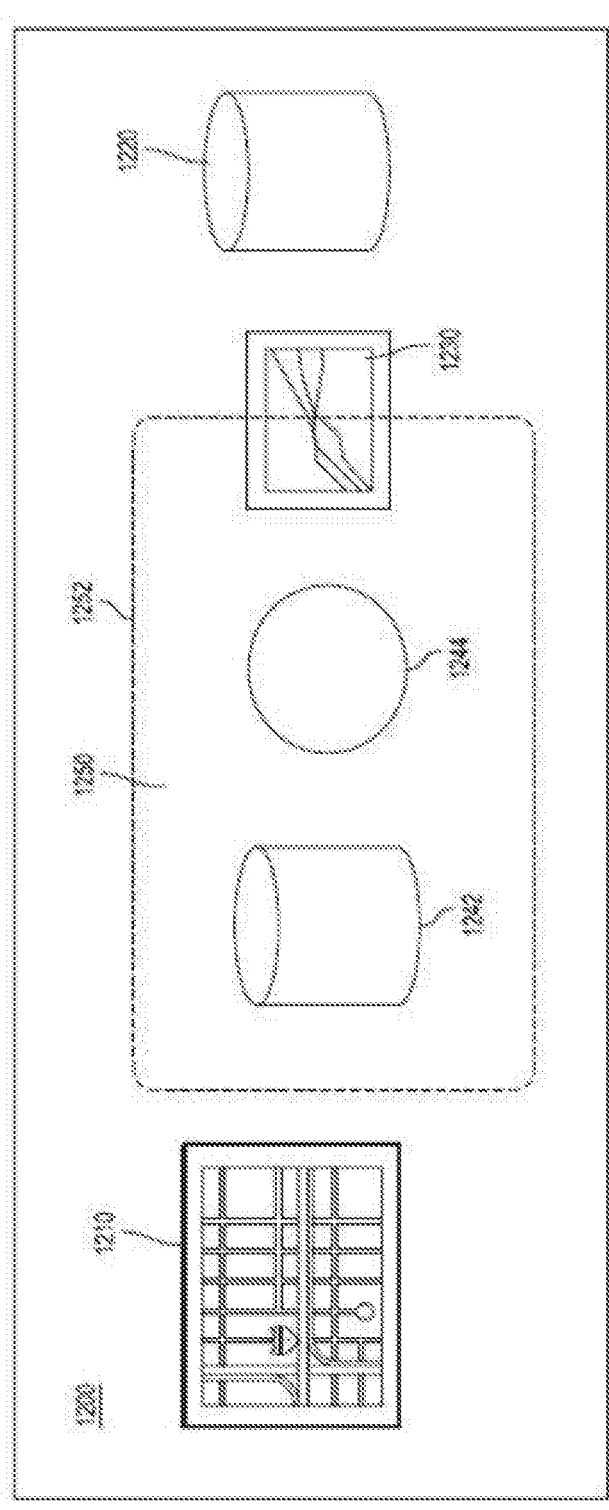
FIG. 12B schematically illustrates an example of virtual objects in a user's field of view and virtual objects in a field of regard.

FIG. 12B schematically illustrates an example of virtual objects in a user's field of view (FOV) and virtual objects in a field of regard (FOR). In FIG. 12B, the FOR 1200 can contain a group of objects (e.g., 1210, 1220, 1230, 1242, and 1244) which can be perceived by the user via the wearable system. The objects within the user's FOR 1200 may be virtual and/or physical objects. For example, the user's FOR 1200 may include physical object such as a chair, a sofa, a wall, etc. The virtual objects may include operating system objects such as, e.g., a recycle bin for deleted files, a terminal for inputting commands, a file manager for accessing files or directories, an icon, a menu, an application for audio or video streaming, a notification from an operating system, text, a text editing application, a messaging application, and so on. The virtual objects may also include objects in an application such as, e.g., avatars, virtual objects in games, graphics or images, etc. Some virtual objects can be both an operating system object and an object in an application. In some embodiments, the wearable system can add virtual elements to the existing physical objects. For example, the wearable system may add a virtual menu associated with a television in the room, where the virtual menu may give the user the option to turn on or change the channels of the television using the wearable system.

A virtual object may be a three-dimensional (3D), two-dimensional (2D), or one-dimensional (1D) object. For example, the virtual object may be a 3D coffee mug (which may represent a virtual control for a physical coffee maker). The virtual object may also be a 2D graphical representation of a clock (displaying current time to the user). In some implementations, one or more virtual objects may be displayed within (or associated with) another virtual object. A virtual coffee mug may be shown inside of a user interface plane, although the virtual coffee mug appears to be 3D within this 2D planar virtual space.

The objects in the user's FOR can be part of a world map as described with reference to FIG. 9. Data associated with objects (e.g., location, semantic information, properties, etc.) can be stored in a variety of data structures such as, e.g., arrays, lists, trees, hashes, graphs, and so on. The index of each stored object, wherein applicable, may be determined, for example, by the location of the object. For example, the data structure may index the objects by a single coordinate such as the object's distance from a fiducial position (e.g., how far to the left or right of the fiducial position, how far from the top or bottom of the fiducial position, or how far depth-wise from the fiducial position). The fiducial position may be determined based on the user's position (such as the position of the user's head). The fiducial position may also be determined based on the position of a virtual or physical object (such as a target object) in the user's environment. Accordingly, the 3D space in the user's environment may be represented in a 2D user interface where the virtual objects are arranged in accordance with the object's distance from the fiducial position.

In FIG. 12B, the FOV 1250 is schematically illustrated by dashed line 1252. The user of the wearable system can perceive multiple objects in the FOV 1250, such as the object 1242, the object 1244, and a portion of the object 1230. As the user's pose changes (e.g., head pose or eye pose), the FOV 1250 will correspondingly change, and the objects within the FOV 1250 may also change. For example, the map 1210 is initially outside the user's FOV in FIG. 12B. If the user looks toward the map 1210, the map 1210 may move into the user's FOV 1250, and (for example), the object 1230 may move outside the user's FOV 1250.

The wearable system may keep track of the objects in the FOR 1200 as well as the objects in the FOV 1250. For example, the local processing & data module 260 can communicate with the remote processing module 270 and remote data repository 280 to retrieve virtual objects in the user's FOR. The local processing & data module 260 can store the virtual objects, for example, in a buffer or a temporary storage. The local processing & data module 260 can determine a user's FOV using the techniques descried herein and render a subset of the virtual objects that are in the user's FOV. When the user's pose changes, the local processing & data module 260 can update the user's FOV and accordingly render another set of virtual objects corresponding to the user's current FOV.

Overview of Various User Input Modes

A wearable system can be programmed to accept various modes of inputs for performing an operation. For example, the wearable system can accept two or more of the following types of input modes: voice commands, head poses, body poses (which may be measured, e.g., by an IMU in a belt pack or a sensor external to the HMD), eye gazes (also referred to herein as eye pose), hand gestures (or gestures by other body parts), signals from a user input device (e.g., a totem), environmental sensors, etc. Computing devices are typically engineered to generate a given output based on a single input from the user. For example, a user can input a text message by typing on a keyboard or guide a movement of a virtual object using a mouse, which are examples of hand gesture input modes. As another example, the computing device can receive a stream of audio data from the user's voice and translate the audio data into an executable command using voice recognition techniques.

A user input mode may, in some cases, be non-exclusively classified as a direct user input or an indirect user input. The direct user input may be a user interaction directly supplied by a user, e.g., via a volitional movement of the user's body (e.g., turning the head or eyes, staring at an object or location, saying a phrase, moving a finger or hand). As an example of a direct user input, the user can interact with the virtual object using a pose such as, e.g., a head pose, an eye pose (also referred to as eye gaze), a hand gesture, or another body pose. For example, the user can look (with head and/or eyes) at a virtual object. Another example of the direct user input is the user's voice. For example, a user can say "launch a browser" to cause the HMD to open a browser application. As yet another example of the direct user input, the user can actuate a user input device, e.g., via a touch gesture (such as touching a touch-sensitive portion of a totem) or a body movement (such as rotating a totem functioning as a multi-degree-of-freedom controller).

In addition or in alternative to direct user input, the user can also interact with a virtual object based on an indirect user input. The indirect user input may be determined from various contextual factors, such as, e.g., a geolocation of the user or the virtual object, an environment of the user, etc. For example, the user's geolocation may be in the user's office (rather than the user's home) and different tasks (e.g., work related tasks) can be executed based on the geolocation (e.g., derived from a GPS sensor).

The contextual factor can also include an affordance of the virtual object. The affordance of the virtual object can comprise a relation between the virtual object and the environment of the object which affords an opportunity for an action or use associated with the object. The affordances may be determined based on, for example, the function, the orientation, the type, the location, the shape, and/or the size of the object. The affordances may also be based on the environment in which the virtual object is located. As examples, an affordance of a horizontal table is that objects can be set onto the table, and an affordance of a vertical wall is that objects may be hung from or projected onto the wall. As an example, the may say "place that there" and a virtual office calendar is placed so as to appear horizontal on the user's desk in the user's office.

A single mode of direct user input may create a variety of limitations, where the number or the type of available user interface operations may be restricted due to the type of user inputs. For example, the user may not be able to zoom in or zoom out with head pose because the head pose may not be able to provide precise user interactions. As another example, the user may need to move the thumb back and forth (or move the thumb over a large amount of distance) on a touchpad in order to move a virtual object from the floor to the wall, which may create user fatigue over time.

Some direct input modes, however, may be more convenient and intuitive for a user to provide. For example, a user can talk to the wearable system to issue a voice command without needing to type up the sentence using gesture-based keyboard input. As another example, the user can use a hand gesture to point at a target virtual object, rather than moving a cursor to identify the target virtual object. While they may not be as convenient or intuitive, other direct input modes can increase accuracy of the user interaction. For example, a user can move a cursor to the virtual object to indicate the virtual object is the target object. However, as described above, if a user wants to select the same virtual object using a direct user input (e.g., a head pose, or other inputs that are direct results of a user's action), the user may need to control the precise movement of the head, which can cause muscle fatigue. A 3D environment (e.g., a VR/AR/MR environment) can add additional challenges to user interactions because user input will also need to be specified with respect to the depth (as opposed to a planar surface). This additional depth dimension can create more opportunities for errors than a 2D environment. For example, in 2D environment, a user input can be translated with respect to a horizontal axis and a vertical axis in a coordinate system while the user input may need to be translated with respect to 3 axes (horizontal, vertical, and depth) in a 3D environment. Accordingly, an imprecise transaction of a user input can cause errors in 3 axes (rather than 2 axes in the 2D environment).

To utilize the existing benefits of direct user inputs while improving accuracy of interacting with objects in the 3D space and reducing user fatigue, multiple modes of direct inputs may be used to execute a user interface operation. The multimodal inputs can further improve existing computing devices (in particular a wearable device) for interactions with virtual objects in a data rich and dynamic environment, such as, e.g., an AR, VR, or MR environment.

Figure 13:
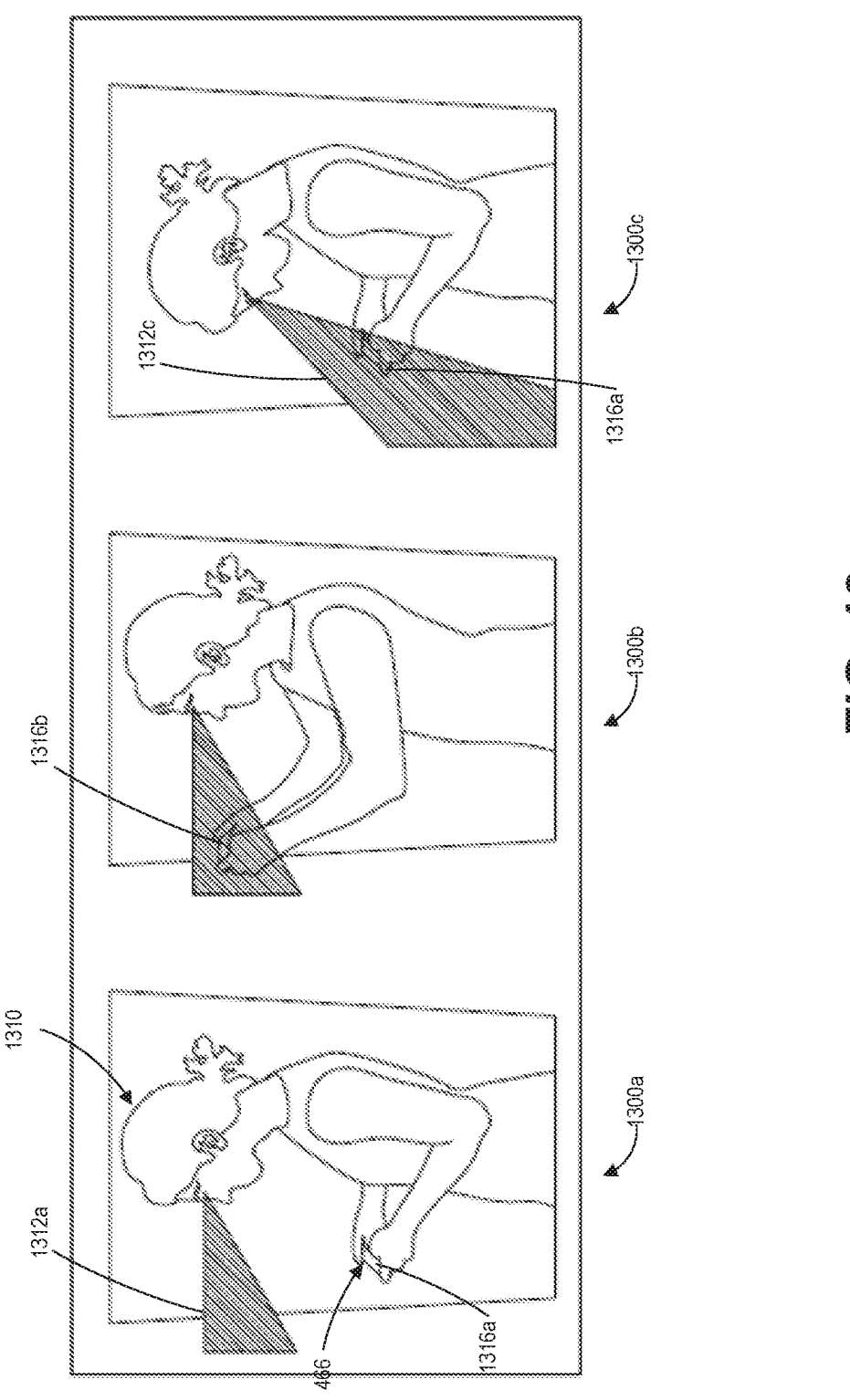
FIG. 13 illustrates examples of interacting with a virtual object using one mode of user input.

In multimodal user input techniques, one or more of the direct inputs may be used to identify a target virtual object (also referred to as a subject) which a user will interact with and to determine a user interface operation that will be performed on the target virtual object. For example, the user interface operation may include a command operation, such as select, move, zoom, pause, play, and a parameter of the command operation (such as, e.g., how to carry out the operation, where or when to the operation will occur, with which object will the target object interact, etc.). As an example of identifying a target virtual object and determining an interaction to be performed on the target virtual object, a user may look at a virtual sticky note (a head or eye pose mode of input), point at a table (a gesture mode of input), and say "move that there" (a voice mode of input). The wearable system can identify that the target virtual object in the phrase "move that there" is the virtual sticky note ("that") and can determine the user interface operation involves moving (the executable command) the virtual sticky note to the table ("there"). In this example, the command operation can be to "move" the virtual object, while the parameter of the command operation can include a destination object, which is the table that the user is pointing at. Advantageously, in certain embodiments, the wearable system can increase overall accuracy of a user interface operation or can increase the convenience of a user's interaction by performing a user interface operation based on multiple modes of direct user inputs (e.g., three modes in the above example, head/eye pose, gesture, and voice). For example, instead of saying "move the leftmost browser 2.5 feet to the right", the user can say "move that there" (without pointing out the object being moved in the speech input) while using head or hand gestures indicating the object is the leftmost browser and use head or hand movements to indicate the distance of the movement.
Examples Interactions in a Virtual Environment Using Various Input Modes FIG. 13 illustrates examples of interacting with a virtual object using one mode of user input. In FIG. 13, a user 1310 wears an HMD and is interacting with virtual content in three scenes 1300a, 1300b, and 1300c. The user's head position (and corresponding eye gaze direction) is represented by a geometric cone 1312a. In this example, the user can perceive the virtual content via the display 220 of HMD. While interacting with the HMD, the user can input a text message via the user input device 466. In the scene 1300a, the user's head is at its natural resting position 1312a and the user's hands are also at their natural resting position 1316a. However, although the user may be more comfortable typing in the text on the user input device 466, the user cannot see the interface on the user input device 466 to ensure that the character is correctly typed.

In order to see the text entered on the user input device, the user can move the hands up to position 1316b as shown in the scene 1300b. Accordingly, the hands will be in the FOV of the user's head when the head is at its natural resting position 1312a. However, the position 1316b is not a natural resting position of the hands, and it may cause user fatigue as a result. Alternatively, as illustrated in the scene 1300c, the user can move her head to the position 1312c in order to maintain the hands at the natural resting position 1316a. However, the muscles around the user's neck may become fatigued due to the unnatural position of the head and the user's FOV is pointed toward the ground or floor rather than toward the outward world (which may be unsafe if the user were walking in a crowded area). In either the scene 1300b or the scene 1300c, the user's natural ergonomics are sacrificed to meet a desired user interface operation when the user is performing the user interface operation using a single input mode.

The wearable system described herein can at least partially alleviate the ergonomic limitations depicted in the scenes 1300b and 1300c. For example, a virtual interface can be projected within the field of view of the user in the scene 1300a. The virtual interface can allow the user to observe the typed input from a natural position.

The wearable system can also display and support interactions with virtual content free from device constraints. For example, the wearable system can present multiple types of virtual content to a user and a user can interact with one type of content using a touchpad while interacting with another type of content using a keyboard. Advantageously, in some embodiments, the wearable system can determine which virtual content is a target virtual object (that the user is intended to act upon) by calculating a confidence score (with a higher confidence score indicative of a higher confidence (or likelihood) that the system has identified the correct target virtual object). Detailed examples on identifying the target virtual object are described with reference to FIGS. 15-18B.

Figure 14:
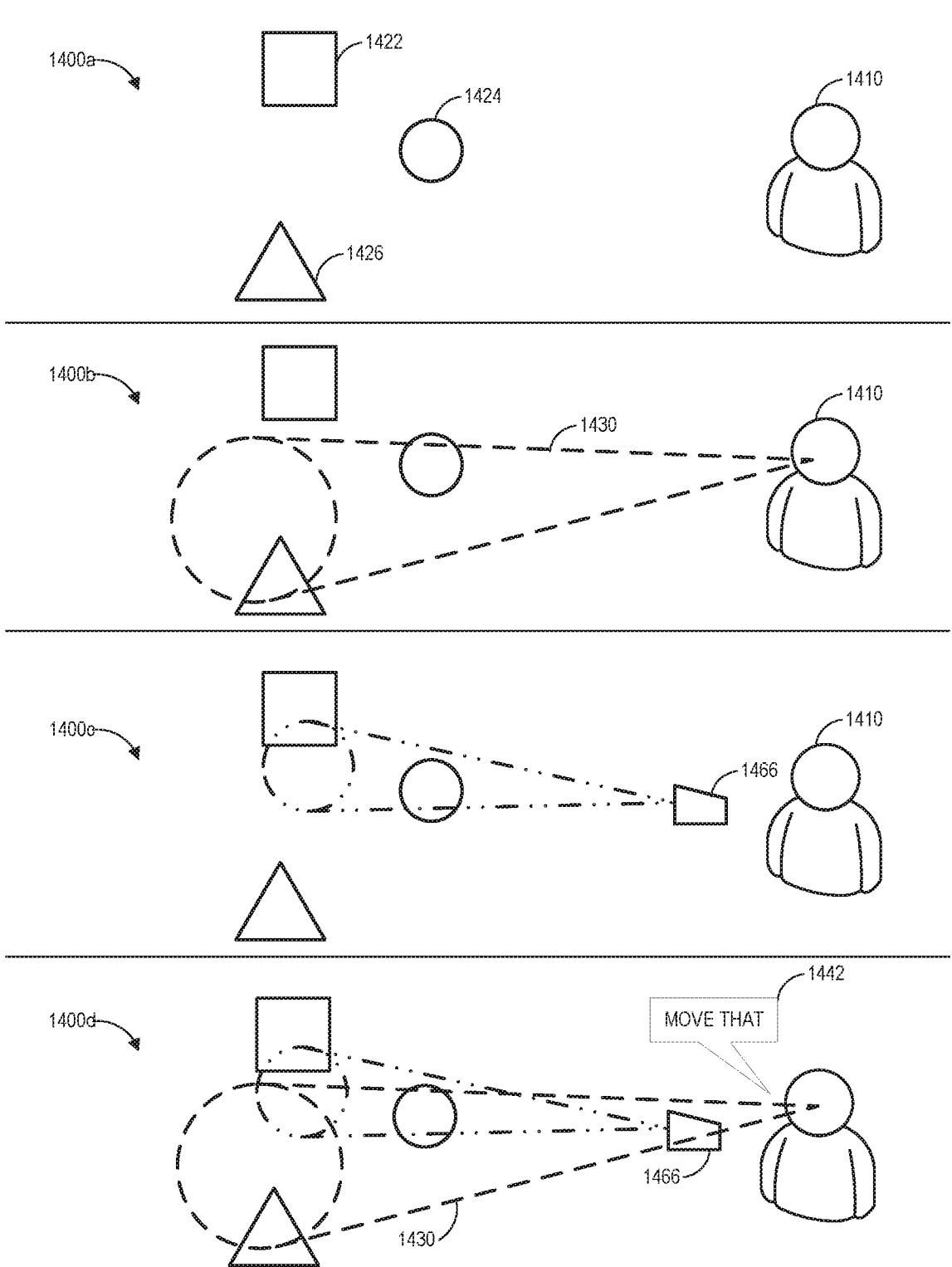
FIG. 14 illustrates examples of selecting a virtual object using a combination of user input modes.

FIG. 14 illustrates examples of selecting a virtual object using a combination of user input modes. In the scene 1400a, the wearable system can present a user 1410 with a plurality of virtual objects, represented by a square 1422, a circle 1424, and a triangle 1426.

The user 1410 can interact with the virtual objects using head pose as illustrated in the scene 1400b. This is an example of a head pose input mode. The head pose input mode may involve a cone cast to target or select virtual objects. For example, the wearable system can cast a cone 1430 from a user's head toward the virtual objects. The wearable system can detect whether one or more of the virtual objects fall within the volume of the cone to identify which object the user intends to select. In this example, the cone 1430 intersects with the circle 1424 and the triangle 1426. Therefore, the wearable system can determine that the user intends to select either the circle 1424 or the triangle 1426. However, because the cone 1430 intersects with both the circle 1424 and the triangle 1426, the wearable system may not be able to ascertain whether the target virtual object is the circle 1424 or the triangle 1426 based on the head pose input alone.

In the scene 1400c, the user 1410 can interact with the virtual objects by manually orienting a user input device 466, such as totem (e.g., a handheld remote control device). This is an example of a gesture input mode. In this scene, the wearable system can determine that either the circle 1424 or the square 1422 is the intended target because these two objects are in the direction at which the user input device

466 is pointing. In this example, the wearable system can determine the direction of the user input device 466 by detecting a position or orientation of the user input device 466 (e.g., via an IMU in the user input device 466), or by performing a cone cast originating from the user input device 466. Because both the circle 1424 and the square 1422 are candidates for the target virtual object, the wearable system cannot ascertain which one of them is the object that the user actually wants to select based solely on the gesture input mode.

In the scene 1400*d*, the wearable system can use multimodal user inputs to determine the target virtual object. For example, the wearable system can use both the results obtained from the cone cast (head pose input mode) and from the orientation of the user input device (gesture input mode) to identify the target virtual object. In this example, the circle 1424 is the candidate identified in both the result from the cone cast and the result obtained from the user input device. Therefore, the wearable system can determine with high confidence, using these two input modes, that the target virtual object is the circle 1424. As further illustrated in the scene 1400*d*, the user can give a voice command 1442 (illustrated as "Move that"), which is an example of a third input mode (namely, voice), to interact with the target virtual object. The wearable system can associate the word "that" with the target virtual object, the word "Move" with the command to be executed, and can accordingly move the circle 1424. However, the voice command 1442 by itself (without indications from the user input device 466 or the cone cast 143) may cause confusion to the wearable system, because the wearable system may not know which object is associated with the word "that".

Advantageously, in some embodiments, by accepting multiple modes of input to identify and interact with a virtual object, the amount of precision required for each mode of input may be reduced. For example, the cone cast may not be able to pinpoint an object at a rendering plane that is far away because the diameter of the cone increases as the cone gets farther away from the user. As other examples, the user may need to hold the input device at a particular orientation to point toward a target object and speak with a particular phrase or pace to ensure the correct voice input. However, by combining the voice input and the results from the cone cast (either from a head pose or a gesture using the input device), the wearable system can still identify the target virtual object without requiring either input (e.g., the cone cast or the voice input) to be precise. For example, even though the cone cast selects multiple objects (e.g., as described with reference to scenes 1400*b*, 1400*c*), the voice input may help narrow down the selection (e.g., increase the confidence score for the selection). For example, the cone cast may capture 3 objects, among which the first object is to the user's right, the second object is to the user's left, and the third object is in the center of the user's FOV. The user can narrow the selection by saying "select the rightmost object". As another example, there may be two identically shaped objects in the user's FOV. In order for the user to select the correct object, the user may need to give more descriptions to the object via voice command. For example, rather than saying "select the square object", the user may need to say "select the square object that is red". However, with cone cast, the voice command may not have to be as precise. For example, the user can look at one of the square object and say "select the square object" or even "select the object". The wearable system can automatically select the square object that coincides with the user's gaze direction and will not select the square object that is not in the user's gaze direction.

In some embodiments, the system may have a hierarchy of preferences for combinations of input modes. For example, a user tends to look in the direction his or her head is pointing; therefore, eye gaze and head pose may provide information that is similar to each other. A combination of head pose and eye gaze may be less preferred, because the combination does not provide much extra information as compared to the use of eye gaze alone or head pose alone. Accordingly, the system may use the hierarchy of modal input preferences to select modal inputs that provide contrasting information rather than generally duplicative information. In some embodiments, the hierarchy is to use head pose and voice as the primary modal inputs, followed by eye gaze and gesture.

Accordingly, as described further herein, based on multimodal inputs, the system can calculate a confidence score for various objects in the user's environment that each such object is the target object. The system can select, as the target object, the particular object in the environment that has the highest confidence score.

FIG. 15 illustrates an example of interacting with a virtual object using a combination of direct user inputs. As depicted in FIG. 15, a user 1510 wears an HMD 1502 configured to display virtual content. The HMD 1502 may be part of the wearable system 200 described herein and may include a belt-worn power & processing pack 1503. The HMD 1502 may be configured to accept user input from a totem 1516. The user 1510 of the HMD 1502 can have a first FOV 1514. The user can observe a virtual object 1512 in the first FOV 1514.

The user 1510 can interact with the virtual object 1512 based on a combination of direct inputs. For example, the user 1510 can select the virtual object 1512 through a cone casting technique based on the user's head or eye pose or by a totem 1516, by a voice command, or by a combination of these (or other) input modes (e.g., as described with reference to FIG. 14).

The user 1510 may shift her head pose to move the selected virtual object 1512. For example, the user can turn her head leftward to cause the FOV to be updated from the first FOV 1514 to the second FOV 1524 (as shown from the scene 1500*a* to the scene 1500*b*). The movement of the user's head can be combined with other direct inputs to cause the virtual object be moved from the first FOV 1514 to the second FOV 1524. For example, the change in the head pose can be aggregated with other inputs such as, e.g., a voice command ("move that, to there"), guidance from the totem 1516, or an eye gaze direction (e.g., as recorded by the inward-facing imaging system 462 shown in FIG. 4). In this example, the HMD 1502 can use the updated FOV 1524 as a general region that the virtual object 1512 should be moved into. The HMD 1502 can further determine the destination of the virtual object's 1512 movement based on the user's direction of gaze. As another example, the HMD may capture a voice command "move that there". The HMD can identify the virtual object 1512 as the object that the user will interact on (because the user has previously selected the virtual object 1512). The HMD can further determine that the user intends to move the object from the FOV 1514 to the FOV 1524 by detecting a change of the user's head pose. In this example, the virtual object 1512 may initially be in the central portion of the user's first FOV 1514. Based on the voice command and the user's head pose, the HMD may move the virtual object to the center of the user's second FOV 1524.

Examples of Identifying a Target Virtual Object or a User Interface Operation with Multimodal User Inputs

As described with reference to FIG. 14, in some situations, the wearable system may not be able to identify (with sufficient confidence) a target virtual object with which the user intends to interact using a single mode of input. Further, even if multiple modes of user inputs are used, one mode of user input may indicate one virtual object while another mode of user input may indicate a different virtual object.

To resolve ambiguities and to provide an improved wearable system which supports multimodal user inputs, the wearable system can aggregate the modes of user inputs and calculate a confidence score to identify a desired virtual object or user interface operation. As explained above, a higher confidence score indicates a higher probability or likelihood that the system has identified the desired target object.

Figure 16:
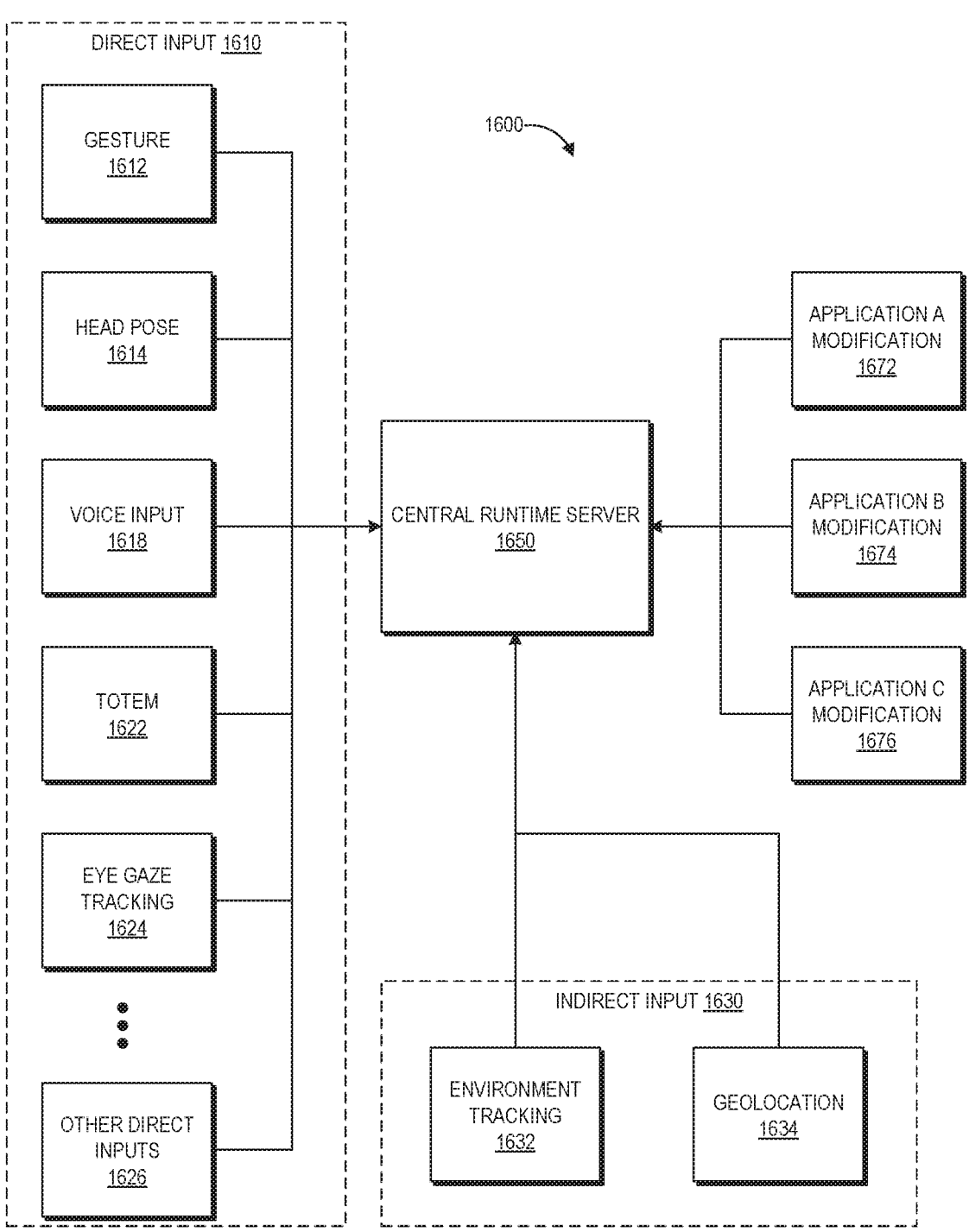
FIG. 16 illustrates an example computing environment for aggregating input modes.

FIG. 16 illustrates an example computing environment for aggregating input modes. The example environment 1600 includes three virtual objects, e.g., associated with the applications A 1672, B 1674, and C 1676. As described with reference to FIGS. 2A, 2B, and 9, a wearable system can include a variety of sensors and can receive a variety of user inputs from these sensors and analyze the user inputs to interact with a mixed reality 960, for example, using the transmodal input fusion techniques described herein. In the example environment 1600, a central runtime server 1650 can aggregate direct inputs 1610 and indirect user inputs 1630 to produce a multimodal interaction for an application. Examples of direct inputs 1610 may include a gesture 1612, head pose 1614, voice input 1618, totem 1622, direction of eye gaze (e.g., eye gaze tracking 1624), other types of direct inputs 1626, etc. Examples of indirect input 1630 may include environment information (e.g., environment tracking 1632), and geolocation 1634. The central runtime server 1650 may include the remote processing module 270. In certain implementations the local processing and data module 260 (or the processor 128) may perform one or more functions of the central runtime server 1650. The local processing and data module 260 may also communicate with the remote processing module 270 to aggregate input modes.

A wearable system can track the gesture 1612 using the outward-facing imaging system 464. The wearable system can use a variety of techniques described in FIG. 9 to track hand gestures. For example, the outward-facing imaging system 464 can acquire images of the user's hands, and map the images to corresponding hand gestures. The outward-facing imaging system 464 may use the FOV camera or a depth camera (configured for depth detection) to image a user's hand gesture. The central runtime server 1650 can use object recognizer 708 to identify the user's head gesture. The gesture 1612 can also be tracked by the user input device 466. For example, the user input device 466 may include a touch sensitive surface which can track the user's hand movements, such as, e.g., a swipe gesture or a tap gesture.

An HMD can recognize head poses 1614 using an IMU. A head 1410 may have multiple degrees of freedom, including three types of rotations (e.g., yaw, pitch, and roll) and three types of translations (e.g., surging, swaying, and heaving). The IMU can be configured, for example, to measure 3-DOF movements or 6-DOF movements of the head. The measurements obtained from the IMU may be communicated to the central runtime server 1650 for processing (e.g., to identify a head pose).

The wearable system can use an inward-facing imaging system 462 to perform eye gaze tracking 1624. For example, the inward-facing imaging system 462 can include eye cameras configured to obtain images of the user's eye region. The central runtime server 1650 can analyze the images (e.g., via the object recognizers 708) to deduce the user's direction of gaze or to track the user's eye movements.

The wearable system can also receive inputs from the totem 1622. As described herein, the totem 1622 can be an embodiment of the user input device 466. Additionally or alternatively, the wearable system can receive voice input 1618 from a user. The inputs from the totem 1622 and the voice input 1618 can be communicated to the central runtime server 1650. The central runtime server 1650 can use natural language processing in real-time or near real-time for parsing the user's audio data (for example acquired from the microphone 232). The central runtime server 1650 can identify the content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIGS. 7 and 9), semantic analysis, other algorithms that uses acoustic modeling or language modeling, etc. The central runtime server 1650 can also apply voice recognition algorithms which can identify the identity of the speaker, such as whether the speaker is the user of the wearable device or a person in the user's background.

The central runtime server 1650 can also receive indirect inputs when a user interacts with the HMD. The HMD can include various environmental sensors described with reference to FIGS. 2A and 2B. Using data acquired by the environmental sensors (along or in combination of data related to the direct input 1610), the central runtime server 1650 can reconstruct or update the user's environment (such as, e.g., the map 920). For example, the central runtime server 1650 can determine the user's ambient light condition based on the user's environment. This ambient light condition may be used to determine which virtual object the user can interact with. For example, when a user is in a bright environment, the central runtime server 1650 may identify the target virtual object to be the virtual object that supports gestures 1612 as an input mode because the cameras can observe the user's gestures 1612. However, if the environment is dark, the central runtime server 1650 may determine that the virtual object may be an object that supports voice input 1618 rather than gestures 1612.

The central runtime server 1650 can perform the environmental tracking 1632 and aggregate direct input modes to produce multimodal interaction for a plurality of applications. As an example, when a user enters into a noisy environment from a quiet environment, the central runtime server 1650 may disable the voice input 1618. Additional examples on selecting the modes of inputs based on the environments are further described with reference to FIG. 24.

The central runtime server 1650 can also identify a target virtual object based on geolocation information of the user. The geolocation information 1634 may also be acquired from an environmental sensor (such as, e.g., a GPS sensor). The central runtime server 1650 may identify a virtual object for potential user interactions where the distance between the virtual object and the user is within a threshold distance. Advantageously, in some embodiments, a cone in a cone cast may have a length that is adjustable by the system (e.g., based on number or density of objects in the environment).

By selecting objects within a certain radius of the user, the number of potential objects that may be target objects can significantly be reduced. Additional examples of using indirect input as a mode of input are described with reference to FIG. 21.

Examples of Ascertaining a Target Object

Figure 17A:
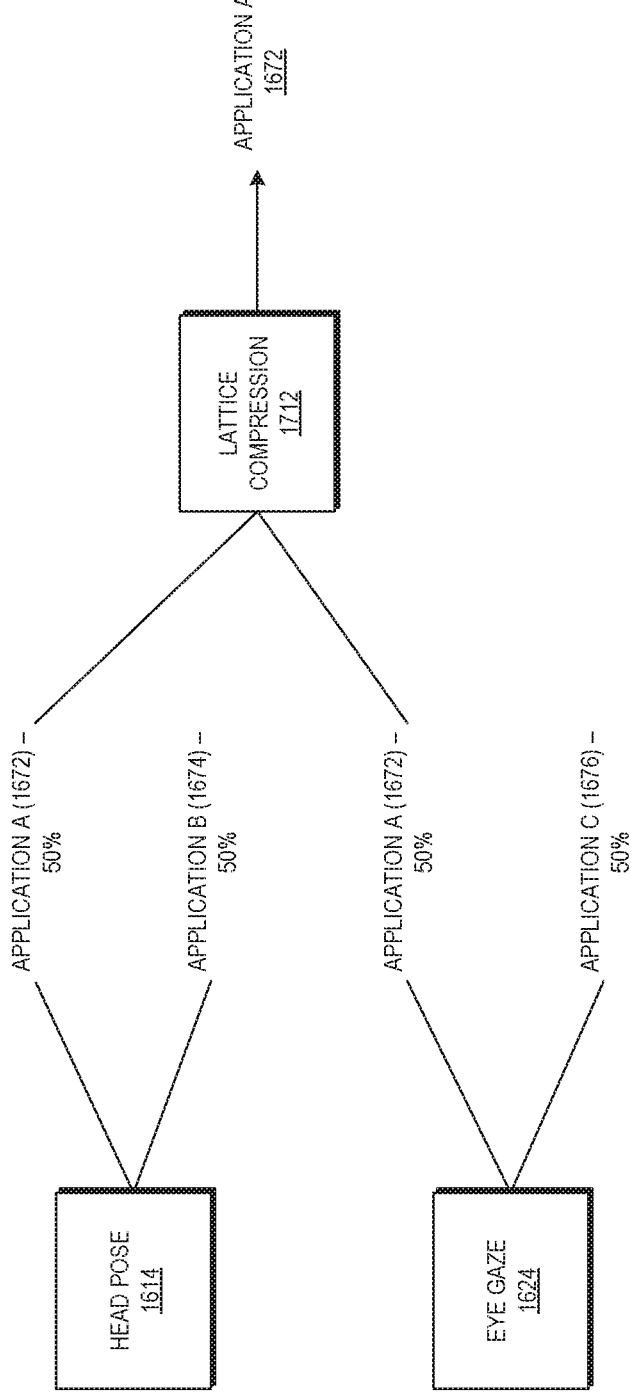
FIG. 17A illustrates an example of identifying a target virtual object using a lattice tree analysis.

The central runtime server 1650 can use a variety of techniques to determine a target object. FIG. 17A illustrates an example of identifying a target object using a lattice tree analysis. The central runtime server 1650 can derive a given value from an input source and produce a lattice of possible values for candidate virtual objects that a user may potentially interact. In some embodiments, the value can be a confidence score. A confidence score can include a ranking, a rating, a valuation, quantitative or qualitative values (e.g., a numerical value in a range from 1 to 10, a percentage or percentile, or a qualitative value of "A", "B", "C", and so on), etc. Each candidate object may be associated with a confidence score, and in some cases, the candidate object with the highest confidence score (e.g., higher than other object's confidence scores or higher than a threshold score) is selected by the system as the target object. In other cases, objects with confidence scores below a threshold confidence score are eliminated from consideration by the system as the target object, which can improve computational efficiency.

In many of the examples herein, a reference is made to selection of a target virtual object or selection from a group of virtual objects. This is intended to illustrate example implementations but is not intended to be limiting. The techniques described can be applied to virtual objects or physical objects in the user's environment. For example, the voice command "move that there" may be in reference to moving a virtual object (e.g., a virtual calendar) onto a physical object (e.g., the horizontal surface of the user's desk). Or the voice command "move that there" may be in reference to moving a virtual object (e.g., a virtual word processing application) to another location within another virtual object (e.g., another position in the user's virtual desktop).

The context of the command may also provide information as to whether the system should attempt to identify virtual objects, physical objects, or both. For example, in the command "move that there", the system can recognize that "that" is a virtual object, because the AR/VR/MR system cannot move an actual, physical object. Accordingly, the system may eliminate physical objects as candidates for "that". As described in the examples above, the target location "there" might be a virtual object (e.g., the user's virtual desktop) or a physical object (e.g., the user's desk).

Also, the system may assign confidence scores to objects in the user's environment, which may be the FOR, FOV, or field of fixation (see, e.g., FIG. 12A), depending on the context and the goals of the system at that point in time. For example, a user may wish to move a virtual calendar to a position on the user's desk, both of which are in the FOV of the user. The system may analyze objects within the user's FOV, rather than all objects in the user's FOR, because the context of the situation suggests that the command to move the virtual calendar will be to a target destination in the user's FOV, which may improve processing speed or efficiency. In another case, the user may be reviewing a menu of movie selections in a virtual movie application and may be fixating on a small selection of movies. The system may analyze (and, e.g., provide confidence scores) for just the movie selections in the user's field of fixation (based, e.g., on the user's eye gaze), rather than the full FOV (or FOR), which also may increases processing efficiency or speed.

With reference to the example shown in FIG. 17A, a user can interact with a virtual environment using two input modes, head pose 1614 and eye gaze 1624. Based on the head pose 1614, the central runtime server 1650 can identify two candidate virtual objects associated with application A 1672 and application B 1674. The central runtime server 1650 can evenly distribute a confidence score of 100% between the application A 1672 and the application B 1674. As a result, the application A 1672 and the application B 1674 may each be assigned a confidence score 50%. The central runtime server 1650 can also identify two candidate virtual objects (application A 1672 and application C 1676) based on the direction of eye gaze 1624. The central runtime server 1650 can also divide a 100% confidence between the application A 1672 and the application C 1676.

The central runtime server 1650 may perform a lattice compression logic function 1712 to reduce or eliminate outlier confidence values that are not common among the multiple input modes, or those confidence values that fall below a certain threshold to determine the most likely application that a user intends to interact with. For example, in FIG. 17A, the central runtime server 1650 can eliminate application B 1674 and application C 1676 because these two virtual objects are not identified by both the head pose 1614 and the eye gaze 1624 analysis. As another example, the central runtime server 1650 can aggregate the values assigned to each application. The central runtime server 1650 can set a threshold confidence value to be equal to or above 80%. In this example, application A's 1672 aggregated value is 100% (50%+50%); application B's 1674 aggregated value is 50%; and the application C's 1676 value is 50%. Because the individual confidence values for applications B and C are below the threshold confidence value, the central runtime server 1650 may be programmed not to select applications B and C, but rather to select the application A 1672, because application A's aggregated confidence value (100%) is greater than the threshold confidence value.

Although the example in FIG. 17A divides the value (e.g., the confidence score) associated with an input device equally among candidate virtual objects, in certain embodiments, the value distribution may not be equal among candidate virtual objects. For example, if the head pose 1614 has a value of 10, application A 1672 may receive a value of 7 and application B 1674 may receive a value of 3 (because the head pose is pointing more towards A 1672). As another example, if the head pose 1614 has a qualitative grade "A", the application A 1672 may be assigned grade "A" while application B 1674 and C 1676 do not receive anything from the head pose 1614.

The wearable system (e.g., the central runtime server 1650) can assign a focus indicator to the target virtual object so that the user can more readily perceive the target virtual object. The focus indicator can be a visual focus indicator. For example, the focus indicator can comprise a halo (substantially surrounding or near the object), a color, a perceived size or depth change (e.g., causing the target object to appear closer and/or larger when selected), or other visual effects which draw the user's attention. The focus indicator can also include audible or tactile effects such as vibrations, ring tones, beeps, etc. The focus indicator can provide useful feedback to the user that the system is "doing the right thing" by confirming to the user (via the focus indicator) that the system has correctly determined the objects associated with the command (e.g., correctly determined "that" and "there" in a "move that there" command). For example, the identified target virtual object can be assigned a first focus indicator and the destination location (e.g., "there" in the command) can be assigned a second focus indicator. In some cases, if the system has incorrectly determined the target object(s), the user may override the system's determination, e.g., by staring (fixating) at the correct object and providing a voice command such as "no, this not that".

Examples of Identifying a Target User Interface Operation

Figure 17B:
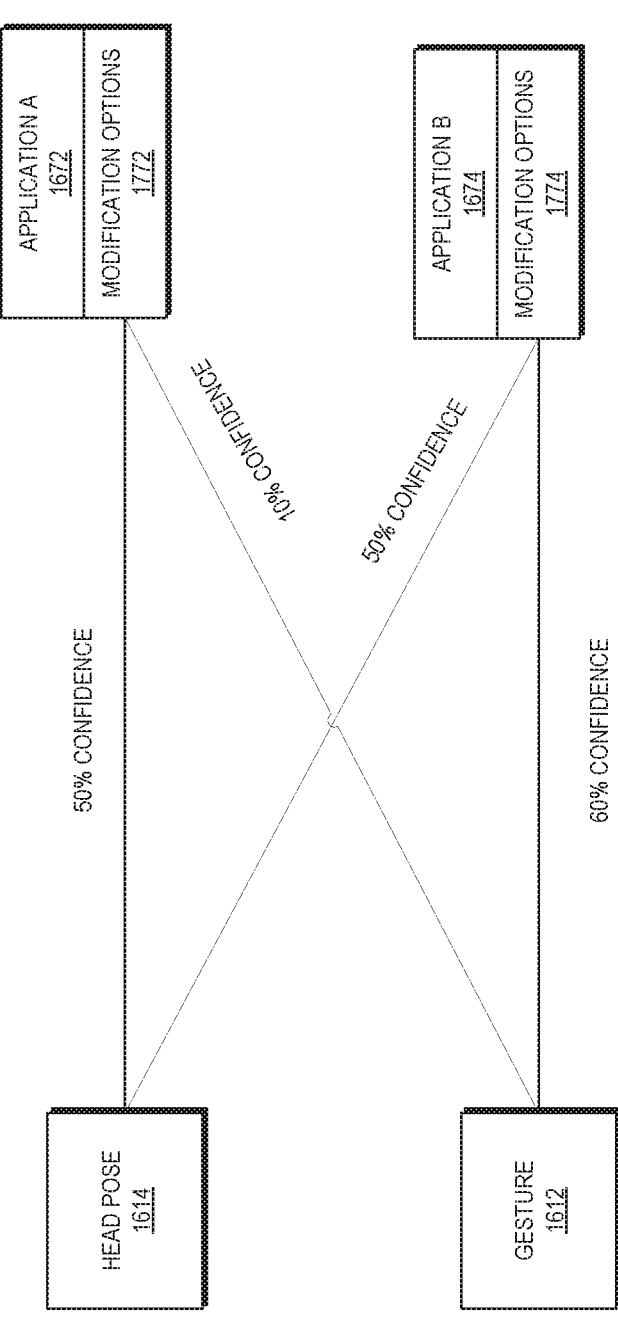
FIG. 17B illustrates an example of determining a target user interface operation based on multimodal inputs.

In addition to or in alternative to identifying a target virtual object, the central runtime server 1650 can also determine a target user interface operation based on multiple inputs received. FIG. 17B illustrates an example of determining a target user interface operation based on multimodal inputs. As depicted, the central runtime server 1650 can receive multiple inputs in the form of a head pose 1614 and a gesture 1612. The central runtime server 1650 can display multiple virtual objects associated with, e.g., application A 1672 and application B 1674, to a user. The head pose input mode by itself, however, may be insufficient to determine the desired user interface actions because there is a 50% confidence that the head pose applies to a user interface operation (shown as modification options 1772) associated with the application A 1672 and there is another 50% confidence that the head pose applies to another user interface operation (shown as modification options 1774) associated with the application B 1674.

In various embodiments, a particular application or a type of user interface operations may be programmed to be more responsive to a certain mode of input. For example, the HTML tags or JavaScript programming of the application B 1674 may be set to be more responsive to a gesture input more than that of the application A 1672. For example, the application A 1672 may be more responsive to a head pose 1672 than a gesture 1612, while a "select" operation may be more responsive to the gesture 1612 (e.g., a tap gesture) than the head pose 1614, because a user may be more likely to use a gesture to select an object than a head pose in some cases.

With reference to FIG. 17B, the gesture 1612 may be more responsive to a certain type of user interface operation in the application B 1674. As illustrated, the gesture 1612 may have a higher confidence associated with user interface operations for application B while the gesture 1612 may not be applicable for interface operations in the application A 1672. Accordingly, if the target virtual object is the application A 1672, the input received from the head pose 1614 may be the target user interface operation. But if the target virtual object is the application B 1674, then the input received from the gesture 1612 (alone or in combination with the input based on the head pose 1614) may be the target user interface operation.

As another example, because the gesture 1612 has a higher confidence level than the head pose 1614 when the user is interacting with the application B, the gesture 1612 may become the primary input mode for application B 1674 while the head pose 1614 may be the secondary input mode. Accordingly, the input received from the gesture 1612 may be associated with a higher weight than the head pose 1614. For example, if the head pose indicates that a virtual object associated with the application B 1674 should stay still while the gesture 1612 indicates that the virtual object should be moved leftward, the central runtime server 1650 may render the virtual object moving leftward. In certain implementations, a wearable system can allow a user to interact with a virtual object using the primary input mode and can consider the secondary input mode if the primary input mode is insufficient to determine the user's action. For example, the user can interact with the application B 1674 with mostly gestures 1612. However, when the HMD cannot determine a target user interface operation (because, e.g., there may be multiple candidate virtual objects in the application B 1674 or if the gesture 1612 is unclear), the HMD can use head pose as an input to ascertain the target virtual object or a target user interface operation to be performed on the application B 1674.

Figure 17C:
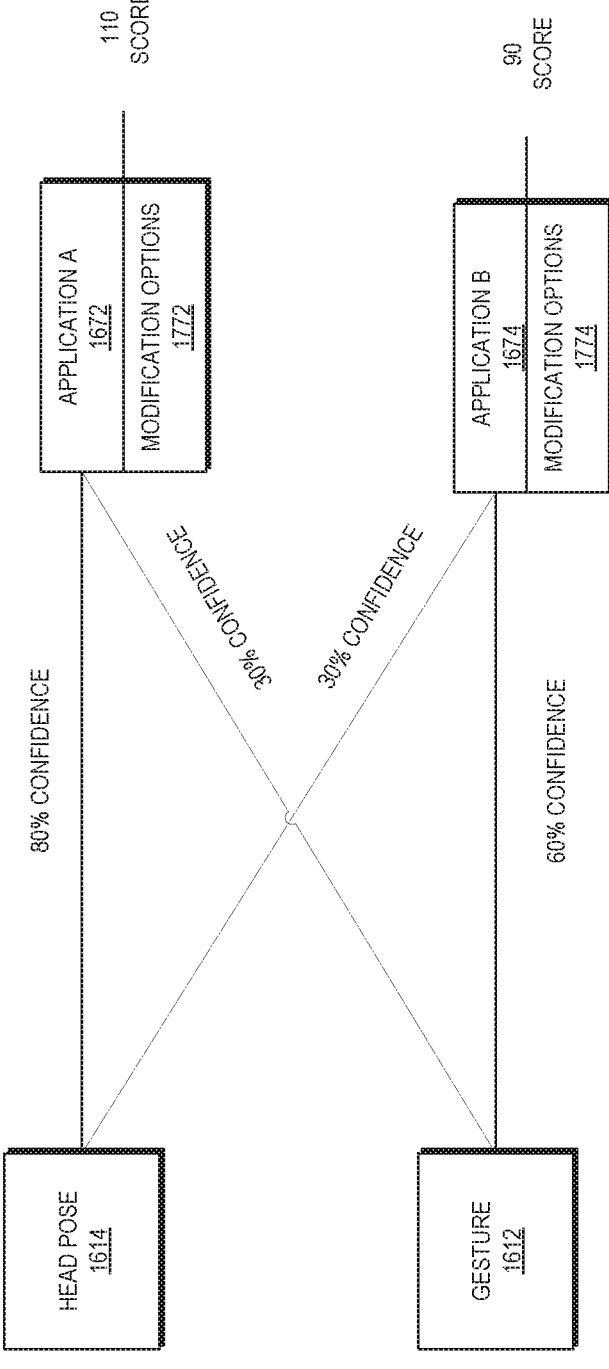
FIG. 17C illustrates an example of aggregating confidence scores associated with input modes for a virtual object.

The score associated with each input mode may be aggregated to determine a desired user interface operation. FIG. 17C illustrates an example of aggregating confidence scores associated with input modes for a virtual object. As illustrated in this example, a head pose input 1614 produces a higher confidence score for application A (80% confidence) over application B (30% confidence), whereas the gesture input 1612 produces a higher confidence score for application B (60% confidence) over application A (30% confidence). The central runtime server 1650 can aggregate the confidence scores for each objects based on the confidence scores derived from each user input mode. For example, the central runtime server 1650 can produce an aggregate score of 110 for application A 1672 and an aggregate score of 90 for application B 1674. The aggregated scores may be weighted or unweighted averages or other mathematical combinations. Because the application A 1672 has a higher aggregate score than Application B 1674, the central runtime server 1650 may select application A as the application to be interacted with. Additionally or alternatively, due to the higher aggregation score of the application A 1672, the central runtime server 1650 can determine that the head pose 1614 and the gesture 1612 are intended to perform an user interface operation on the application A 1672, even though the application B is more "responsive" to the gesture 1612 than application A.

In this example, the central runtime server 1650 aggregates the confidence scores occurred by adding the confidence scores of various inputs for a given object. In various other embodiments, the central runtime server 1650 can aggregate the confidence scores using techniques other than a simple addition. For example, an input mode or a score may be associated with a weight. As a result, the aggregation of confidence scores will take into account the weight assigned to the input mode or the score. The weights may be user adjustable to permit the user to selectively adjust the "responsiveness" of the multimodal interaction with the HMD. The weights may also be contextual. For example, weights used in a public place may emphasize head or eye pose over hand gestures, to avoid possible social awkwardness of having the user frequently gesture while operating the HMD. As another example, in a subway, airplane, or train, voice commands may be given less weight than head or eye poses, since a user may not wish to speak out loud to his or her HMD in such an environment. Environmental sensors (e.g., GPS) may assist in determining the appropriate context for where the user is operating the HMD.

Although the examples in FIGS. 17A-17C are illustrated with reference to two objects, the techniques described herein can also be applied when there are more or fewer objects. In addition, techniques described with reference to these figures can be applied to applications of a wearable system or virtual objects associated with one or more applications. Furthermore, the techniques described herein can also be applied to direct or indirect input modes, other than head pose, eye gaze, or gestures. For example, the voice command may also be used. In addition, despite the central runtime server 1650 having been used as an example throughout to describe the processing of the various input modes, the local processing & data module 260 of the HMD may also perform a portion or all of the operations in addition to or in alterative to the central runtime server 1650.

Example Techniques for Calculating a Confidence Score

Figure 18A:
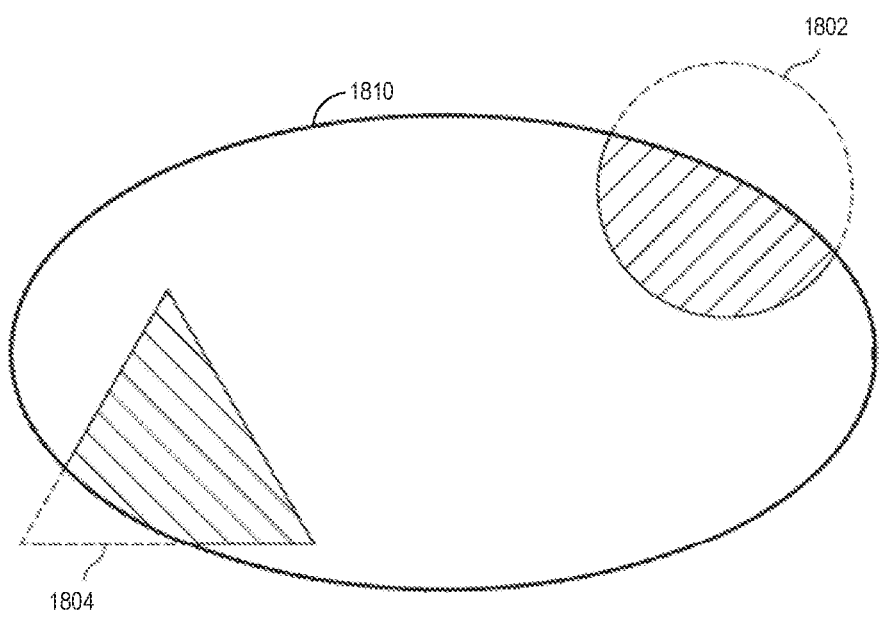
FIGS. 18A and 18B illustrate examples of calculating confidence scores for objects within a user's FOV.
Figure 18B:
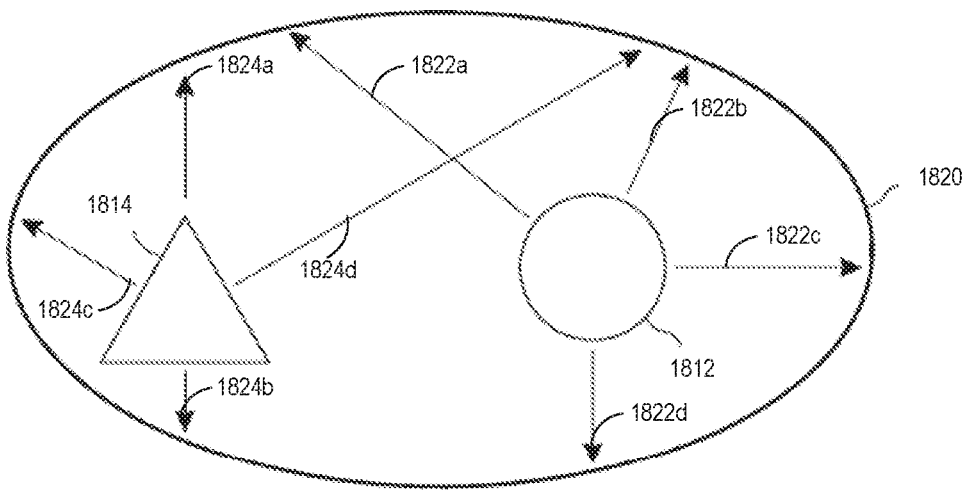

The wearable system can use one or a combination of a variety of techniques to calculate a confidence score of an object. FIGS. 18A and 18B illustrate examples of calculating confidence scores for objects within a user's FOV. The user's FOV may be calculated based on the user's head pose or eye gaze, for example, during a cone cast. The confidence scores in the FIGS. 18A and 18B may be based on a single input mode (such as, e.g., the user's head pose). Multiple confidence scores can be calculated (for some or all of the various multimodal inputs) and then aggregated to determine a user interface operation or a target virtual object based on multimodal user inputs.

FIG. 18A illustrates an example where the confidence score of a virtual object is calculated based on the portion of the virtual object that falls within the user's FOV 1810. In FIG. 18A, the user's FOV has a portion of two virtual objects (represented by a circle 1802 and a triangle 1804). The wearable system can assign confidence scores to the circle and the triangle based on the proportion of the projected area of the object that falls within the FOV 1810. As illustrated, approximately half of the circle 1802 falls within the FOV 1810, and as a result, the wearable system may assign a confidence score of 50% to the circle 1802. As another example, about 75% of the triangle is within the FOV 1810, Therefore, the wearable system may assign a confidence score of 75% to the triangle 1804.

The wearable system can use regression analysis of content in the FOV and FOR to calculate the proportion of a virtual object within a FOV. As described with reference to FIG. 12B, although the wearable system keeps track of the objects in the FOR, the wearable system may deliver the objects (or portions of the objects) that are in the FOV to a rendering projector (e.g., the display 220) for display within the FOV. The wearable system can determine which portions are provided for the rendering projector and analyze the proportion that is delivered to the rendering projector against the virtual object as a whole to determine the percentage of the virtual object that is within the FOV.

In addition to or as an alternative to calculating a confidence score based on the proportional area that falls within the FOV, the wearable system can also analyze the space near the object in the FOV to determine a confidence score of the object. FIG. 18B illustrates an example of calculating a confidence score based on the evenness of space surrounding a virtual object in the FOV 1820. The FOV 1820 includes two virtual objects as depicted by the triangle 1814 and the circle 1812. The space around each virtual object may be represented by vectors. For example, the space around the virtual object 1812 may be represented by vectors 1822*a*, 1822*b*, 1822*c*, and 1822*d*, while the space around the virtual object 1814 may be represented by vectors 1824*a*, 1824*b*, 1824*c*, and 1824*d*. The vectors may originate from a virtual object (or a boundary to the virtual object) and end at the edge of the FOV 1820. The system can analyze the distribution of the lengths of the vectors from the objects to the edge of the FOV to determine which of the objects is positioned more towards the center of the FOV. For example, an object at the very center of a circular FOV would have a relatively uniform distribution of vector lengths, whereas an object very close to an edge would have a non-uniform distribution of vector lengths (since some vectors pointing to the nearby edge would be shorter but vectors pointing to the most distant edge would be longer). As depicted in FIG. 18B, the distribution of lengths of the vectors from the virtual triangle 1814 to the edges of field of view 1820 vary more than the distribution of lengths of the vectors from circle 1812 to the edges of field of view 1820, which indicates the virtual circle 1812 is more towards the center of the FOV 1820 than the virtual triangle 1814. The variability of the distribution of the vector lengths may be represented by a standard deviation or variance (or other statistical measure) of the lengths. The wearable system can accordingly assign a higher confidence score to the virtual circle 1812 over the virtual triangle 1814.

Besides the techniques described with reference to FIGS. 18A and 18B, the wearable system can assign confidence score to a virtual object based on historical analysis of the user's interactions. As an example, the wearable system can assign a higher confidence score to a virtual object with which the user frequently interacts. As another example, one user may tend to move virtual objects using voice commands (e.g., "move that there"), whereas another user may prefer to use hand gestures (e.g., by reaching out and "grabbing" a virtual object and moving it to another position). The system can determine such user tendencies from the historical analysis. As yet another example, an input mode may be frequently associated with a particular user interface operation or a particular virtual object, as a result, the wearable system may increase the confidence score to the particular user interface operation or the particular virtual object, even though there may be an alternative user interface operation or virtual object based on the same input.

Given either field of view 1810 or 1820 as depicted in FIG. 18A or 18B, a second input mode can facilitate the selection of the appropriate virtual object or an appropriate user interface operation in the virtual object. For example, a user can say "enlarge the triangle" to increase the size of the triangle within field of view 1810. As another example, in FIG. 18A, a user may give a voice command, such as "make that twice as big". The wearable system may determine that the subject (e.g., the target object) of the voice command is the virtual object 1804 because the virtual object 1804 has a higher confidence score based on the head pose. Advantageously, in some embodiments this reduces the specificity of interaction needed to produce the desired result. For example, the user don't have to say "make the triangle twice as big" in order for the wearable system to achieve the same interaction.

The triangles and circles in FIGS. 18A and 18B are for illustration purposes only. Various techniques described herein can also be applied to virtual content that supports more complex user interactions.

Example Multimodal Interactions in a Physical Environment

Figure 19A:
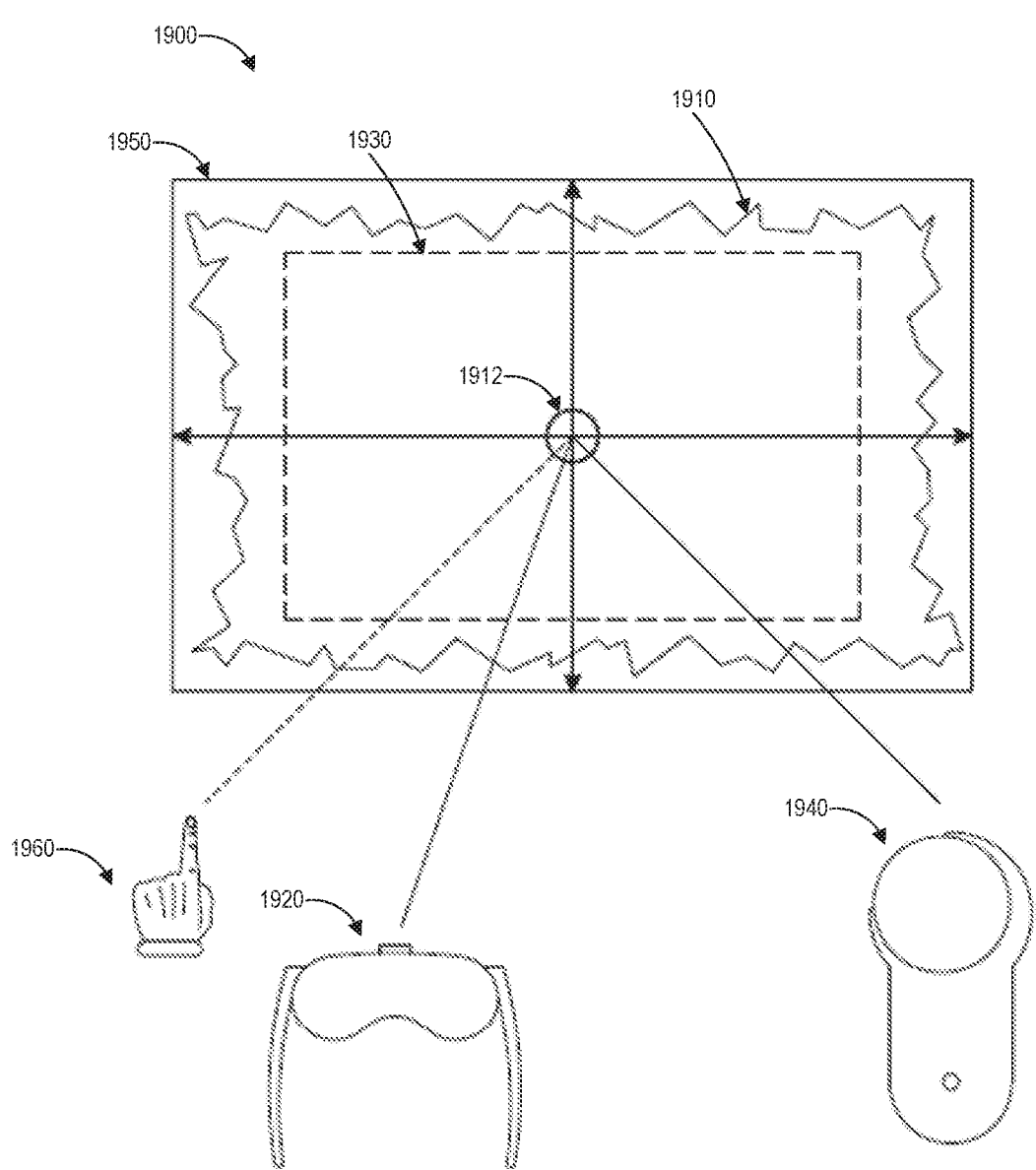
FIGS. 19A and 19B illustrate an example of interacting with a physical environment using multimodal inputs.
Figure 19B:
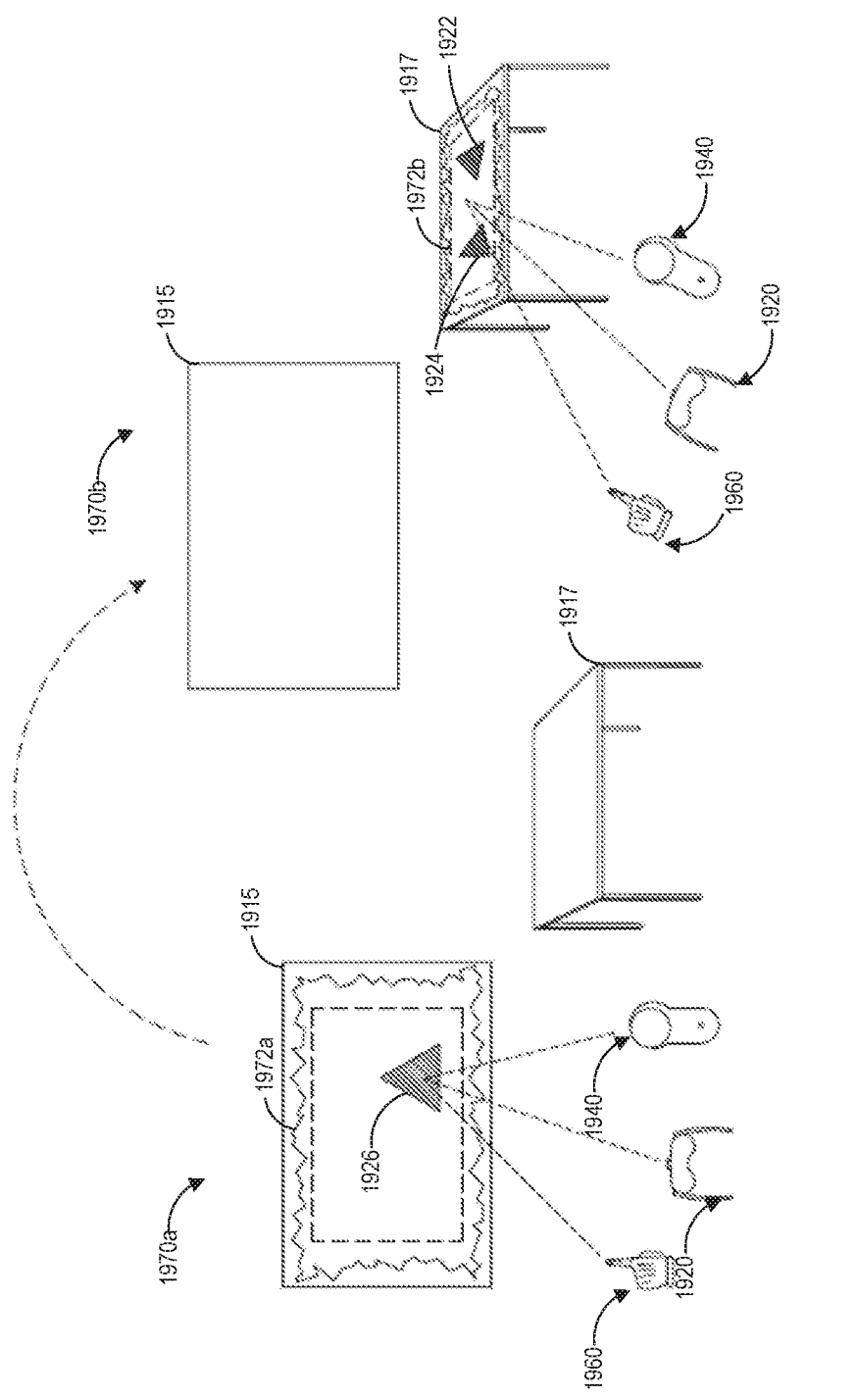

In addition to or in alternative to interacting with virtual objects, the wearable system can also offer a broad range of interactions within a real world environment. FIGS. 19A and 19B illustrate examples of interacting with a physical environment using multimodal inputs. In FIG. 19A, 3 modes of inputs are illustrated: hand gestures 1960, head pose 1920, and inputs from the user input device 1940. The head pose 1920 can be determined using pose sensors. The pose sensors may be an IMU, gyroscopes, magnetometers, accelerometers, or other types of sensors described with reference to FIGS. 2A and 2B. The hand gesture 1960 may be measured using an outward-facing imaging system 464 while the user input device 1940 may be an embodiment of the user input device 466 shown in FIG. 4.

In some embodiments, the wearable system can also measure the user's eye gaze. The eye gaze may include a vector extending from each of the user's eyes to a position where the two eyes' lines of sight converge. The vector can be used to determine the direction a user is looking and can be used to select or identify virtual content at the convergence point or along the vector. Such eye gaze may be determined by eye-tracking techniques such as, e.g., glint detection, iris or pupil shape mapping, infrared illumination, or binocular eye imaging with regression of an intersection point originating from a respective pupil orientation. Eye gaze or head pose may then be considered a source point for a cone cast or ray cast for virtual object selection.

As described herein, an interaction event to move selected virtual content within a user's environment (for example, "put that there") may require determination of a command operation (e.g., "put"), a subject (e.g., "that" as may be determined from the above multimodal selection techniques), and a parameter (e.g., "there"). The command operation (or command for short) and the subject (which is also referred to as the target object or the target virtual object) may be determined using a combination of input modes. For example, a command to move the subject 1912 may be based on a head pose 1920 change (e.g., head turning or nodding) or a hand gesture 1960 (e.g., a swipe gesture), alone or in combination. As another example, the subject 1912, may be determined based on a combination of head pose and eye gaze. Accordingly, the command based on multimodal user inputs can also sometimes be referred to as a multimodal input command.

The parameter may also be determined using a single input or a multimodal input. The parameter may be associated with objects in the user's physical environment (e.g., a table or a wall) or objects in the user's virtual environment (e.g., a movie application, an avatar or a virtual building in a game). Identifying a real world parameter can allow for a quicker and more accurate content placement response in some embodiments. For example, a particular virtual object (or a portion of the virtual object) may be substantially planar with a horizontal orientation (e.g., the normal of the virtual object is perpendicular to a floor of a room). When a user initiates an interaction of moving the virtual object, the wearable system can identify a real world surface with a similar orientation (e.g., a tabletop) and move the virtual object to the real world surface. In certain embodiments, such movements may be automatic. For example, the user may want to move a virtual book from where it is sitting on a floor. The only available horizontal surface in the room may be the user's study desk. Accordingly, the wearable system can automatically move the virtual book to the surface of the study desk in response to a voice command of "move that" without the user inputting additional commands or parameters, because the surface of the desk is the most likely location for where the user would want to move the book. As another example, the wearable system can identify real world surfaces of a suitable size for given content and thereby may provide better parameter matching for a user. For example, if a user is watching a virtual video screen with a given display size and desires to move it to a particular surface with a simple voice command, the system may determine which real world surfaces provide the necessary surface area to best support the virtual video's display size.

The wearable system can identify a target parameter (e.g., a target surface) using the techniques described with reference to identifying a target virtual object. For example, the wearable system can calculate a confidence score associated with a plurality of target parameters based on indirect user inputs or direct user inputs. As an example, the wearable system can calculate a confidence score associated with a wall based on direct input (such as the user's head pose) and indirect input (such as the characteristics of the wall (e.g., a vertical surface)).

Example Techniques of Identifying Real World Parameters

The wearable system can use a variety of techniques to determine a parameter (such as a target location) of a multimodal input command. For example, the wearable system can use various depth sensing techniques, such as, e.g., applying the SLAM protocol to environmental depth information (e.g., described with reference to FIG. 9), or construction or access of a mesh model of the environment. In some embodiments, depth sensing determines the distance between known points in a 3D space (e.g., the distance between sensors on an HMD) and a point of interest ("POI") on a surface of an object in the real world (e.g., a wall for locating virtual content). This depth information may be stored in the world map 920. A parameter for the interaction may be determined based a collection of POIs.

The wearable system can apply these depth sensing techniques to data obtained from depth sensors to determine the metes and bounds of a physical environment. The depth sensors may be part of the outward-facing imaging system 464. In some embodiments, depth sensors are coupled to IMUs. The data acquired from the depth sensors can be used to determine orientation of a plurality of POIs relative to one another. For example, the wearable system can compute a truncated signed distance function ("TSDF") for the POIs. A TSDF can include a numerical value for each POI. The numerical value may be zero when a point is within a given tolerance of a particular plane, positive when a point is spaced away from the particular plane in a first direction (e.g., above or outside), and negative when the point is spaced away from the particular plane in a second (e.g., opposite) direction (e.g., below or inside). The computed TSDF can be used to define a 3-D volumetric grid of bricks or boxes along orientations as determined by the IMU, which are aligned in, above, and below the particular plane to construct or representing a particular surface.

POIs outside of a given planar tolerance (e.g., with absolute value of TSDF greater than the tolerance) may be eliminated, leaving only a plurality of POIs adjacent to one another within given tolerance, to create virtual representations of surfaces within the real world environment. For example, the real world environment may include a conference table. There may be various other objects (e.g., telephones, laptop computers, coffee mugs, etc.) on top of the conference table. For the surfaces of the conference table, the wearable system can keep POIs associated with the conference table and remove the POIs for the other objects. As a result, a planar map (delineating the surfaces of the conference table) can represent the conference table with only the points that belong to the conference table. The map can leave out the points associated with the objects on top of the conference table. In certain embodiments, the collection of POIs remaining in the planar map may be referred to as "workable surfaces" of the environment, because these regions of the planar map represent space(s) where virtual objects may be placed. For example, when a user wants to move a virtual screen to a table, the wearable system can identify suitable surfaces (such as table tops, walls, etc.) in the user's environment while eliminating the objects (e.g., a coffee mug or a pencil or a wall painting) or surfaces (e.g., a surface of a bookshelf) that are not suited for placing the screen. In this example, the identified suitable surfaces may be the workable surfaces of the environment.

Referring back to the example shown in FIG. 19A, the environment 1900 can include a physical wall 1950. An HMD or the user input device 1940 can house a depth sensor system (such as, e.g., a time of flight sensor or vertical cavity surface emitting laser (VCSEL)) and pose sensors (such as, e.g., IMUs). The data obtained by the depth sensor system can be used to identify various POIs in the user's environment. The wearable system can group POIs that are substantially planar together to form a boundary polygon 1910. The boundary polygon 1910 may be an example embodiment of a workable surface.

In some embodiments, the outward-facing imaging system 464 can identify a user gesture 1960 which may include a finger pointing to a region within the real world environment 1900. The outward-facing imaging system 464 can identify a pre-measured boundary polygon 1910 by determining a sparse point vector construction of the finger pointing towards boundary polygon 1910.

As illustrated in FIG. 19A, there can be a virtual video screen 1930 inside of the boundary polygon 1910. The user can interact within the virtual object 1912 inside of the virtual video screen 1930 using multimodal input. FIG. 19B depicts an interaction using multimodal input of virtual content in a real world environment. The environment in FIG. 19B includes a vertical surface 1915 (which may be part of a wall) and a surface 1917 on a table top. In a first state 1970a, the virtual content 1926 is initially displayed within the boundary polygon 1972a on the wall surface 1915. The user can select the virtual object 1926, for example, through a cone cast or a multimodal input (including two or more of the gesture 1960, head pose 1920, eye gaze, or an input from the user input device 1940).

The user can use another input as part of the multimodal input to select the surface 1917 as a destination. For example, the user can use a head pose combined with a hand gesture to indicate that the surface 1917 is the destination. The wearable system can recognize the surface 1917 (and the polygon 1972b) by grouping POIs that appear to be on the same plane. The wearable system can also use other surface recognition techniques to identify the surface 1917.

The user can also use a multimodal input to transfer the virtual content 1126 to boundary polygon 1972b on the surface 1917 as illustrated in the second state 1970b. For example, the user can move the virtual content 1926 through a combination of changes in head pose and a movement of the user input device 1940.

As another example, the user could say "move that there" via the microphone 232 of the wearable system which can receive the audio stream and parse this command from it (as described herein). The user can combine this voice command with a head pose, eye gaze, gesture, or an actuation of the totem. The wearable system can detect the virtual object 1926 as the subject of this command because the virtual object 1926 is the highest confidence object (see, e.g., the dashed lines in scene 1970a indicating the user's finger 1960, HMD 1920 and totem 1940 are oriented toward object 1926). The wearable system can also identify the command operation as "move" and determine the parameter of the command to be "there". The wearable system can further determine that "there" refers to boundary polygon 1972b based on input modes other than the voice (e.g., eye gaze, head pose, gesture, totem).

A command in an interaction event can involve adjustments and calculations of multiple parameters. For example, the parameters may include a destination, a placement, an orientation, an appearance (e.g., size or shape), or an animation of a virtual object. The wearable system can automatically calculate a parameter even though the direct input is not explicit in changing the parameter. As an example, the wearable system can automatically change the orientation of the virtual object 1926 when it is moved from a vertical surface 1915 to a horizontal surface 1917. In the first state 1970a, the virtual content 1926 is a substantially vertical orientation on the surface 1915. When the virtual content 1926 is moved to the surface 1917 in the second state 1970b, the orientation of the virtual content 1926 may be kept consistent (e.g., maintaining the vertical orientation) as shown by the virtual object 1924. The wearable system can also automatically adjust the orientation of the virtual content 1926 to align with the orientation of the surface 1917 such that the virtual content 1926 appears to be in a horizontal position as illustrated by the virtual object 1922. In this example, the orientation may be automatically adjusted based on environment tracking 1632 as an indirect input. The wearable system can automatically consider the object's (e.g., the surface 1917) characteristics when the wearable system determines that the object is the target destination object. The wearable system can adjust the parameters of the virtual object based on the characteristics of the target destination object. In this example, the wearable system automatically rotated the orientation of the virtual object 1926 based on the orientation of the surface 1917.

Additional examples of automatically placing or moving virtual objects are described in U.S. application Ser. No. 15/673,135, filed Aug. 9, 2017, titled "AUTOMATIC PLACEMENT OF A VIRTUAL OBJECT IN A THREE-DIMENSIONAL SPACE," published as U.S. Pat. Pub. No. 20180045963, the disclosure of which is hereby incorporated by reference herein in its entirety.

In certain implementations, an input may explicitly modify multiple parameters. A voice command of "place that there flat" may alter the orientation of the virtual object 1926 in addition to identifying the surface 1917 as the destination. In this example, both the word "flat" and the word "there" can be parameter values, where "there" causes the wearable system to update the location of the target virtual object whereas the word "flat" is associated with the orientation of the target virtual object at the destination location. To execute the parameter "flat", the wearable system can match the orientation of the virtual object 1926 to match the orientation of the surface 1917.

Figure 20:
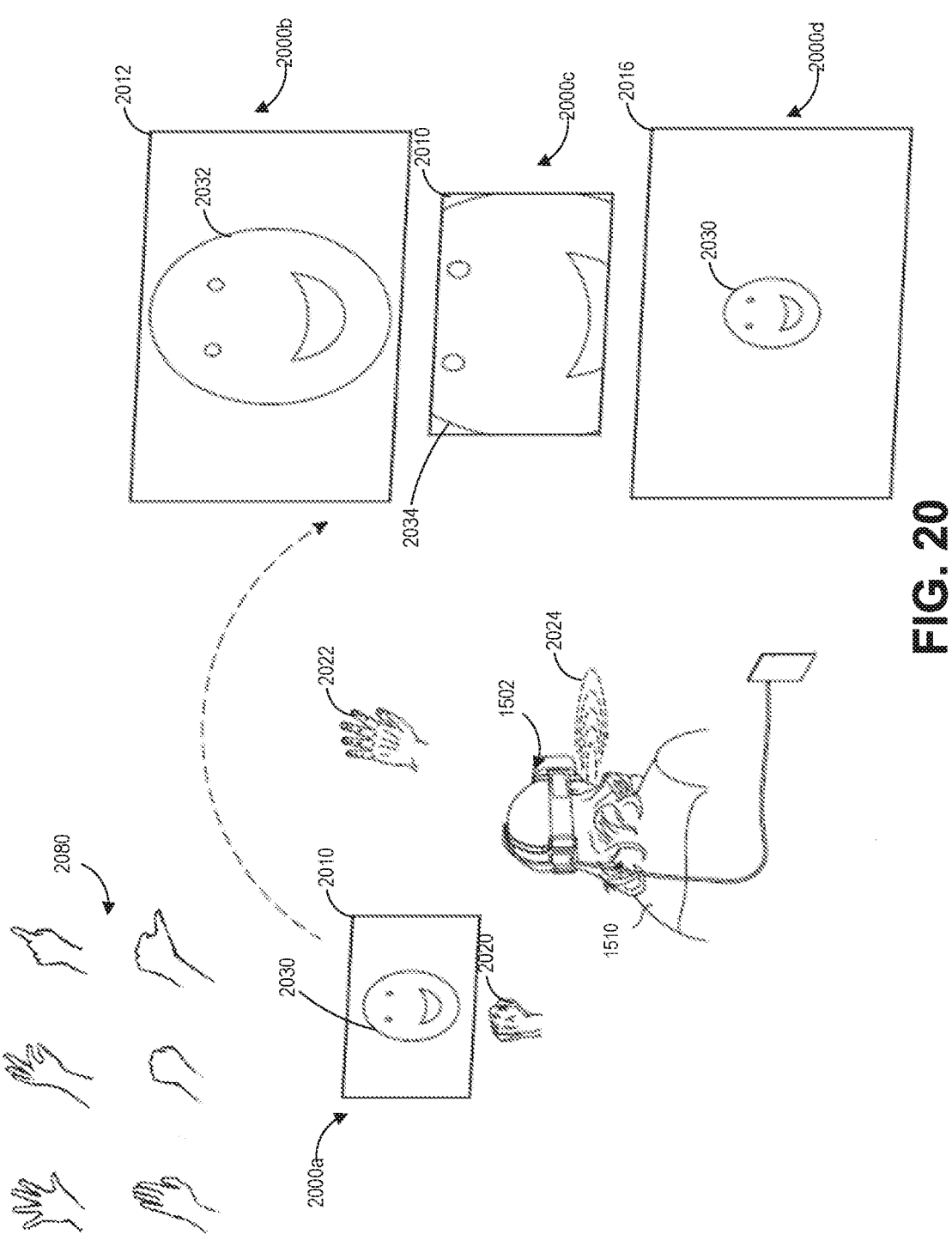
FIG. 20 illustrates an example of automatically resizing a virtual object based on multimodal inputs.

In addition to or as an alternative to selecting and moving a virtual object, a multimodal input can interact with virtual content in other ways. FIG. 20 illustrates an example of automatically resizing a virtual object based on multimodal inputs. In FIG. 20, the user 1510 can wear an HMD 1502 and can interact with virtual objects using hand gestures and voice commands 2024. FIG. 20 illustrates four scenes 2000a, 2000b, 2000c, and 2000d. Each scene includes a display screen and a virtual object (illustrated by the smiley face).

In the scene 2000a, the display screen has a size 2010 and the virtual object has a size 2030. The user can change the hand gesture from the gesture 2020 to the gesture 2022 to indicate that the user wants to adjust the size of either the virtual object or the display screen. The user can use voice input 2024 to indicate whether the virtual object or the display screen is the subject of manipulation.

As an example, the user may want to enlarge both the display screen and the virtual object. Accordingly, the user can use the input gesture 2022 as a command to enlarge. The parameter for the degree of expansion may be expressed by the extent of the outstretched figures. In the meantime, the user can use the voice input 2024 to dictate the subject of the interaction. As shown in the scene 2000b, the user may say "all" to produce an enlarged display 2012 and an enlarged virtual object 2032. As another example, in the scene 2000c, the user may say "content" to produce an enlarged virtual object 2034 while the size the display screen remains the same as that in the scene 2000a. As yet another example, in the scene 2000d, the user can say "display" to produce an enlarged display screen 2016, while the virtual object remains the same size as that in the scene 2000a.

Examples of Indirect Input as an Input Mode

As described herein, a wearable system can be programmed to allow user interactions with direct user inputs and indirect user inputs as part of the multimodal inputs. The direct user inputs may include head pose, eye gaze, voice input, gesture, inputs from a user input device, or other inputs that directly from a user. Indirect inputs may include various environment factors, such as, e.g., user's position, user's characteristics/preferences, object's characteristics, characteristics of the user's environment, etc.

Figure 21:
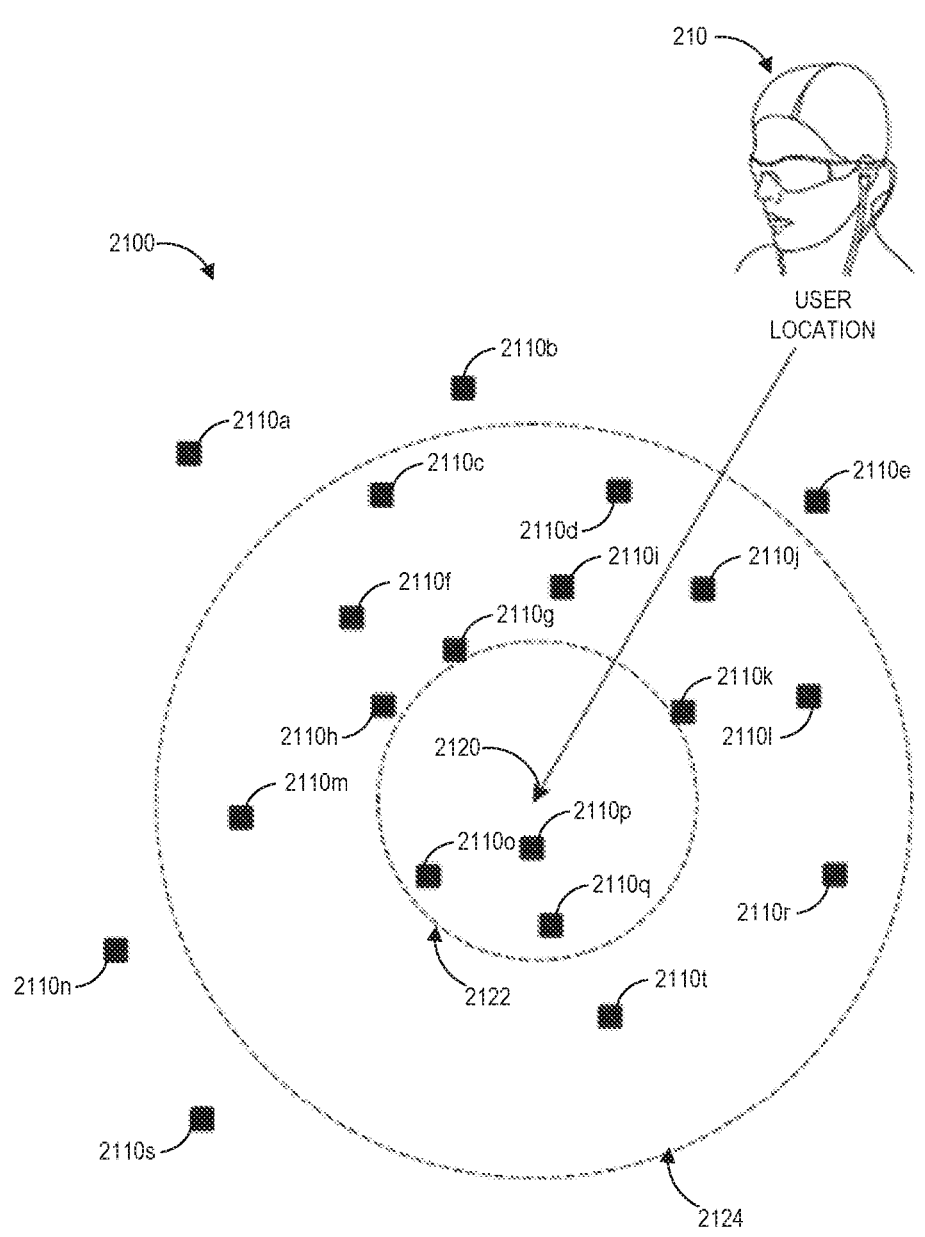
FIG. 21 illustrates an example of identifying a target virtual object based on objects' locations.

As described with reference to FIGS. 2A and 2B, the wearable system can include a location sensor, such as, e.g., a GPS or radar or lidar. The wearable system can determine a subject of user's interactions as a function of the object's proximity to the user. FIG. 21 illustrates an example of identifying a target virtual object based on objects' locations. FIG. 21 schematically illustrates a bird's eye view 2100 of the user's FOR. The FOR can include a plurality of virtual objects 2110a-2110q. The user can wear an HMD which can include a location sensor. The wearable system can determine candidate target objects based on the objects' proximity to the user. For example, the wearable system can select virtual objects within a threshold radius (e.g., 1 m, 2 m, 3 m, 5 m, 10 m, or more) from the user as candidate target virtual objects. In FIG. 21, the virtual objects (e.g., virtual objects 2110o, 2110p, 2110q) fall within the threshold radius (illustrated by the dashed circle 2122) from the user's position 2120. As a result, the wearable system can set virtual objects 2110o-2110q as candidate target virtual objects. The wearable system can further refine the selections based on other inputs (such as, e.g., the user's head pose). The threshold radius can depend on contextual factors such as the location of the user. For example, the threshold radius may be shorter if the user is in his or her office than if the user is outside in a park. The candidate objects can be selected from a portion of the region 2122 within the threshold radius from the user. For example, only those objects that are both within the circle 2122 and in the user's FOV (e.g., generally in front of the user) may be candidates, while objects within the circle 2122 but outside the user's FOV (e.g., behind the user) may not be candidates. As another example multiple virtual objects may be along a common line of sight. For example, a cone cast may select multiple virtual objects. The wearable system can use the user's position as another input to determine a target virtual object or a parameter for user interaction. For example, cone cast may select objects corresponding to different depth planes, but the wearable system may be configured to identify a target virtual object as an object within the user's hand's reach.

Similar to direct input, an indirect input may also be assigned to a value which can be used for calculating the confidence scores of a virtual object. For example, while multiple subjects or parameters were within a common confidence of selection, the indirect input could further be used as a confidence factor. With reference to FIG. 21, the virtual objects within the circle 2122 may have a higher confidence score than the virtual objects in-between the circle 2122 and the circle 2124 because the objects that are closer to the user's position 2120 are more likely to be the objects that the user is interested in interacting with.

In the example shown in FIG. 21, dashed circles 2122, 2124 are illustrated for convenience, representing the projection of a sphere of corresponding radius onto the plane shown in FIG. 21. This is for illustration and is not limiting; in other implementations, other shaped regions (e.g., polyhedral) may be chosen.

Figure 22A:
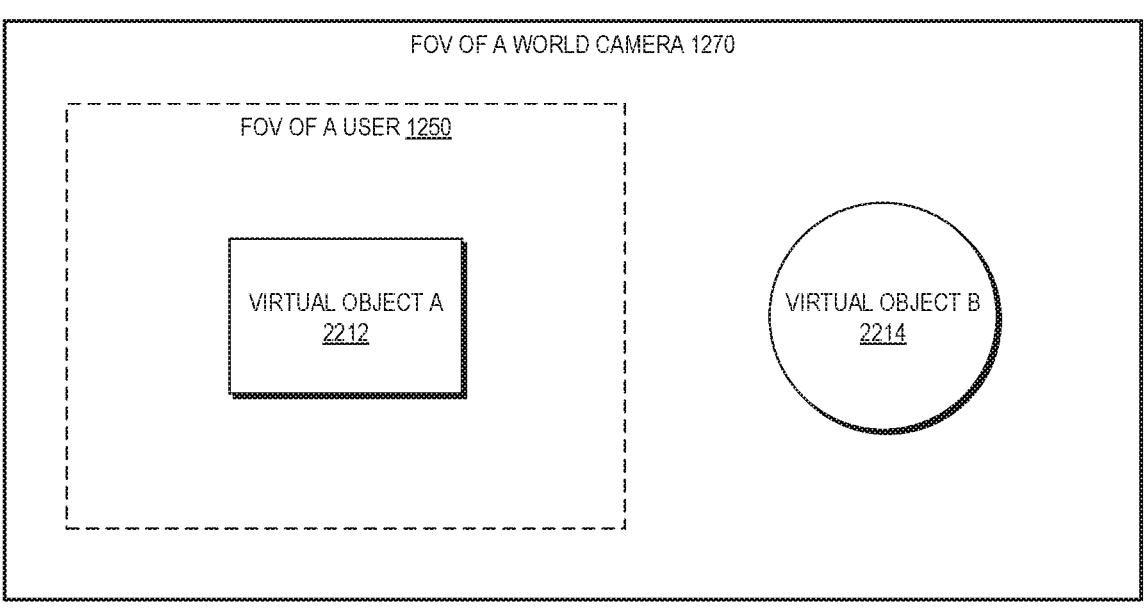
FIGS. 22A and 22B illustrate another example of interacting with a user's environment based on a combination of direct and indirect inputs.
Figure 22B:
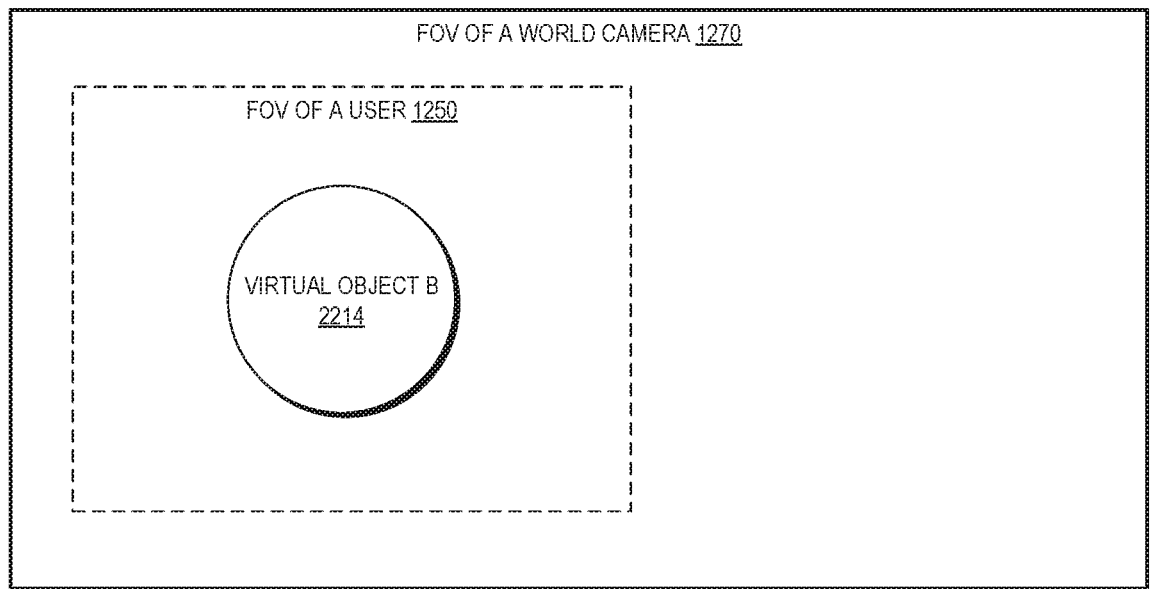

FIGS. 22A and 22B illustrate another example of interacting with a user's environment based on a combination of direct and indirect inputs. These two figures show two virtual objects, virtual object A 2212 and virtual object B 2214 in the FOV 1270 of a world camera which may be larger than the FOV 1250 of the user. The virtual object A 2212 is also within the FOV 1250 of the user. For example, the virtual object A 2212 may be a virtual document that the user is currently viewing while the virtual object B 2214 may be a virtual sticky note on a wall. However, while the user is interacting with virtual object A 2212, the user may want to look at the virtual object B 2214 to obtain additional information from the virtual object B 2214. As a result, the user may turn the head rightward (to change the FOV 1250) in order to view the virtual object B 2214. Advantageously, in some embodiments, rather than turning the head, the wearable system may detect a change in the user's direction of gaze (toward the direction of the virtual object B 2214), and as a result, the wearable system can automatically move the virtual object B 2214 within the user's FOV without needing the user to change his head pose. The virtual object B may overlay the virtual object A (or be included within the object A) or the object B may be placed within the user FOV 1250 but spaced at least partially apart from object A (so that object A is also at least partly visible to the user).

As another example, the virtual object B 2214 may be on another user interface screen. The user may want to switch in-between the user interface screen having the virtual object A 2212 and the user interface screen having the virtual object B 2214. The wearable system can make the switch without changing the user's FOV 1250. For example, upon detection of a change in eye gaze or an actuation of the user input device, the wearable system can automatically move the user interface screen having the virtual object A 2212 to be outside of the user's FOV 1250 while move the user interface screen having the virtual object B 2214 to be inside of the user's FOV 1250. As another example, the wearable system can automatically overlay the user interface screen having the virtual object B 2214 on top of the user interface screen having the virtual object A 2212. Once the user provides an indication that he has finished with a virtual user interface screen, the wearable system can automatically move the virtual user interface screen outside of the FOV 1250.

Advantageously, in some embodiments, the wearable system can identify the virtual object B 2214 as the target virtual object to be moved inside of the FOV based on multimodal inputs. For example, the wearable system can make the determination based on the user's eye gaze and positions of the virtual objects. The wearable system can set the target virtual object as an object that's on the user's direction of gaze and is the closet object to the user.

Figure 23:
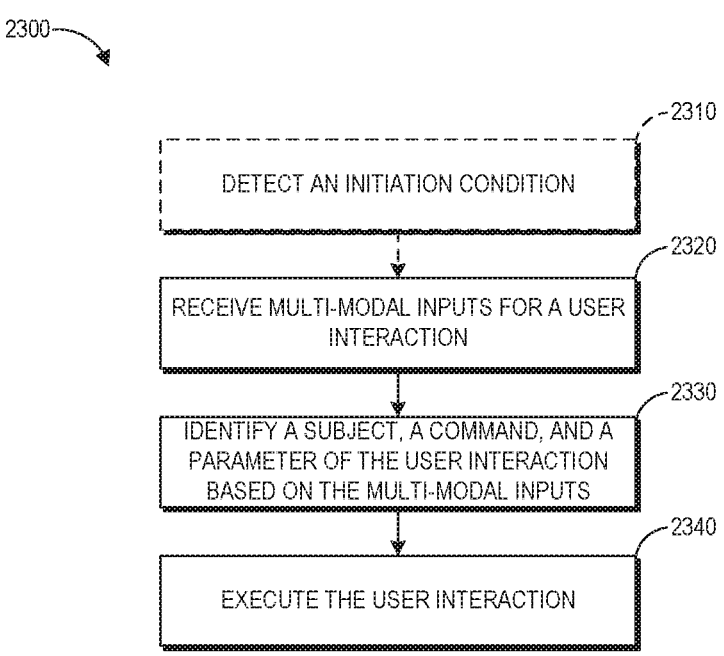
FIG. 23 illustrates an example process of interacting with a virtual object using multimodal inputs.

Example Processes of Interacting with a Virtual Object Using Multimodal User Inputs FIG. 23 illustrates an example process of interacting with a virtual object using multimodal inputs. The process 2300 can be executed by the wearable system described herein. For example, the process 2300 may be executed by the local processing & data module 260, remote processing module 270, and the central runtime server 1650, alone or in combination.

At block 2310, the wearable system can optionally detect an initiation condition. The initiation can be a user-initiated input which can provide an indication that the user intends to issue a command to the wearable system. The initiation condition may be predefined by the wearable system. The initiation condition may be a single input or a combination input. For example, the initiation condition may be a voice input, such as, e.g., by saying the phrase "Hey, Magic Leap". The initiation condition can also be gesture based. For example, the wearable system can detect the presence of an initiation condition when a user's hand is detected within the FOV of the world camera (or the FOV of the user). As another example, the initiation condition may be a specific hand motion, such as, e.g., a snap of the fingers. The initiation condition can also be detected when a user actuates a user input device. For example, a user can click on a button on a user input device indicating that the user will issue a command. In certain implementations, the initiation condition may be based on multimodal inputs. For example, both a voice command and a hand gesture may be required for the wearable system to detect the presence of the initiation condition.

The block 2310 is optional. In some embodiments, the wearable system may receive and start parsing multimodal inputs without the detection of the initiation condition. For example, when a user is watching a video, the wearable system may intake the user's multimodal inputs to adjust the volume, fast forward, rewind, skip to the next episode, etc., without requiring the user to first provide the initiation condition. Advantageously, in some embodiments, the user may not need to wake up the video screen (e.g., so that the video screen can present the time adjustment or volume adjustment tools) before the user can interact with the video screen using multimodal inputs.

At block 2320, the wearable system can receive multimodal inputs for a user interaction. The multimodal inputs may be direct or indirect inputs. Example input modes may include voice, head pose, eye gaze, gesture (on a user input device or in the air), inputs on a user input device (such as, e.g., a totem), user's environment, or characteristics of objects (physical or virtual objects) in the 3D space.

At block 2330, the wearable system can parse the multimodal inputs to identify a subject, a command, and a parameter of the user interaction. For example, the wearable system can assign confidence scores to candidate target virtual objects, target commands, and target parameters and select the subject, command, and parameters based on the highest confidence scores. In some embodiments, one input mode may be the primary input mode while another input mode may be the secondary input mode. The inputs from the secondary input mode may supplement the input from the primary input mode to ascertain a target subject, command, or parameter. For example, the wearable system may set the head pose as the primary input mode and set the voice command as the secondary input mode. The wearable system can first interpret the inputs from primary input mode as much as possible and then interpret the additional inputs from the secondary input mode. If the additional input is interpreted to suggest a different interaction from the inputs of the primary input, the wearable system can automatically provide a disambiguation prompt to the user. The disambiguation prompt may request the user to select the desired task from: the interpretation of the primary input or alternative options based on the interpretation of the secondary input. Although this example is described with reference to a primary input mode and a second input mode, in various situations, there may be more than two input modes. The same technique can also be applicable on a third input mode, a fourth input mode, and so forth.

At block 2340, the wearable system can execute the user interaction based on the subject, command, and the parameter. For example, the multimodal inputs may include an eye gaze and a voice command "put that there". The wearable system can determine that the subject of the interaction is the object that the user is currently interacting with, the command is "put", and the parameter is the center of the user's field of fixation (determined based on the user's eye gaze direction). Accordingly, the user can move the virtual object that the user is currently interacting with to the center of the user's field of fixation.

Examples of Setting Direct Input Modes Associated with a User Interaction

In some situations, such as when the user is interacting with a wearable system using poses, gestures, or voices, there is a risk that other people near the user could "hijack" the user's interaction by issuing a command using these direct inputs. For example, a user A could stand near a user B in a park. The user A can interact with an HMD using voice commands. The user B can hijack the user A's experience by saying "take a picture". This voice command issued by user B can cause the user A's HMD to take a picture even though user A never intended to take a picture. As another example, user B could perform a gesture within the FOV of a world camera of the user A's HMD. This gesture can cause the user A's HMD to go to a home page, for example, while the user A is playing a video game.

In some implementations, the input can be analyzed to determine if the input originated from the user. For example, the system can apply speaker recognition techniques to determine whether the command "take a picture" was said by the user A or the hijacker B. The system may apply computer vision techniques to determine whether the gesture was made by user A's hand or by the hijacker B's hand.

Figure 24:
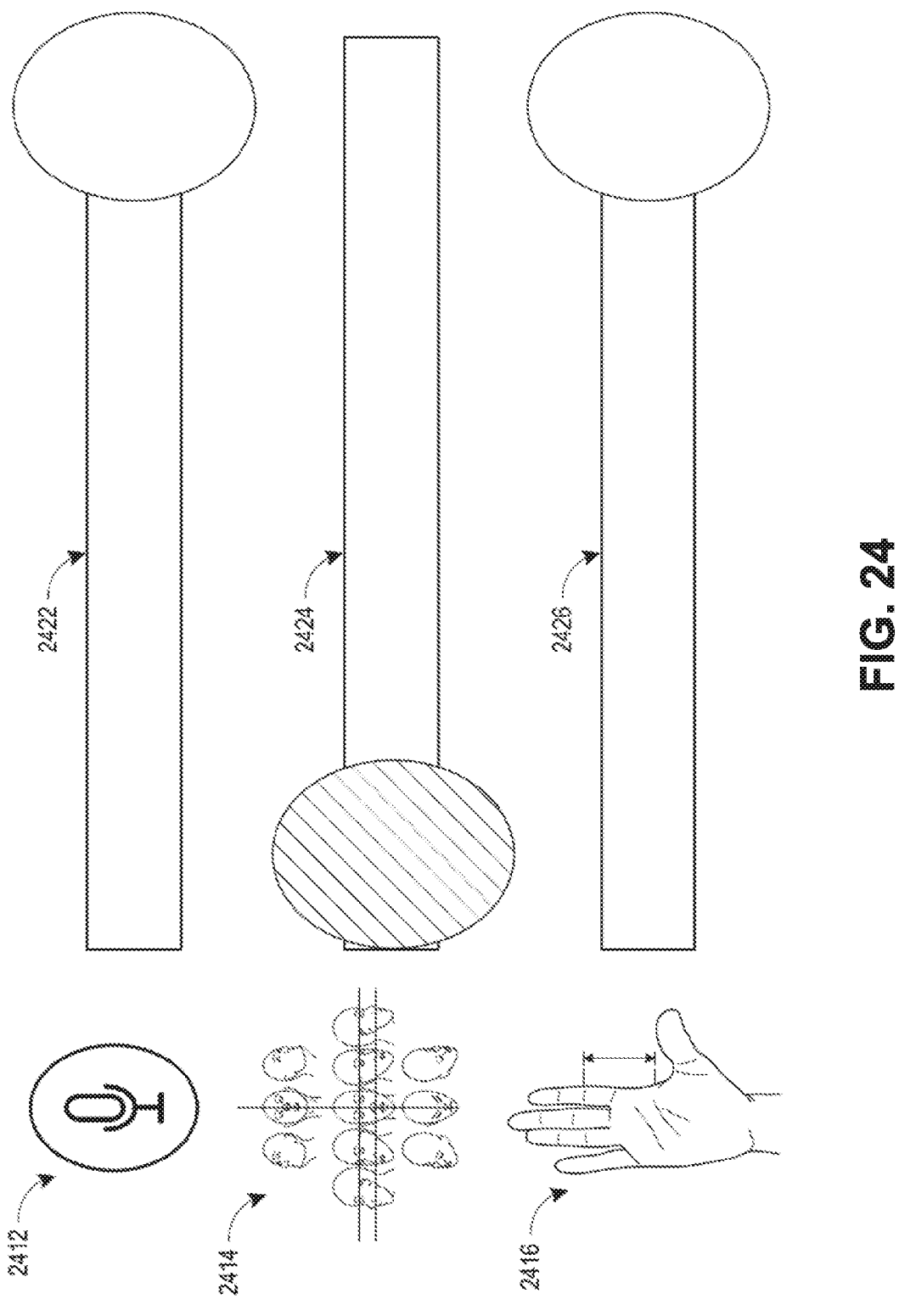
FIG. 24 illustrates an example of setting direct input modes associated with a user interaction.

Additionally or alternatively, to prevent security breaches and interruptions of a user's interactions with the wearable system, the wearable system can automatically set available direct input modes based on indirect inputs or require multiple modes of direct inputs before a command is issued. FIG. 24 illustrates an example of setting direct input modes associated with a user interaction. Three direct inputs: voice 2412, head pose 2414, and hand gestures 2416 are illustrated in FIG. 24. As described further below, the slider bars 2422, 2424, and 2426 represent an amount by which each input is weighted in determining a command. If the slider is all the way toward the right, the input is given full weight (e.g., 100%), if the slider is all the way to the left, the input is given zero weight (e.g., 0%), and if the slider is in between these extreme settings, the input is given partial weight (e.g., 20% or 80% or some other value intermediate values, such as a value between 0 and 1). In this example, the wearable system can be set to require both voice commands 2422 and hand gestures 2426 (while not using head pose 2414) before a command is executed. Accordingly, the wearable system may not execute a command if the voice commands 2442 and the gesture 2426 indicate different user interactions (or virtual objects). By requiring both types of inputs, the wearable system can reduce the likelihood that someone else hijacks the user's interaction.

As another example, one or more input modes may be disabled. For example, when a user is interacting with a document processing application, the head pose 2414 may be disabled as an input mode, as shown in FIG. 24 where the head pose slider 2424 is set to 0.

Each input may be associated with an authentication level. In FIG. 24, the voice 2412 is associated with the authentication level 2422; the head pose 2414 is associated with the authentication level 2424; and the hand gesture 2416 is associated with the authentication level 2426. The authentication level may be used to determine whether an input is required for a command to be executed or whether an input is disabled or whether the input is given a partial weight (between being fully enabled or fully disabled). As illustrated in FIG. 24, the authentication levels of the voice 2412 and the hand gestures 2416 are set all the way to the right (which is associated with the maximum authentication level), suggesting that these two inputs are required for a command to issue. As another example, the authentication level of a head pose is set all the way to the left (which is associated with the minimum authentication level). This suggests that head pose 2414 is not required for a command to issue even though the head pose 2414 may still be used to determine a target virtual object or a target user interface operation. In some situations, by setting the authentication level to the minimum, the wearable system may disable head pose 2414 as an input mode.

In certain implementations, the authentication level may also be used to calculate confidence levels associated with a virtual object. For example, the wearable system may assign a higher value to an input mode which has a higher authentication level, while assigning a lower value to an input mode which has a lower authentication level. As a result, when aggregating confidence scores from multiple input modes for calculating an aggregated confidence score for a virtual object, the input mode with a higher authentication level may have more weight in the aggregated confidence score than the input mode with a lower authentication level.

The authentication levels can be set by a user (through inputs or via a setup panel) or can be set automatically by the wearable system, e.g., based on indirect inputs. The wearable system may require more input modes when a user is in a public place while requiring fewer input modes when a user is in a private place. For example, the wearable system may require both voice 2412 and hand gestures 2416 when the user is on a subway. However, when the user is at home, the wearable system may require only the voice 2412 for issuing a command. As another example, the wearable system may disable the voice command when the user is in a public park, thereby providing privacy to the user's interaction. But the voice command may still be available when the user is at home.

Although these examples are described with reference to setting direct input modes, similar techniques can also be applied to setting indirect input modes as part of the multimodal input. For example, when a user is using public transportation (such as, e.g., a bus), the wearable system may be configured to disable geolocation as an input mode because the wearable system may not know accurately where the user specifically sits or stands on the public transportation.

Additional Example User Experiences

In addition to the examples described herein, this section describes additional user experiences with multimodal inputs. As a first example, the multimodal inputs can include a voice input. For example, the user can say a voice command such as "Hey Magic Leap, call her", which is received by an audio sensor 232 on the HMD and parsed by the HMD system. In this command, the user can initiate the task (or provide an initiation condition) by saying "Hey Magic Leap". "Call" can be a preprogrammed word so the wearable system knows it should make a telephone call (rather than initiating a video call). In certain implementations, these pre-programmed words can also be referred to as "hotwords" or "carrier phrases," which the system recognizes as indicating the user wants to take a particular action (e.g., "Call") and which may alert the system to accept further input to complete the desired action (e.g., identify a person ("her") or a telephone number after the word "Call"). The wearable system can use the additional inputs to identify who "her" is. For example, the wearable system can use eye tracking to see which contact on the virtual contact list or the user's phone that the user is looking at. The wearable system can also use head pose or eye tracking to determine if the user is looking directly at a person the user wants to call. In certain embodiments, the wearable system can utilize facial recognition techniques (e.g., using the object recognizers 708) to determine the identity of the person that the user is looking at.

As a second example, the user can have a virtual browser placed directly on a wall (e.g., the display 220 of the wearable system can project the virtual browser as if it is overlaid on the wall). The user can reach his or her hand out and provide a tap gesture on a link in the browser. Since the browser appears to be on the wall, the user may tap the wall or tap in space such that the projection of the user's finger appears to tap the wall to provide the indication. The wearable system can use multimodal inputs to identify the link that the user intends to click. For example, the wearable system can use gesture detection (e.g., via data acquired by the outward-facing imaging system 464), a head pose based cone-cast, and an eye gaze. In this example, the gesture detection may be less than 100% accurate. The wearable system can improve the gesture detection with data acquired from the head pose and eye gaze to increase the gesture tracking's accuracy. For example, the wearable system can identify a radius where the eyes are most likely focusing based on data acquired by the inward-facing imaging system 462. In certain embodiments, the wearable system can identify the user's field of fixation based on the eye gaze. The wearable system can also use indirect input such as environment features (e.g., the location of the wall, the characteristics of the browser or the webpage, etc.) to improve gesture tracking. In this example, the wall may be represented by a planar mesh (which may be previously stored in the map 920 of the environment), the wearable system can determine the user's hand position in view of the planar mesh to determine the link that the user is targeting and selecting. Advantageously, in various embodiments, by combining multiple modes of inputs, the accuracy required for one mode of input for a user interaction may be reduced as compared to a single mode of input. For example, the FOV camera may not need to have very high resolution for hand gesture recognition because the wearable system can supplement hand gestures with head pose or eye gaze to determine the intended user interaction.

Although the multimodal inputs in the examples above include an audio input, the audio input is not required for the multimodal input interactions described above. For example, a user can use a 2D-touch swipe gesture (on a totem, for example) to move a browser window from one wall to a different wall. The browser may initially be on the left wall. The user can select the browser by actuating the totem. The user can then look at the right wall and make a right-swipe gesture on the touchpad of the totem. The swipe on the touchpad is loose and inaccurate because a 2D swipe by itself doesn't translate easily/well to a 3D movement.

However, the wearable system can detect a wall (e.g., based on environmental data acquired by the outward-facing imaging system) and detect the point where the user is specifically looking on the wall (e.g., based on eye gaze). With these three inputs (touch-swipe, gaze, environment features), the wearable system can gracefully place the browser at a location with high confidence that it is where the user wanted browser window to go.

Additional Examples of Head Pose as a Multimodal Input

In various embodiments, the multimodal inputs can support a totem free experience (or an experience where a totem is used infrequently). For example, multimodal inputs can include a combination of head pose and voice control which can be used to share or search for a virtual object. The multimodal inputs can also use a combination of head pose and gestures to navigate various user interface planes and virtual objects within a user interface plane. A combination of head pose, voice, and gesture, can be used to move objects, conduct social networking activities (e.g., initiate and conduct a telepresence session, sharing posts), browse information on a webpage, or control a media player.

FIG. 25 illustrates an example of user experience with multimodal input. In the example scene 2500a, the user 2510 can target and select the applications 2512 and 2514 with a head pose. The wearable system can display a focus indicator 2524a indicating that the user is currently interacting with the virtual object with head pose. Once the user selects the application 2514, the wearable system may show a focus indicator 2524a for the application 2514 (such as, e.g., a target graphic as shown in FIG. 25, a halo around the application 2514 or bringing the virtual object 2514 to appear closer to the user). The wearable system can also change the focus indicator's appearance from the focus indicator 2524a to the focus indicator 2524b (e.g., the arrow graphic shown in the scene 2500b) indicating that the interactions by user input device 466 also become available after the user selects with virtual object 2514. Voice and gesture interactions extend this interaction pattern of head pose plus hand gestures. For example, when a user issues a voice command, the application targeted with head pose may respond to or be manipulated by the voice command. Additional examples of interacting with virtual objects with a combination of, for example, head pose, hand gestures, and voice recognition are described in U.S. application Ser. No. 15/296,869, filed Oct. 18, 2016, titled "SELECTING VIRTUAL OBJECTS IN A THREE-DIMENSIONAL SPACE", published as U.S. Pat. Pub. No. 2017/0109936, the disclosure of which is hereby incorporated by reference herein in its entirety.

The head pose may be integrated with voice control, gesture recognition, and environmental information (e.g., mesh information) to provide hands-free browsing. For example, a voice command of "Search for Fort Lauderdale" will be handled by a browser if the user is using head pose to target the browser. If the user is not targeting a particular browser, the wearable system can also handle this voice command without going through a browser. As another example, when the user says "Share this with Karen", the wearable system will execute the share action on an application that the user is targeting (e.g., using head pose, eye gaze, or gestures). As another example, the voice control can execute browser window functions, such as, e.g., "Go to Bookmarks", while the gestures may be used to perform basic navigation of a webpage such as, e.g., clicks and scrolls.

Multimodal inputs can also be used to launch and move a virtual object without needing a user input device. The wearable system can use multimodal inputs, such as, e.g., gesture, voice, and gaze, to naturally place content near a user and the environment. For example, the user can use voice to open an unlaunched application when a user is interacting with the HMD. The user can issue a voice command by saying "Hey Magic Leap, launch the Browser." In this command, the initiation condition includes the presence of the invocation phrase "Hey Magic Leap". The command can be interpreted to include "launch" or "open" (which may be interchangeable commands). The subject of this command is the application name, e.g., "browser". This command, however, does not require a parameter. In some embodiments, the wearable system can automatically apply a default parameter, such as, e.g., placing the browser in the user's environment (or the user's FOV).

The multimodal inputs can also be used to perform basic browser controls, such as, e.g., opening bookmarks, opening a new tab, navigating to history, etc. The ability to reference web content in hands-free or hands-full multi-tasking scenarios can empower users to be more informed and productive. For example, a user, Ada, is a radiologist reading films in her office. Ada can navigate the web with voice and gesture to bring up reference material while reading the films, which reduces her need to move a mouse back and forth to switch between the films and the reference materials on the screen. As another example, a user, Chris, is cooking a new recipe from a virtual browser window. The virtual browser window can be placed on his cabinet. Chris can use a voice command to pull up a bookmarked recipe while he starts chopping food.

FIG. 26 illustrates an example user interface with a variety of bookmarked applications. A user can select an application on the user interface 2600 by saying the name of the application. For example, the user can say "open food" to launch the food application. As another example, the user can say "open this". The wearable system can determine the user's direction of gaze and identify an application on the user interface 2600 that intersects with the user's direction of gaze. The wearable system can accordingly open the identified application.

Figure 27:
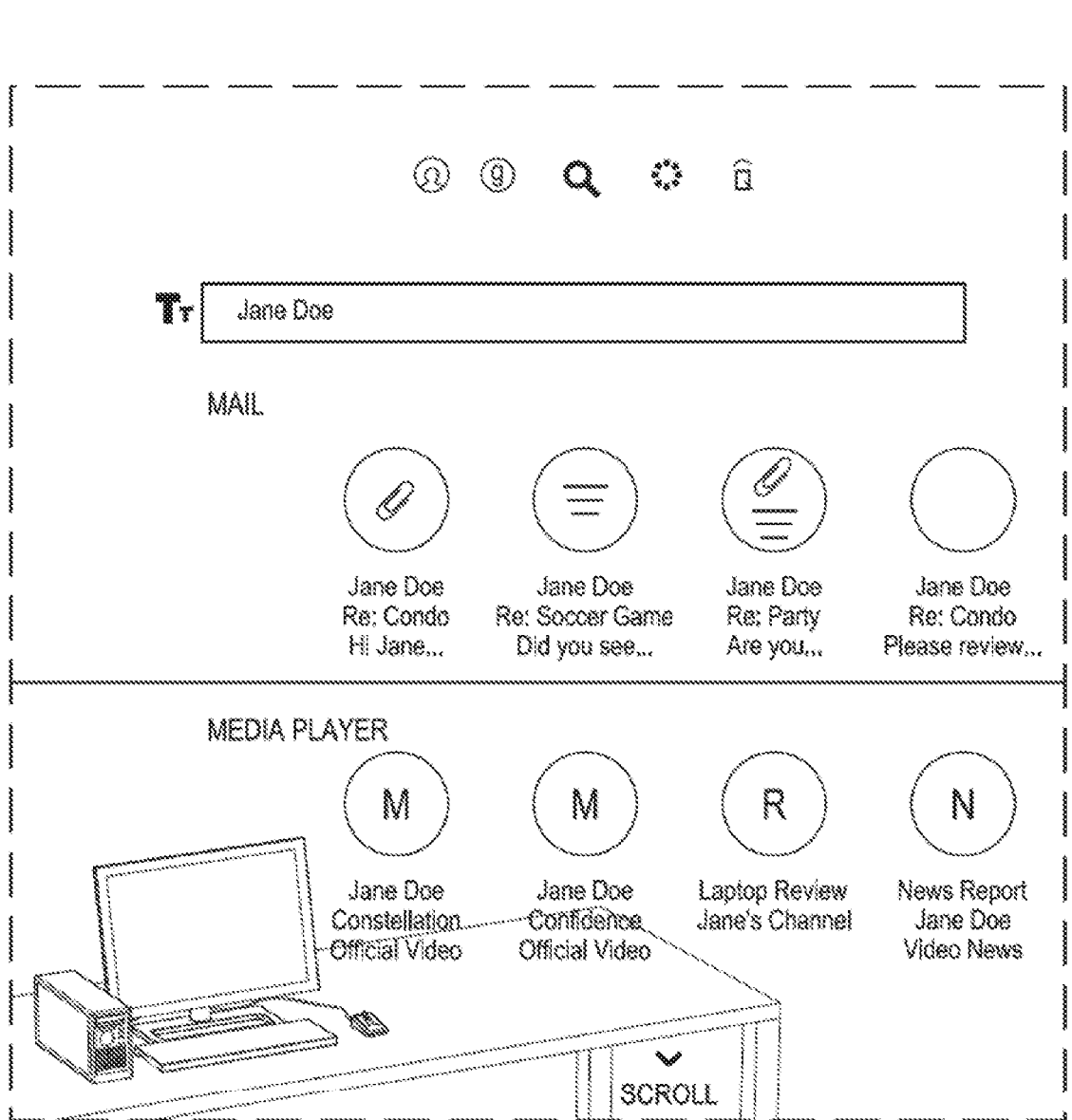
FIG. 27 illustrates an example user interface when a search command is issued.

A user can also use a voice to issue a search command. The search command can be performed by an application that the user is currently targeting. If the object does not currently support a search command, the wearable system may perform a search within a data store of the wearable system or search for the information via a default application (such as, e.g., via a browser). FIG. 27 illustrates an example user interface 2700 when a search command is issued. The user interface 2700 shows both an email application and a media watching application. The wearable system may determine (based on the user's head pose) that the user is currently interacting with the email application. As a result, the wearable system may automatically translate the user's voice command into a search command in the email application.

Multimodal inputs can also be used for media controls. For example, the wearable system can use voice and gesture controls to issue commands such as, e.g., play, pause, mute, fast forward, and rewind, for controlling a media player in an application (such as screens). The users can use the voice and gesture controls with a media application and set the totem aside.

Multimodal inputs can further be used in a social networking context. For example, a user can start conversations and share experiences (e.g., virtual images, documents, etc.) without a user input device. As another example, users can participate in a telepresence session and set a private context such that the users can feel comfortable for using voices to navigate the user interface.

Accordingly, in various implementations, the system may utilize multimodal inputs such as: head pose plus voice (e.g., for information sharing and general application searching), head pose plus gesture (e.g., for navigation in applications), or head pose plus voice plus gesture (e.g., for "put that there" functionality, media player controls, social interactions, or browser applications).

Additional Examples of Gesture Control as Part of Multi-modal Inputs

There may be two, non-limiting and non-exclusive, classes of gesture interactions: event gestures and dynamic hand tracking. Event gestures can be in response to an event while a user is interacting with an HMD, such as, e.g., a catcher throwing a sign to a pitcher at a baseball game or a thumbs-up sign at a browser window to cause the wearable system to open a share dialogue. The wearable system can follow one or more gesture patterns that the user performs and respond to the event accordingly. Dynamic hand tracking can involve tracking the user's hand with low latency. For example, the user can move a hand over the user's FOV and a virtual character may follow the movement of the user's finger.

The quality of gesture tracking may depend on the type of user interaction. The quality may involve multiple factors, e.g., robustness, responsiveness, and ergonomics. In some embodiments, the event gestures may be near-perfect robustness. The threshold for minimum acceptable gesture performance may be a bit lower in social experiences, bleeding-edge interactions, and third party applications, since the aesthetics of these experiences can tolerate faults, interruptions, low latency, etc., but gesture recognition can still be highly performant in these experiences to maintain the responsiveness.

To increase the likelihood that the wearable system is responsive to a user's gesture, the system can reduce or minimize latency for gesture detection (for both event gestures and dynamic hand tracking). For example, the wearable system can reduce or minimize latency by detecting when the user's hand is within view of the depth sensor, automatically switching the depth sensor to the appropriate gesture mode, and then giving feedback to the user when he or she can perform the gesture.

As described herein, gestures can be used in combination with other input modes to launch, select, and move an application. Gesture can also be used to interact with virtual objects within an application, such as by tapping, scrolling in the air or on a surface (e.g., on a table or a wall).

In certain embodiments, the wearable system can implement a social networking tool which can support gesture interactions. A user can perform semantic event gestures to enrich communication. For example, the user can wave a hand in front of the FOV camera and a wave animation can accordingly be sent to the person the user is chatting with. The wearable system can also provide virtualization of a user's hands with dynamic hand tracking. For example, a user can hold up his or her hands in front of his or her FOV and get visual feedback that his or her hands are being tracked to animate his or her avatar's hands.

The hand gestures can also be used as part of the multi-modal inputs for media player controls. For example, the user can use a hand gesture to play or to pause a video stream. The user can perform the gesture manipulation away from the device (e.g., a television) playing the video. Upon detecting the user's gesture, the wearable system can remotely control the device based on the user's gesture. The user can also look at the media panel and the wearable system can use the user's hand gesture in combination with the user's direction of gaze to update the parameters of the medial panel. For example, a pinch (ok) gesture may suggest a "play" command a fist gesture may suggest a "pause" command. The user can also close up the menu by waving one of the arms in front of the FOV camera. Examples of hand gestures 2080 are shown in FIG. 20.

Additional Examples of Interacting with Virtual Objects

As described herein, the wearable system can support various multimodal interactions with objects (physical or virtual) in the user's environment. For example, the wearable system can support direct inputs for interactions with found objects, such as targeting, selecting, controlling (e.g., the movement or properties) the found objects. The interactions with the found objects can also include interactions with found object geometries or interactions with found object connected surfaces.

Direct inputs are also supported for interactions with flat surfaces, such as targeting and selecting wall or table top. The user can also initiate various user interface events, such as, e.g., touch events, tap events, swipe events, or scroll events. The user can manipulate 2D user interface elements (e.g., panels) using direct interactions, such as, e.g., panel scrolling, swiping, and selecting elements (e.g., virtual objects or user interface elements such as buttons) within a panel. The user can also move or resize the panel using one or more direct inputs.

Direct inputs can further be used to manipulate objects that are at different depths. The wearable system can set various threshold distances (from the user) to determine the region of the virtual objects. With reference to FIG. 21, the objects that are within the dashed circle 2122 may be considered as objects in the near-field, the objects that are within the dashed circle 2124 (but are outside of the dashed circle 2122) may be considered as objects in the mid field, and the objects that are outside of the dashed circle 2124 may be considered as objects in the far field. The threshold distance between the near field and the far field may be, e.g., 1 m, 2 m, 3 m, 4 m, 5 m, or more, and may depend on environment (e.g., larger in an outdoor park than an indoor office cubicle).

The wearable system can support various 2D or 3D manipulations of virtual objects in the near field. Example 2D manipulations may include moving or resizing. Example 3D manipulations may include placing the virtual objects in the 3D space such as by pinching, drawing, moving, or rotating the virtual objects. The wearable system can also support interactions with virtual objects in the mid field such as, e.g., panning and repositioning the object in the user's environment, performing a radial motion of the object, or moving the object into the near field or the far field.

The wearable system can also support continuous finger-tip interactions. For example, the wearable system can allow the user's finger to point like an attractor, or pinpoint an object and perform a push interaction on the object. The wearable system can further support fast pose interactions, such as, e.g., hand surface interactions or hand contour interactions.

Additional Examples of Voice Command in the Context of Social Network and Sharing The wearable system can support voice commands as an input for a social networking (or messaging) application. For example, the wearable system can support voice commands for sharing information with contacts or making calls with contacts.

As an example of starting a call with a contact, the user can use a voice command such as "Hey Magic Leap, call Karen." In this command, "Hey Magic Leap" is the invocation phrase, the command is "call", and the parameter of the command is the name of the contact. The wearable system can automatically use a messenger application (as the subject) to initiate the call. The command "call" may be associated with tasks, such as, e.g., "start a call with", start a chat with", etc.

If the user says "Start a call" and then says a name, the wearable system can attempt to recognize the name. If the wearable system does not recognize the name, the wearable system can communicate a message to the user for the user to confirm the name or contact information. If the wearable system recognizes the name, the wearable system may present a dialog prompt which the user can confirm/deny (or cancel) the call, or provide an alternative contact.

The user can also start a call with several contacts with a list of friends. For example, the user can say "Hey Magic Leap, start a group chat with Karen, Cole, and Kojo." The group chat command may be extracted from the phrase "start a group chat" or may be from a list of friends provided by the user. While a user is in a call, the user can add another user to the conversation. For example, the user can say "Hey Magic Leap, invite Karen" where the phrase "invite" can be associated with an invite command.

The wearable system can share virtual objects with a contact using voice commands. For example, the user can say "Hey Magic Leap, share Screens with Karen" or "Hey Magic Leap, share that with David and Tony." In these examples, the word "share" is a share command. The word "screens" or "that" may be a reference to a subject which the wearable system can determine based on multimodal inputs. The names such as "Karen", "David and Tony" are the parameters of the command. In some embodiments, when the voice command provided by the user includes the word "share" with an application reference and a contact, the wearable system may provide a confirmation dialog to ask the user to confirm whether the user wants to share the application itself or share a subject via the referenced application. When the user issues the voice command including the word "share", an application reference, and a contact, the wearable system can determine whether the application name is recognized by the wearable system or whether the application exists on the user's system. If the system does not recognize the name or the application does not exist in the user's system, the wearable system may provide a message to the user. The message may suggest the user to try the voice command again.

If the user provides deictic or anaphoric references (e.g., "this" or "that") in the voice command, the wearable system can use multimodal inputs (e.g., the user's head pose) to determine whether the user is interacting with an object that can be shared. If the object cannot be shared, the wearable system may prompt an error message to the user or move to a second mode of input, such as gestures, to determine which object should be shared.

The wearable system can also determine whether the contact with whom the object is shared can be recognized (e.g., as part of the user's contact list). If the wearable system recognizes the name of the contact, the wearable system can provide a confirmation dialogue to confirm that the user wants to proceed with sharing. If the user confirms, the virtual object can be shared. In some embodiments, the wearable system can share multiple virtual objects associated with an application. For example, the wearable system can share a whole album of pictures or share the most recently viewed picture in response to the user's voice command. If the user denies sharing, the share command is canceled. If the user indicates that the contact is wrong, the wearable system may prompt the user to speak the contact's name again or select a contact from a list of available contacts.

In certain implementations, if the user says "Share" and says an application reference but doesn't specify a contact, the wearable system may share the application locally with people in the user's environment who have access to the user's file. The wearable system may also reply and request the user to input a name using one or more of the input modes described herein. Similar to the social networking example, the user can issue a voice command to share a virtual object with one contact or a group of contacts.

A challenge in making calls via voice is when the Voice user interface incorrectly recognizes or fails to recognize a contact's name. This can be especially problematic with less common or non-English names, e.g., like lsi, Ileana, etc. For example, when a user says a voice command includes the name of a contact (such as "Share Screens with Ily"), the wearable system may not be able to identify the name "Ily" or its pronunciation. The wearable system can open a contacts dialogue with a prompt such as, e.g., "Who?" The user can try again with voice to specify "Ily", spell the name out "I-L-Y" using voice or a user input device, or use a user input device to quickly select names from a panel of available names. The name "Ily" may be a nickname for Ileana, who has an entry in the user's contacts. Once the user instructs the system that "Ily" is the nickname, the system may be configured to "remember" the nickname by automatically associating the nickname (or the pronunciation or audio pattern associated with the nickname) with the friend's name.

Additional Examples of Selecting and Moving a Virtual Object Using a Voice Command A user can naturally and quickly manage the placement of a virtual object in the user's environment using multimodal inputs, such as, e.g., a combination of eye gaze, gestures, and voice. For example, a user named Lindsay sits down at the table and gets ready to do some work. She opens her laptop and starts up the desktop-Monitors app on her computer. As the computer is loading, she reaches her hand out above the laptop screen and says "Hey Magic Leap, put Monitors here." In response to this voice command, the wearable system can automatically launch the monitor screens and place them above her laptop. However, when Lindsay says "Put screens there" while looking over at the wall on the other side of the room, the wearable system can automatically place the screens on the wall across from her. Lindsay could also say "Put halcyon here," while looking at her desk. The halcyon was initially on her kitchen table, but in response to the voice command, the wearable system can automatically move it to her table surface. As she works, she can use a totem to interact with these objects and adjust their scales to her preference.

The user can use voice to open an unlaunched application at any point in the user's environment. For example, the user can say "Hey Magic Leap, launch the Browser." In this command "Hey Magic Leap" is the invocation word, the word "launch" is a launch command, and the word "Browser" is an application of the subject. The "launch" commands may be associated with the words "launch", "open", "play". For example, the wearable system can still identify the launch command when the user says "open the browser". In certain embodiments, an application may be an immersive application which can provide a 3D virtual environment to a user as if the user is part of the 3D virtual environment. As a result, when the immersive application is launched, the user may be positioned as if he is in the 3D virtual environment. In certain implementations, an immersive application also includes a store application. When the store application is launched, the wearable system can provide a 3D shopping experience for the user so that the user can feel as if he is shopping in a real store. In contrast to the immersive application, an application may be a landscape application. When the landscape application is launched, it may be placed to where it would be placed if launched via totem in a launcher. As a result, the user can interact with the landscape application, but the user may not feel that he is part of the landscape application.

The user can also use a voice command to launch a virtual application in a specified location in the user's FOV or the user can move an already-placed virtual application (e.g., a landscape application) to a specific location in the user's FOV. For example, the user can say "Hey Magic Leap, Put the browser here," "Hey Magic Leap, Put the browser there," "Hey Magic Leap, Put this here," or "Hey Magic Leap, Put that there." These voice commands include the invocation word, the put command, the application name (which is a subject), and a location cue (which is a parameter). The subject may be referenced based on the audio data, for example, based on the name of application spoken by the user. The subject may also be identified based on head pose or eye gaze when the user says the word "this" or "that" instead. To facilitate this voice interaction, the wearable system can make, for example, two inferences: (1) which application to launch and (2) where to place the application.

The wearable system can use the put command and the application name to infer which application to launch. For example, if the user says an application name that the wearable system doesn't recognize, the wearable system may provide an error message. If the user says an application name that the wearable system recognizes, the wearable system can determine whether the application has already been placed into the user's environment. If the application is already shown in the user's environment (such as, e.g., in the user's FOV), the wearable system can determine how many instances of the applications there are in the user's environment (e.g., how many browser windows are open). If there is just one instance of the target application, the wearable system can move the application to the location specified by the user. If there is more than one instance of the spoken application in the environment, the wearable system can move all instances of the application to the specified location or the most recently used instance to the specified location. If the virtual application has not already been placed in the user's environment, the system can determine whether the application is a landscape application, an immersive application, or a store application (in which the user can download or purchase other applications). If the application is a landscape application, the wearable system can launch the virtual application at a specified location. If the application is an immersive application, the wearable system can place a shortcut of the application at the specified position because the immersive application does not support the functions of launching at a specified location in the user's FOV. If the application is the store application, the system may place a mini store at the specified position since the store application may require full 3D immersion of the user into the virtual world and therefore do not support launching at a specific location in the user's environment. The mini store may include brief summaries or icons of virtual objects in the store.

The wearable system can use a variety of inputs to determine where to place the application. The wearable system can parse the syntax in the user's command (e.g., "here" or "there"), determine intersections of virtual objects in the user's environment with a head pose based raycast (or cone cast), determine the user's hand position, determine planar surface mesh or environment planar mesh (e.g., a mesh associated with a wall or a table), etc. As an example, if the user says "here", the wearable system can determine the user's hand gesture, such as whether there is a flat open hand in the user's FOV. The wearable system can place the object at the position of the user's flat hand and at a rendering plane that is near the user's hand reach. If there are no flat open hands in the FOV, the wearable system can determine whether a head pose (e.g., the direction of a head pose based cone cast) is intersecting with surface-planar mesh that is within the user's arms-reach. If the surface-planar mesh exists, the wearable system can place the virtual object at the intersection of the direction of the head pose and the surface-planar mesh at a rendering plane that is within the user's arms-reach. The user can place the object flat on the surface. If there is no surface planar mesh, the wearable system may place the virtual object at a rendering plane having distance somewhere between within-arms-reach and optimal reading distance. If the user says "there", the wearable system can perform similar operations as when the user says "here", except that if there is no surface-planar mesh that is within the user's arms-reach, the wearable system may place a virtual object at a rendering plane in the mid field.

Once the user says "Put the Application . . . .", the wearable system can immediately provide predictive feedback to a user to show where the virtual object would be placed based on available inputs if the user says either "here" or "there". This feedback could be in the form of a focus indicator. For example, the feedback may include a small floating text bubble saying "here" at the hand, mesh, or a planar surface which intersects with the user's head pose direction at a rendering plane with in the user's arms reach. The planar surface may be located in the near field if the user's command is "here" while in the mid or far field if the user's command is "there". This feedback could be visualized like a shadow or the outline of the visual object.

The user can also cancel the interaction. An interaction may be canceled in two ways in various cases: (1) a command failed to be completed by an n second timeout or (2) input a canceling command, such as, e.g., saying "no", "never mind', or "cancel".

Examples of Interacting with Text Using a Combination of User Inputs

Free form text input in a mixed reality environment, particularly input of long string sequences, using traditional interaction modalities can be problematic. As an example, systems that rely entirely upon automated speech recognition (ASR), especially in a "hands-free" environment lacking input or interface devices such as keyboard, handheld controller (e.g., totem) or mouse, can be difficult to use for text editing (e.g., to correct ASR errors endemic to speech recognition technology itself such as an incorrect transcription of the user's speech). As another example, a virtual keyboard in a "hands-free" environment may require refined user control and can cause fatigue if used as the primary form of user input.

The wearable system 200 described herein can be programmed to allow a user to naturally and quickly interact with virtual text using multimodal inputs, such as, e.g., a combination of two or more of: voice, eye gaze, gestures, head poses, totem inputs, etc. The phrase "text" as used herein can include a letter, a character, a word, a phrase, a sentence, a paragraph, or other types of free-form text. Text can also include graphics or animations, e.g., emoji, ideograms, emoticons, smileys, symbols, etc. Interactions with the virtual text can include composing, selecting (e.g., selecting a portion of or all text), or editing text (e.g., change, copy, cut, paste, delete, clear, undo, redo, insert, replace, etc.), alone or in combination. By utilizing a combination of user inputs, the systems described herein provide significant improvements in speed and convenience over single-input systems.

The multimodal text interaction techniques described herein can be applied in any dictation scenario or application (e.g., in which the system simply transcribes user speech rather than applying any semantic evaluation, even if that transcription is part of another task that does rely on semantic evaluation), Some example applications can include a messaging application, a word processing application, a gaming application, a system configuration application, etc. Examples of use cases can include a user writing a text message to be sent to a contact that may or may not be in the user's contact list; a user writing a letter, an article, or other textual content; a user posting and sharing content on a social media platform; and a user completing or otherwise filling out a form using the wearable system 200.

A system utilizing a combination of user inputs need not be a wearable system. If desired, such a system may be any suitable computing system such as a desktop computer, a laptop, a tablet, a smart phone, or another computing device having multiple user input channels such as keyboards, trackpads, microphones, eye or gaze tracking systems, gesture recognition systems, etc.

Examples of Composing a Text with Multimodal User Inputs

FIGS. 28A-28F illustrate an example user experience of composing and editing a text based on a combination of inputs such as, e.g., voice commands or eye gaze. As described herein, the wearable system can determine the user's gaze direction based on images acquired by the inward-facing imaging system 462 shown in FIG. 4. The inward-facing imaging system 462 may determine the orientation of one or both of the user's pupils and may extrapolate the line or lines of sight of the user's eye or eyes. By determining the lines of sight of both eyes of the user, the wearable system 200 can determine the three-dimensional position in space in which the user is looking.

The wearable system can also determine a voice command based on data acquired from the audio sensor 232 (e.g., a microphone) shown in FIG. 2A. The system may have an automated speech recognition (ASR) engine that converts the spoken input 2800 into text. The speech recognition engine may use natural language understanding in converting the spoken input 2800 into text, including isolating and extracting message text from a longer utterance.

Figure 28A:
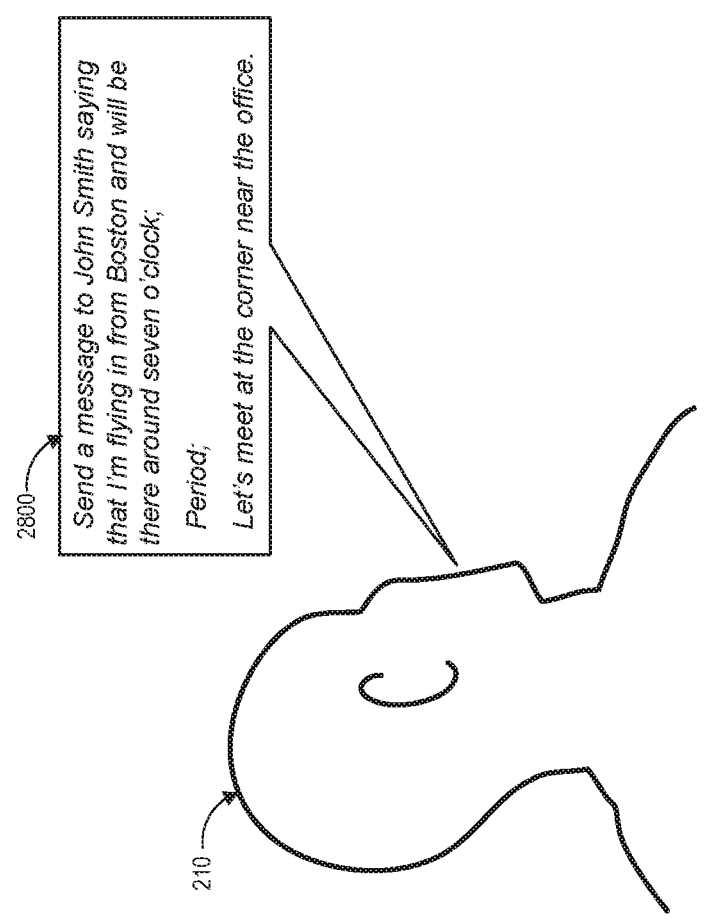
FIGS. 28A-28F illustrate an example user experience of composing and editing a text based on a combination of voice and gaze inputs.

As shown in FIG. 28A, the audio sensor 232 can receive a phrase 2800 spoken by a user. As illustrated in FIG. 28A, the phrase 2800 may include a command, such as "Send a message to John Smith saying that," as well as the parameters of the command such as, e.g., composing and sending a message, and the destination of the message as John Smith. The phrase 2800 can also include the content of the message that is to be composed. In this example, the content of the message can include "I'm flying in from Boston and will be there around seven o'clock; Period; Let's meet at the corner near the office." Such content can be obtained by parsing the audio data using an ASR engine (which can implement natural language understanding to isolate and extract message content and punctuation (e.g., "Period") from the user's utterance). In some examples, punctuation may be processed for presentation within the context of a transcribed string (e.g., "two o'clock" may be presented as "2:00" or "question mark" may be presented as "?") The wearable system can also tokenize the text string, such as by isolating discrete words in the text string, and display the result, such as by displaying the discrete words, in the mixed reality environment.

Figure 28B:
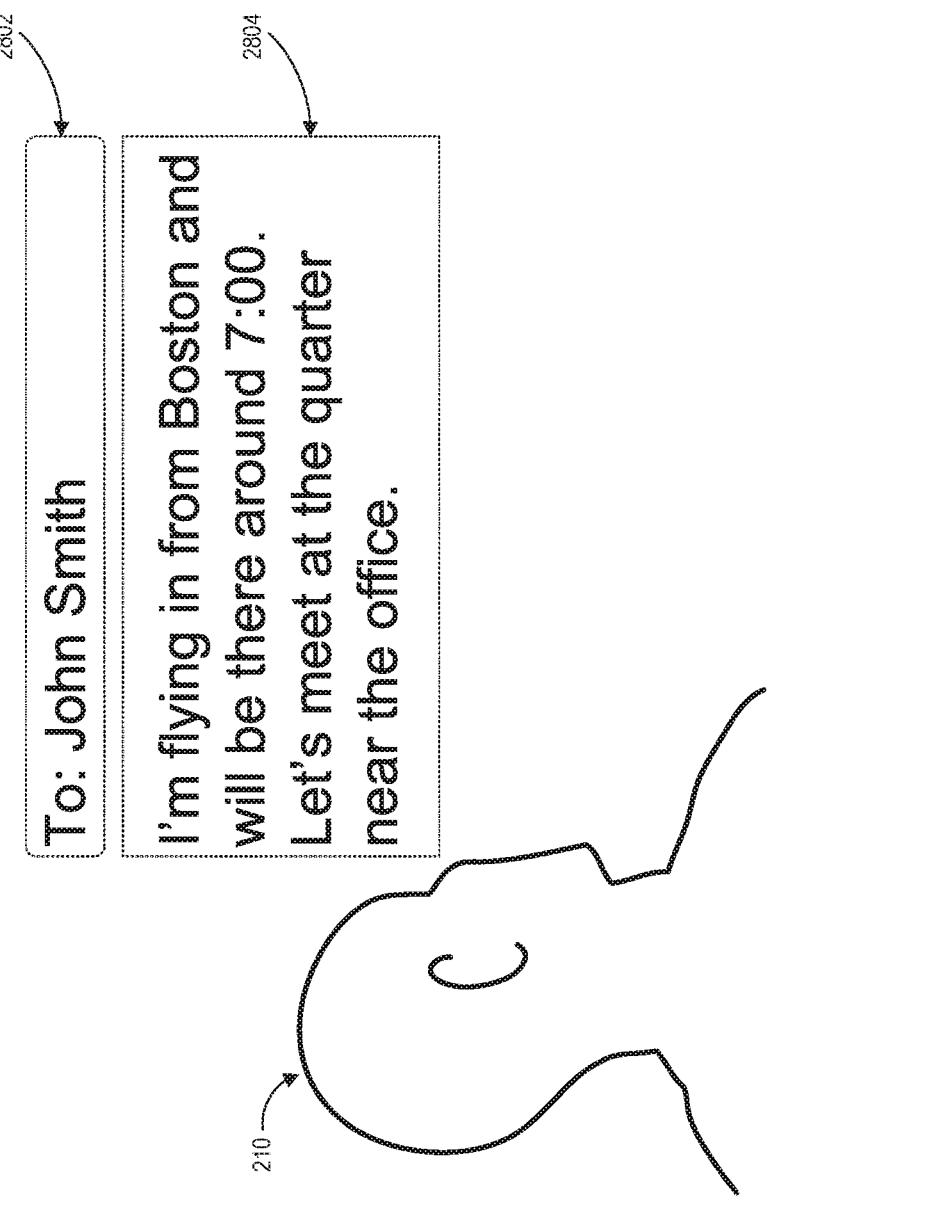

However, automatic speech recognition may be susceptible to errors in some situations. As illustrated in FIG. 28B, a system using an ASR engine may produce results that do not precisely match the user's spoken input, for various reasons including poor or idiosyncratic pronunciation, environmental noise, homonyms and other similar sounding words, hesitations or disfluency, and vocabulary that is not in the ASR's dictionary (e.g., foreign phrases, technical terms, jargon, slang, etc.). In the example of FIG. 28B, the system properly interpreted the command aspect of the phrase 2800 and generated a message with a header 2802 and a body 2804. However, in the body 2804 of the message, the system incorrectly interpreted the user's utterance of "corner" as "quarter," which are somewhat similar sounding. In systems that rely entirely upon voice inputs, it would be difficult for a user to quickly replace the misrecognized word (or phrase) with the intended word (or phrase). However, the wearable system 200 described herein can advantageously allow the user quickly correct the error as illustrated in FIGS. 28C-28F.

The ASR engine in the wearable system may produce text results, including at least one word, associated with a user's utterance and may also produce an ASR score associated with each word (or phrase) in the text results. A high ASR score may indicate a high confidence or high likelihood that the ASR engine correctly transcribed the user's utterance into text, whereas a low ASR score may indicate a low confidence or low likelihood that the ASR engine correctly transcribed the user's utterance into text. In some embodiments, the system may display words with low ASR scores (e.g., ASR scores below an ASR threshold) in an emphasized manner (e.g., with background highlighting, italics or bold font, different color font, etc.), which may make it easier for the user to identify or select incorrectly recognized words. A low ASR score for a word can indicate that the user is more likely to select that word for editing or replacement, because there is a reasonable likelihood that the ASR engine misrecognized the word.

Figure 28C:
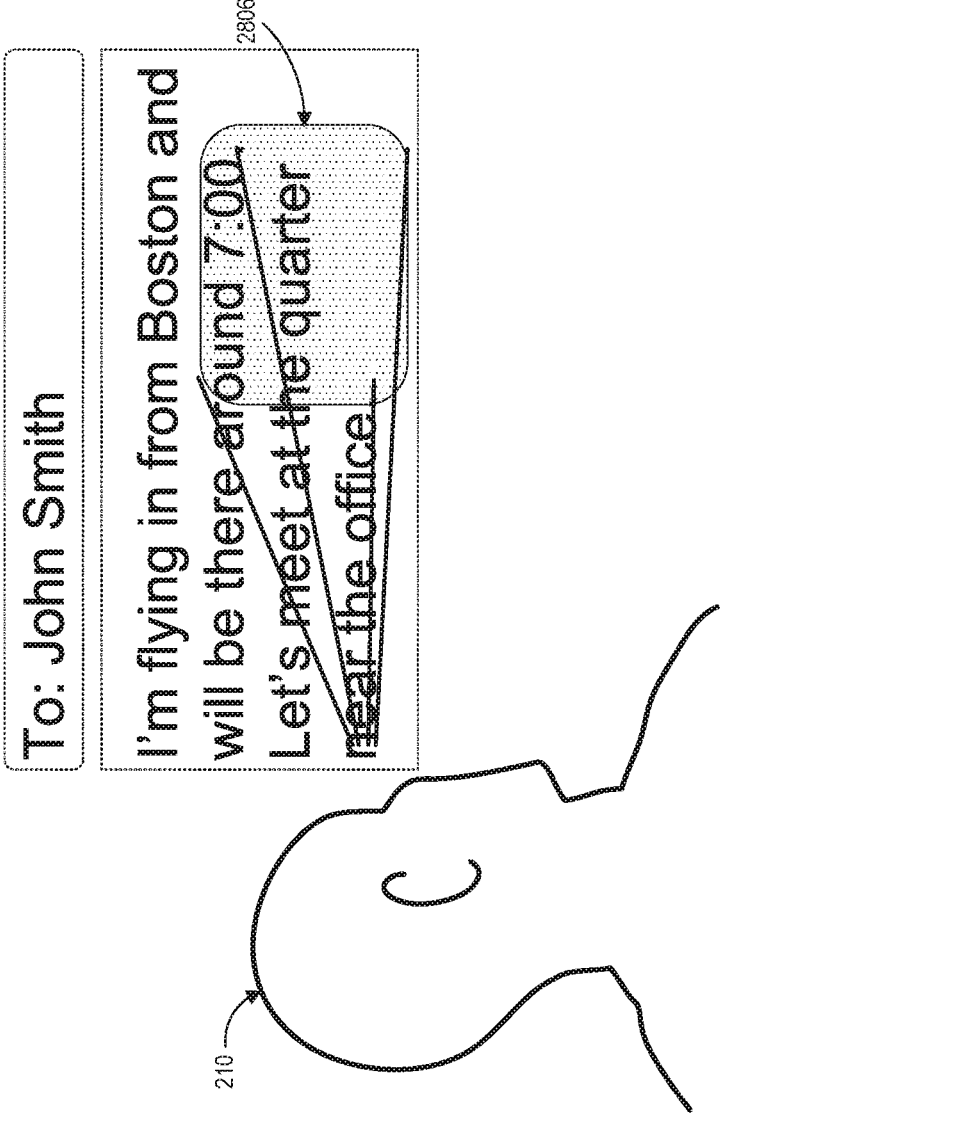
Figure 28D:
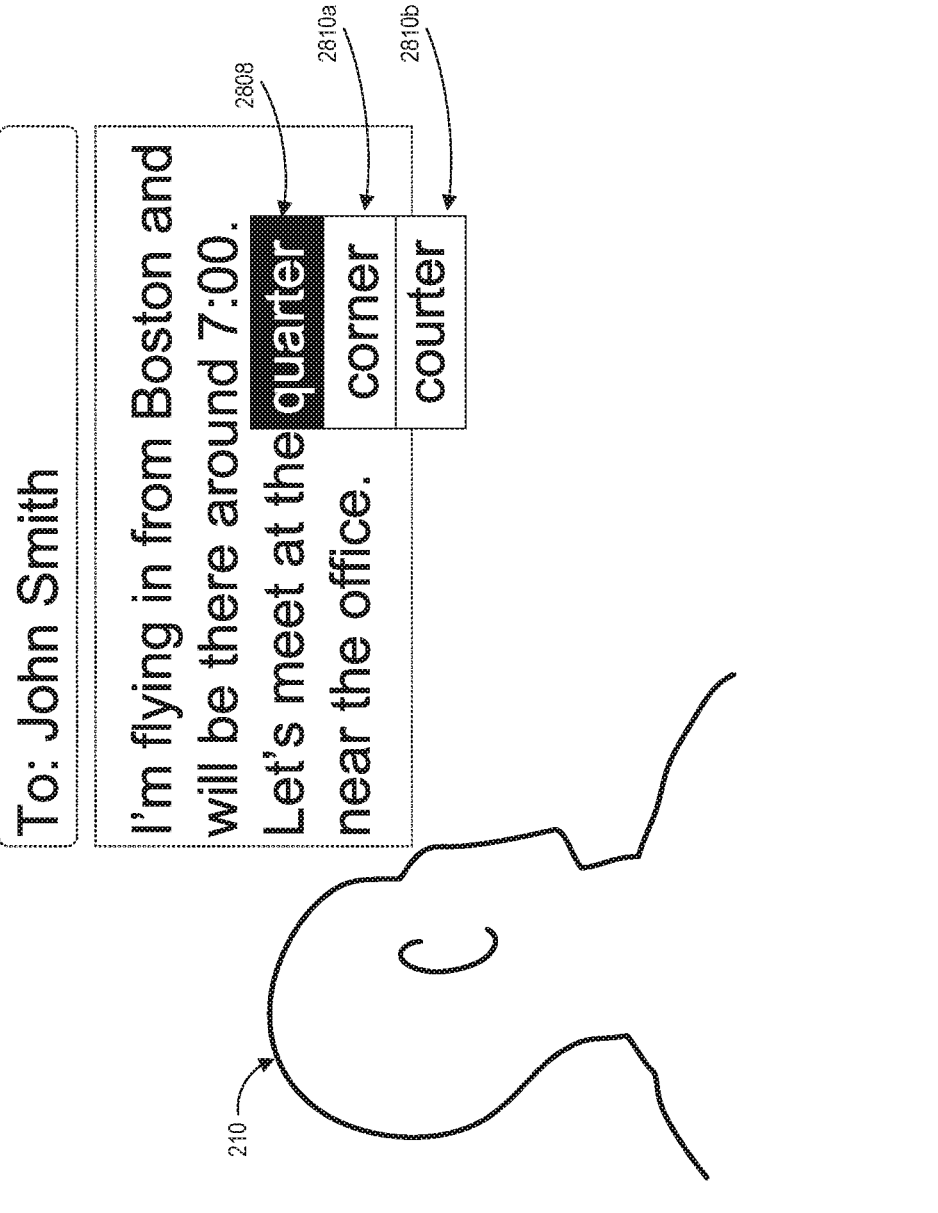

As shown in FIGS. 28C and 28D, the wearable system may enable the user to select the misrecognized word (or phrase) using an eye tracking system, such as inward-facing imaging system 462 of FIG. 4. In this example, the selected word may be an example of the target virtual object described above with earlier figures.

The wearable system 200 can determine the gaze direction based on the inward-facing imaging system 462 and can cast a cone 2806 or ray in the gaze direction. The wearable system can select one or more words that intercept with the user's direction of gaze. In certain implementations, a word may be selected when the user's gaze lingers on the erroneous word for at least a threshold time. As described above, the erroneous word may be determined at least in part by being associated with a low ASR score. The threshold time may be any amount of time sufficient to indicate that the user wants to select a particular word, but not so long as to unnecessarily delay selection. The threshold time may also be used to determine a confidence score indicating that the user desires to select a particular virtual word. For example, the wearable system can calculate the confidence score based on how long a user has stared at a direction/object, where the confidence score may increase as the time duration for looking at a certain direction/object increases. The confidence score may also be calculated based on multimodal inputs as described herein. For example, the wearable system may determine, with a higher confidence score (than the confidence score derived from eye gaze alone), if both the user's hand gesture and the eye gaze indicate a word should be selected.

As another example, the wearable system may calculate the confidence score based in part on the ASR score, which may be indicative of the relative confidence of the ASR engine of a translation of a particular word, as discussed in more detail herein. For example, a low ASR engine score may be indicative that the ASR engine has relatively low confidence that it correctly transcribed a spoken word. Therefore, there is a higher probability that the user will be likely to select that word for editing or replacement. If the user's gaze lingers longer than a threshold time on a word that has a low ASR score, the system can assign a higher confidence score to reflect that the user has selected that word for at least two reasons: first, the length of the eye gaze on the word and second, the fact that the word was likely mis-transcribed by the ASR engine, both of which tend to indicate that the user is going to want to edit or replace that word.

A word may be selected if the confidence score passes a threshold criterion. As examples, the threshold time may be one-half a second, one second, one and a half seconds, two seconds, two and a half seconds, between one and two seconds, between one and three seconds, etc. Thus, the user can easily and quickly select the erroneous word, "quarter," merely by looking at it for a sufficient time. The word may be selected based on a combination of eye gaze (or gesture) time together with an ASR score above an ASR threshold, both of which criteria provide indications that the user is going to select that particular word.

As an example, if the results of the ASR engine include a first word having a high ASR score (e.g., a word the ASR engine is relatively confident was correctly recognized) and a second word having a low ASR score (e.g., a word the ASR engine is relatively confident was not correctly recognized) and these two words are displayed adjacent to each other by the wearable system, the wearable system may assume that a user's gaze input that encompasses both the first and second words is actually an attempt by the user to select the second word, based on its relatively low ASR score, because the user is more likely to want to edit the incorrectly recognized second word than the correctly recognized first word. In this manner, words produced by an ASR engine with a low ASR score, which are more likely to be inaccurate and require editing, may be significantly easier for a user to select for editing, thus facilitating editing by the user.

Although this example describes selecting the misrecognized word using eye gaze, another multimodal input can also be used to select a word. For example, cone casting can identify multiple words, such as "around", "7:00", "the", and "quarter", since they also intersect with a portion of the virtual cone 2806. As will further be described with reference to FIGS. 29-31, the wearable system can combine the eye gaze input with another input (such as, e.g., a gesture, a voice command, or an input from a user input device 466) to select the word "quarter" as the word for further editing.

Upon selecting the word 2808, the system can enable editing of the selected word. The wearable system can allow a user to edit the word using a variety of techniques, such as, e.g., change, cut, copy, paste, delete, clear, undo, redo, insert, replace, etc. As shown in FIG. 28D, the wearable system can allow a user to change the word 2808 to another word. The wearable system can support a variety of user inputs for editing the word 2808, such as, e.g., by receiving additional spoken input through a microphone to replace or delete the selected word, displaying a virtual keyboard to enable the user to type out a replacement, or receiving user input via a user input device, etc. In certain implementations, an input may be associated with a specific type of text editing. For example, a waving gesture may be associated with deleting the selected text while a gesture with a finger pointing at a position in the text may cause the wearable system to insert additional text at the position. The wearable system can also support a combination of user inputs to edit the words. As will further be described with reference to FIGS. 32-35, the system can support eye gaze in combination with another input mode to edit the word.

Figure 28E:
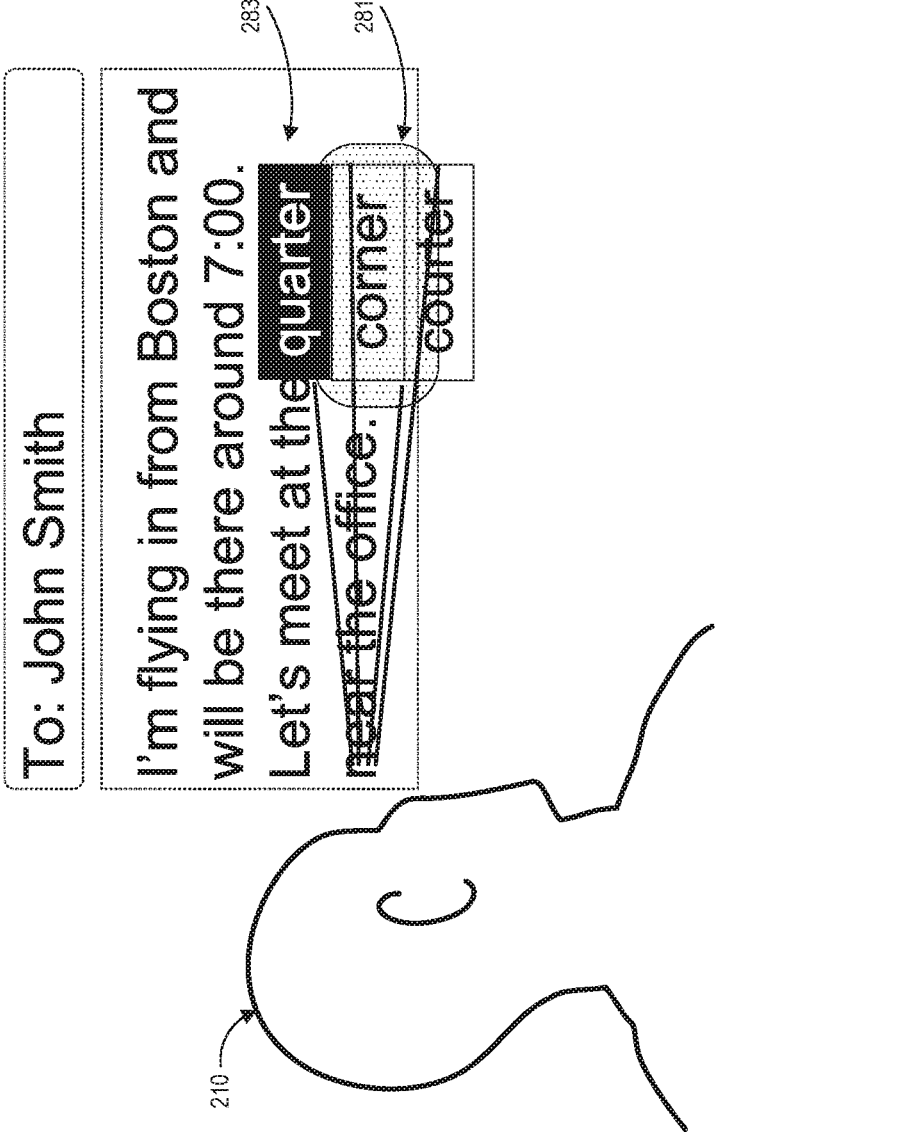

In the examples of FIGS. 28D and 28E, the system may automatically present the user with an array of suggested alternatives such as alternatives 2810*a* and 2810*b* upon a selection of the word 2808. The suggested alternatives may be generated by the ASR engine or other language processing engines in the system and may be based on the original speech input (which may also be referred to as voice input in some embodiments), natural language understandings, context, learned from user behavior, or other suitable sources. In at least some embodiments, suggested alternatives may be alternate hypotheses generated by the ASR engine, may be hypotheses generated by a predictive text engine (which may try to "fill in the blanks" using the context of adjacent words and a user's historical patterns of text), may be homophones of the original translation, may be generated using a thesaurus, or may be generated using other suitable techniques. In the illustrated examples, the suggested alternatives to "quarter" include "corner" and "courter", which may be provided by a language engine as being words that sound similar to "quarter."

Figure 28F:
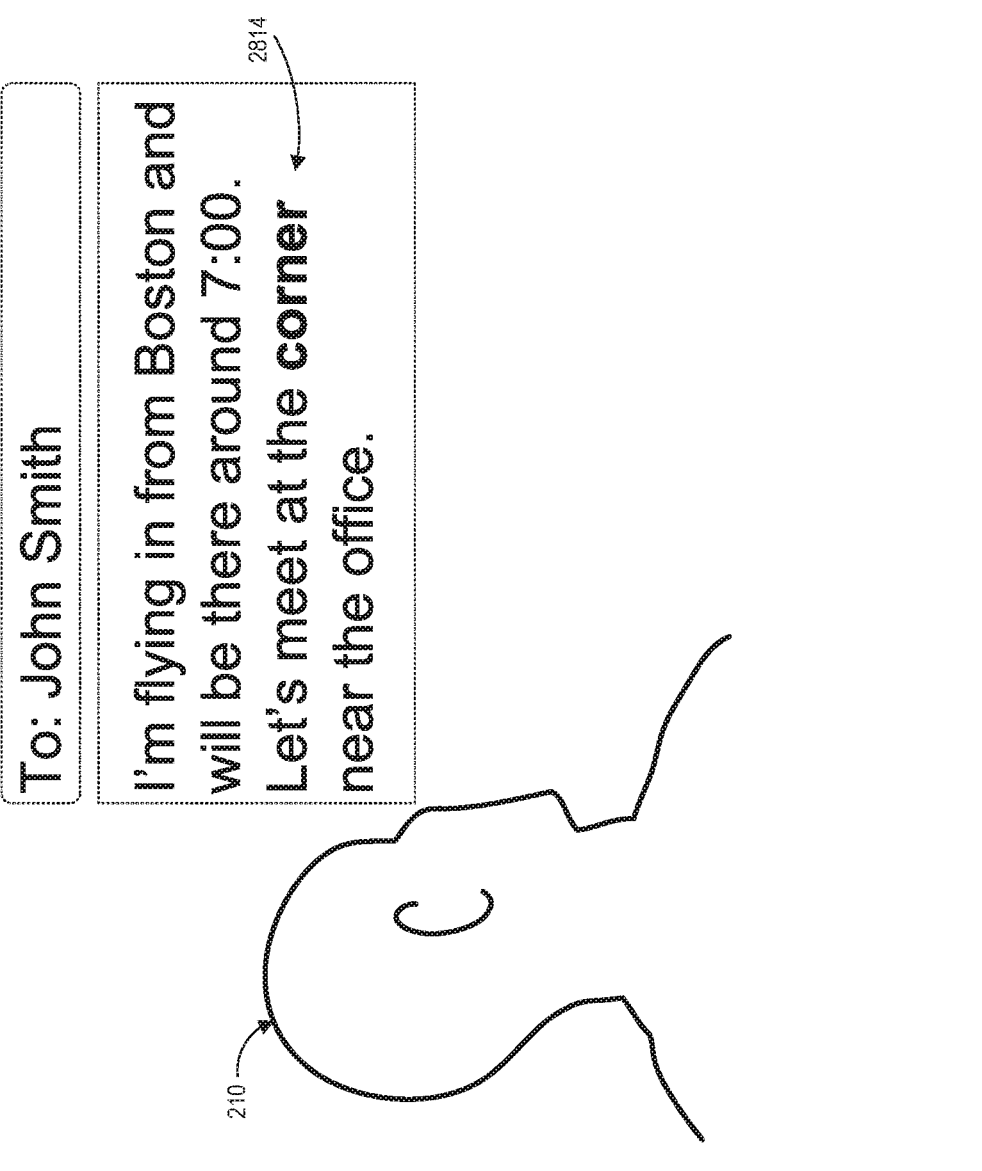

FIG. 28E illustrates how the system may enable the user to select a desired alternative word, such as "corner," with eye gaze. The wearable system may use similar techniques as those described with reference to FIG. 28C to select the alternative word. For example, the system may track the user's eyes using inward-facing imaging system 462 to determine that the user's gaze 2812 has been focused upon a particular alternative, such as alternative 2810A or "corner", for at least a threshold time. After determining that the user's gaze 2812 was focused on an alternative for the threshold time, the system may revise the text (the message) by replacing the originally selected word with the selected alternative word 2814, as shown in FIG. 28F. In certain implementations, where the wearable system uses cone casting to select a word, the wearable system can dynamically adjust the size of the cone based on the density of the text. For example, the wearable system may present a cone with a bigger aperture (and thus with a bigger surface area at the away from the user) to select an alternative word for editing as shown in FIG. 28E because there are few available options. But the wearable system may present the cone with a smaller aperture to select the word 2808 in FIG. 28C because the word 2808 is surrounded with other words and a smaller cone can reduce the error rate of accidentally selecting another word.

The wearable system can provide feedback (e.g., visual, audio, haptic, etc.) to the user throughout the course of operation. For example, the wearable system can present a focus indicator to facilitate the user's recognition of the target virtual object. For example, as shown in FIG. 28E, the wearable system can provide a contrasting background 2830 around the word "quarter" to show that the word "quarter" is selected and the user is currently editing the word "quarter". As another example, as shown in FIG. 28F, the wearable system can change the font of the word "corner" 2814 (e.g., to a bold font) to show that the wearable system has confirmed the replacement of the word "quarter" with this alternative word "corner". In other implementations, the focus indicator can include a cross-hair, a circle or oval surrounding the selected text, or other graphical techniques to highlight or emphasize the selected text.

Examples of Selecting a Word with Multimodal User Inputs

Figure 29:
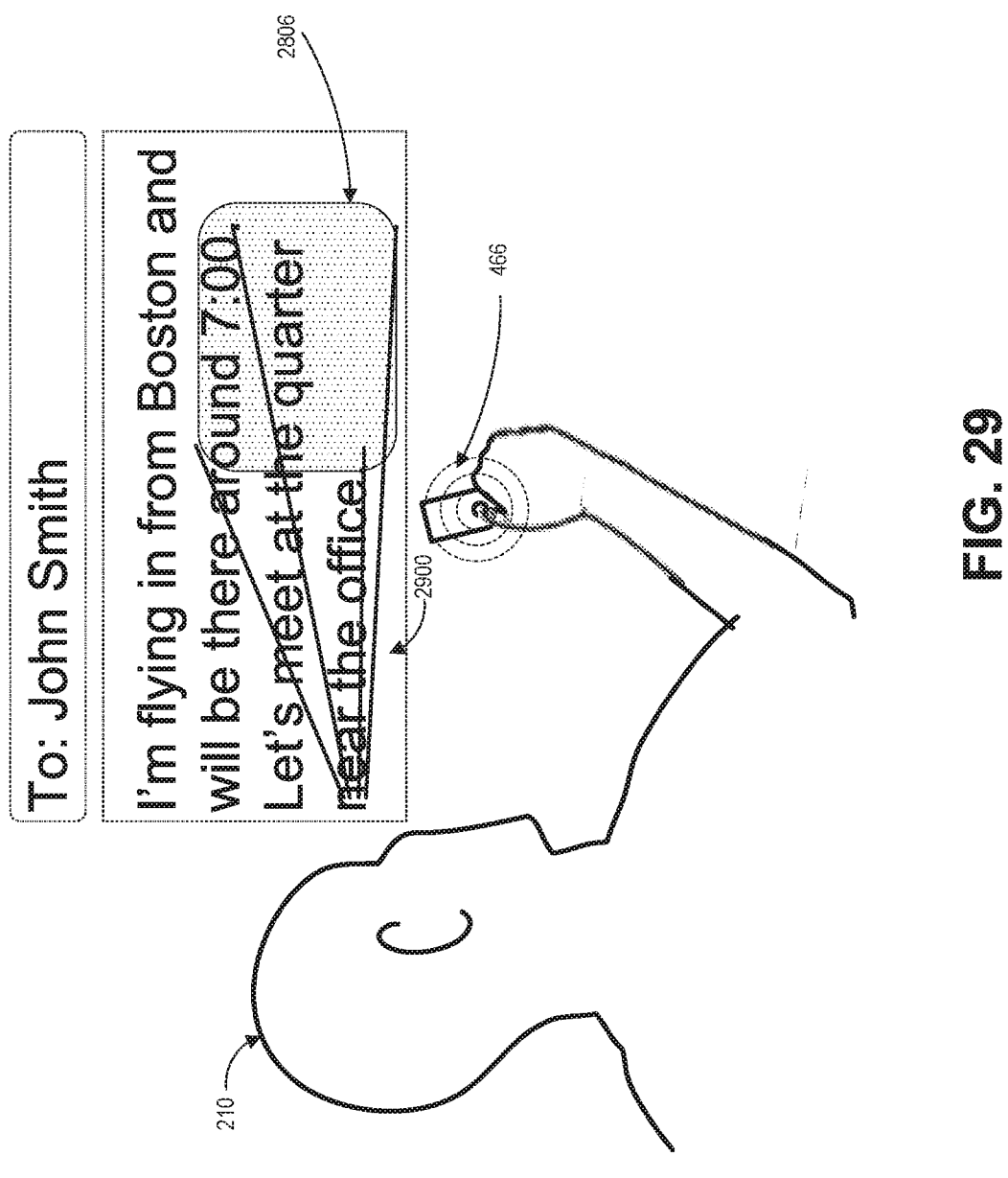
FIG. 29 illustrates an example of selecting a word based on an input from a user input device and gaze.
Figure 30:
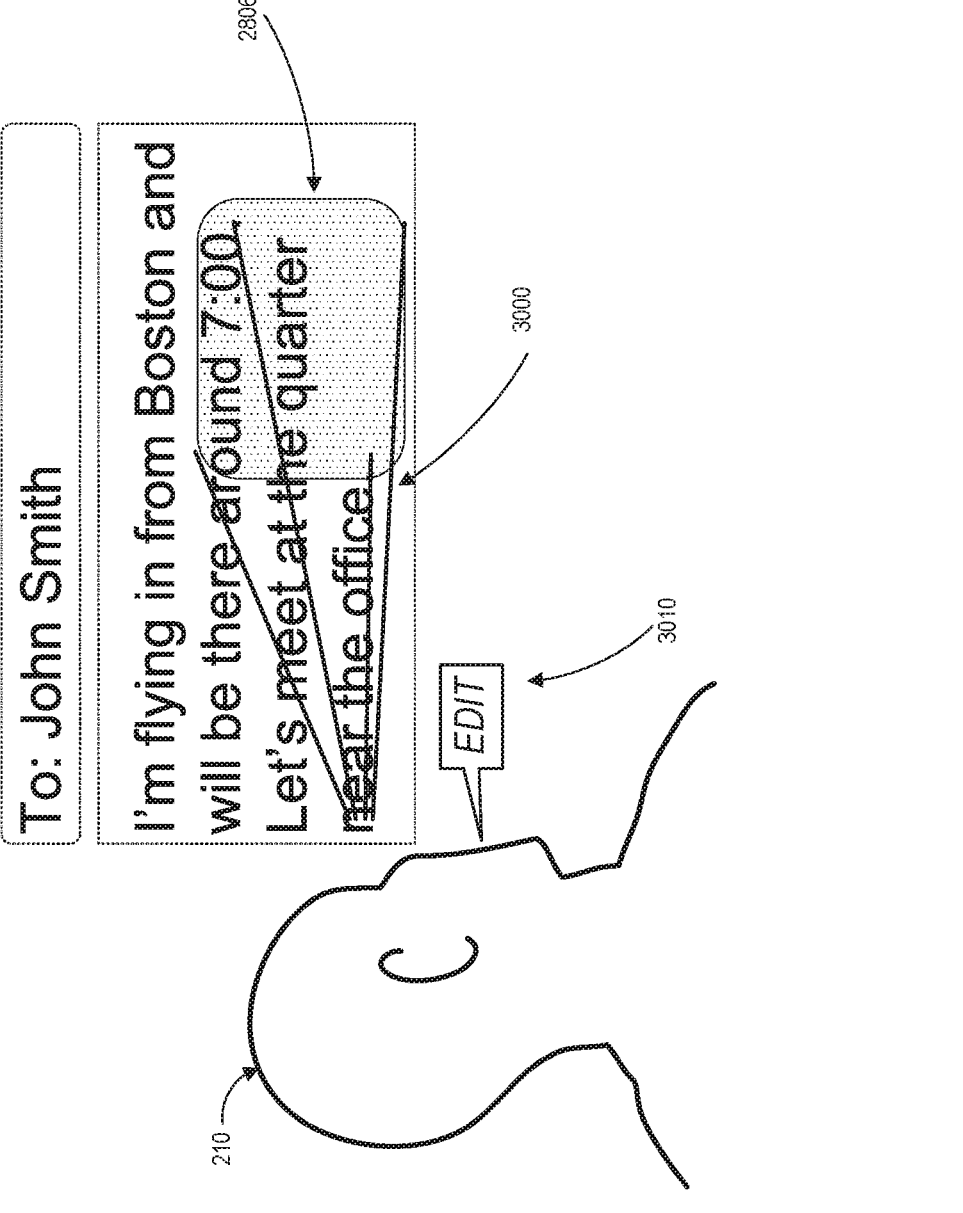
FIG. 30 illustrates an example of selecting a word for editing based on a combination of voice and gaze inputs.
Figure 31:
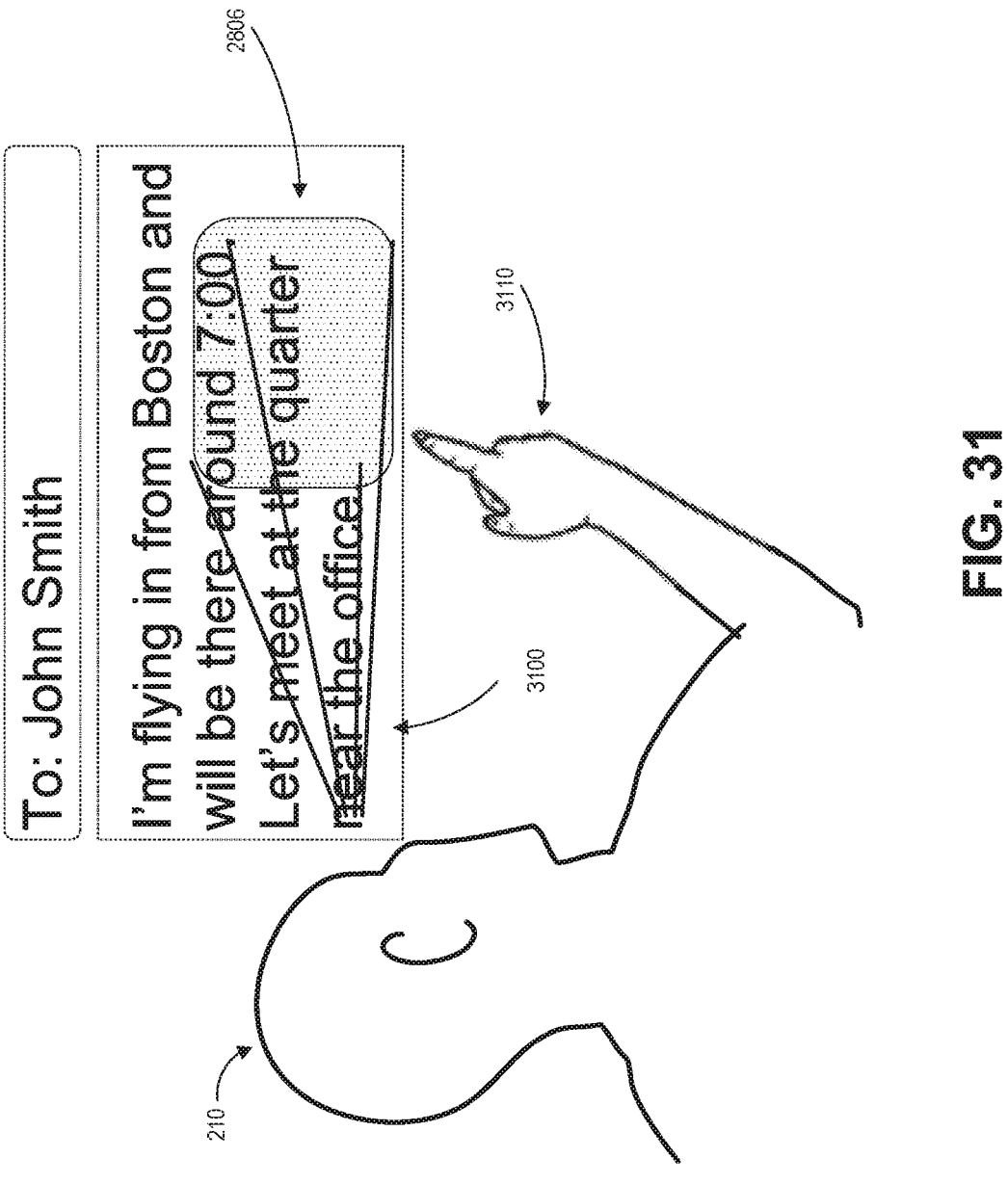
FIG. 31 illustrates an example of selecting a word for editing based on a combination of gaze and gesture inputs.

The wearable system can be configured to support and utilize multiple modes of user inputs to select a word. FIGS. 29-31 illustrate examples of selecting a word based on a combination of eye gaze and another input mode. Although in other examples, inputs other than eye gaze can also be used in combination with another mode of inputs for interactions with texts.

FIG. 29 illustrates an example of selecting a word based on an input from a user input device and gaze. As shown in FIG. 29, the system may combine a user's gaze 2900 (which may be determined based on data from the inward-facing imaging system 462) together with a user input received via a user input device 466. In this example, the wearable system can perform a cone cast based on the user's direction of gaze. The wearable system can confirm the selection of the word "quarter" based on the input from the user input device. For example, the wearable system can identify that the word "quarter" is the word that is closest to the user's gaze direction and the wearable system can confirm that the word quarter is selected based on the user's actuation of the user input device 466. As another example, the cone cast can capture a plurality of words, such as, e.g., "around", "7:00", "the", and "quarter". The user can select the word, via the user input device 466, among the plurality of words for further editing. By receiving input independent of the user's gaze, the system may not need to wait as long before confidently identifying a particular word as one the user wants to edit. After selecting a word to edit in this manner, the system may present alternatives (as discussed in connection with FIG. 28E) or otherwise allow the user to edit the selected word. The same process of combining the user's gaze with a user input received via a totem may be applied to selecting a desired replacement word (e.g., selecting the word "corner" among the alternatives to replace the word "quarter"). Some implementations may utilize a confidence score to determine which text is being selected by the user. The confidence score may aggregate multiple input modalities to provide a better determination of the selected text. For example, the confidence score may be based on the time that the user gazes at the text, whether the user actuates the user input device 466 when gazing at the text, whether the user points toward the selected text, and so forth. If the confidence score passes a threshold, the wearable system can determine, with increased confidence, that the system has correctly selected the text the user wants. For example, to select text just with eye gaze, the system may be configured to select the text if the gaze time exceeds 1.5 seconds. However, if the user gazes at the text for only 0.5 seconds but simultaneously actuates the user input device, the system can more quickly and confidently determine the selected text, which may improve the user experience.

FIG. 30 illustrates an example of selecting a word for editing based on a combination of voice and gaze inputs. The wearable system can determine a target virtual object based on the user's gaze. As shown in FIG. 30, the system may determine that a user's gaze 3000 is directed to a particular word (in this case "quarter"). The wearable system can also determine the operation to be performed on the target virtual object based on the user's voice command. For example, the wearable system may receive a user's spoken input 3010 via the audio sensor 232, may recognize the spoken input 3010 as a command, and may combine the two user inputs into a command to apply the command operation ("edit") to the target virtual object (e.g., the word the user is focusing their gaze upon ("quarter")). As discussed previously, the system may present alternative words after a user selects a word for editing. The same process of combining the user's gaze with a spoken input may be applied to selecting a desired replacement word among the alternative words to replace the word "quarter". As described herein, a term like "edit" represents a context-specific wakeup word that serves to invoke a constrained system command library associated with editing for each of one or more different user input modalities. That is, such a term, when received by the system as spoken input may cause the system to evaluate subsequently-received user input against a limited set of criteria so as to recognize editing-related commands provided by the user with enhanced accuracy. For example, within the context of speech input, the system might consult a limited command-specific vocabulary of terms to perform speech recognition on subsequently-received speech input. In another example, within the context of gaze or gesture input, the system might consult a limited command-specific library of template images to perform image recognition on subsequently-received gaze or gesture input. A term like "edit" is sometimes referred to as a "hotword" or "carrier phrase," and the system may include a number of pre-programmed (and optionally, user-settable) hotwords such as (in the editing context): edit, cut, copy, paste, bold, italic, delete, move, etc.

FIG. 31 illustrates an example of selecting a word for editing based on a combination of gaze and gesture inputs. As illustrated in the example of FIG. 31, the system may use eye gaze input 3100 together with gesture input 3110 to select a word for editing. In particular, the system may determine an eye gaze input 3100 (e.g., based on data acquired by the inward-facing imaging system 462) and may identify a gesture input 3110 (e.g., based on images acquired by the outward-facing imaging system 464). Object recognizers such as the recognizers 708 may be used in detecting part of a user's body, such as their hand, making a gesture associated with identification of a word for editing.

The gesture may be used alone or in combination with the eye gaze to select a word. For example, although the cone cast can capture multiple words, the wearable system may nevertheless identify the word "quarter" as the target virtual object because it is identified both from cone cast and the user's hand gesture (e.g., a confidence score based on the eye gaze cone cast in addition to the hand gesture passes a confidence threshold indicating the user selected the word "quarter"). As another example, although the cone cast can capture multiple words, the wearable system may nevertheless identify the word "quarter" as the target virtual object because it is identified both from cone cast and is the word with the lowest ASR score from the ASR engine that lies within (or near) the cone cast. In certain implementations, a gesture may be associated with a command operation, as it can be associated with a command such as "edit" or the other hotwords described herein. As an example, the system may recognize when a user points to the same word they are gazing at, and interpret these user inputs as a request to edit the same word. If desired, the system may also utilize additional user input, such as a voice command to "edit" at the same time, in determining that the user wants to edit a particular word.

Examples of Editing a Word with Multimodal User Inputs

Figure 32:
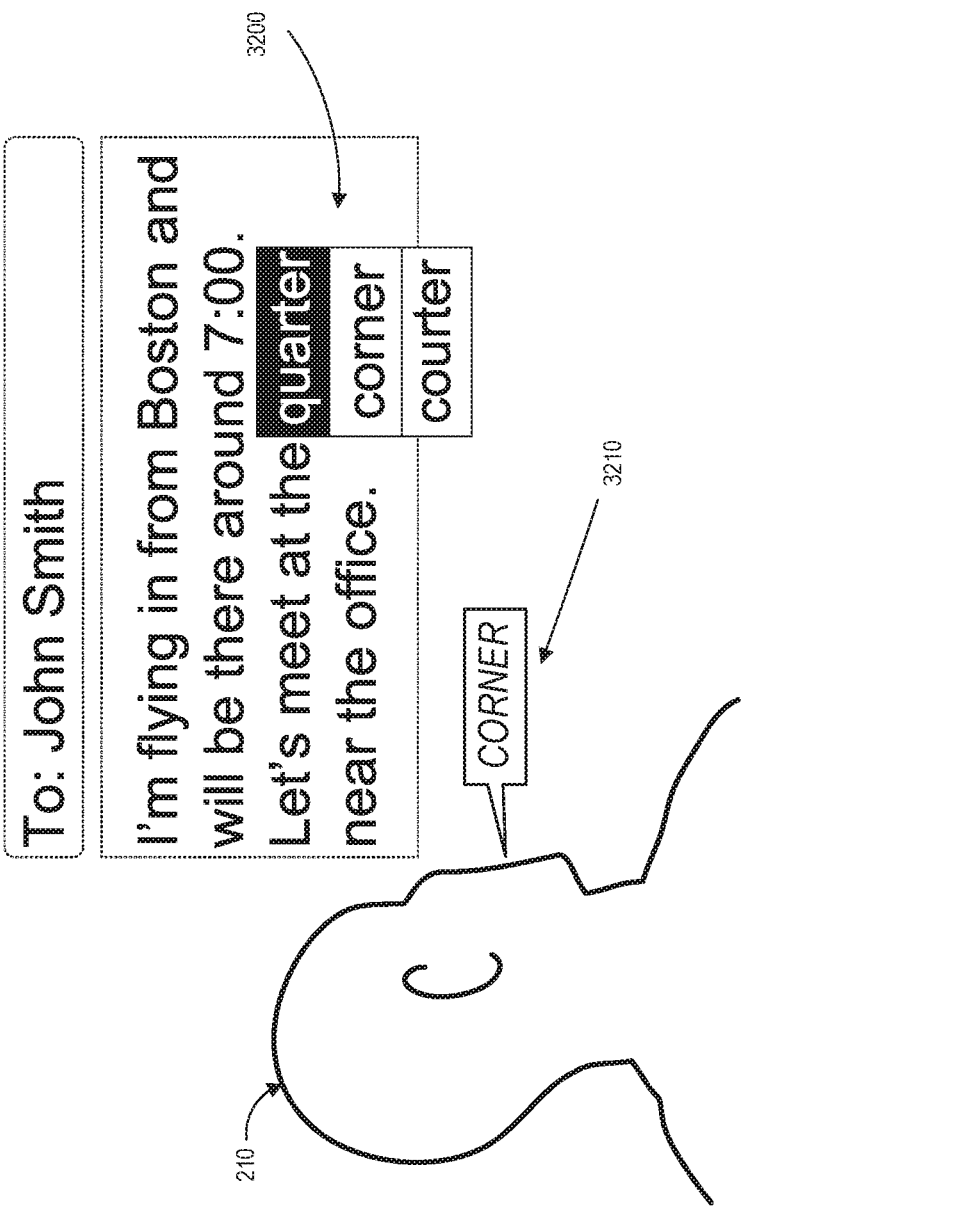
FIG. 32 illustrates an example of replacing a word based on a combination of eye gaze and voice inputs.
Figure 33:
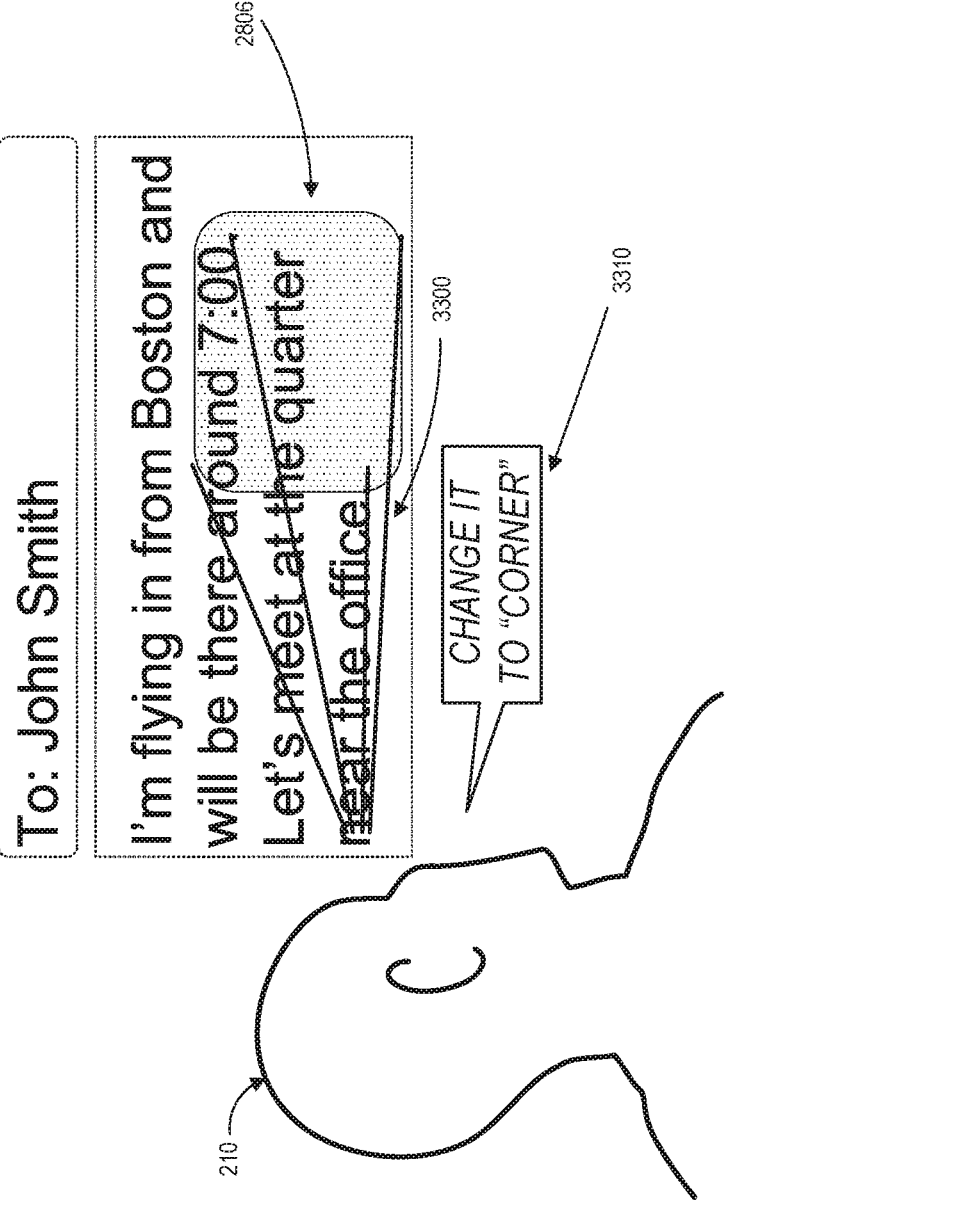
FIG. 33 illustrates an example of changing a word based on a combination of voice and gaze inputs.
Figure 34:
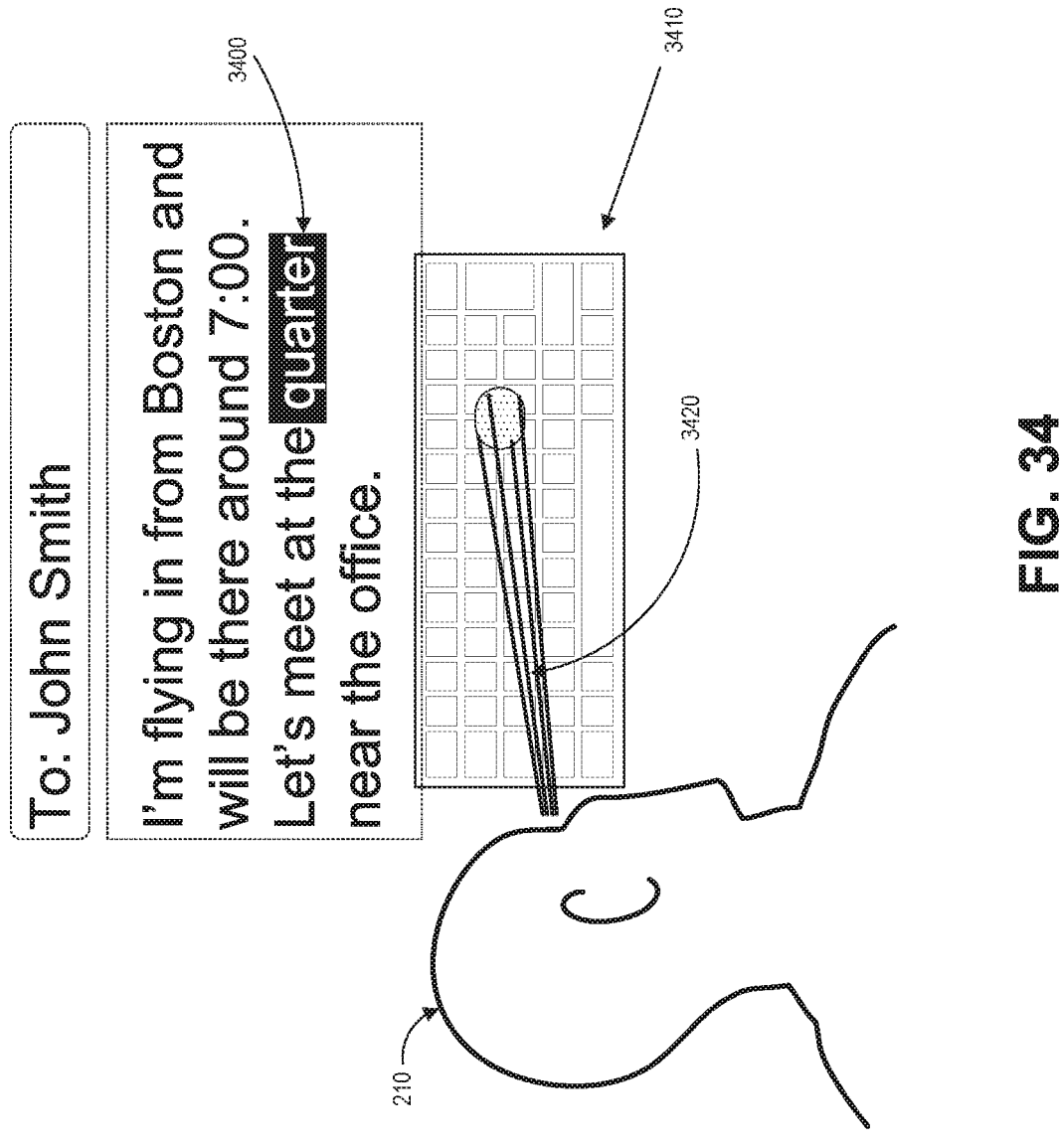
FIG. 34 illustrates an example of editing a selected word using a virtual keyboard.

Once the user has selected a word for editing, the system can utilize any desirable mode of user input to edit the selected word. The wearable system can allow a user to change or replace the selected word by displaying a list of potential alternatives and receiving user gaze input 2812 to select an alternative word to replace the original word (see example illustrated in FIG. 28E). FIGS. 32-34 illustrate additional examples of editing a selected word where the selected word can be edited using multimodal inputs.

FIG. 32 illustrates an example of replacing a word based on a combination of eye gaze and speech inputs. In FIG. 32, the system receives a speech input 3210 from the user (through audio sensor 232 or other suitable sensor). The speech input 3210 can contain the desired replacement word (which may or may not be a replacement word from the list of suggested alternatives 3200). Upon receiving the speech input 3210, the wearable system can parse the input (e.g., to strip out carrier phrases like "change this to . . . ") to identify the word spoken by the user and replace the selected word "quarter" with the word "corner" as uttered by the user. Although in this example, the replacement is a word, in certain implementations, the wearable system can be configured to replace the word "quarter" with a phrase or a sentence or some other element (e.g., an emoji). In examples where multiple words are contained within the eye gaze cone cast, the wearable system may automatically select the word within the eye gaze cone that is closest to the replacement word (e.g., "quarter" is closer to "corner" than "the" or "7:00").

FIG. 33 illustrates an example of changing a word based on a combination of voice and gaze inputs. In this example, the wearable system can receive a speech input 3310 and determine the user's gaze direction 3300. As shown in FIG. 33, the speech input 3310 includes the phrase "change it to 'corner'". The wearable system can parse the speech input 3310 and determine that the speech input 3310 includes a command operation "change" (which is an example of a carrier phrase), a subject "it", and a parameter of the command (e.g., a resulting word "corner"). This speech input 3310 can be combined with the eye gaze 3300 to determine the subject of the operation. As described with reference to FIGS. 28A and 28B, the wearable system can identify the word "quarter" as the subject of the operation. Thus, the wearable system can change the subject ("quarter") to the resulting word "corner".

FIG. 34 illustrates an example of editing a selected word 3400 using a virtual keyboard 3410. The virtual keyboard 3410 can be controlled by user gaze inputs, gesture inputs, inputs received from a user input device, etc. For example, a user may type out a replacement word by moving the eye gaze direction 3420 over the virtual keyboard 3410 displayed to the user by the display of the wearable system 200. The user may type each letter in the replacement word by pausing their gaze over a respective key for a threshold period of time, or the wearable system may recognize changes in direction of the user's gaze 3420 over a particular key as an indication the user wants to select that key (thereby eliminating the need for the user to hold their focus steady on each individual key when typing out a word). As described with reference to FIG. 28D, in certain implementations, the wearable system may vary the size of the cone based on the size of the keys. For example, in a virtual keyboard 3410 where the size of each key is relatively small, the wearable system may reduce the size of the cone to allow a user to identify the letters in the replacement word more accurately (such that a cone cast will not accidentally capture a large number of possible keys). If the size is relatively big, the wearable system can accordingly increase the size of the keys to so that the user does not have to pinpoint the gaze direction (which can reduce fatigue).

Figure 35:
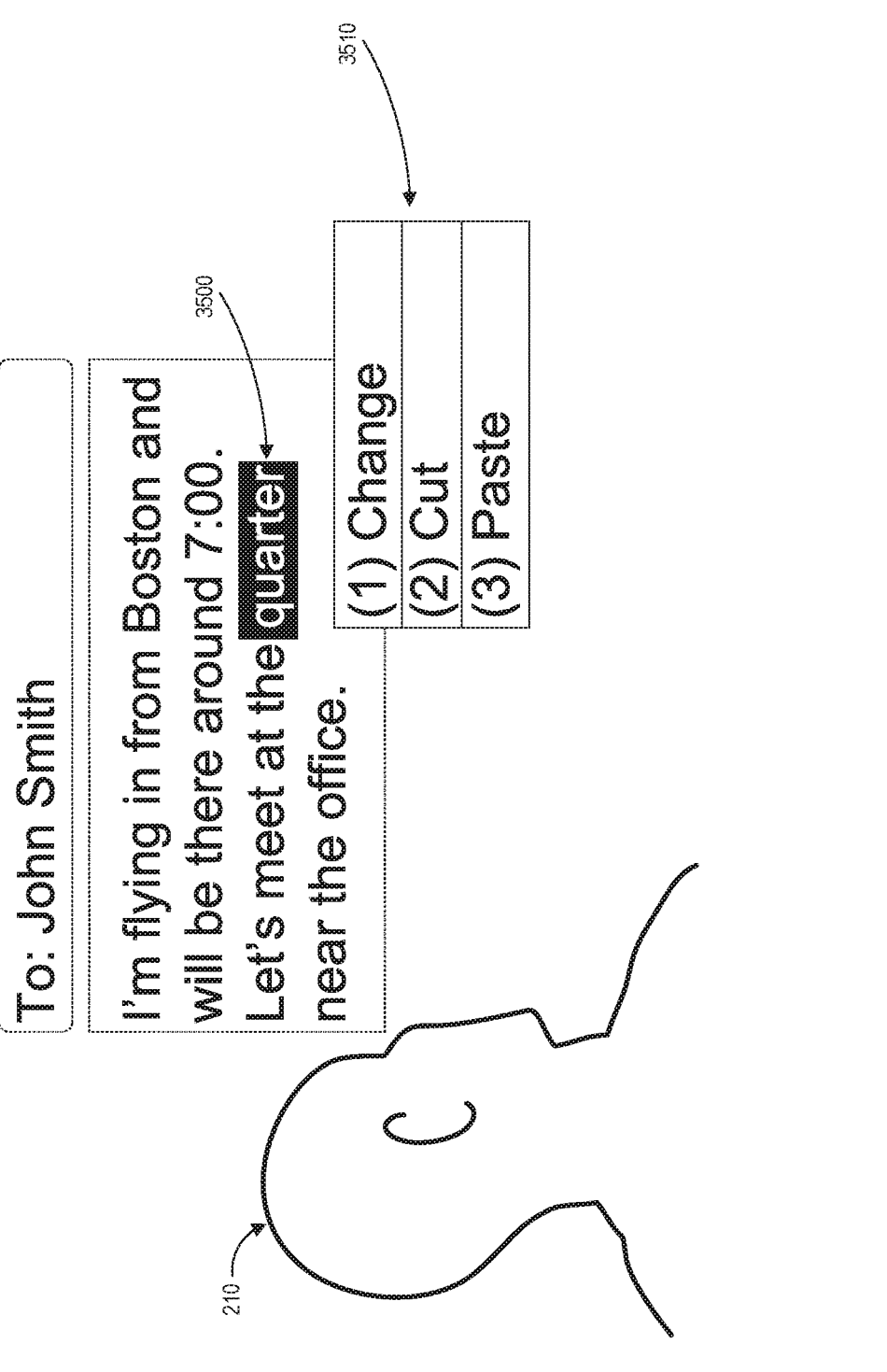
FIG. 35 illustrates an example user interface that displays possible actions to apply to a selected word.

In certain implementations, after a word has been selected, the wearable system can present a set of possible actions in addition to or in alternative to displaying a list of suggested alternative words for replacing the selected word. The user 210 can select an action and edit the selected word using the techniques described herein. FIG. 35 illustrates an example user interface that displays possible actions to apply to a selected word. In FIG. 35, upon selection of a word 3500 for editing, the wearable system may present a list 3510 of options for editing, including (in this example) an option to (1) change the word (using any of the techniques described herein for editing), (2) cut the word out and optionally store it in a clipboard or copy the word and store it in a clipboard, or (3) paste in a word or phrase from the clipboard. Additional or alternative options that may be presented include a delete selection option, an undo option, a redo option, a select all option, an insert here option, and a replace option. The various options may be selected using gaze input, totem input, gesture input, etc., as described herein.

Examples of Interacting with a Phrase with Multimodal User Inputs

While the preceding examples have described using multimodal inputs to select and edit a word, this is intended for illustration, and the same or similar processes and inputs may generally be used in selecting and editing a phrase or a sentence or a paragraph including multiple words or characters.

FIGS. 36(*i*)-36(*iii*) illustrates an example of interacting with a phrase using multimodal inputs. At FIG. 36(*i*), the wearable system can determine the user's gaze 3600 direction, and perform and cone cast based on the user's gaze direction. At FIG. 36(*ii*), the system may recognize that the gaze 3600 of the user 210 is focused on a first word 3610 (e.g., "I'm"). The system may make such determinations of the first word 3610 using any of the techniques discussed herein, including but not limited to recognizing that the user's gaze 3600 has dwelled (e.g., lingered) on a particular word for a threshold period of time, that the user's gaze 3600 is on a particular word at the same time the user provides voice, gesture, or totem input, etc. The wearable system can also display a focus indicator (e.g., a contrasting background as shown) on the selected word "I'm" 3610 to indicate that the word has been determined from the eye gaze cone cast. The user can actuate a totem 3620 (which is an example of the user input device 466) while looking at the first word 3610. This actuation may indicate that the user intends to select a phrase or a sentence beginning with the first word 3610.

At FIG. 36(*iii*), after the actuation of the user input device 466, the user can look at the last intended word (e.g., the word "there") to indicate that the user desires to select the phrase starting from the word "I'm" and ending at the word "there". The wearable system can also detect that the user has stopped actuating the totem 3620 (e.g., releasing the button that the user previously pressed) and can accordingly select the entire range 3630 of the phrase "I'm flying in from Boston and will be there". The system can display the selected phrase using a focus indicator (e.g., by extending the contrasting background to all the words in the phrase).

The system may determine that the user desires to select a phrase rather than another word for editing using a variety of techniques. As an example, the system may determine that the user desires to select a phrase rather than undo their selection of the first word when the user selects a second word shortly after the user selects a first word. As another example, the system may determine that the user wants to select a phrase when the user selects a second word that appears after the first and the user has not yet edited the first selected word. As yet another example, the user may press a button on totem 3620 when they are focused on first word 3610 and then hold the button until their gaze has settled on the last word. When the system recognizes the button was pressed while the gaze 3610 was focus on a first word, but only released after the user's gaze 3610 shifted to a second word, the system may recognize the multimodal user input as a selection of a phrase. The system may then identify all of the words in the phrase, including the first word, the last word, and all words in between and may enable editing of the phrase as a whole. The system may use a focus indicator to highlight the selected phrase (e.g., highlighting, emphasized text (e.g., bold or italic or a different color), etc.) so that it stands out from unselected text. The system may then display contextually appropriate options for editing the selected phrase, such as options 3510, a virtual keyboard such as keyboard 3410, alternative phrases, etc. The system may receive additional user inputs such as spoken input, totem input, gesture input, etc., to determine how to edit the selected phrase 3630.

While FIG. 36 illustrates the user selecting a first word 3610 that is at the start of a phrase, the system may also allow a user to select backwards from the first word 3610. In other words, the user may select a phrase by selecting the last word of a phrase (e.g., "there"), and then by selecting the first word of the desired phrase (e.g., "I'm").

Figure 37A:
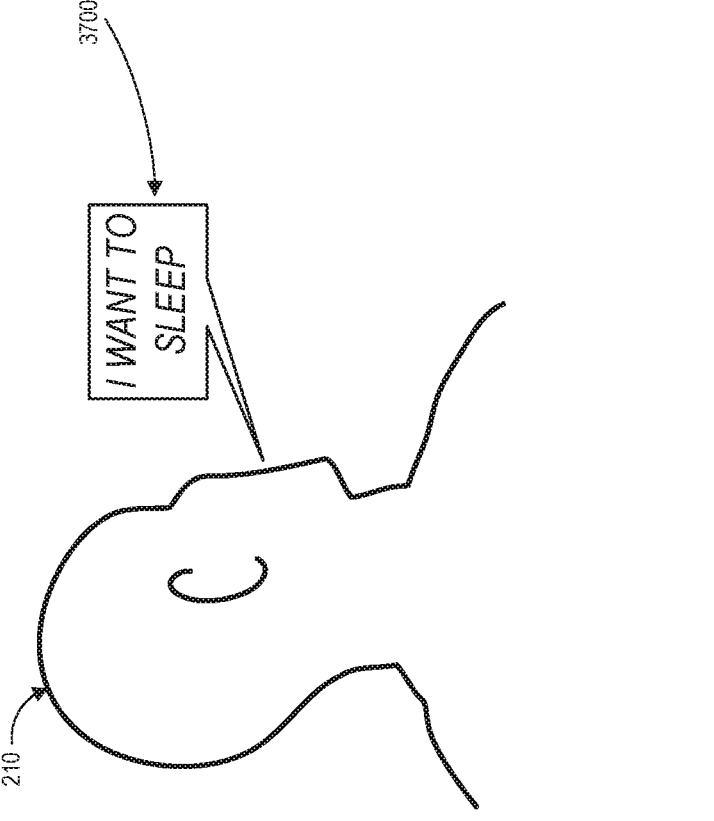
FIGS. 37A and 37B illustrate additional examples of using multimodal inputs to interact with a text.
Figure 37B:
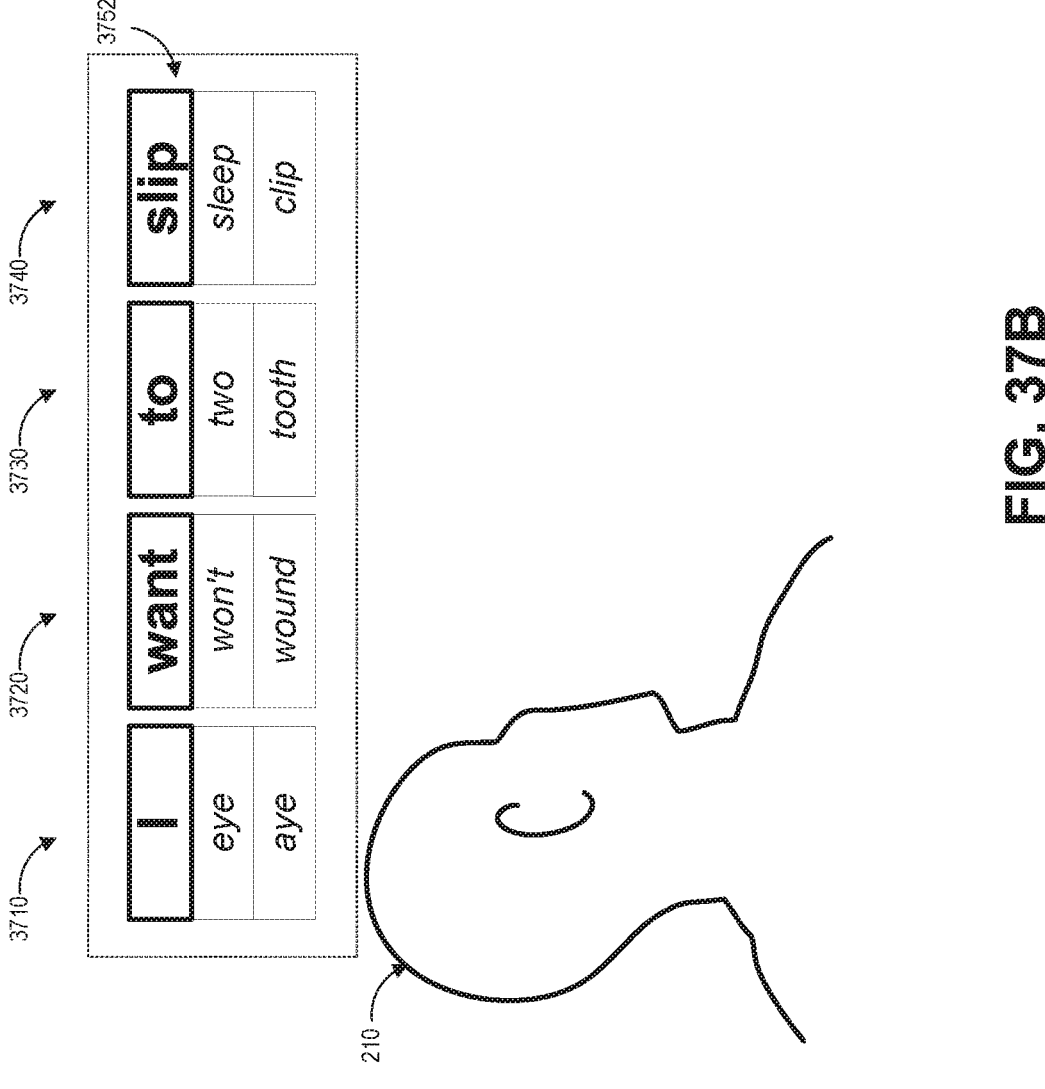

FIGS. 37A-37B illustrate another example of interacting with a text using multimodal inputs. In FIG. 37A, a user 210 utters a sentence ("I want to sleep"). The wearable system can capture the user's utterance as a speech input 3700. For this speech input, the wearable system can display both primary and secondary results from the automated speech recognition (ASR) engine for each word, as shown in FIG. 37B. The primary result for each word may represent the ASR engine's best guess (e.g., the word having the highest ASR score for indicating what word the user actually spoke) for the word spoken by the user in speech input 3700, whereas the secondary results may represent similarly sounding alternatives or words having lower ASR scores than the ASR engine's best guess. In this figure, FIG. 37B, the primary results are displayed as the sequence 3752. In some embodiments, the wearable system may present alternative results or hypotheses as alternative phrases and/or entire sentences as opposed to alternative words. As an example, the wearable system may provide a primary result of "four score and seven years ago" along with a secondary result of "force caring seven years to go" where there is no one-to-one correspondence between discrete words in the primary and secondary results. In such embodiments, the wearable system can support inputs from the user (in any of the manners described herein) selecting the alternative or secondary phase(s) and/or sentence(s).

As shown in FIG. 37B, each word from the user's speech input 3700 may be displayed as a collection 3710, 3720, 3730, 3740 of primary and secondary results. Arrangements of this type may enable a user to quickly swap out incorrect primary results and correct any errors introduced by the ASR engine. The primary results 3752 may be emphasized with a focus indicator (e.g., each word is in bold text surrounded by a bounding box in the example in FIG. 37B) to distinguish them from the secondary results.

The user 210 can dwell on secondary results, e.g., secondary words, phrases, or sentences, etc., if the primary words are not the ones intended by the user. As an example, the ASR engine's primary result in collection 3740 is "slip," whereas the correct transcription is actually the first secondary result "sleep." To correct this error, the user can focus their gaze upon the correct secondary result "sleep" and the system may recognize that the user's gaze lingering upon a secondary result for a threshold period of time. The system may translate the user gaze input as a request to replace the primary result "slip" with the selected secondary result "sleep." Additional user inputs may be received in conjunction with selecting a desired secondary result, such as user speech input (e.g., the user may ask the system to "edit", "use this", or "replace" while looking at the desired secondary result).

Once the user finishes editing the phrase "I want to sleep" or confirms that the transcription is correct, the phrase can be added to a body of text using any modes of user input described herein. For example, the user can say a hotword, such as "finish" to cause the edited phrase to be added back to a body of text.

Example Processes of Interacting with Text Using a Combination of User Inputs

Figure 38:
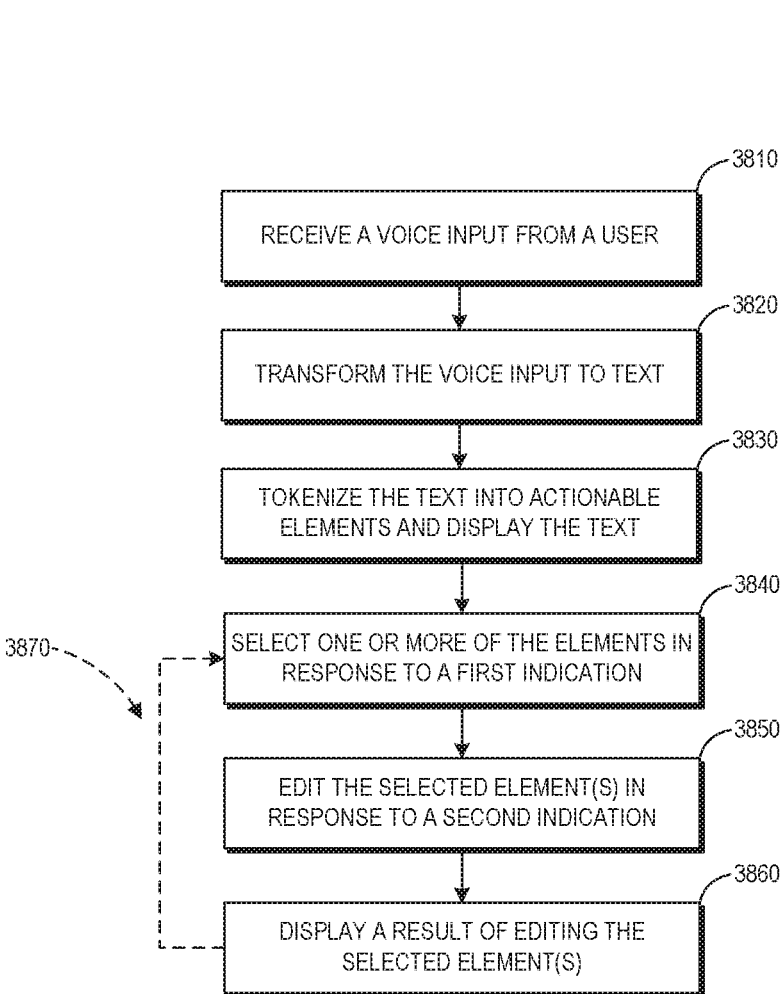
FIG. 38 is a process flow diagram of an example method of using multiple modes of user input to interact with a text.

FIG. 38 is a process flow diagram of an example method 3800 of using multiple modes of user input to interact with a text. The process 3800 can be performed by the wearable system 200 described herein.

At block 3810, the wearable system may receive spoken input from a user. The speech input may include the user's speech containing one or more words. In one example, the user may dictate a message and the wearable system may receive this dictated message. This may be achieved through any suitable input device, such as the audio sensor 232.

At block 3820, the wearable system may transform the speech input into text. The wearable system may utilize an automatic speech recognition (ASR) engine to transform the user's spoken input into text (e.g., a literal transcription), and may further leverage natural language processing techniques to transform such text into a semantic representation indicative of intents and concepts. The ASR engine may be optimized for free-form text input.

At block 3830, the wearable system may tokenize the text into discrete actionable elements such as words, phrases, or sentences. The wearable system may also display the text for the user, using a display system such as the display 220. In some embodiments, the wearable system does not need to understand the meaning of the text during the tokenization system. In other embodiments, the wearable system is equipped with the capacities to understand the meaning of the text (e.g., one or more natural language processing models or other probabilistic statistical models), or simply the capacities to distinguish between (i) words, phrases, and sentences that represent a user-composed message or portion thereof, and (ii) words, phrases, and sentences that do not represent a user-composed message or portion thereof, but instead correspond to commands to be executed by the wearable system. For example, the wearable system may need to know the meaning of the text for recognizing a command operation or a parameter of the command spoken by the user. Examples of such text may include context-specific wakeup words that serve to invoke one or more constrained system command libraries associated with editing for each of one or more different user input modalities, which are also referred to herein as hotwords.

A user can interact with one or more of the actionable elements using multimodal user inputs. At block 3840, the wearable system can select one or more elements in response to a first indication. The first indication can be one user input or a combination of user inputs as described herein. The wearable system may receive input from the user selecting one or more of the elements of the text string for editing. The user may select a single word or multiple words (e.g., a phrase or a sentence). The wearable system may receive a user input selecting element(s) for editing in any desired form including, but not limited to, a speech input, a gaze input (e.g., via the inward-facing imaging system 462), a gesture input (e.g., as captured by the outward-facing imaging system 464), a totem input (e.g., via actuation of a user input device 466), or any combinations thereof. As examples, the wearable system may receive a user input in the form of a user's gaze lingering on a particular word for a threshold period of time or may receive a user's gaze on a particular word at the same time as a user input via a microphone or totem indicating a selection of that particular word for editing.

At block 3850, the wearable system can edit the selected element(s) in response to a second indication. The second indication can be received via a single mode of input or a combination of input modes as described with preceding figures including, but not limited to, user gaze input, spoken input, gesture input, and totem input. The wearable system may receive user input indicating how the selected element(s) should be edited. The wearable system may edit the selected element(s) according to the user input received in block 3850. For example, the wearable system can replace the selected element based on a speech input. The wearable system can also present a list of suggested alternatives and choose among the selected alternatives based on the user's eye gaze. The wearable system can also receive input via user interactions with a virtual keyboard or via a user input device 466 (such as, e.g., a physical keyboard or a handheld device).

At block 3860, the wearable system can display a result of editing the selected element(s). In certain implementations, the wearable system can provide a focus indicator on the element(s) that is edited.

As indicated by the arrow 3870, the wearable system may repeat blocks 3840, 3850, and 3860 if the user provides additional user input to edit additional element(s) of the text.

Additional details relating to multimodal task execution and text editing for wearable systems are provided in U.S. patent application Ser. No. 15/955,204, filed Apr. 17, 2018, titled MULTIMODAL TASK EXECUTION AND TEXT EDITING FOR A WEARABLE SYSTEM, published as U.S. Pat. Pub. No. 2018/0307303, which is hereby incorporated by reference herein in its entirety.

Examples of Transmodal Input Fusion Techniques

As described above, transmodal input fusion techniques providing dynamic selection of appropriate input modes can advantageously permit a user to more accurately and confidently target real or virtual objects and can provide a more robust, user-friendly AR/MR/VR experience.

A wearable system can advantageously support opportunistic fusion of multiple modes of user input to facilitate user interactions in a three-dimensional (3D) environment. The system can detect when a user is providing two or more inputs, via two or more respective input modes, that may converge together. As an example, a user may be pointing to a virtual object with their finger, while also directing their eye gaze at the virtual object. The wearable system may detect this convergence of the eye gaze and finger gesture inputs and apply an opportunistic fusion of the eye gaze and finger gesture inputs and thereby determine, with greater accuracy and/or speed, which virtual object the user is pointing to. The system thus allows the user to select smaller elements (or more rapidly moving elements) by reducing the uncertainty of the primary input targeting method. The system can also be used to speed up and simplify the selection of elements. The system can allow the user to improve the success of targeting moving elements. The system can be used to speed up rich rendering of display elements. The system can be used to prioritize and speed up the local (and cloud) processing of object point cloud data, dense meshing and plane acquisition to improve the indentation fidelity of found entities and surfaces, along with grasped objects of interest. Embodiments of the transmodal techniques described herein allows the system to establish varying degrees of transmodal focus from the user's point of view, while still preserving small motions of the head, eye and hands, thereby greatly enhancing the system's understanding of user intent.

As will further be described herein, identification of a transmodal state may be performed through an analysis of the relative convergence of some or all of the available input vectors. For example, this may be achieved by examining the angular distance between pairs of targeting vectors (e.g., a vector from the user's eyes to the target object and a vector from a totem held by a user pointing toward the target object). Then, the relative variance of each pair of inputs may be examined. If the distances or variances are below thresholds, then a bimodal state (e.g., a bimodal input convergence) can be associated with a pair of inputs. If a triplet of inputs has targeting vectors with angular distances or variances below thresholds, then a trimodal state can be associated with the triplet of inputs. Convergence of four or more inputs is also possible. In the example of a head pose targeting vector (head gaze), an eye vergence targeting vector (eye gaze), and a tracked controller or tracked hand (hand pointer) targeting vector triplet is identified, the triplet may be referred to as a transmodal triangle. The relative size of the triangle sides, area of this triangle, or its associated variances may present characteristic traits that the system can use to predict targeting and activation intent. For example, if the area of the transmodal triangle is less than a threshold area, then a trimodal state can be associated with the triplet of inputs. Examples of vergence calculations are provided herein and in Appendix A. As an example of predictive targeting, the system may recognize that a user's eye and head inputs tend to converge prior to convergence of the user's hand input. For example, when trying to grasp an object, eye and head movements can be performed quickly and may converge onto the object a short time (e.g., about 200 ms) beforehand movement input converges. The system can detect the head-eye convergence and predict that the hand movement input will soon thereafter converge.

The convergence of targeting vector pairs (bimodal), triplets (trimodal), or quartets (quadmodal), or higher numbers of inputs (e.g., 5, 6, 7, or more) can be used to further define the subtype of transmodal coordination. In at least some embodiments, a desired fusion method is identified based on the detailed transmodal state of the system. The desired fusion method may also be determined, at least in party, by the transmodal type (e.g., which inputs are converged), the motion type (e.g., how the converged inputs are moving), and the interaction field type (e.g., in which interaction field, such as the mid-field region, taskspace, and workspace interactive regions described in connection with FIGS. 44A, 44B, and 44C the inputs are focused). In at least some embodiments, the selected fusion method may determine which of the available input modes (and associated input vectors) are selectively converged. The motion type and field type may determine settings of the selected fusion method, such as the relative weighting or filtering of one or more of the converged inputs.

Additional benefits and examples of techniques related to transmodal inputs for interacting with virtual objects and the opportunistic fusion of multiple modes of user input are further described with reference to FIGS. 39A-60B (as well as below and in Appendix A).

Explanation of Certain Transmodal Terminology

Explanations of certain terms used for transmodal input fusion techniques are provided below. These explanations are intended to illustrate, but not to limit, the scope of transmodal terminology. Transmodal terminology is to be understood from the perspective of a person of ordinary skill in the art in view of the entirety of the description set forth in the specification, claims, and accompanying figures.

The term IP region can include a volume associate with an interaction point (IP). For example, a pinch IP region can include a volume (e.g., spherical) created by the posed separation of the index fingertip and the thumb-tip. The term region of intent (ROI) can include a volume constructed from overlapping uncertainty regions (e.g., volumes) associated with a set of targeting vectors for an intended target object. The ROI can represent the volume in which the intended target object is likely to be found.

The term modal input can refer to input from any of the sensors of the wearable system. For example, common modal inputs include inputs from six degree of freedom (6DOF) sensors (e.g., for head pose or totem position or orientation), eye-tracking cameras, microphones (e.g., for voice commands), outward-facing cameras (for hand or body gestures), etc. Transmodal input can refer to simultaneous use of multiple, dynamically coupled modal inputs.

The term vergence can include the convergence of multiple input vectors associated with multiple modes of user input on a common interaction point (e.g., when an eye gaze and a hand gesture both point to the same spatial location). The term fixation can include the localized slowing and pause of a vergence point or a point of a single input vector. The term dwell can include a fixation that extends in time for a least a given duration. The term ballistic pursuit can include a ballistic (e.g., projectile like) motion of a vergence point towards a target or other object. The term smooth pursuit can include the smooth (e.g., low acceleration or low jerk) motion of a vergence point towards a target or other object.

The term sensor convergence can include the convergence of sensor data (e.g., the convergence of data from a gyroscope with the data from an accelerometer forming an inertial measurement unit (IMU), the convergence of data from an IMU with a camera, the convergence of multiple cameras for a SLAM process, etc.). The term feature convergence can include the spatial convergence of inputs (e.g., the convergence of input vectors from multiple modes of input) as well as the temporal convergence of inputs (e.g., the concurrent or sequential timing of multiple modes of input).

The term bimodal convergence can include the convergence of two input modes (e.g., the convergence of two input modes as the input vectors converge on a common interaction point). The term trimodal and quadmodal convergence can respectively include the convergence of three and four input modes. The term transmodal convergence can include the transient convergence of multiple inputs (e.g., the detection of a temporary convergence of multiple modes of user input and corresponding integration or fusion of those user inputs to improve the overall input experience).

The term divergence can refer to at least one input mode that was previously converged (and resultingly fused) with at least one other input mode and that is no longer converged with that other input mode (e.g., a trimodal divergence may refer to a transition from a trimodal convergence state to a bimodal convergence state as an initially-convergent, third input vector diverges from converged first and second input vectors).

The term head-hand-vergence can include the convergence of the head and hand raycast vectors or the convergence of the head pose and hand interaction points. The term head-eye vergence can include the convergence of the head pose and eye gaze vectors. The term head-eye-hand vergence can include the convergence of the head pose, eye gaze, and hand direction input vectors.

The term passive transmodal intent can include pre-targeting, targeting, head-eye fixation and dwell. The term active transmodal intent can include head-eye-hand dwell interaction, or head-eye-hand manipulation interaction. The term transmodal triangle can include an area created by the convergence of three modal input vectors (and may refer to the area of uncertainty of a trimodal converged input). This area may also be referred to as a vergence area or modal vergence area. The term transmodal quadrangle can include an area created by the convergence of four modal input vectors.

Examples of User Inputs

Figure 39A:
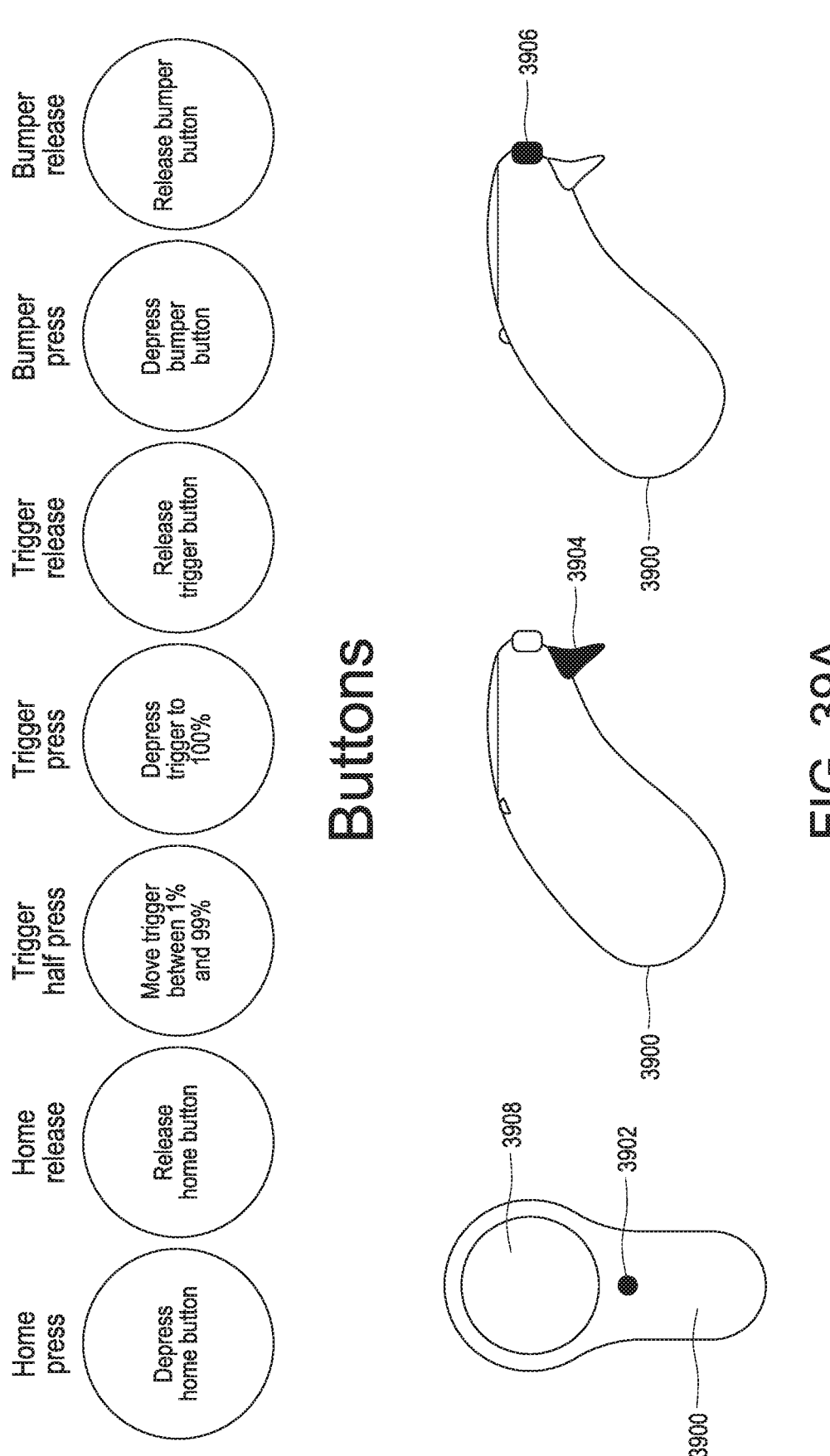
FIG. 39A illustrates examples of user inputs received through controller buttons.
Figure 39B:
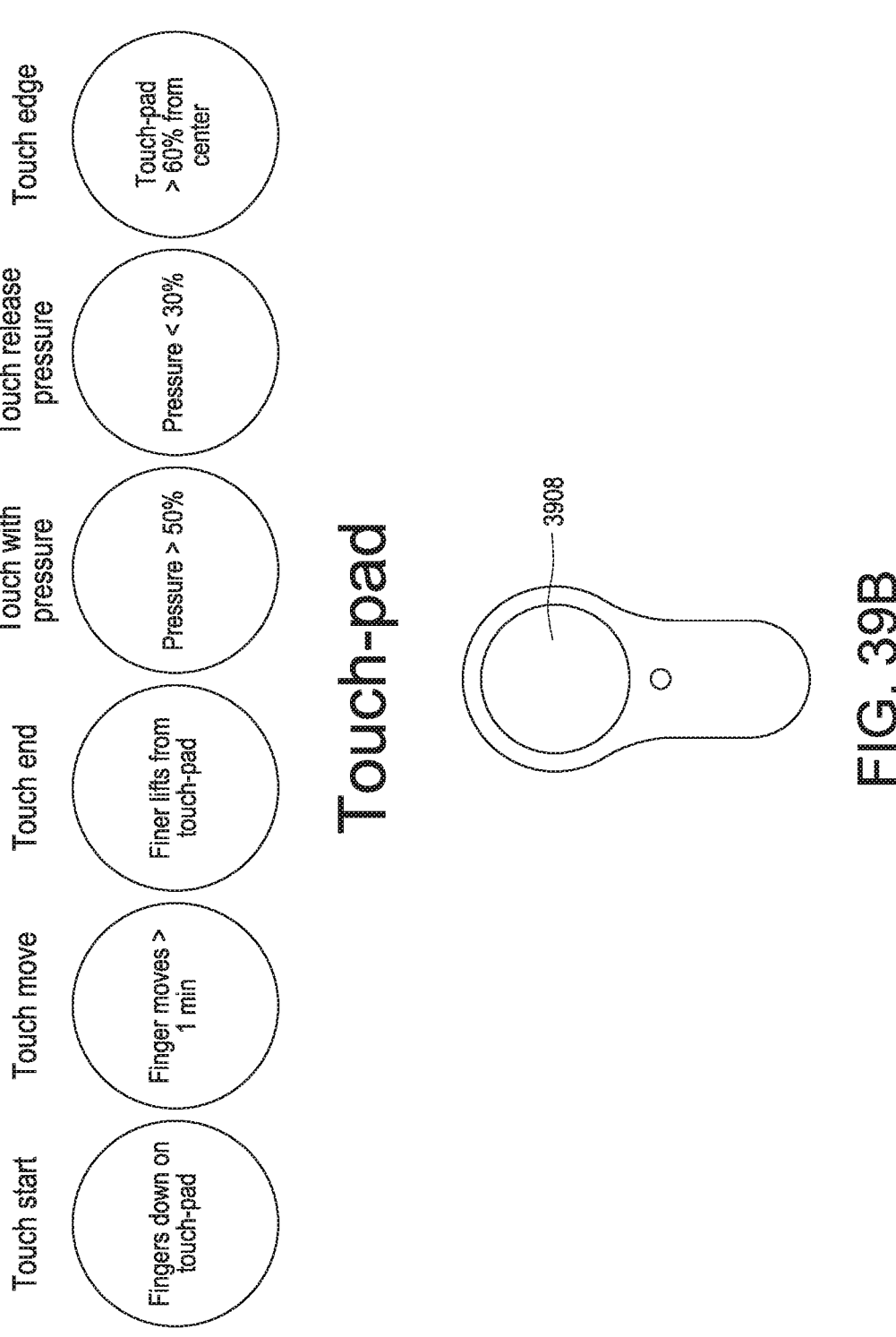
FIG. 39B illustrates examples of user inputs received through a controller touchpad.

FIGS. 39A and 39B illustrate examples of user inputs received through controller buttons or input regions on a user input device. In particular, FIGS. 39A and 39B illustrates that a controller 3900, which may be a part of the wearable system disclosed herein and which may include a home button 3902, trigger 3904, bumper 3906, and touchpad 3908. The user input device 466 or the totem 1516 described with reference to FIGS. 4 and 15, respectively, can serve as controllers 3900 in various embodiments of wearable systems 200.

Potential user inputs that can be received through controller 3900 include, but are not limited to, pressing and releasing the home button 3902; half and full (and other partial) pressing of the trigger 3904; releasing the trigger 3904; pressing and releasing the bumper 3906; touching, moving while touching, releasing a touch, increasing or decreasing pressure on a touch, touching a specific portion such as an edge of the touchpad 3908, or making a gesture on the touchpad 3908 (e.g., by drawing a shape with the thumb).

Figures 39C, 39D:
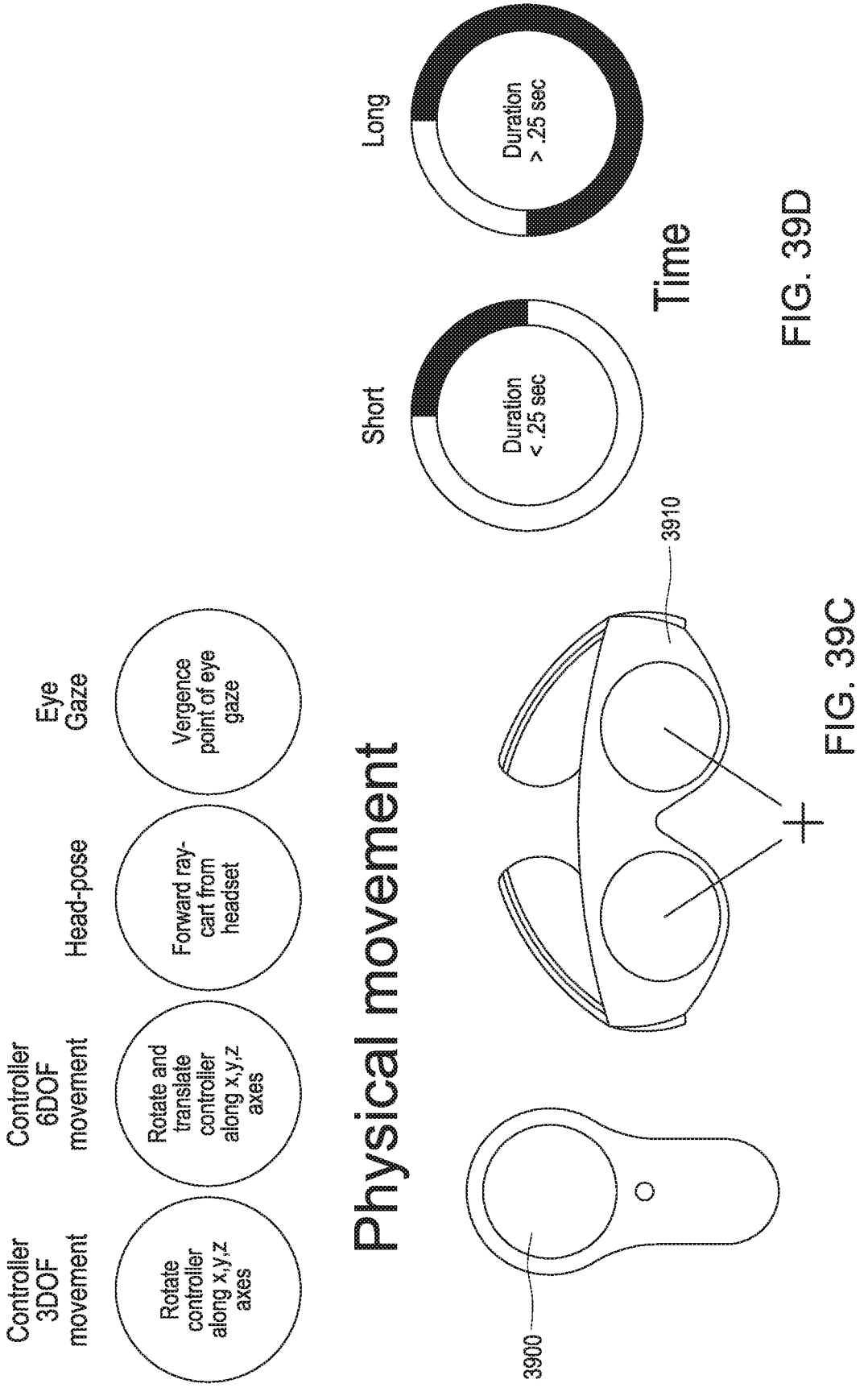
FIG. 39C illustrates examples of user inputs received through physical movement of a controller or a head-mounted device (HMD).
FIG. 39D illustrates examples of how user inputs may have different durations.

FIG. 39C illustrates examples of user inputs received through physical movement of a controller or a head-mounted device (HMD). As shown in FIG. 39C, physical movement of controller 3900 and of a head mounted display 3910 (HMD) may form user inputs into the system. The HMD 3910 can comprise the head-worn components 220, 230 shown in FIG. 2A or the head mounted wearable component 58 shown in FIG. 2B. In some embodiments, the controller 3900 provides three degree-of-freedom (3 DOF) input, by recognizing rotation of controller 3900 in any direction. In other embodiments, the controller 3900 provides six degree-of-freedom (6 DOF) input, by also recognizing translation of the controller in any direction. In still other embodiments, the controller 3900 may provide less than 6 DOF or less than 3 DOF input. Similarly, the head mounted display 3910 may recognize and receive 3 DOF, 6 DOF, less than 6 DOF, or less than 3 DOF input.

FIG. 39D illustrates examples of how user inputs may have different durations. As shown in FIG. 39D, certain user inputs may have a short duration (e.g., a duration of less than a fraction of a second, such as 0.25 seconds) or may have a long duration (e.g., a duration of more than a fraction of a second, such as more than 0.25 seconds). In at least some embodiments, the duration of an input may itself be recognized and utilized by the system as an input. Short and long duration inputs can be treated differently by the wearable system 200. For example, a short duration input may represent selection of an object, whereas a long duration input may represent activation of the object (e.g., causing execution of an app associated with the object).

FIGS. 40A, 40B, 41A, 41B, and 41C illustrate various examples of user inputs that may be received and recognized by the system. The user inputs may be received over one or more modes of user input (individually, or in combination, as illustrated). The user inputs may include inputs through controller buttons such as home button 3902, trigger 3904, bumper 3906, and touchpad 3908; physical movement of controller 3900 or HMD 3910; eye gaze direction; head pose direction; gestures; voice inputs; etc.

Figure 40A:
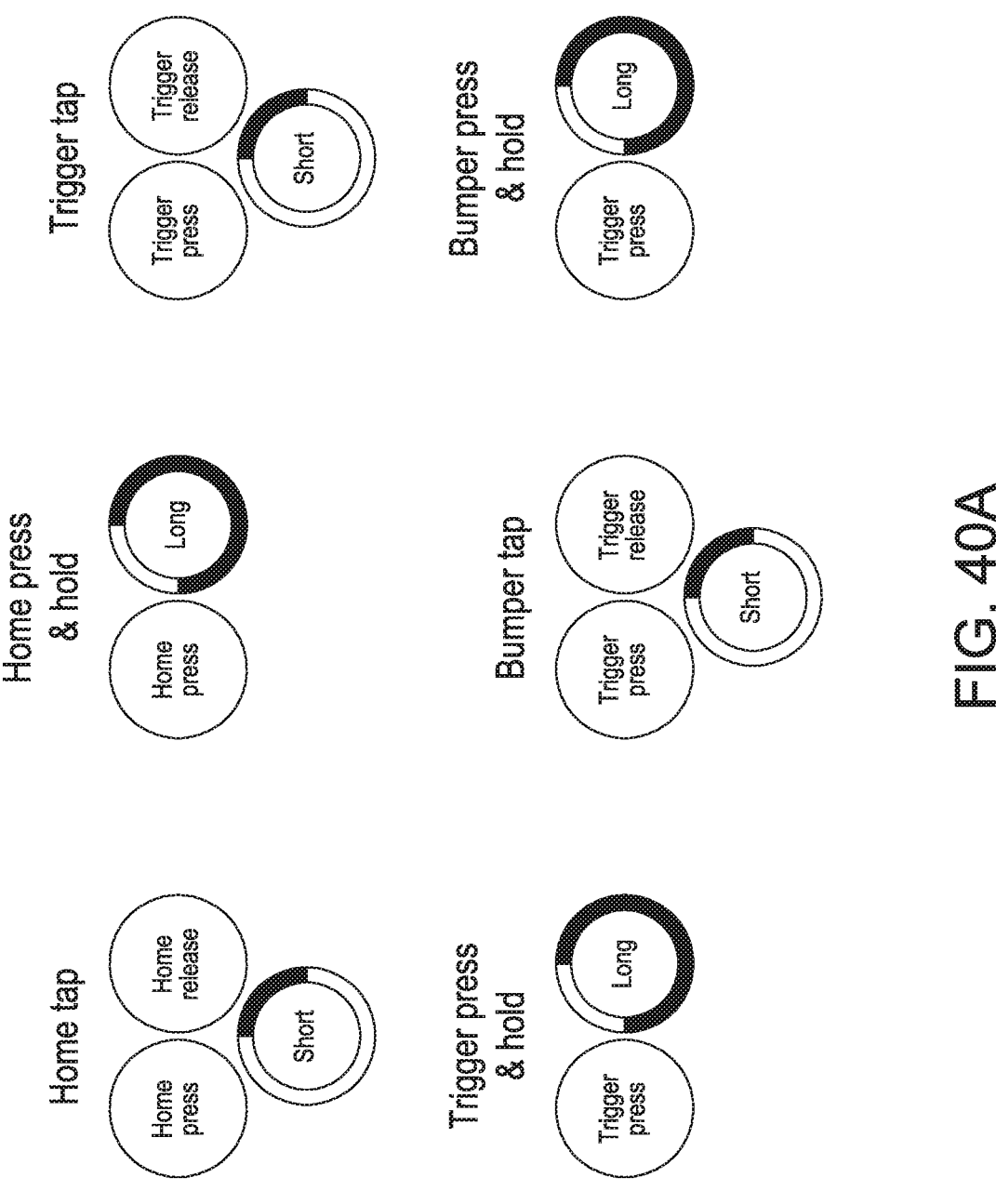
FIG. 40A illustrates additional examples of user inputs received through controller buttons.

As shown in FIG. 40A a short press and release of the home button 3902 may indicate a home tap action, whereas a long press of the home button 3902 may indicate a home press & hold action. Similarly, a short press and release of the trigger 3904 or bumper 3906 may indicate a trigger tap action or a bumper tap action, respectively; while a long press of the trigger 3904 or bumper 3906 may indicate a trigger press & hold action or a bumper press & hold action, respectively.

Figure 40B:
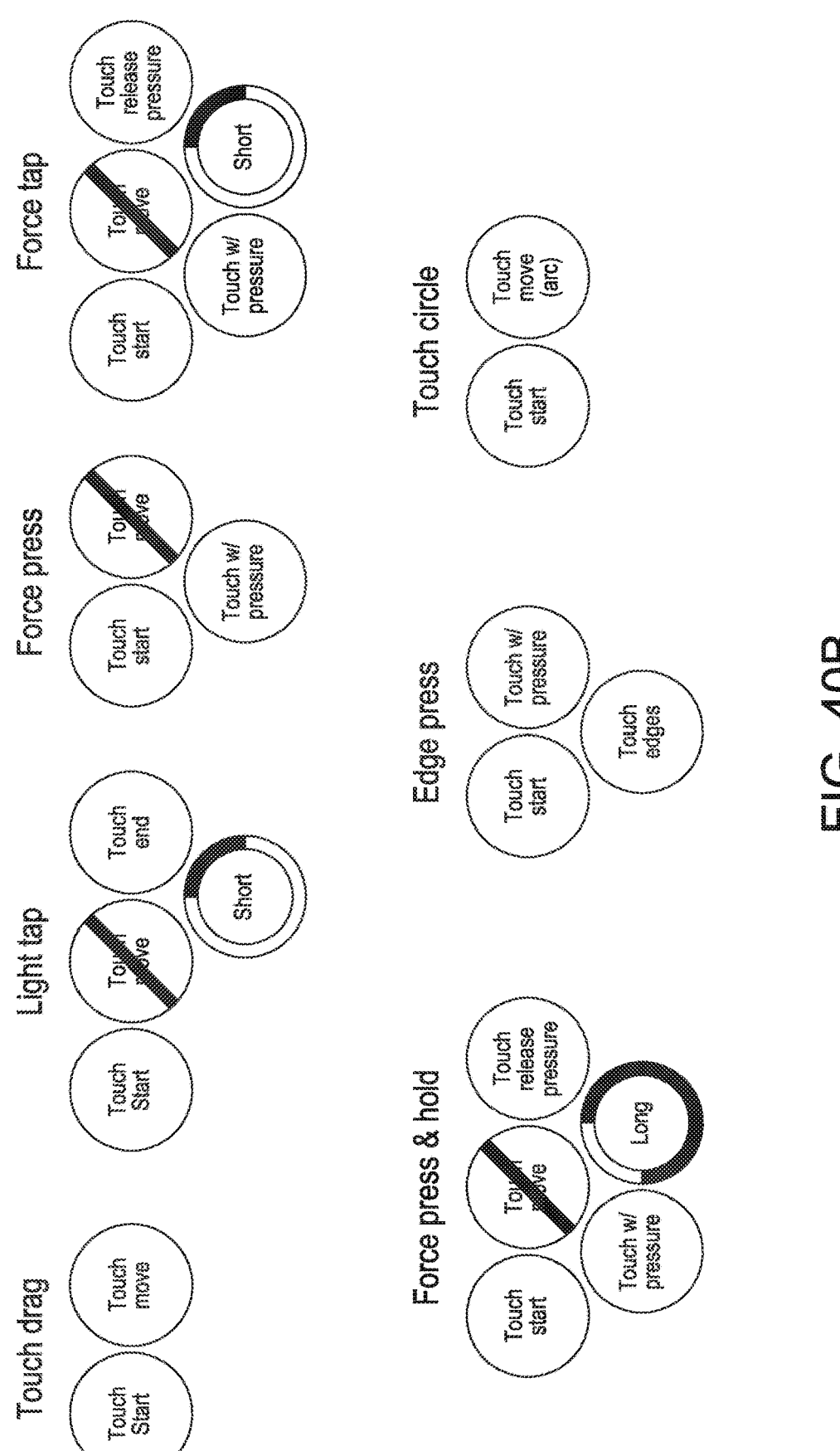
FIG. 40B illustrates additional examples of user inputs received through a controller touchpad.

As shown in FIG. 40B, a touch of the touchpad 3908 that moves over the touchpad may indicate a touch drag action. A short touch and release of the touchpad 3908, where the touch doesn't move substantially, may indicate a light tap action. If such a short touch and release of touchpad 3908 is done with more than some threshold level of force (which may be a predetermined threshold, a dynamically determined threshold, a learned threshold, or some combination thereof), the input may indicate a force tap input. A touch of the touchpad 3908 with more than the threshold level of force may indicate a force press action, while a long touch with such force may indicate a force press and hold input. A touch near the edge of the touchpad 3908 may indicate an edge press action. In some embodiments, an edge press action may also involve an edge touch of more than a threshold level of pressure. FIG. 40B also shows that a touch on touchpad 3908 that moves in an arc may indicate a touch circle action.

Figure 41A:
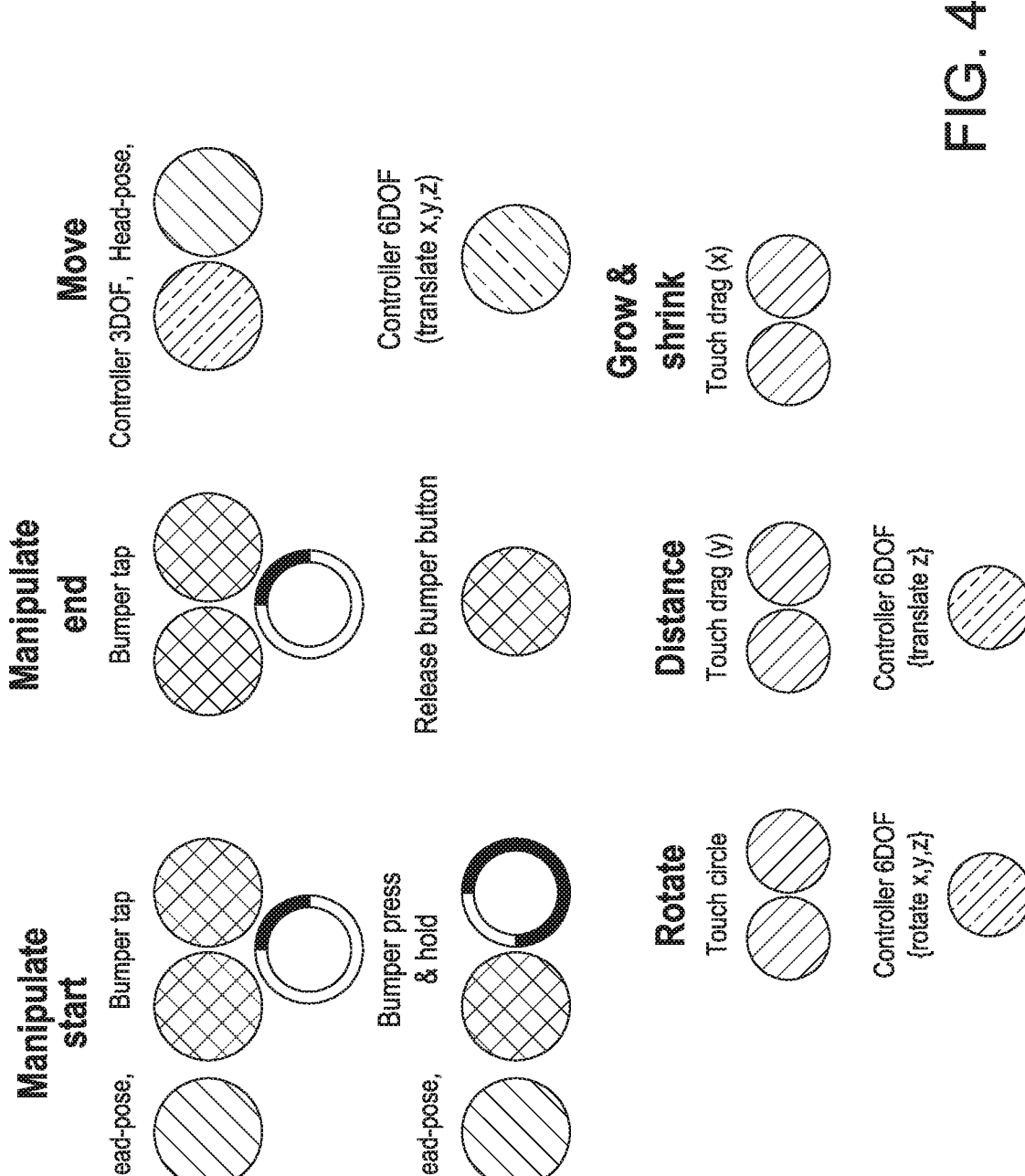
FIG. 41A illustrates examples of user inputs, received through various modes of user input, for spatial manipulation of a virtual environment or virtual objects.

The examples of FIG. 41A illustrate that interaction with the touchpad 3908 (e.g., by moving the thumb over the touchpad) or physical movement (6 DOF) of controller 3900 can be used to rotate virtual objects (e.g., by making a circular gesture on the touchpad), move virtual objects in the z-direction toward or away from the user (e.g., by making a gesture on the touchpad in, say, the y-direction), and grow or shrink the size of a virtual object (e.g., by making a gesture in a different direction on the touchpad, say, the x-direction).

FIG. 41A also shows that combinations of inputs can represent actions. In particular, FIG. 41 illustrates that interaction with bumper 3906 and a user turning and tilting their head (e.g., adjusting their head-pose) can indicate a manipulate start and/or manipulate end action. As an example, a user may provide an indication to start manipulation of an object by double tapping or pressing and holding the bumper 3906, may then move the object by providing additional inputs, and then may provide an indication to end manipulation of the object by double tapping or releasing the bumper 3906. In at least some embodiments, the user may provide additional inputs to move the object in the form of physical movement (6 or 3 DOF) of the controller 3900 or by adjusting their head pose (e.g., tilting and/or rotating their head).

Figure 41B:
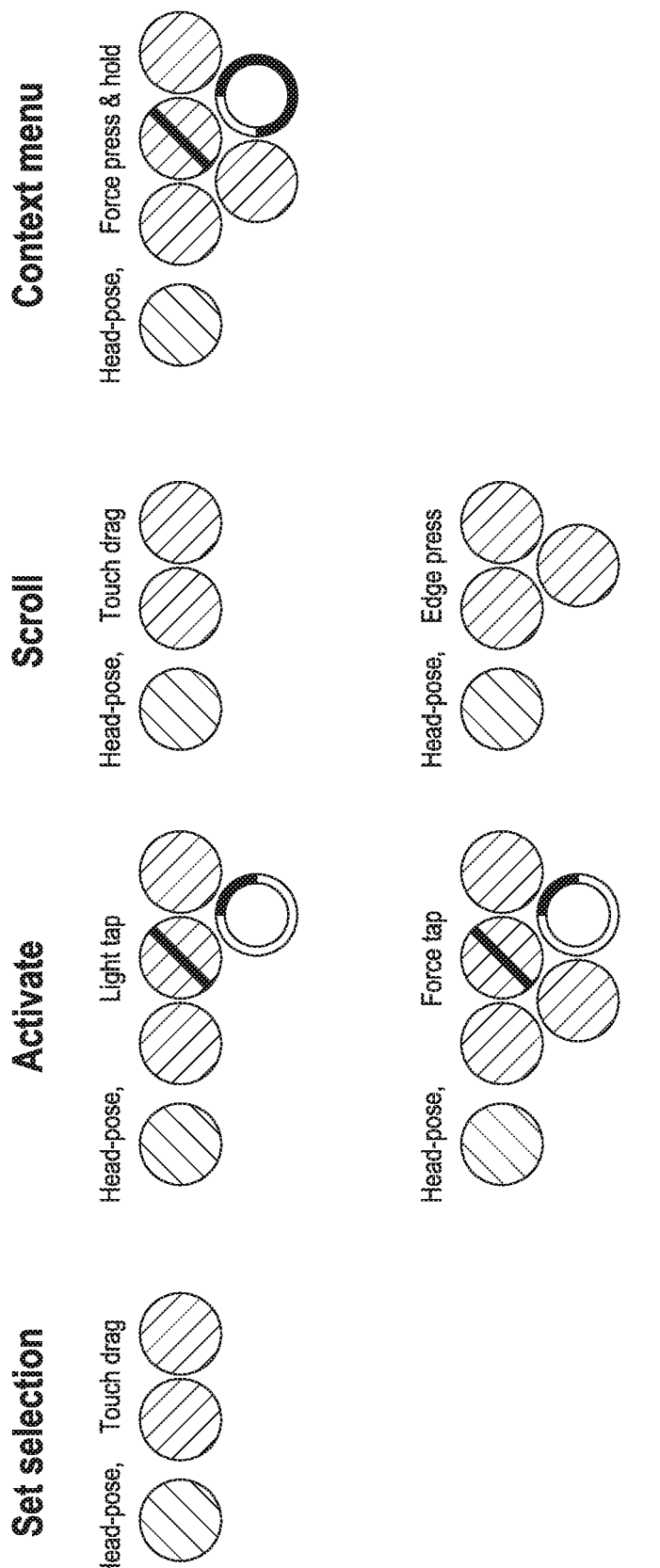
FIG. 41B illustrates examples of user inputs, received through various modes of user input, for interacting with planar objects.

FIG. 41B illustrates additional examples of user interactions. In at least some embodiments, the interactions of FIG. 41B involving two-dimensional (2D) content. In still other embodiments, the interactions of FIG. 41B may be used for three-dimensional content. As shown in FIG. 41B, a head pose (which may be directed to the 2D content) combined with a moving touch on the touchpad 3908 may indicate a set selection action or a scroll action. A head pose combined with a press with force on the edge of touchpad 3908 may indicate a scroll action. A head pose combined with a light and short tap on the touchpad 3908 or combined with a short tap with pressure on the touchpad 3908 may indicate an active action. Pressing with force and holding the forceful press on touchpad 3908 combined with a head-pose (which may be a particular head pose) may indicate a context menu action.

As shown in FIG. 41C, the wearable device can use head pose indicating the user's head is pointing toward a virtual app together with a home tap action to open a menu associated with the app or use head pose together with a home press & hold action to open a launcher application (e.g., an app that permits executing multiple apps). In some embodiments, the wearable device can open a launcher application associated with a pre-targeted application using a home tap action (e.g., a single or double tap of the home button 3902).

Figure 42A:
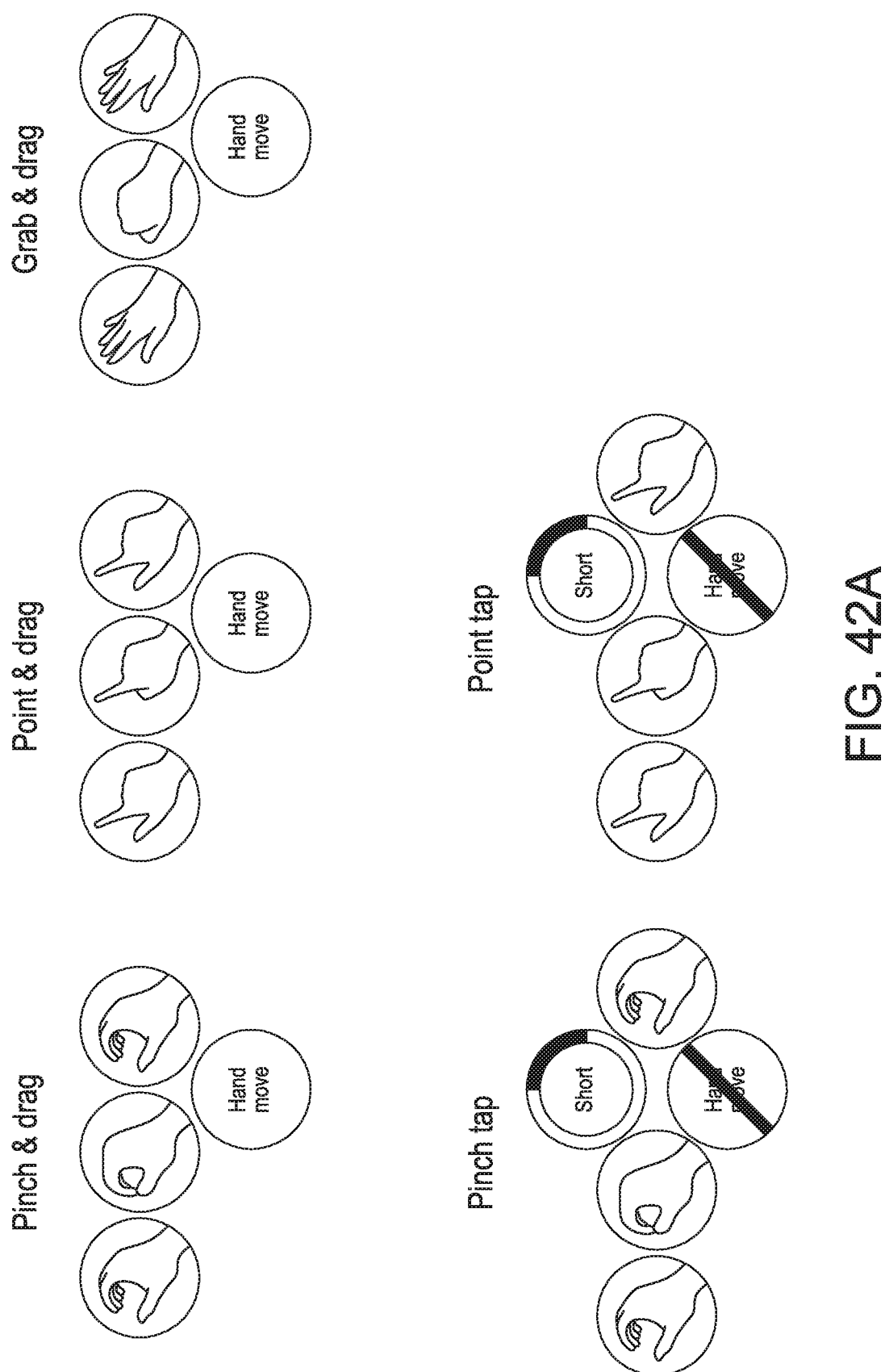
Figure 42C:
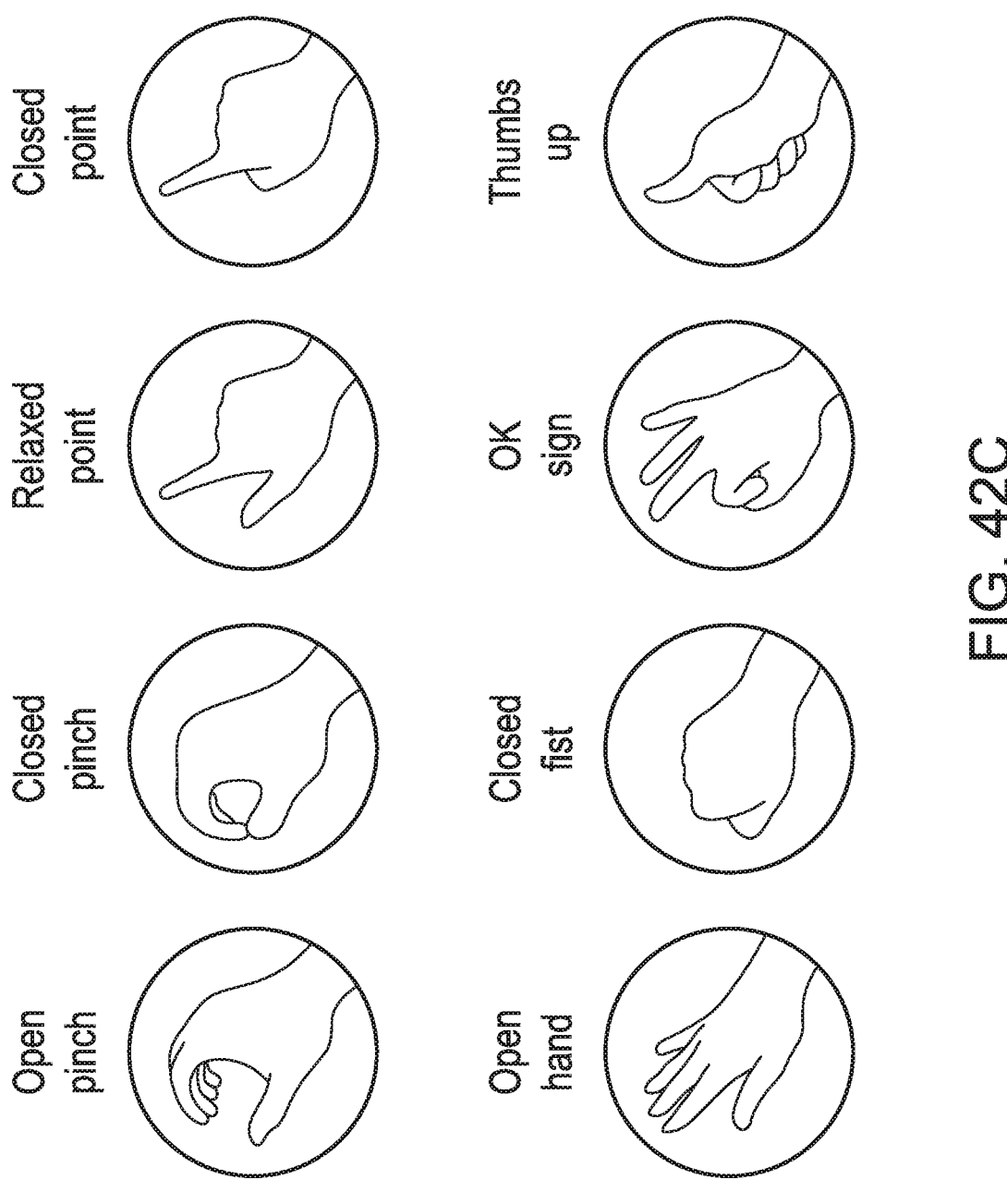

FIGS. 42A, 42B, and 42C illustrate examples of user inputs in the form of fine finger gestures and hand movements. The user inputs illustrated in FIGS. 42A, 42B, and 42C may sometimes be referred to herein as microgestures and may take the form of fine finger movements such as pinching a thumb and index finger together, pointing with a single finger, grabbing with an closing or opening hand, pointing with a thumb, tapping with a thumb, etc. The microgestures may be detected by the wearable system using a camera system, as one example. In particular, the microgestures may be detected using one or more cameras (which may include a pair of cameras in a stereo configuration), which may be a part of the outward-facing imaging system 464 (shown in FIG. 4). Object recognizers 708 can analyze imagery from the outward-facing imaging system 464 to recognize the example microgestures shown in FIGS. 42A-42C. In some implementations, microgestures are activated by the system when the system determines the user has focused on a target object for a sufficiently long fixation or dwell time (e.g., convergence of multiple input modes is considered robust).

Examples of Perceptive Fields, Display Render Planes, and Interactive Regions

Figure 43A:
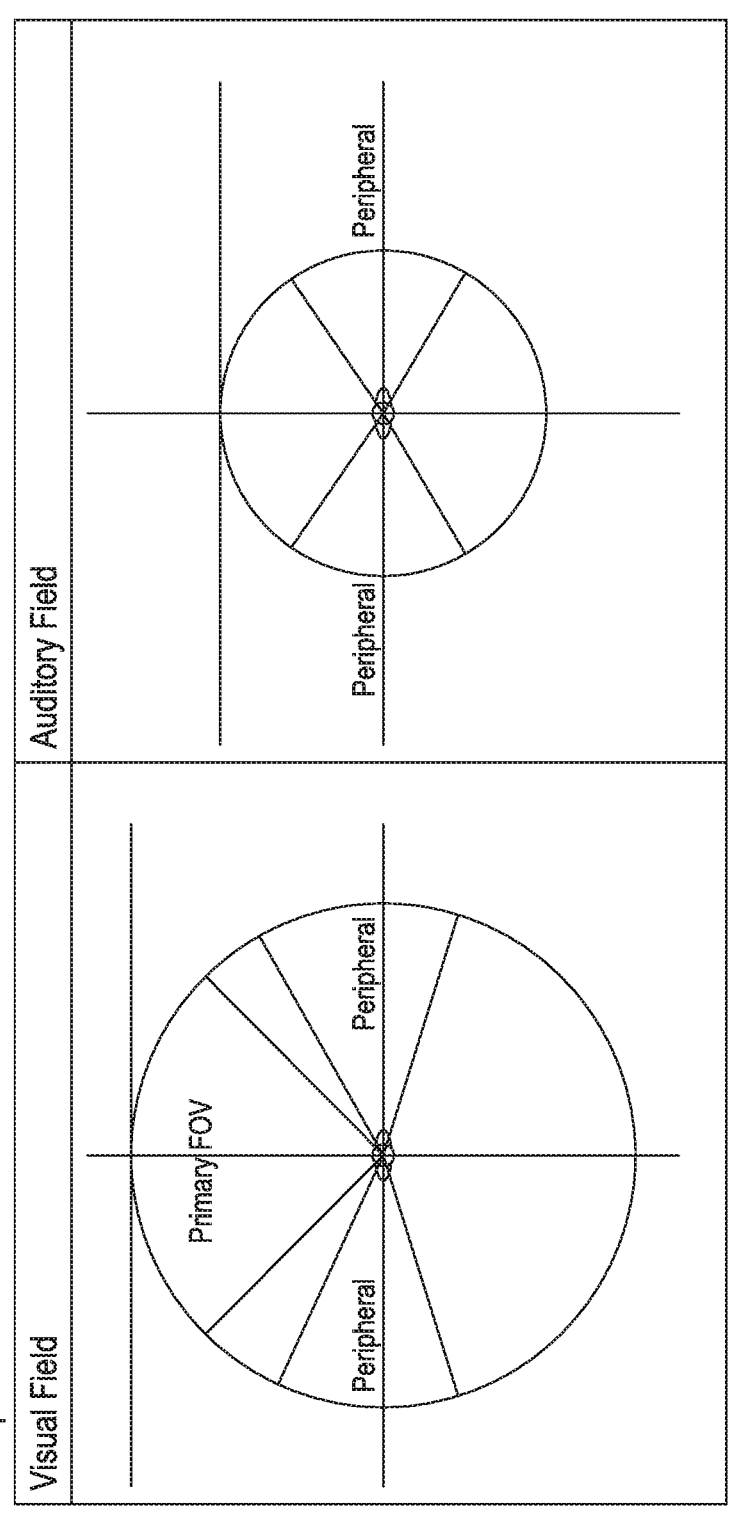
FIG. 43A illustrates examples of fields of perception of a user of a wearable system including a visual perception field and an auditory perception field.

FIG. 43A illustrates a visual perceptive field and an auditory perceptive field of the wearable system. As shown in FIG. 43A, a user may have a primary field of view (FOV) and peripheral FOV in their visual field. Similarly, a user may sense direction in an auditory perceptive field having at least forward, rearward, and peripheral directions.

Figure 43B:
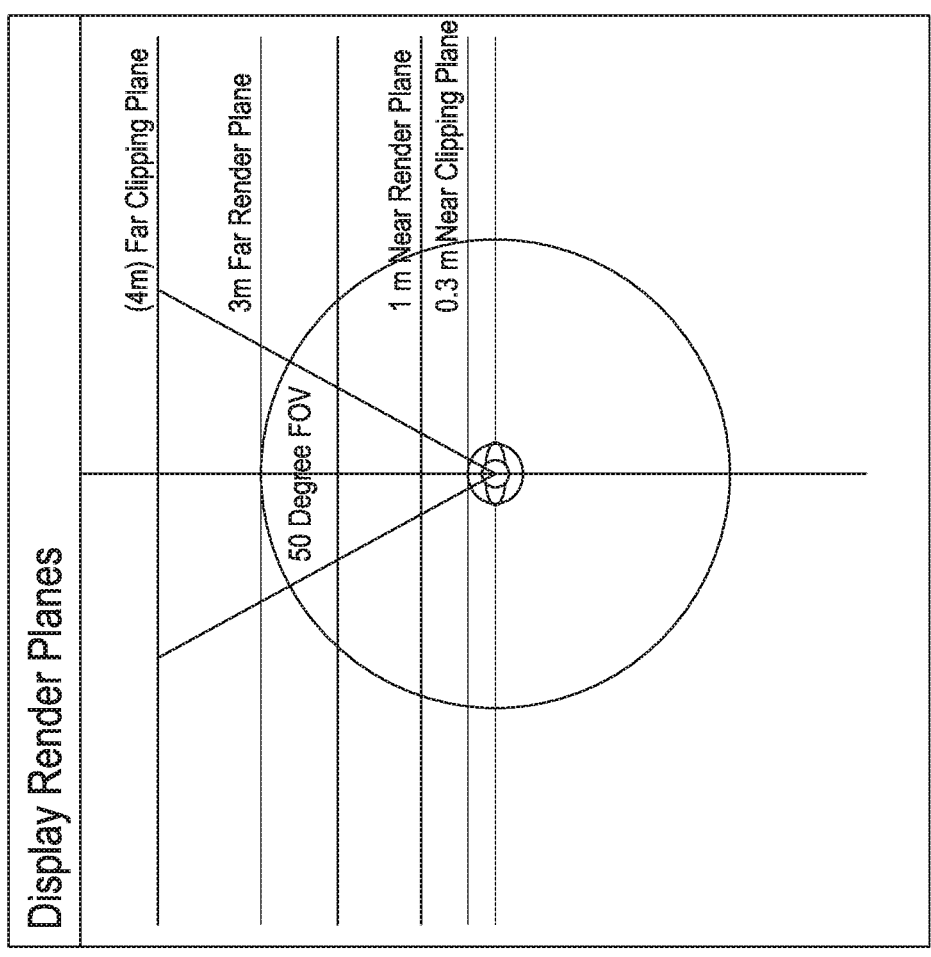
FIG. 43B illustrates examples of display render planes of a wearable system having multiple depth planes.

FIG. 43B illustrates display render planes of a wearable system having multiple depth planes. In the example of FIG.

43B, the wearable system has at least two render planes, one displaying virtual content at a depth of about 1.0 meter and another displaying virtual content at a depth of about 3.0 meters. The wearable system may display virtual content at a given virtual depth on the depth plane having the closest display depth. FIG. 43B also illustrates a 50 degree field of view for this example wearable system. Additionally, FIG. 43B illustrates a near clipping plane at approximately 0.3 meters and a far clipping plane at approximately 4.0 meters. Virtual content that is closer than the near clipping plane may be clipped (e.g., not displayed) or may be shifted away from the user (e.g., to at least the distance of the near clipping plane). Similarly, virtual content that is further from the user than the far clipping plane may be clipped or may be shifted towards the user (e.g., to at least the distance of the far clipping plane).

Figure 44A:
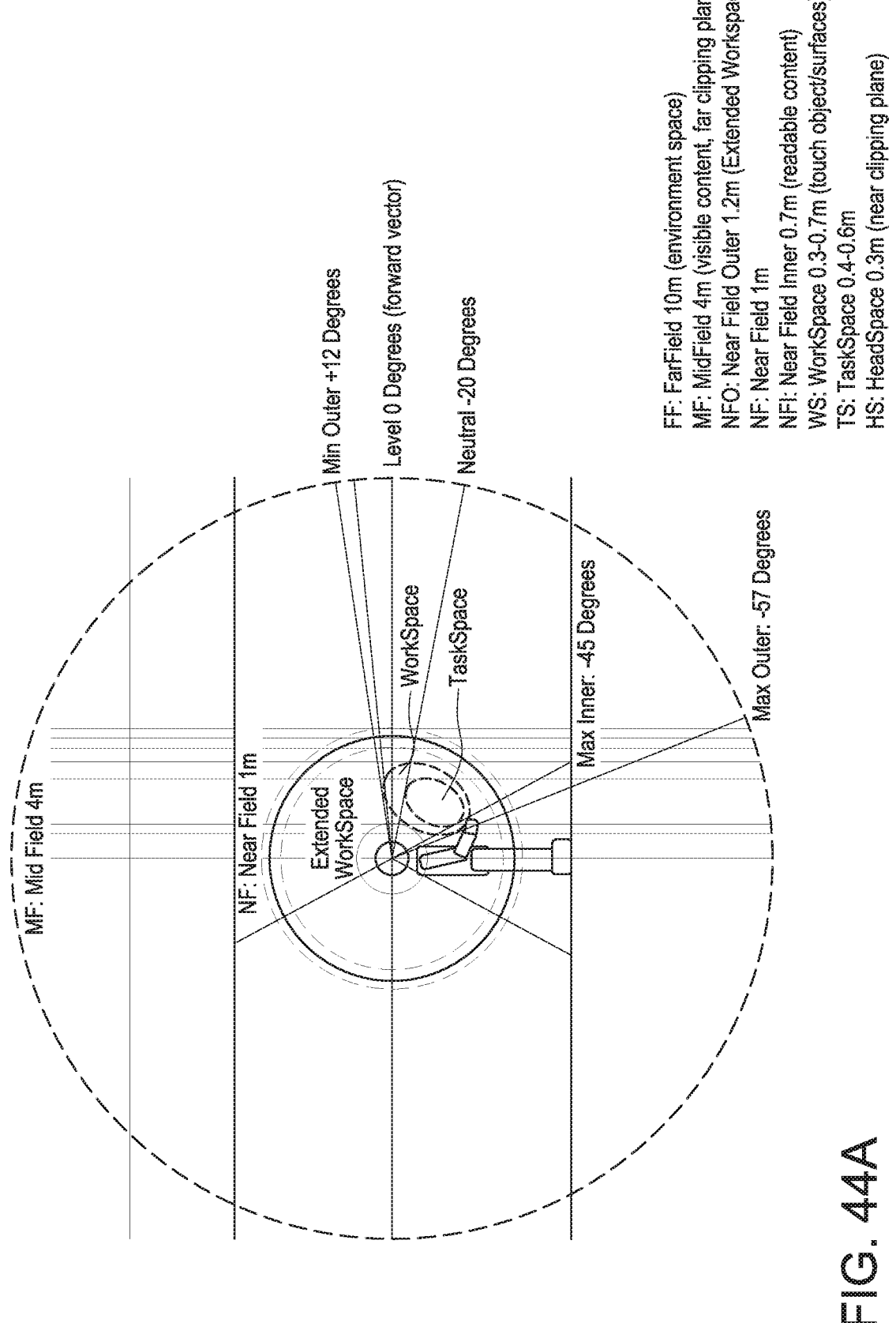
Figure 44B:
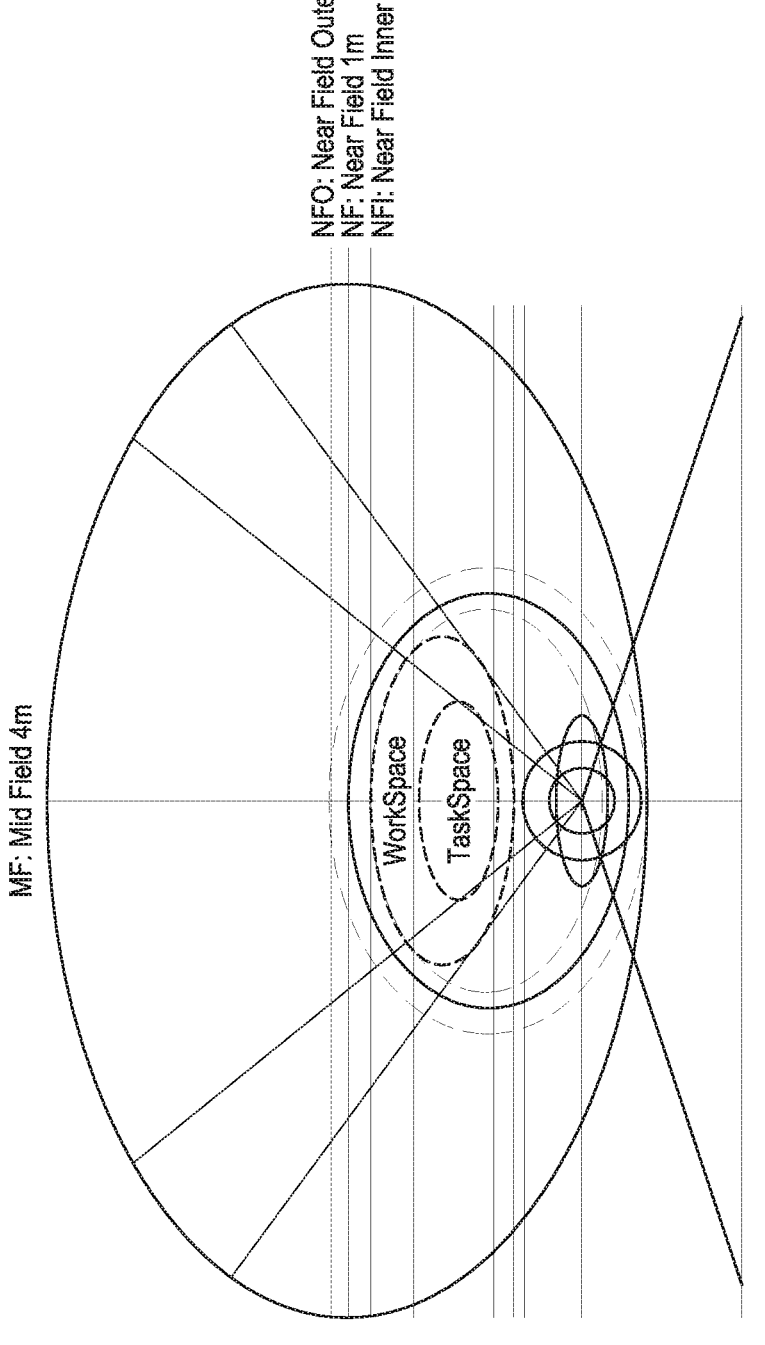

FIGS. 44A, 44B, and 44C illustrate examples of different interactive regions around a user, including a mid-field region, an extended workspace, a workspace, a taskspace, a manipulation space, an inspection space, and a head space. These interactive regions represent spatial regions in which the user can interact with real and virtual objects, and the type of interaction may be different in different regions, and the appropriate set of sensors used for transmodal fusion may be different in the different regions. For example, the workspace can include a region in front of the user, within the user's field of view (FOV), and within the user's reach (e.g., out to about 0.7 m). The taskspace may be a volume within the workspace and may generally correspond to the volume in which users are comfortable manipulating objects with their hands (e.g., from about 0.2 to 0.65 m). The taskspace may include angles (measured from a forward level vector) that are generally downward, e.g., from about 20 degrees below level to about 45 degrees below level. The inspection space may be a volume within the taskspace and may generally correspond to the volume in which user's may hold an object when inspecting it closely (e.g., from about 0.2 to 0.3 m). The type of inputs in the inspection space, the taskspace, and the workspace typically can include head pose, eye gaze, hand gestures (e.g., the micro-gestures illustrated in FIGS. 42A-42C). At larger distances from the user, the extended workspace may extend to a distance of about 1 m, the workspace may be a volume in front of the user generally within the user's FOV, while the mid-field region may spherically to a distance of about 4 meters (from the user's head). The head space may correspond to the volume occupied by a user's head (e.g., out to the near clipping plane shown in FIG. 43B) and any head-mounted components of the wearable system disclosed herein.

The near field region includes the regions near to the user and extends from about 0.7 m to about 1.2 m from the user. The midfield region extends beyond the near field and out to about 4 m. A farfield region extends beyond the midfield region and can include distances out to the distance of the greatest render plane or greatest depth plane provided by the wearable system (which can be up to 10 m or 30 m or even to infinity). In some implementations, the midfield region can range from about 1.2 m to about 2.5 m and may represent the region of space in which a user can "lean in" and grab or interact with real or virtual objects. In some such implementations, the farfield region extends beyond about 2.5 m.

The example interactive regions shown in FIGS. 44A-44C are illustrative and not limiting. User interactive regions can be arranged differently than shown and can have different sizes, shapes, etc.

Degrees of Input Integration

As will be further described below, the development of transmodal input fusion techniques represents increasing input integration, from statically defined input systems through dynamic coupling based on input feedback systems to input coupling that operates with multiple dynamic feedback and feedforward systems (e.g., to dynamically anticipate or predict the input sensors to use). For example, unimodal techniques may utilize a single, sensor with exclusive controls (e.g., a touch gesture), and multimodal techniques may utilize multiple independent sensors operating in concurrently, in parallel (e.g., head gaze and a button selection on an input device). Crossmodal techniques can utilize multiple sensors that are statically fused (e.g., permanently cross-coupled). In techniques such as these, the wearable system typically accepts all the sensor inputs and determines the likely intent of the user (e.g., to select a particular object).

In contrast, transmodal input fusion techniques provide for dynamic coupling of sensor input, e.g., identifying sensor inputs that have converged spatially (e.g., converged in a spatial region around a target object) or temporally (e.g., for a fixation or dwell time).

In some implementations, transmodally coupled sensor input occurs a relatively small fraction of the time the user is interacting with the 3D environment. For example, in some such implementations, transmodally coupled input occurs only about 2% of the time. However, during the time that an appropriate set of converged sensors are identified, transmodal input fusion techniques can substantially increase the accuracy of target object selection and interaction.

Unimodal User Interactions

Figure 45:
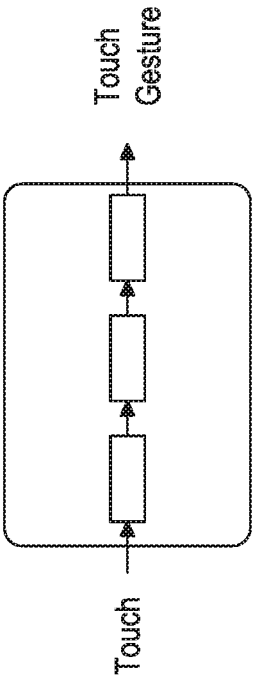
FIG. 45 illustrates an example of a unimodal user interaction.

FIG. 45 illustrates an example of a unimodal user interaction. In unimodal user interactions, a user input is received via a single mode of user input. In the example of FIG. 45, a touch input is registered as a touch gesture, and no other modes of input are used in interpreting the user input. The touch input may, if desired, include changes in the single mode of user input over time (e.g., a touch that moves, followed by a tap).

Multimodal User Interactions

FIGS. 46A, 46B, 46C, 46D, and 46E illustrate examples of multimodal user interactions. In multimodal user interactions, independent modes of user input are received and leveraged together to improve the user experience. However, in multimodal interactions, dynamic fusing of different sensor modalities typically does not occur. In figures similar to FIGS. 46A and 46B, the user actions are shown on the left (e.g., the user can provide touch input or move his or her head, eye(s), or hand(s)) and the corresponding input control (e.g., touch gesture, head gaze (also referred to as head pose), eye gaze, and hand gesture).

Figure 46A:
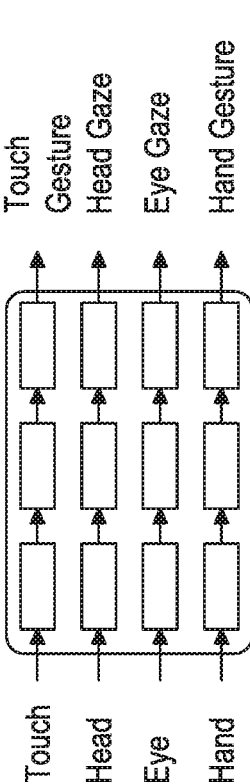
FIGS. 46A, 46B, 46C, 46D, and 46E illustrate examples of multimodal user interactions.
Figure 46B:
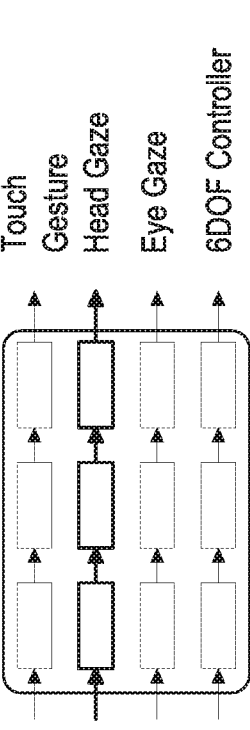

As shown in the example of FIGS. 46A and 46B, a user may target a virtual object using their head gaze and then select the virtual object using a controller button. Thus, the user provides input over two modes (head gaze and button), and the system leverages both to determine that the user desires to select the virtual object the user's head is pointing at.

Additionally, the modes of user input that are combined in multimodal user interactions may be somewhat interchangeable. As an example, the user may target a virtual object using their eye gaze, instead of their head pose. As another example, the user may select the virtual target using a blink, hand gesture, or other input, rather than a controller button.

Figure 46C:
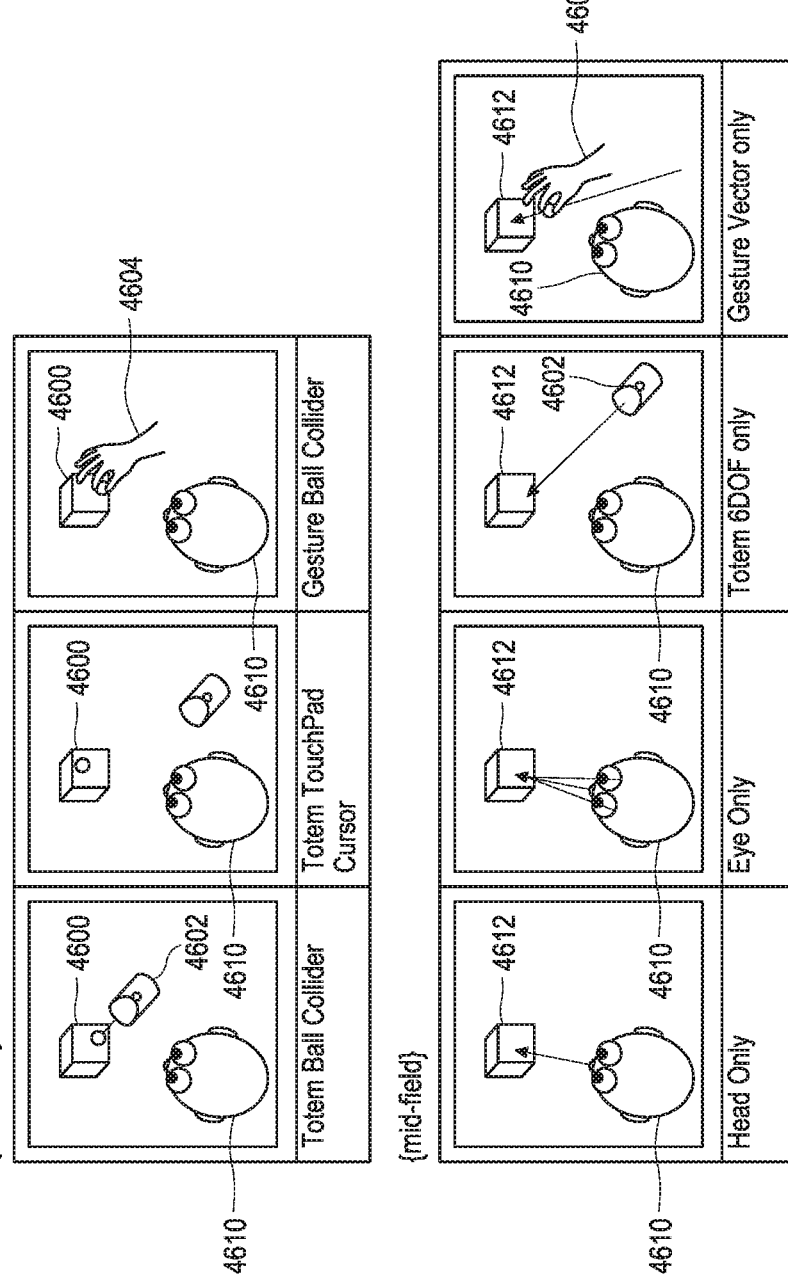

FIG. 46C illustrates examples of multimodal user inter-actions in the near-field and mid-field interactive regions, which may correspond to the workspace and mid-field of FIG. 44B, as an example. As shown in FIG. 46C, a user 4610 may target a virtual object 4600 in the near-field region using a totem collider directly associated with the position a totem 4602, a totem touchpad cursor (e.g., by manipulating a touch pad to move a mouse arrow over the virtual object 4600), or by making a particular gesture 4604 on or near the virtual object 4600. Similarly, a user 4610 may target a virtual object 4612 in the mid-field region using head pose, eye gaze pose, a controller 4602 having 3 or 6 DOF inputs, or using a hand or arm gesture 4604. In the examples of FIG. 46C, the interactions are multimodal due to the fact that there are multiple unimodal options available for a user to provide the same input to the system.

Figure 46D:
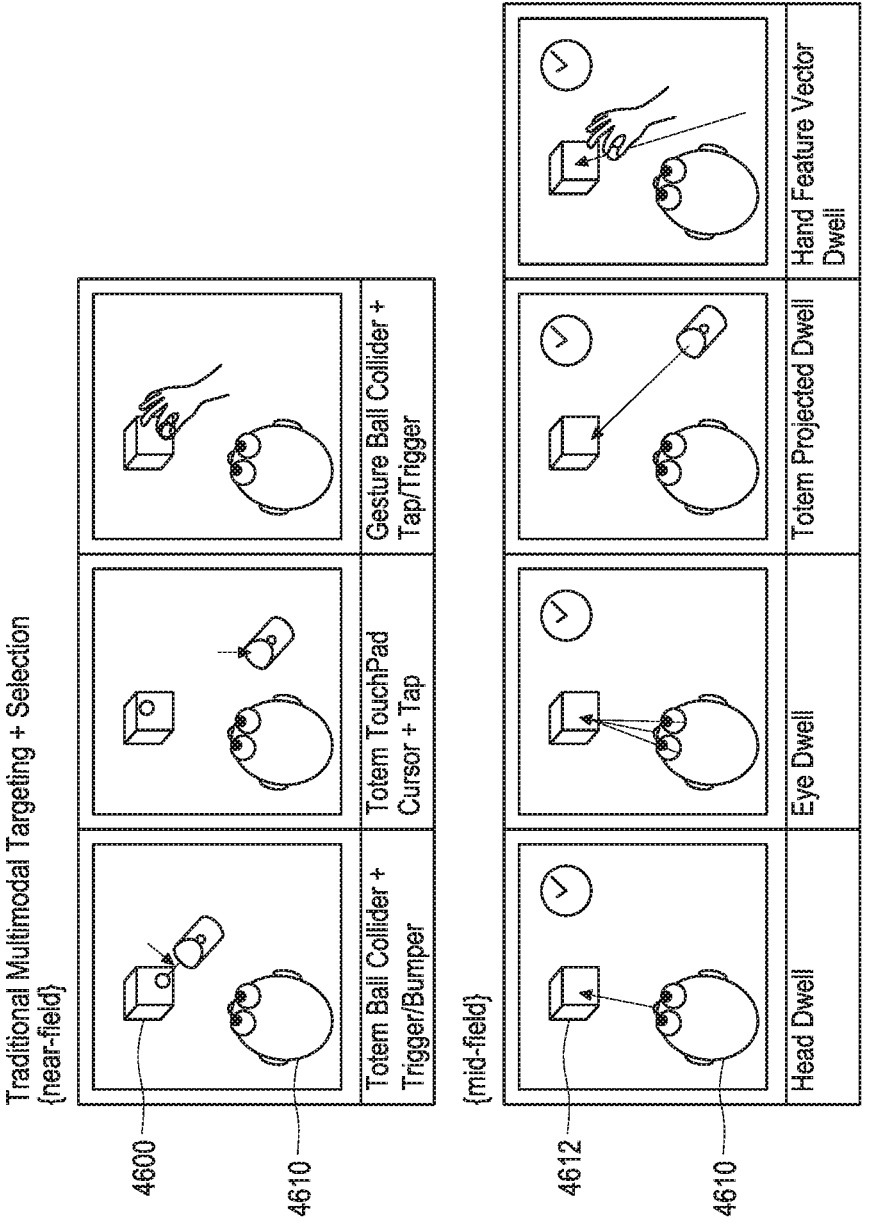

While FIG. 46C illustrates examples of multimodal user interactions associated with targeting, FIG. 46D illustrates examples of multimodal user interactions associated with targeting and selection (in the near-field and mid-field inter-active regions). As shown in FIG. 46D, a user 4610 may target the virtual objects 4600 and 4612 selected in FIG. 46C using various techniques including, but not limited to, pressing a bumper or trigger on a totem (also referred to herein as a controller), pressing or tapping a touchpad on the totem, performing a microgesture such as a finger pinch or tap, or lingering (e.g., dwelling) the input used to target the object (e.g., keeping their head pose, eye pose, totem pro-jection, or hand gesture focused on the virtual object 4600 or 4612 for longer than some threshold amount. In the examples of FIG. 46D, the interactions are multimodal due to the fact that a user is using multiple modes of input (where time itself, in the form of a dwell, may be a mode of input).

Figure 46E:
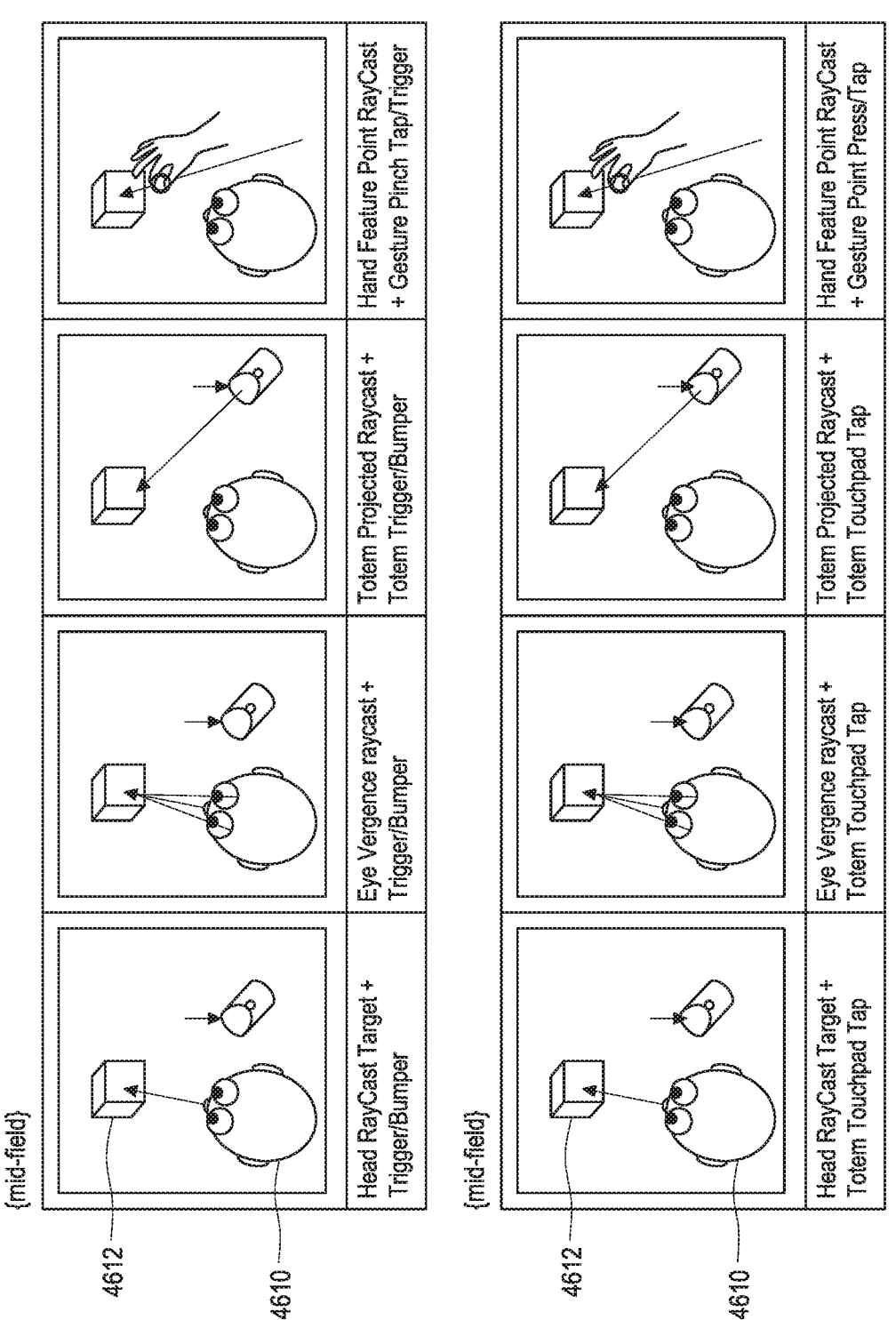

As illustrated in FIG. 46E, the user may select the targeted virtual objects, such as objects 4600 and 4612, using a mode of input different from that used for targeting. As shown in the various examples of FIG. 46E, a user may select a targeted virtual object using various techniques including, but not limited to, pressing a trigger or bumper or tapping on a totem touchpad (e.g., while using a head pose, eye pose, or totem for targeting) and making a hand or microgesture such as a pinch tap, a tap gesture, or a pointing gesture (e.g., while using a hand targeting gesture). In the examples of FIG. 46E, the interactions are multimodal due to the fact that a user is using multiple modes of input.

Crossmodal User Interactions

FIGS. 47A, 47B, and 47C illustrate examples of cross-modal user interactions. In crossmodal user interactions, a first mode of user input is modified by a second mode of user input. In the example of targeting, a primary mode of user input may be used to target a desired virtual object and a secondary mode of user input may be used to adjust the primary mode of user input. This may be referred to as a relative cursor mode. As an example of a relative cursor mode, a user may provide primary control of a cursor using a first mode of user input (such as eye gaze) and may adjust the position of the cursor using a second mode of user input (such as input on a controller). This may provide the user with more accurate control over the cursor.

As shown in FIG. 47C, a head ray cast (e.g., head pose) may be received that roughly targets a virtual object 4700. Then, inputs from a totem may be received that impart a delta to the head ray case in order to fine-tune the targeting of the virtual object 4700. Once the user is satisfied, the user may provide a touch tap to select the targeted virtual object 4700. FIG. 47C also illustrates various examples of similar processes, using different combinations of primary and secondary modes of user input and different examples of selection inputs.

Transmodal User Interactions

Figure 48A:
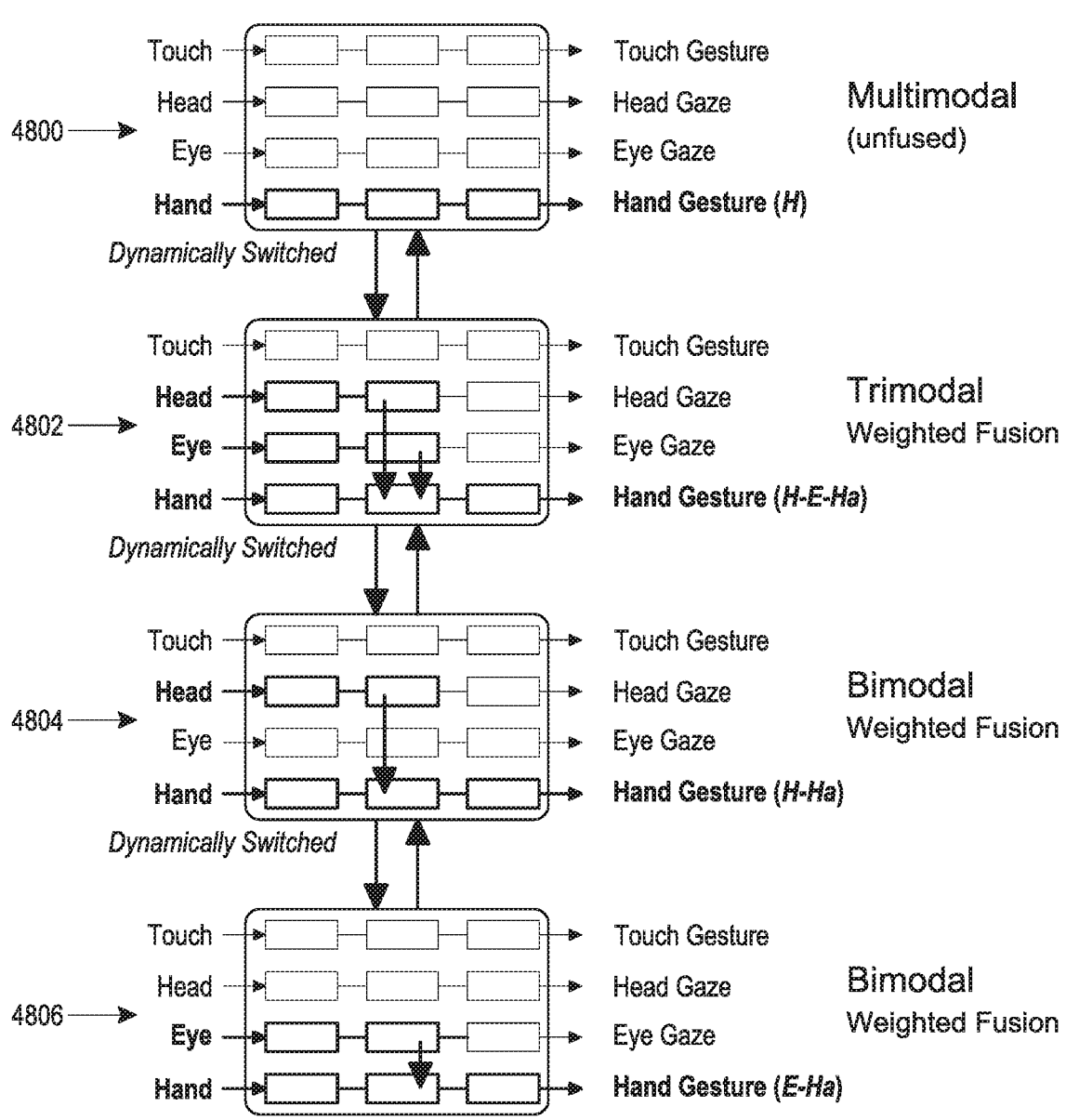
Figure 48B:
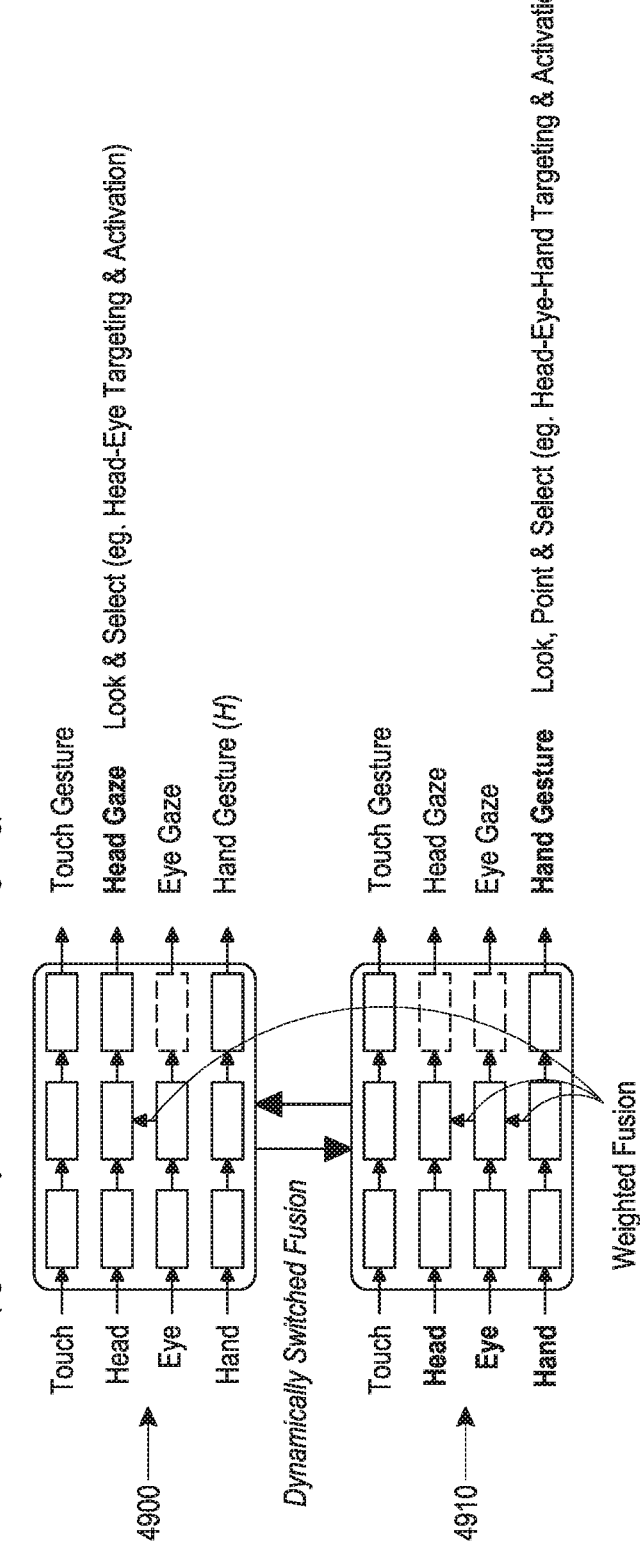

FIGS. 48A, 48B, and 49 illustrate various examples of transmodal user interactions. In transmodal user interac-tions, two or more modes of user input may be dynamically coupled together. As an example, the wearable system may dynamically detect when two (or more) different modes of user input are convergent and may then combine the inputs received over those modes to achieve a better result than any individual input could otherwise provide.

As shown in the example of FIG. 48A, a user's hand gesture inputs, head pose inputs, and eye gaze inputs can be dynamically integrated and split as the inputs converge together and split apart.

At time 4800, a user is providing hand gesture input to target a particular virtual object. As an example, the user may be pointing at the virtual object.

At time 4802, the user has focused their eyes on the same virtual object (as the user targeted with their hand(s)) and has also turned their head to point at the same virtual object. Thus, all three modes of input (hand gesture, eye pose, and head pose) have converged together on a common virtual object. The wearable system may detect this convergence (e.g., trimodal convergence) and enable filtering of the user inputs to reduce any uncertainty associated with the user input (e.g., to increase the probability that the system correctly identifies the virtual object that the user is intend-ing to select). The system can selectively utilize different filters and/or models of user input to process convergent inputs (e.g., based on factors such as which inputs have converged and how strongly the inputs have converged). As an example, the system may overlay or otherwise combine the uncertainty regions for each of the converged inputs and thereby determine a new uncertainty region that is smaller than the individual uncertainties. In at least some embodi-ments, the wearable system may integrate converged inputs with different weights given to different user inputs. As an example, eye gaze inputs may more accurately indicate the current location of the target, and thus given more weight, than head or hand pose inputs over this brief period of time. In particular, even when using eye tracking systems with relatively low resolution cameras and sampling rates, a user's eye tends to lead other inputs and therefore tends to respond quicker to small changes in the location of a target. As such, the eye gaze inputs may provide a more accurate input vector when conditioned properly (e.g., filtered and fused with other inputs in a suitable weighted manner).

At time 4804, the user has diverted their eye gaze away from the virtual object, while their head pose and hand gesture remain focused or pointing at the virtual object. In other words, the user's eye gaze has diverged and is no longer converged with the user's head pose and hand gesture inputs. The wearable system may detect this divergence event and adjust its filtering of the different user inputs accordingly. As an example, the wearable system may continue to combine the user's head pose and hand gesture inputs (e.g., in a bimodal convergence) to identify which virtual object the user wishes to select, while ignoring the eye gaze input for that purpose.

At time 4806, the user has returned their eye gaze to the virtual object such that the user's eye gaze and hand gesture are converged on the virtual object. The wearable system can detect this bimodal convergence and combine or fuse the two inputs in a weighted manner.

As shown in the example of FIG. 48B, transmodal selection or targeting of objects may include dynamically cross-coupled inputs and may be used for static objects and ballistic objects (e.g., moving objects) in various interactive regions such as the near-field (sometimes referred to as taskspace) and mid-field regions. FIG. 48B illustrates that a user may target static or moving objects using transmodal inputs. As an example, a user may target an object by turning their head and eye gaze to an object (and potentially lingering such inputs on the object and/or tracking the object with such inputs). The user may also provide additional inputs such as controller or hand gestures that select the object (e.g., that converge with the head and/or eye gaze to form a trimodal input).

As shown in the example of FIG. 49, the system may dynamically cross couple inputs together. At time 4900, the system may fuse together eye gaze inputs with head pose inputs, allowing the user to look to select an object (while using their head pose to increase the accuracy of their eye gaze input). At time 4910, the system may fuse together head pose, eye pose, and hand gesture inputs, thereby allowing the user to look and point to select an object (while using the head and eye gaze pose inputs to increase the accuracy of the hand gesture input).

Example Processes of Transmodal Interactions

Figure 50:
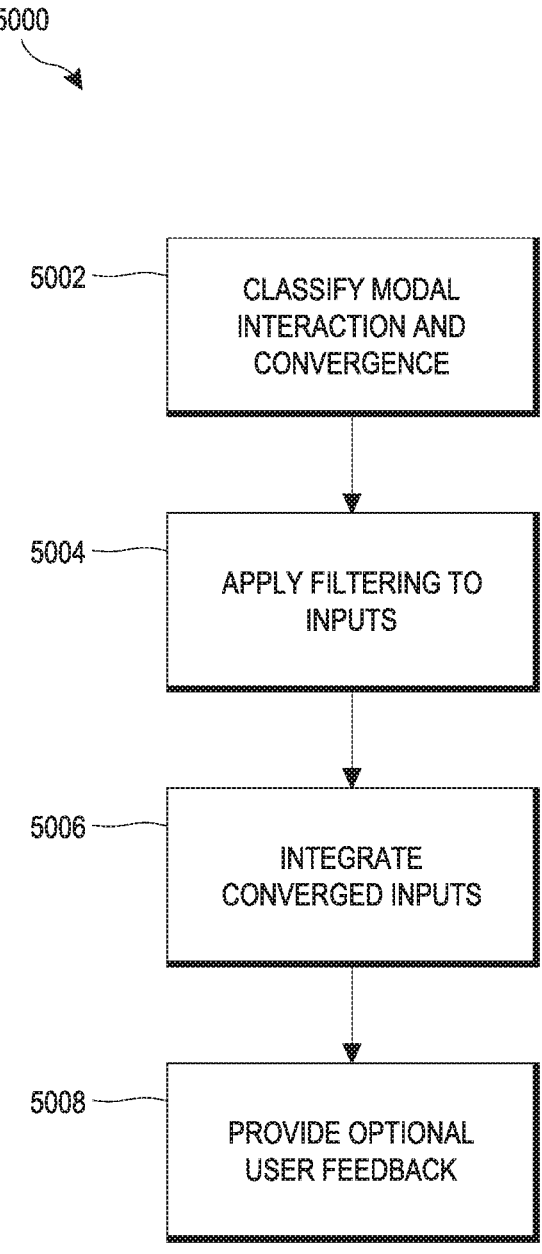
FIG. 50 is a process flow diagram of an example of a method of detecting modal vergences.

FIG. 50 is a process flow diagram of an example method 5000 of using multiple modes of user input to interact with a wearable system. The process 5000 can be performed by the wearable system 200 described herein.

At block 5002, the wearable system may receive user inputs and classify the modal interaction and determine occurrence of any convergences of different modes of user inputs. The wearable system may classify the modal interaction as being bimodal or trimodal (e.g., having two or three different user input modes converged together) or quadmodal (e.g., four input modes) or a higher number of input modes. Block 5002 may involve detection and classification of various phases of a modal interaction such as union or the initial formation of a bimodal or trimodal "bond" (e.g., where the difference between the input vectors or different user input modes falls below some given threshold), settling or the stabilization of the bimodal or trimodal "bond" (e.g., where the difference between the input vectors stabilizes below the threshold), and divergence (e.g., where the difference between the input vectors increases beyond the threshold). In some cases, two input modes may stabilize before an action is performed or before another input mode converges with them. For example, head and eye input may converge and stabilize a short time (e.g., about 200 ms) before a hand grasping action is performed or beforehand input converges with the head and eye input.

Block 5002 may also involve classifying the motion type and interaction region of a modal interaction. In particular, block 5002 may involve determining if the converged user inputs are in ballistic pursuit (e.g., have a variable velocity or variable acceleration), in smooth pursuit (e.g., have a more constant velocity with low acceleration), in fixation (e.g., have a relatively low velocity and acceleration over time), or in dwell (e.g., have been in fixation for more than a given amount of time). Additionally, block 5002 may involve determining if the converged inputs are within a near-field region (e.g., a taskfield region), a mid-field region, or a far-field region. The system may process transmodal inputs differently depending on the motion type and interaction region.

At block 5004, the wearable system may apply filtering to transmodal inputs. Block 5004 may involve applying filtering of different strengths based on how strong the vergence between the inputs is, which inputs are converged together, which region the inputs are convergent in, etc. As an example, when an eye pose input and a hand gesture input are converged and in the mid or far-field regions, it may be necessary to apply stronger filtering than when such inputs are in the near-field regions (due to the generally increasing uncertainty of these inputs with greater distance from the user). In at least some embodiments, filtering in block 5004 may involve conditioning of inputs and may or may not include removing portions of the inputs. As an example, the system may filter transmodal inputs by noise filtering a primary input pose, to increase targeting accuracy. Such filtering may include a low-pass filter, such as a one Euro filter, that filters out high frequency components (and which may include an adaptive cutoff frequency). While such filtering can increase targeting accuracy even in the absence of fusion, leaving such filtering on permanently (as opposed to dynamically while inputs are converged) can result in the introduction of noticeable (and undesirable) latency. By selectively applying noise filtering only when inputs are converged (which may represent a small fraction of operational time), the system can retain the accuracy benefit of applying a low-pass filter while avoiding the vast majority of noticeable latency. In various implementations, other filters can be used (alone or in combination) including, e.g., a Kalman filter, a finite impulse response (FIR) filter, an infinite impulse response (IIR) filter, a moving average, a single or double exponential, etc. Another example of a filter is a dynamic recursive low pass filter in which a low pass filter has a dynamically adjustable cutoff frequency such that at low speeds of the input vectors, the cutoff frequency is smaller to reduce jitter (while allowing a small degree of lag or time latency) and at high speeds of the input vectors, the cutoff frequency is larger to reduce lag as compared to jitter.

At block 5006, the wearable system may integrate any user inputs that are converged. In combining the user inputs, the wearable system may interpolate (linearly, spherically, or otherwise) between the user inputs to create a combined or fused input. In some embodiments, the wearable system may perform easing (linear, quadratic, exponential, or otherwise) to avoid jittery inputs. In particular, the wearable system may smooth out sudden changes in the combined input. As an example, at the moment the difference between two inputs becomes smaller than the threshold for convergence, the active input of the wearable system may jump from an active one of the inputs to the new fused input. To avoid jitter, the wearable system may move the active input (and any corresponding cursor or feedback mechanism) from the original active input to the new fused input in a damped manner (e.g., with a finite acceleration away from the original active input, travel, then a finite deceleration to the new fused input). The actions in block 5006 can be dynamic in that the method 5000 can continuously or repeatedly check for converged or diverged inputs and integrate the converged inputs. For example, the method can dynamically integrate an input that has converged and dynamically remove an input that has diverged.

At block 5008, the wearable system may optionally provide feedback to the user that user inputs have been fused and transmodal interactions are now available. As examples, the wearable system may provide such feedback in the form of text, a visual marker such as a point, line, ring, arc, triangle (e.g., for trimodal convergence), square (e.g., for quadmodal convergence), and a mesh).

Figure 51:
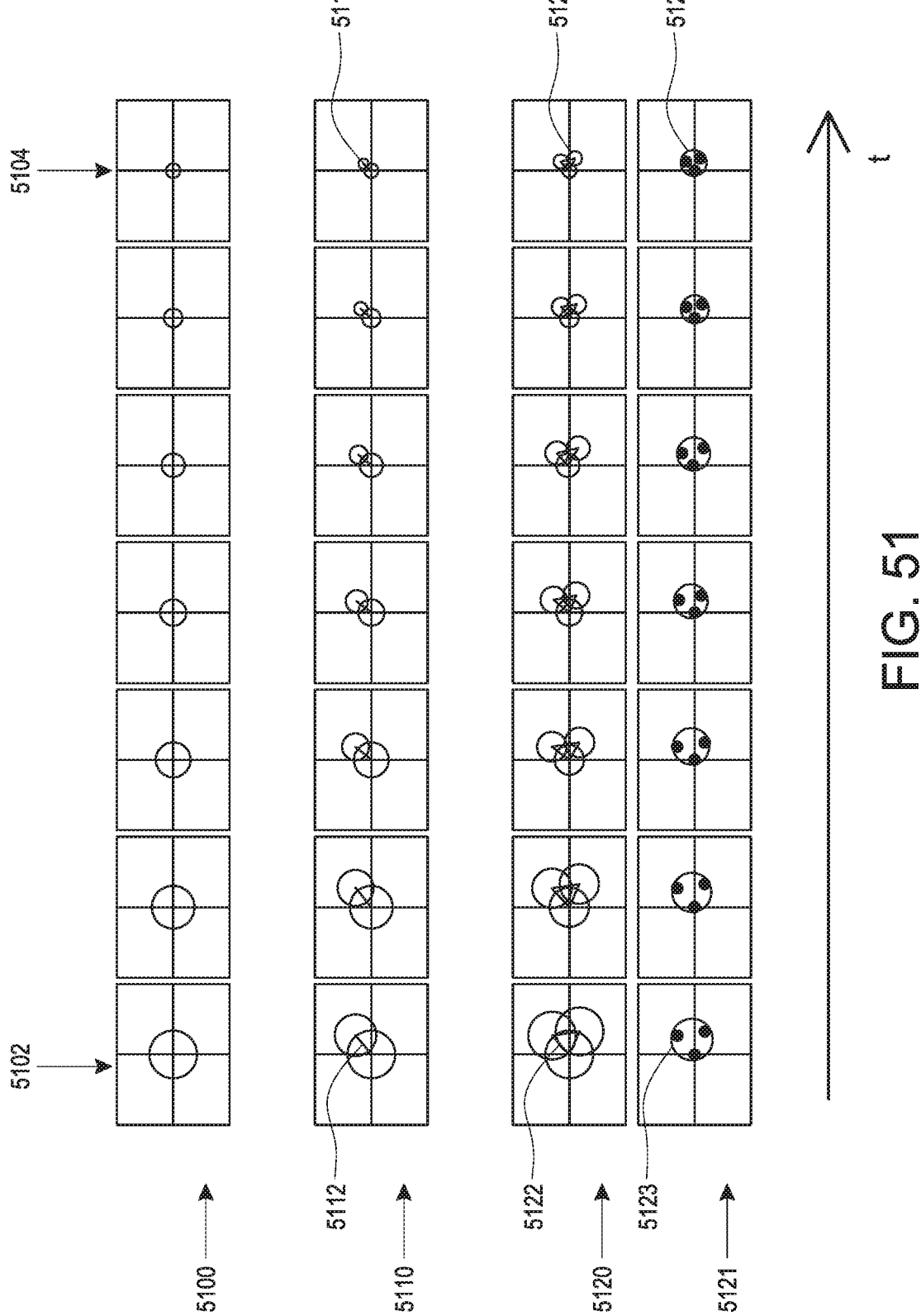
FIG. 51 illustrates examples of user selections in uni-modal, bi-modal, and tri-modal interactions.

Examples of User Selection Processes in Unimodal, Bi-Modal, and Tri-Modal Interactions FIG. 51 illustrates examples of user selections in unimodal, bi-modal, and tri-modal interactions.

In unimodal interaction 5100, a user is providing a user input to track or select a given object via a first mode of user input. The mode of user input in interaction 5100 may be any suitable mode such as a head pose, eye pose, hand gesture, controller or totem input, etc. The user input in interaction 5100 is generally an input from a user identifying a particular area or volume for selection. As illustrated in FIG. 51, there may be an uncertainty associated with the user input in interaction 5100. In particular, user inputs generally have at least some amount of uncertainty due to the limits of input devices such as eye tracking systems, head pose tracking systems, gesture tracking systems, etc. In at least some embodiments, this uncertainty may decrease over time (e.g., as the system averages an otherwise constant user input over time). This effect is illustrated in FIG. 51 by circles, which represent uncertainty of a given user input and which shrink over time (e.g., compare the relatively large uncertainties at time 5102 versus the relatively small uncertainties at time 5104).

In bimodal interaction 5110, a user is providing user input via two different modes of user input to track or select a given object. The modes of user input in interaction 5110 may be any suitable combination of modes such as head-eye, hand-eye, head-hand, etc. As shown in FIG. 51, the system may use the overlapping uncertainties to decrease the system's uncertainty of the user interaction. As an example, the system may identify the region 5112 that lies within both the uncertainty area of the first mode of user input and the uncertainty area of the second mode of user input in bimodal interaction 5110. As illustrated in FIG. 51, the overlapping error region 5112 associated with the fused bimodal input is substantially smaller than the error region associated with any one of the constitution modal inputs. Additionally, the overlapping error region 5112 may also shrink over time, as the uncertainty of each of the underlying modal inputs decreases (e.g., the bimodal uncertainty 5112 may generally decrease from an initial time 5102 to a later time 5104).

In trimodal interaction 5120, a user is providing user input via three different modes of user input to track or select a given object. The modes of user input in interaction 5110 may be any suitable combination of modes such as head-eye-hand, head-eye-totem, etc. As discussed in connection with bimodal interaction 5110, the system may use the overlapping uncertainties of the three different modes to decrease the system's overall uncertainty of the user interaction. As an example, the system may identify the region 5122 that lies within the uncertainty areas of the first, second, and third modes of user input. The overall uncertainty region 5122 may sometimes be referred to as a transmodal triangle (for tri-modal interactions) and a trans-modal quadrangle (for quad-modal interactions) and a trans-modal polygon (for higher numbers of input interactions). As shown in FIG. 51, the overall uncertainty region 5122 may also shrink over time, as the uncertainty of each of the underlying modal inputs decreases (e.g., the trimodal uncertainty 5122 may generally decrease from an initial time 5102 to a later time 5104). FIG. 51 also illustrates, in interaction 5121, an overall uncertainty region 5123 in the form of a circle rather than a triangle. The exact shape of uncertainty regions formed from multiple converged modes of user input may depend on the shape of uncertainty regions of the underlying user inputs.

In at least some embodiments, the lengths of the "legs" of the transmodal triangle, transmodal quadrangle, and/or a higher-level transmodal shape, may be proportional to the degree of convergence of each pair of input pose vectors associated with a respective leg. The lengths of the "legs" may also be indicative of the type of task and/or characteristic to individual users (e.g., different users may tend to interact in different and identifiable ways that may be reflected in the lengths of the "legs"). In various embodiments, the lengths of the "legs" or sides of a transmodal shape may be used in classifying what type of user interaction is involved. For example, the area of the triangle or quadrangle (depending on number of input poses) is directly proportional to transmodal convergence and can be applied to a broad range of scenarios. In use, two different triangles may have the same area but different side lengths. In this case, the length of the sides may be used to classify the subtype of input convergence, and the area may be a proxy for intensity of intent along with the variance of the area.

Example of Interpreting User Input Based on Convergence of User Inputs

Figure 52:
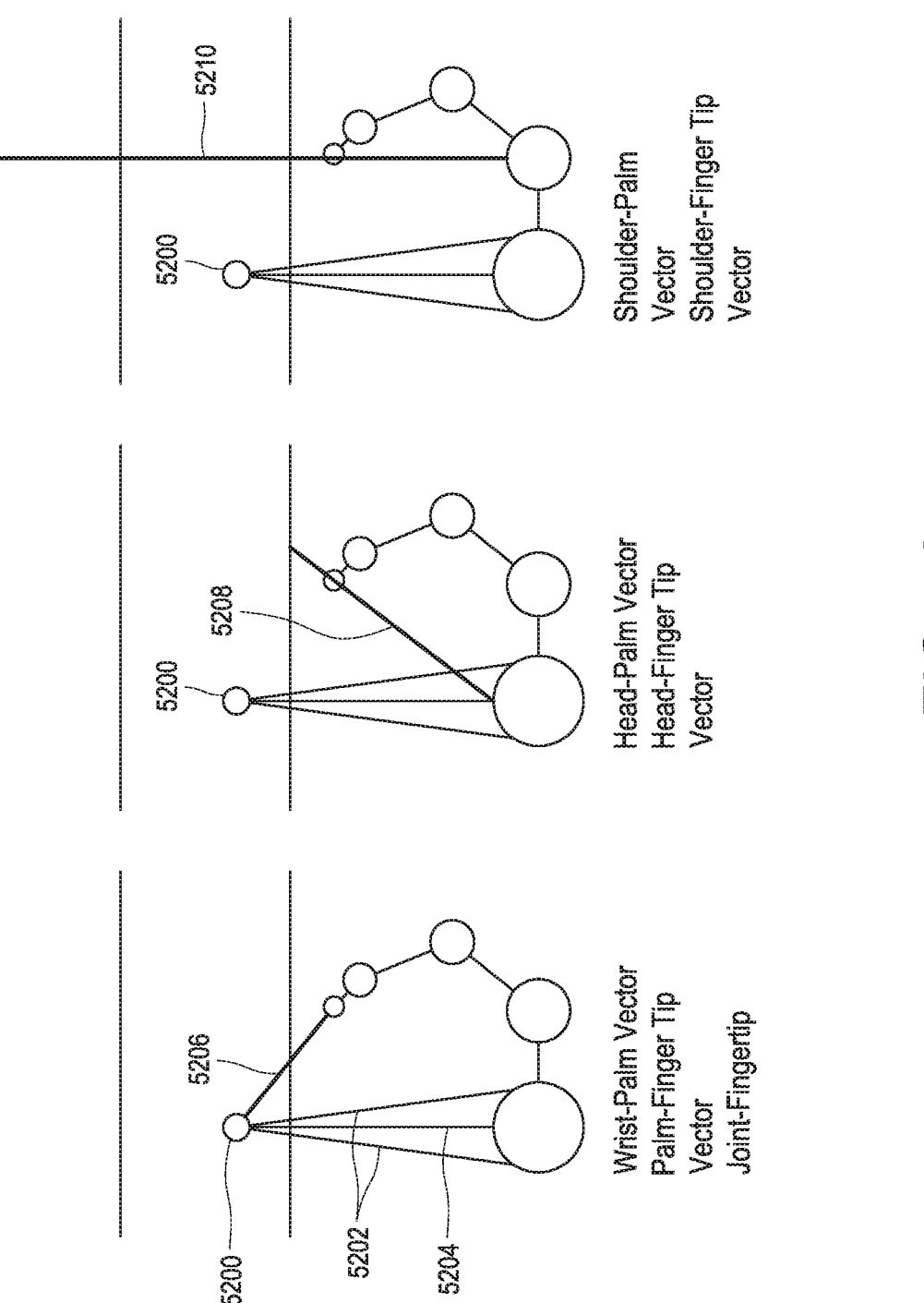
FIG. 52 illustrates an example of interpreting user input based on the convergence of multiple modes of user input.

In at least some embodiments, the system disclosed herein may interpret user inputs based on convergence of user inputs. In the example of FIG. 52, a user is providing various user inputs to select an object 5200. The user has turned their head towards object 5200, thus providing head pose input 5202; the user is looking at the object 5200, thereby providing eye gaze input 5204; and the user is gesturing with their arm.

In general, it may be difficult for the system to interpret the user's arm gesture as it potentially has several different meanings. Perhaps the user is pointing at the object 5200, such that the raycast from the user's wrist to their palm (or fingertip) represents the intended input. Alternatively, perhaps the user is forming an "O" with their fingers and moving their hand such that the "O" surrounds the object in their line of line of sight, such that the raycast from the user's head to their fingers represents the intended input. In yet another alternative, perhaps the user is pointing a water hose at a car and intends for the raycast from their shoulder to their fingertip to represent the intended input. Absent additional information, the system may struggle to determine which is the intended input.

With the present system, the system may determine which of the potential inputs (e.g., one of the potential interpretations of the arm or hand gesture input) are converged with inputs of another mode (e.g., the head or eye gaze pose inputs). The system may then assume that the potential interpretation that results in modal convergence is the intended input. In the example of FIG. 52, the palm-fingertip input 5206 (e.g., wrist-palm, joint-fingertip, etc.) is converged with the head and eye gaze inputs, while the head-palm (e.g., head-fingertip) input 5208 and the shoulder-palm (e.g., shoulder-fingertip) input 5210 are divergent with the other inputs. Thus, the system may determine that the palm-fingertip input 5206 is most likely the intended input and may then use the palm-fingertip input 5206 in identifying the object 5200 for selection (e.g., by using the input 5206 and its uncertainty characteristics to reduce the overall uncertainty characteristics for the trimodal selection of object 5200). Thus, the system may interpret the arm gesture based at least in part on which possible interpretations result in modal convergences.

FIGS. 53, 54, 55, and 56 illustrate additional examples of how user input may be interpreted based on convergence of user inputs.

Figure 53:
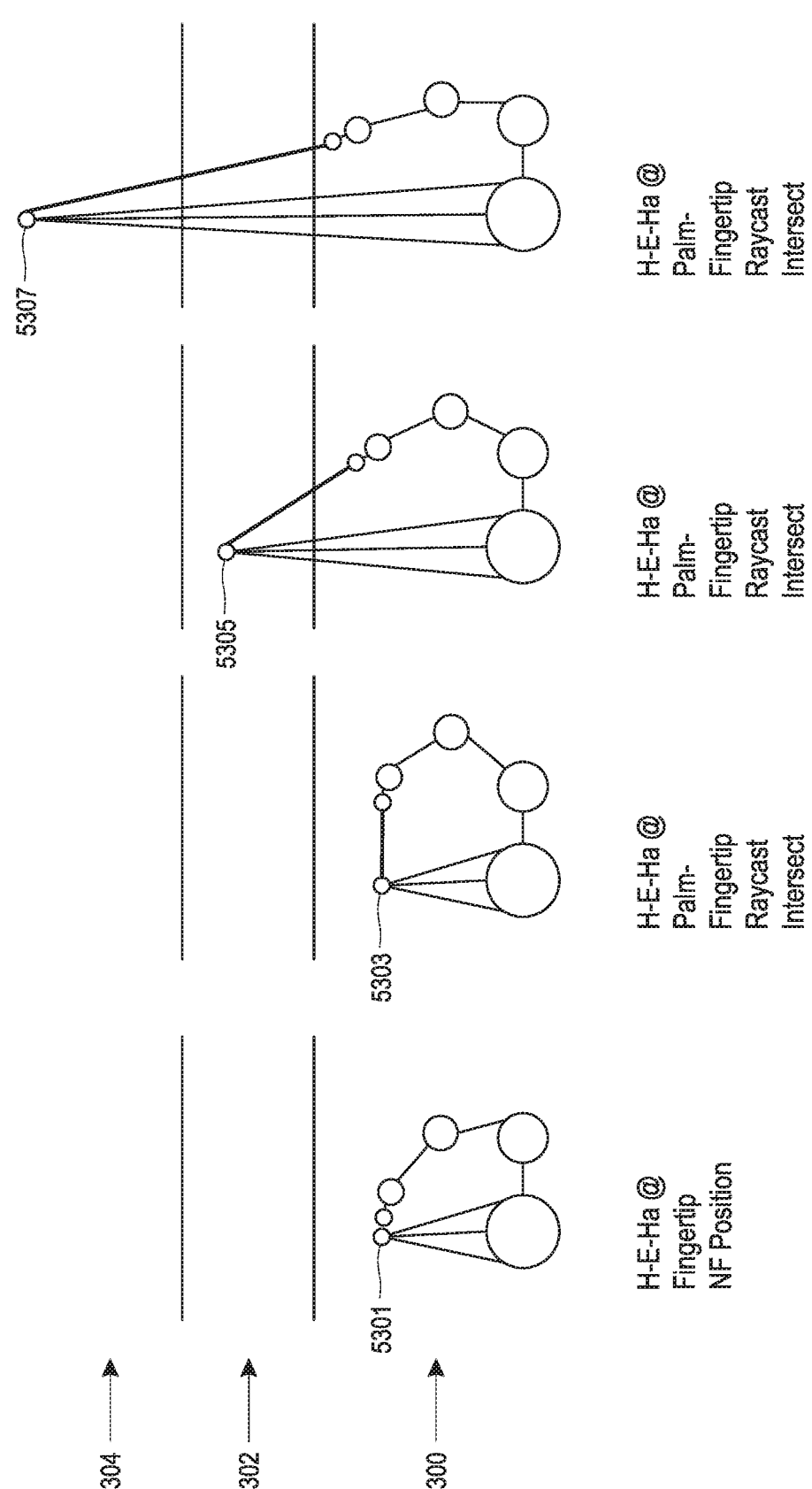
FIG. 53 illustrates an example of how different user inputs may converge across different interactive regions.

FIG. 53 illustrates how a trimodal convergence, of a head pose (H), eye gaze pose (E), and a palm-fingertip input (Ha, for hand), may occur in either a near-field region 5300 (which may be a taskspace or inspection space of the type shown in FIGS. 44A, 44B, and 44C), a mid-field region 5302 (which may correspond to the mid-field region from between about 1 and 4 meters from the user shown in FIGS. 44A, 44B, and 44C), and a far-field region 5304 (which may correspond to regions beyond the mid-field region of FIGS. 44A, 44B, and 44C). As shown in the examples of FIG. 53, the H, H, and Ha inputs may converge together at points 5301, 5303, 5305, and 5307. The Ha input may involve fingertip position in the example associated with convergence point 5301, whereas the Ha input may involve the palm-to-fingertip raycast in the examples associated with convergence points 5303, 5305, and 5307.

Figure 54:
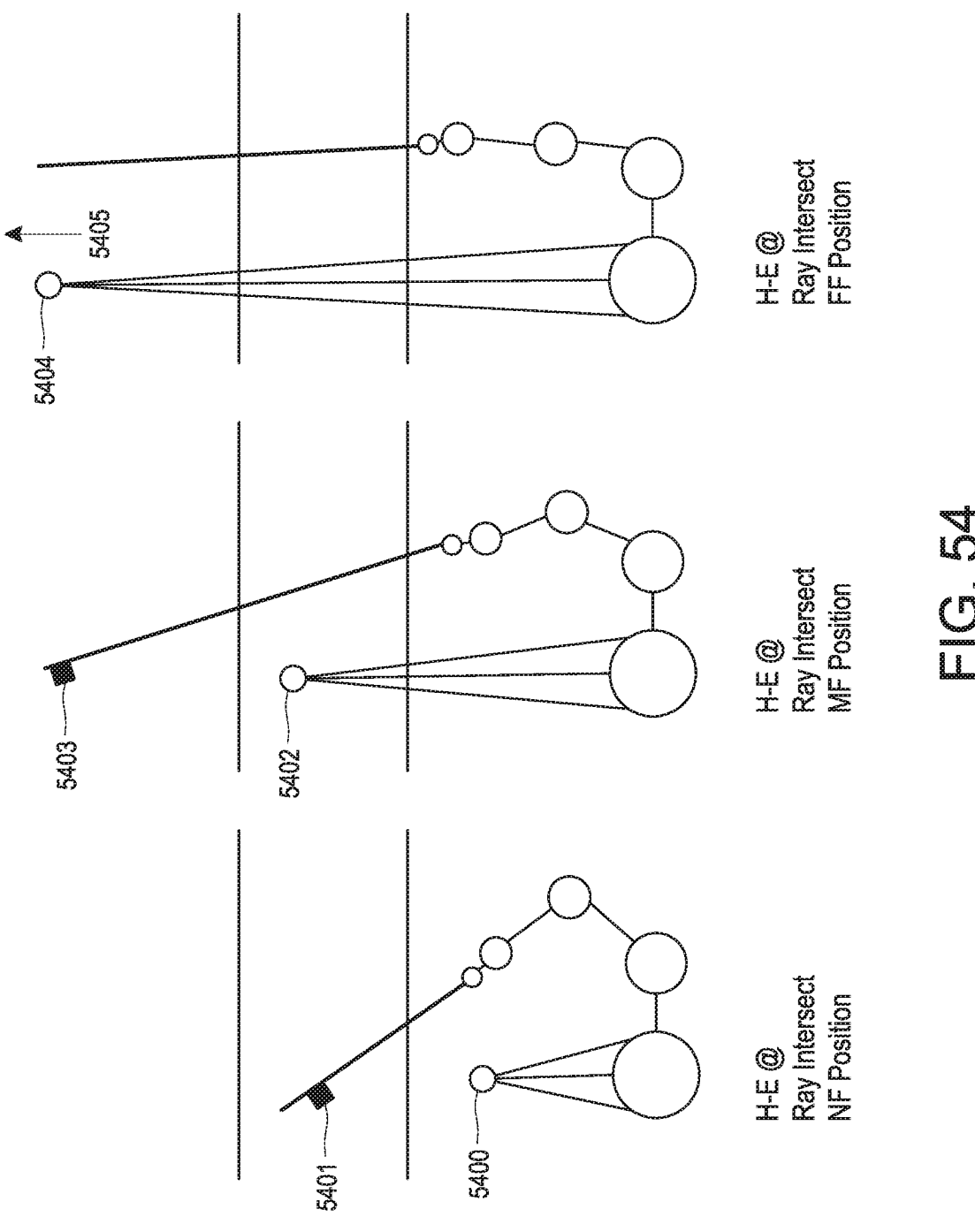
FIGS. 54, 55, and 56 illustrate examples of how a system may select amongst multiple possible input convergence interpretations based at least in part on a ranking of different inputs.
Figure 55:
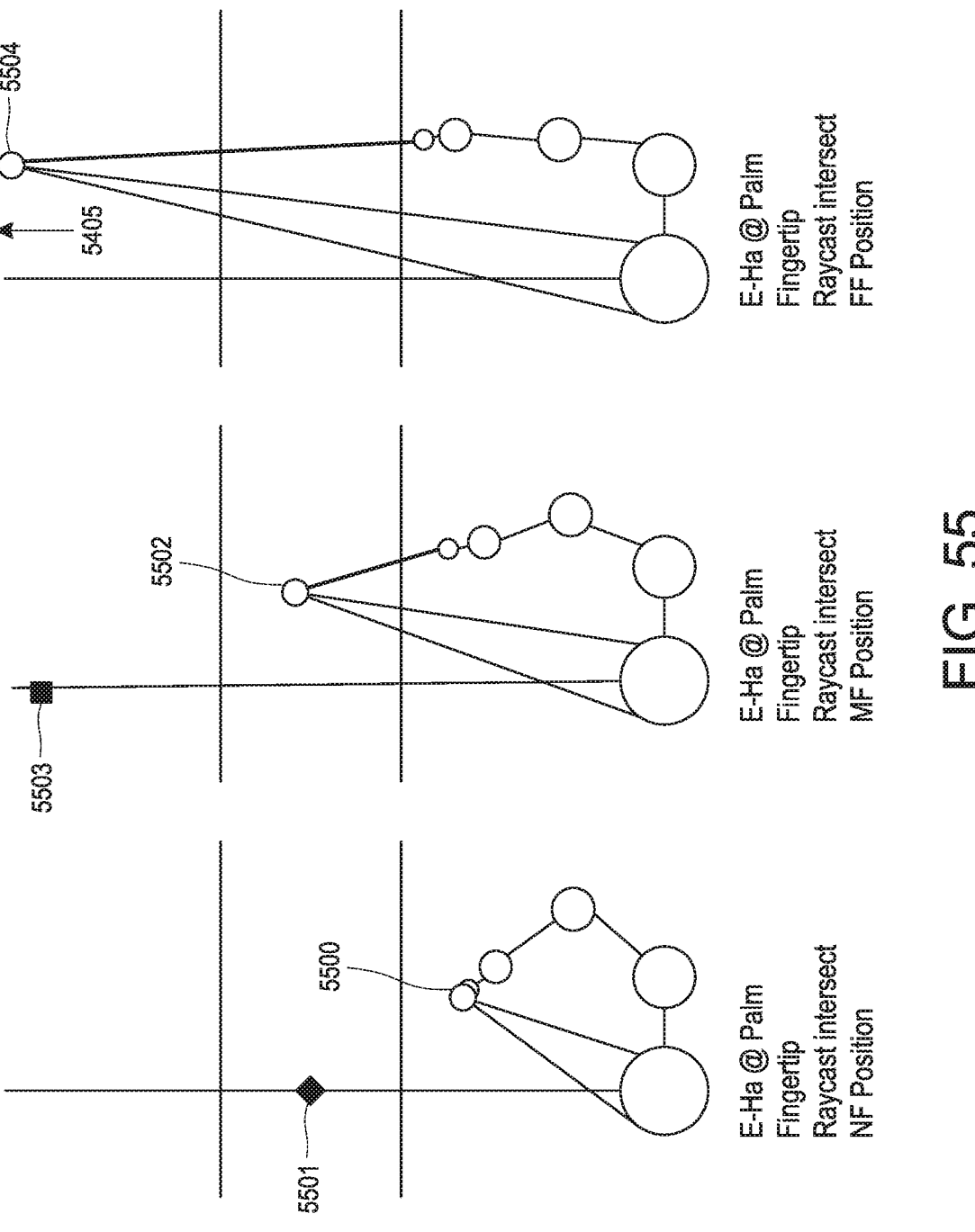
Figure 56:
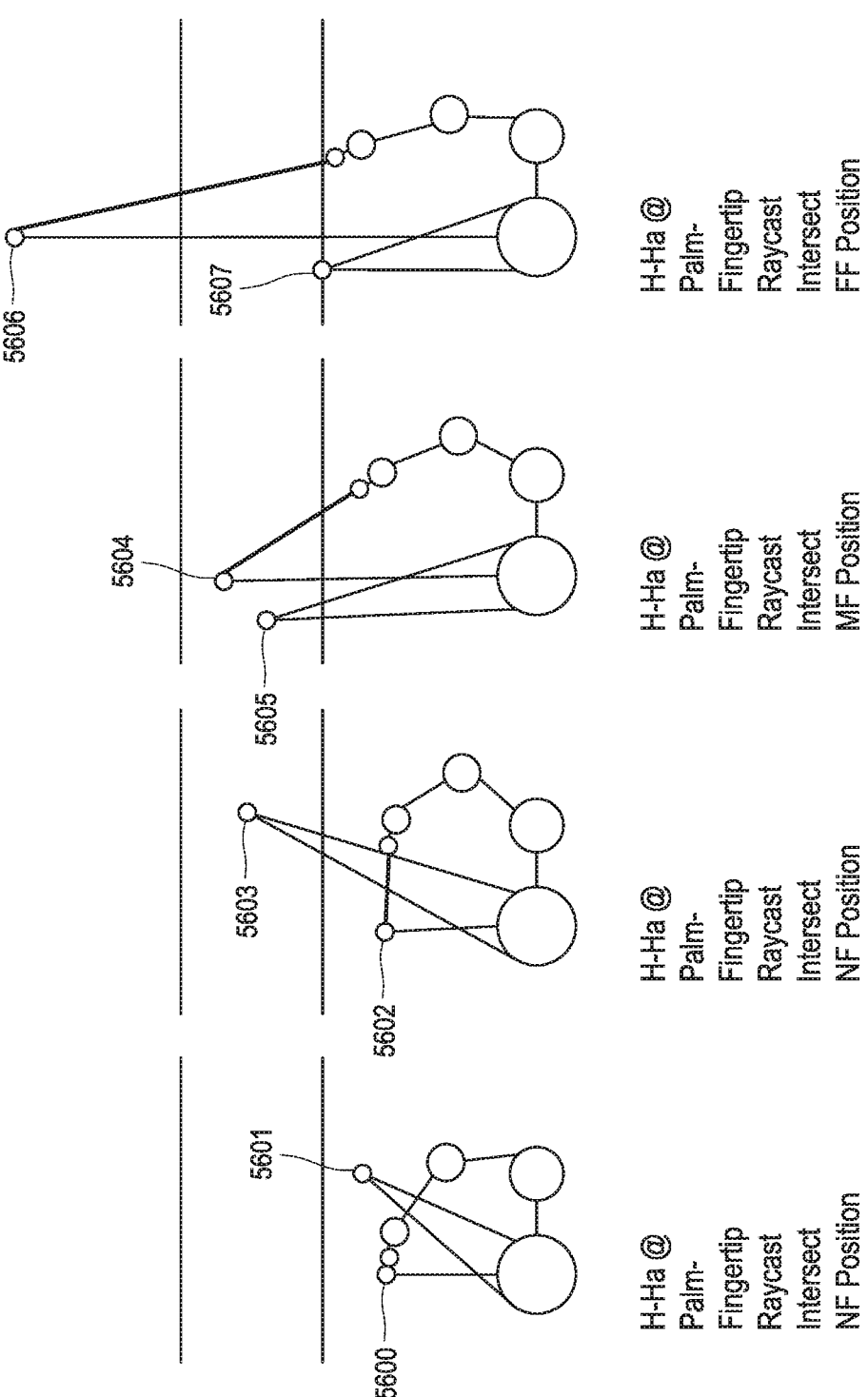

In at least some embodiments, a system having transmodal fusion capabilities may place different weights (e.g., importance values) on different inputs. In general, inputs may be dominant (e.g., be assigned more weight) when those inputs have factors such as lower error, increased functionality (such as providing depth information), higher frequency, etc. FIGS. 54, 55, and 56 illustrate how systems having transmodal fusion capabilities may utilize the differing weights of inputs in interpreting user inputs. As an example and in at least some embodiments, eye gaze (E) inputs may be dominant over head pose (H) inputs and hand gesture (Ha), as the eye gaze inputs include an indication of depth (e.g., distance from the user), whereas head pose inputs don't include an indication of depth, and as eye gaze (E) may sometimes be more indicative of user input that hand gestures (Ha).

As shown in the examples of FIG. 54, eye gaze (E) inputs may determine how a system having transmodal fusion capabilities interprets various other inputs. In the examples of FIG. 54, eye gaze (E) inputs and head pose (H) inputs appear to converge at points 5400, 5402, and 5404 (which may be in the near-field, mid-field, and far-field regions, respectively). However, the head pose (H) inputs also appear to converge with the hand gesture (Ha) inputs at points 5401, 5403, and 5405 (which may be substantially far away as to not be on the sheet of FIG. 54), which are beyond the convergence points of the E and H inputs. The system described herein may decide to ignore the apparent convergences at points 5401, 5403, and 5405 and instead utilize the apparent convergences at points 5400, 5402, and 5404. The system may do so based on the relatively higher weight of eye gaze (E) inputs.

In other words, FIG. 54 shows how inputs such as head pose (H) may have multiple interpretations (e.g., one fusing with eye gaze (E) and another fusing with hand gesture (Ha)) and how the system may select interpretations that result in convergences with higher weight inputs. Thus, FIG. 54 illustrates how the system may ignore apparent input convergences when the convergence is inconsistent with another, more dominant, input such as eye gaze (E) input.

FIG. 55 shows examples similar to FIG. 54, except that the eye gaze (E) inputs converge with the hand gesture (Ha) inputs at points 5500, 5502, and 5504. In addition, the head pose (H) inputs apparently converge with the Ha inputs at points 5501, 5503, and 5505. As with FIG. 54, the system may decide in the examples of FIG. 55 to prefer the apparent convergences involving the more-dominant eye gaze (E) inputs.

In the examples of FIG. 56, the eye gaze (E) inputs diverge from both the hand gesture (Ha) inputs and the head pose (H) inputs. As such, the system may decide to utilize the apparent convergences of the hand gesture (Ha) inputs and the head pose (H) inputs (e.g., the inputs to points 5600, 5602, 5604, and 5606) as the intended transmodal inputs. The system may filter out the eye gaze (E) inputs to points 5601, 5603, 5605, and 5607 or may utilize the eye gaze (E) inputs for other uses.

Example Diagrams of a Wearable System having Transmodal Fusion Capabilities

Figure 57A:
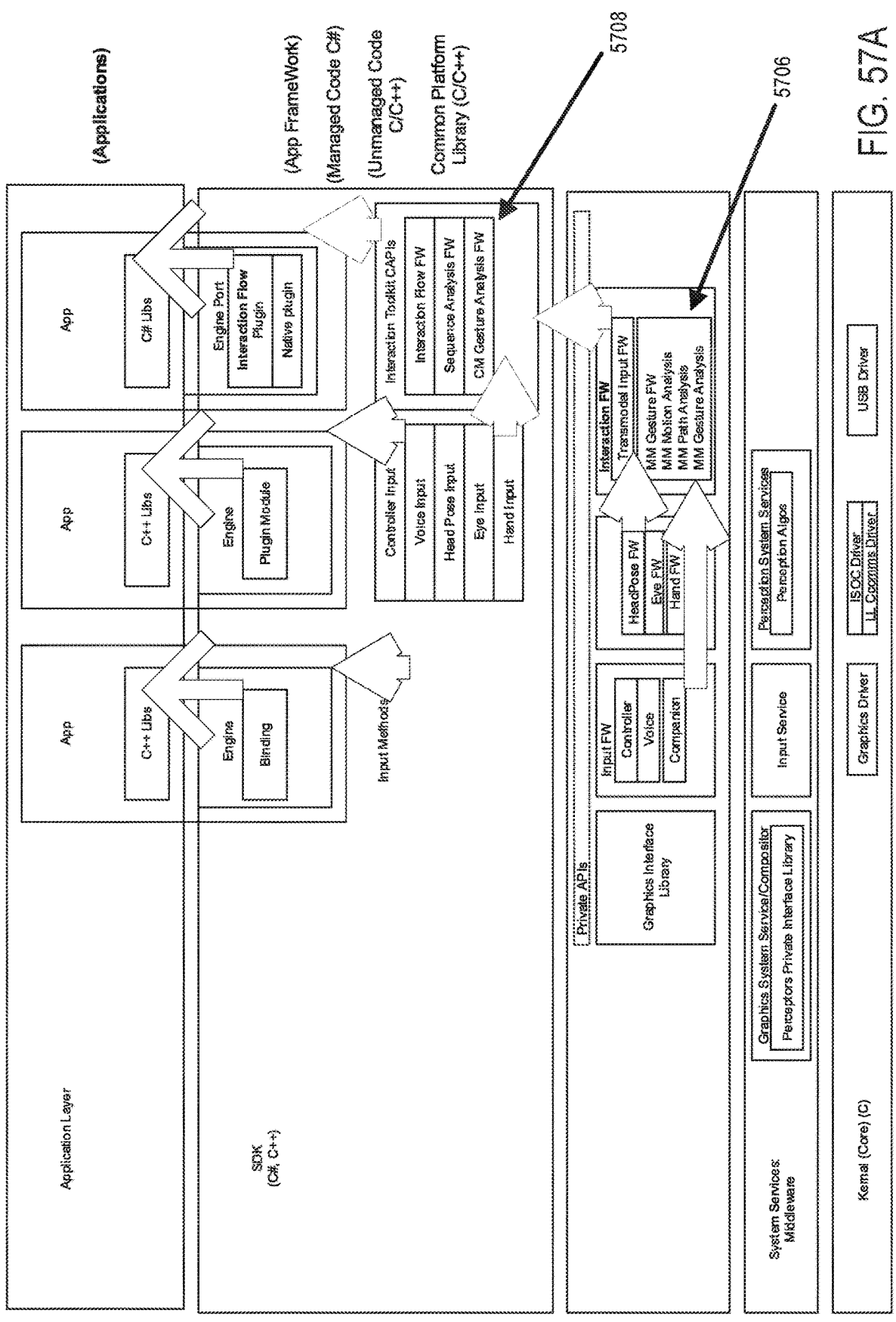
FIGS. 57A and 57B are block diagrams of an example of a wearable system that fuses multiple modes of user input to facilitate user interactions with the wearable system.

FIG. 57A is a block system diagram of an example processing architecture of a wearable system 200 that fuses multiple modes of user input to facilitate user interactions (e.g., a wearable system with transmodal capabilities). The processing architecture may be implemented by the local processing and data module 260 shown in FIG. 2A or the processor 128 shown in FIG. 2B. As shown in FIG. 57A, the processing architecture may include one or more interaction blocks such as blocks 5706 and 5708 that implement transmodal fusion techniques of the type described herein. Block 5706, for example, receives inputs such as head pose, eye gaze direction, and hand gesture inputs and can apply transmodal fusion techniques (such as filtering and combining the inputs when input convergence is detected) to those inputs. Similarly, block 5708 receives inputs such as controller input, voice input, head pose input, eye input, and hand gesture input and can apply transmodal fusion techniques to these (and any other available) user inputs. The integrated and filtered user inputs can, as illustrated by the arrows of FIG. 57A, be passed along to and used by various software applications.

Figure 57B:
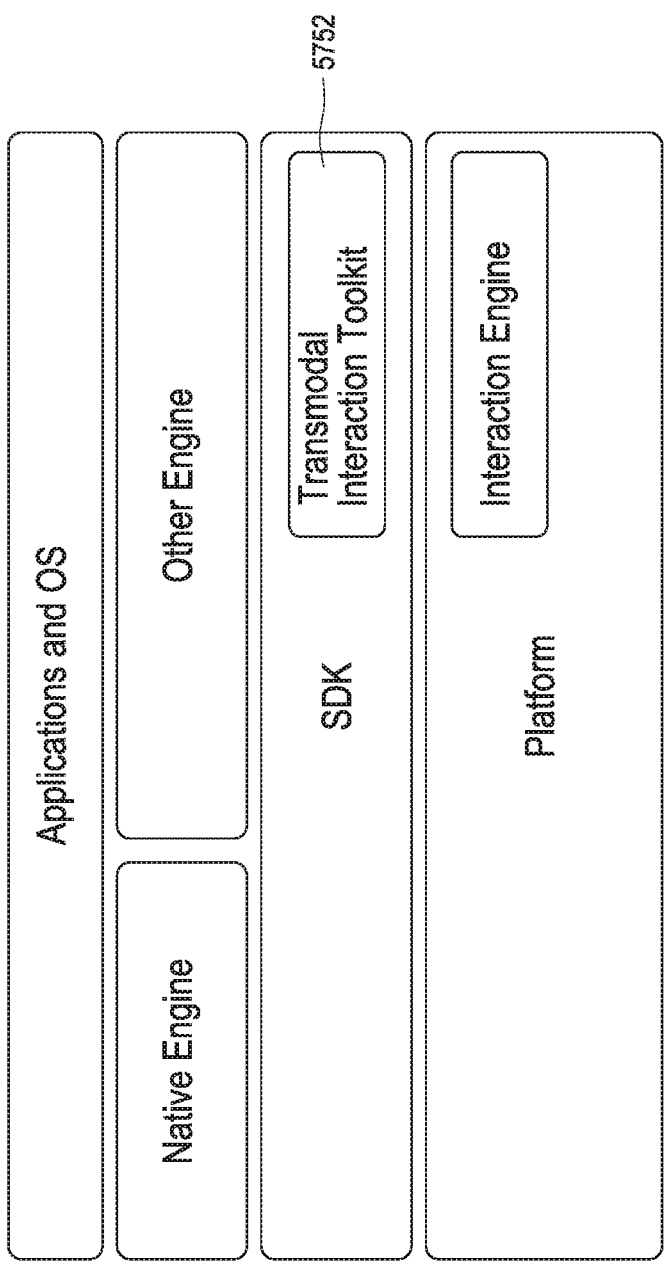

FIG. 57B is a block system diagram of another example of a processing architecture of a wearable system 200 with transmodal input capabilities. FIG. 57B shows how the processing architecture can include a transmodal interaction toolkit 5752 as part of a software development kit (SDK), thus allowing software developers to selectively implement some or all of the available transmodal input capabilities of the system.

Figure 58A:
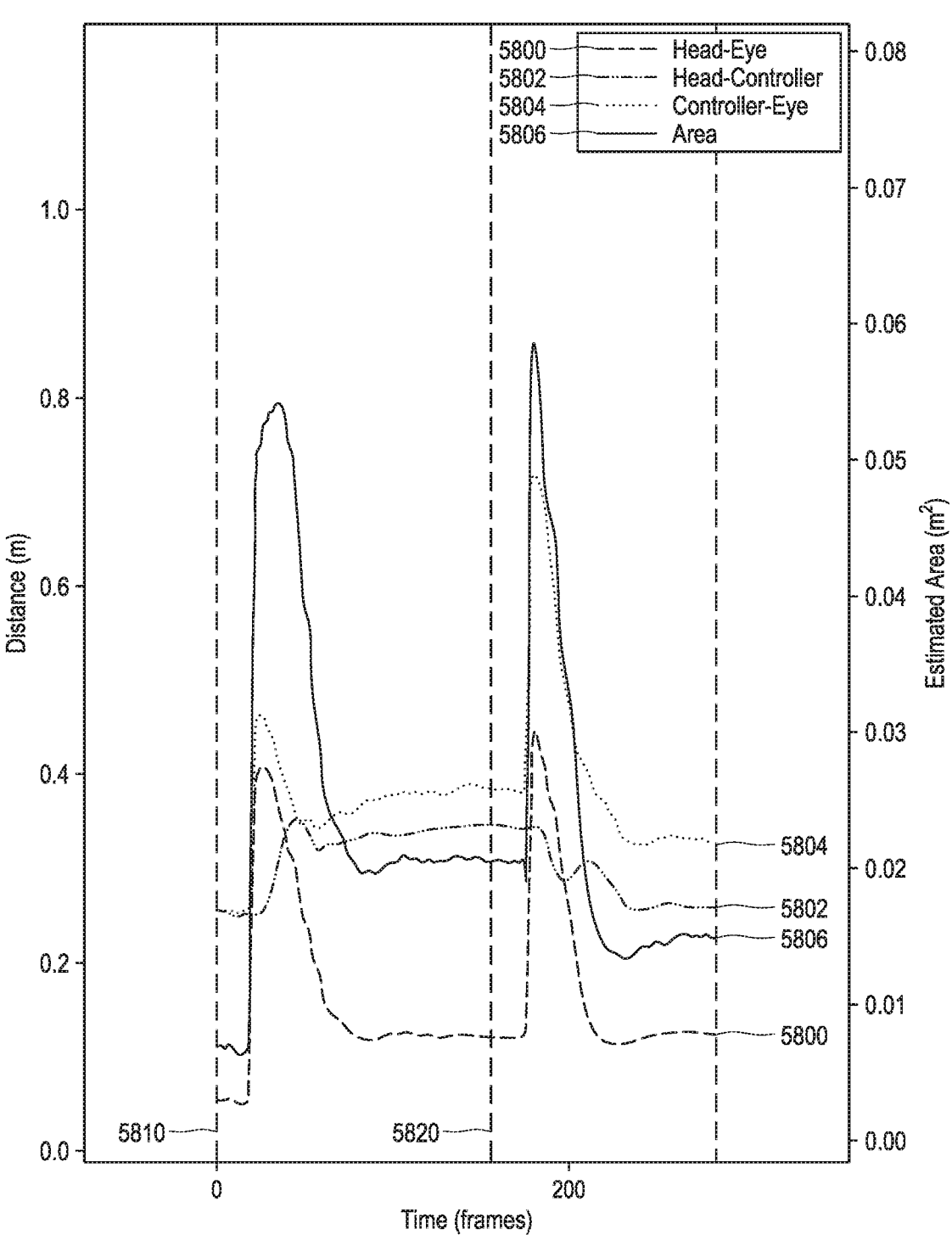
FIG. 58A is a graph of vergence distances of various input pairs and of the vergence area for a user interaction with dynamic transmodal input fusion disabled.
Figure 58B:
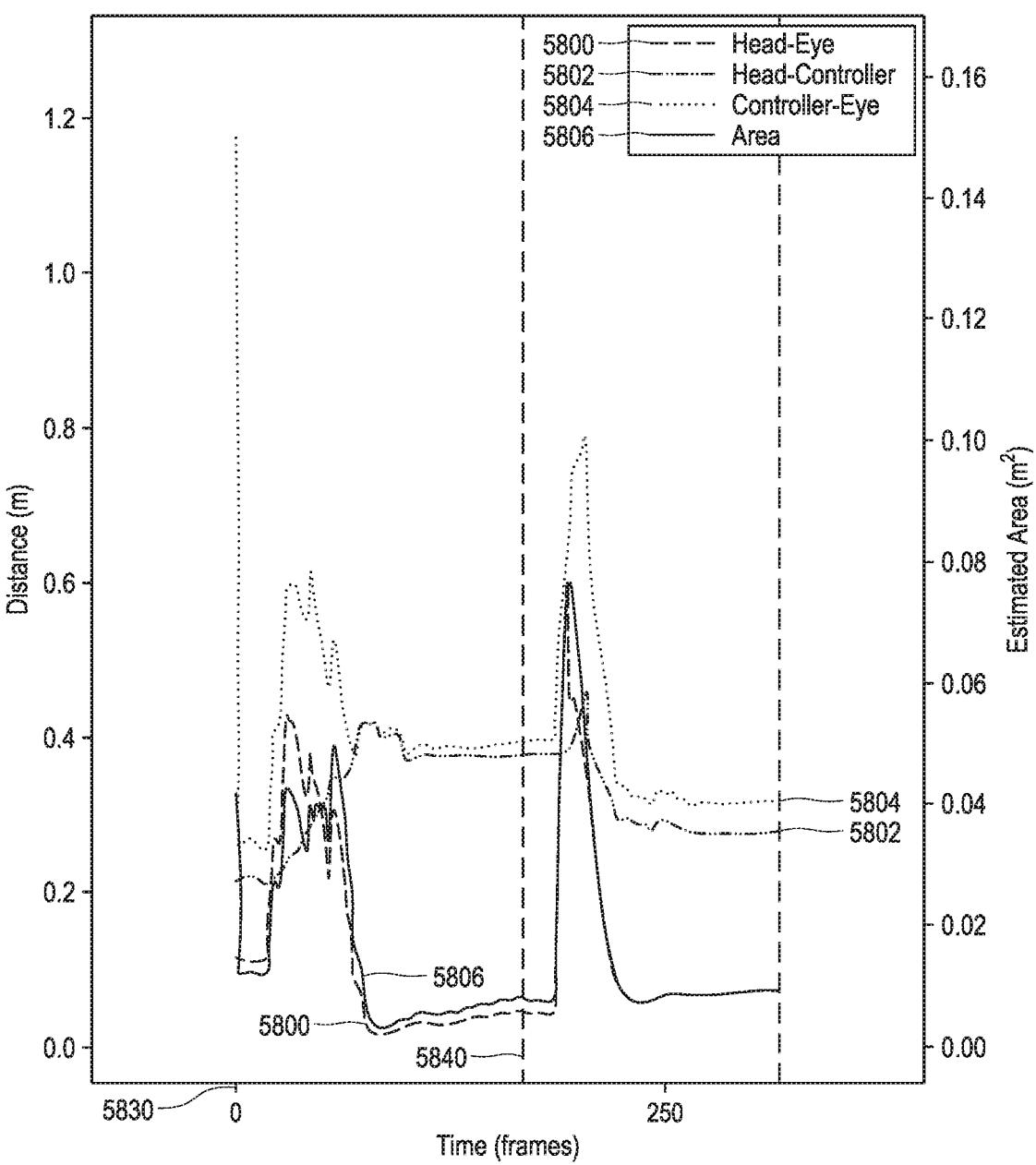
FIG. 58B is a graph of vergence distances of various input pairs and of the vergence area for a user interaction with dynamic transmodal input fusion enabled.

Example Graphs of Vergence Distances and Area for Converged and Divergent User Interactions FIGS. 58A and 58B are graphs of observed vergence distances of various input pairs and of the vergence area for user interactions with the wearable system, where a user was asked to track a static object using their head, eyes, and a controller. In the example of FIG. 58A, dynamic transmodal input fusion was disabled, while in the example of FIG. 58B dynamic transmodal input fusion was enabled. In the example of FIG. 58A, the user was presented with a static object at time 5810 at a first location, and then again at time 5820 at a second location. In the example of FIG. 58B, the user was presented with a static object at time 5830 at a first location, and then again at time 5840 at a second location.

FIGS. 58A and 58B show the changes over time of the head-eye vergence distance 5800, the head-controller vergence distance 5802, and the controller-eye vergence distance 5804. The head-eye vergence distance 5800 is the distance between the head pose input vector and the eye gaze input vector. Similarly, the head-controller vergence distance 5802 is the distance between the head pose input vector and a controller input vector. Additionally, the controller-eye vergence distance 5804 is the distance between the controller input vector and the eye gaze input vector. FIGS. 58A and 58B also graph the vergence area 5806, which may be indicative of the area of uncertainty associated with the user inputs (e.g., the uncertainty the system has in connection with the user's input tracking the object).

As shown in FIG. 58B (particularly when contrasted with FIG. 58A), transmodal filtering of the head pose and eye gaze input vectors significantly reduces the vergence area 5806 and the head-eye vergence distance 5800. In particular and after an initial spike as the user shifts their inputs to a newly-presented object at times 5830 and 5840, the head-eye vergence distance 5800 is drastically reduced by dynamic transmodal filtering. In the example of FIG. 58B, dynamic transmodal filtering may include identifying that the head pose and eye gaze inputs have converged and then integrating the inputs together and applying filtering to achieve a more accurate result than either input could achieve on its own.

The system can use information similar to the graphs in FIGS. 58A and 58B to determine a user's cognitive load (e.g., the effort being used in the working memory of the user). For example, the rates of rise of the graphs 5800-5804 or the temporal differences between the peaks of these curves represent the user's mental processing power that can be applied to the task. For example, if the cognitive load is low, the user can devote more working memory to the task, and the rise times may be steeper, and the peaks more closely spaced in time, because the user has sufficient cognitive load to accomplish the task (e.g., targeting a moving object). If the cognitive load is high, the user has less working memory to apply to the task, and the rise times may be less steep and the peaks spaced out longer in time, because the user takes longer to accomplish the task. Note that the rise time (to the peak) for eye inputs tends to be quicker than that for head input, and both tend to be quicker than for hand inputs (e.g., the head-controller graph 5802 can be seen in FIGS. 58A, 58B to have a less steep rise and a delayed peak relative to the head-eye graph 5800).

An Example of Dwelling and Feedback

Figures 59A, 59B:
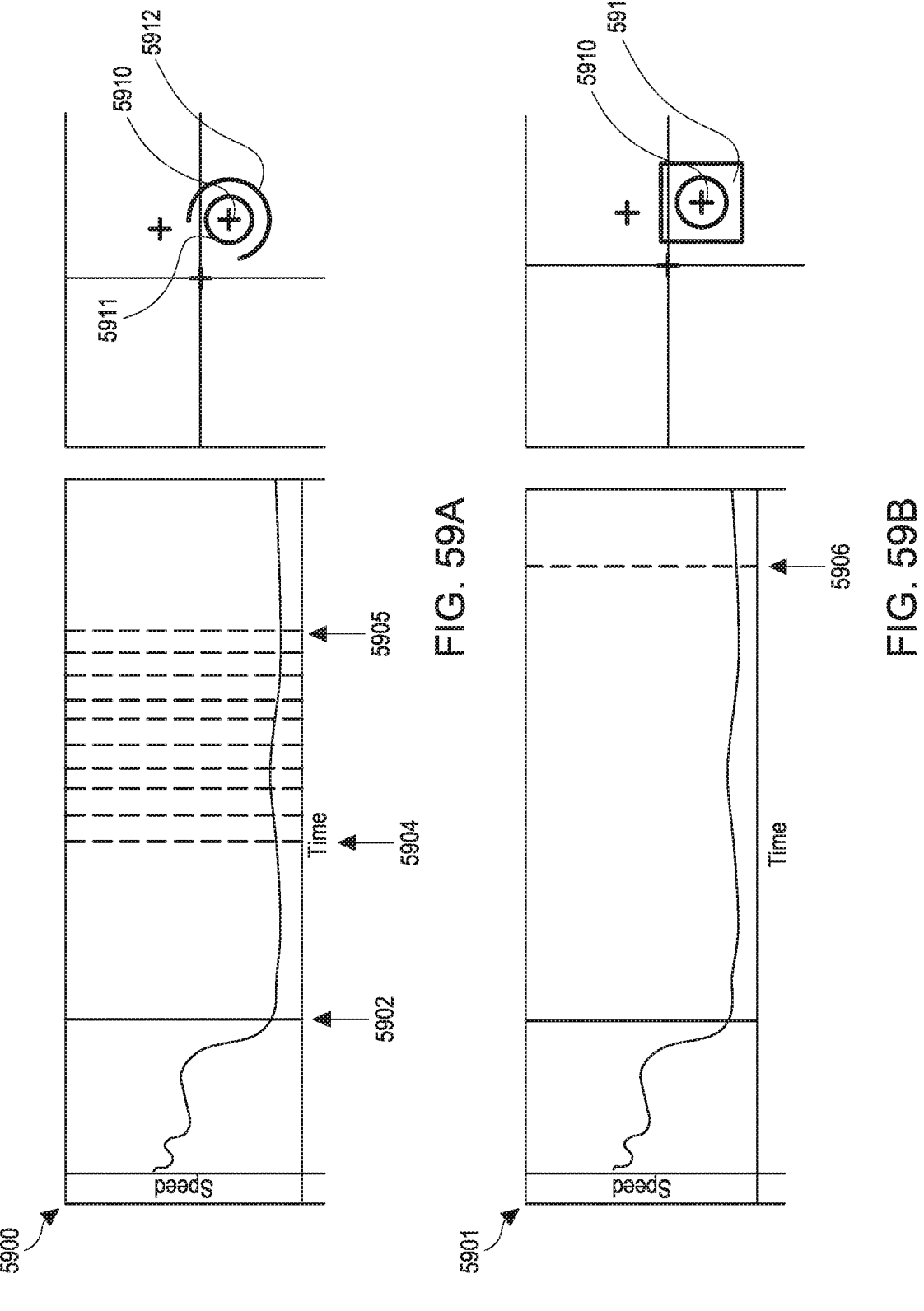
FIGS. 59A and 59B illustrate an example of user interaction and feedback during a fixation and dwell event.

FIGS. 59A and 59B illustrate an example of user interaction and feedback during a fixation and dwell event. In particular, FIGS. 59A and 59B show how a user may provide input by shifting their eye gaze input onto an object 5910, fixate on the object 5910, and dwell (e.g., linger) their gaze on the object 5910 for a threshold period of time. Graphs 5900 and 5901 show the rate of change (e.g., speed) of the user's eye gaze input over time.

At time 5902, the user finished shifting their eye gaze onto the object 5910. If desired, the system may provide feedback to the user. The feedback may take the form of indicator 5911 and may indicate that the object 5910 is at least temporarily selected.

After the user's gaze has dwelled on the object 5910 for an initial threshold period (represented by time 5904), the system may provide feedback 5912 to the user. In some cases, the dwell time 5904 for an eye on an object is about 500 ms. The feedback 5912 may be in the form of a progress bar, a progress arc, or other such mechanism to show roughly what percentage of dwell time has been completed to successfully provide a dwelling user input. As one example, feedback 5914 may take the form of a continuously or progressively updated fixation arc. In at least some embodiments, the fixation arc 5914 may be stepped closer to completion as the user's eye gaze fixations for incrementally longer lengths of time (e.g., as indicated by the vertical dashed lines in graph 5900.

After the user's gaze has dwelled on the object 5910 for a threshold period (represented by time 5906), the system may provide feedback 5914 to the user. The feedback 5914 may be in any desired form such as a completed progress bar, a completed progress arc, highlighting of the object, etc. In the illustrated example of FIG. 59B, feedback 5914 is in the form of a completed square surrounding object 5910.

Although this is example is based on eye gaze, the concepts are applicable to other sensor input modalities, e.g., head pose, hand input, etc., alone or in combination with other inputs. For example, the dwell time 5904, 5906 for either eye gaze or head pose toward an object may be about 500 ms, but if both eye gaze and head pose inputs converge on the object, the dwell time might reduce to 300 ms for the system to determine the user has selected the object, given the greater certainty in targeting due to the convergence of these two input modes.

Examples of Personalization for Transmodal Input Fusion Techniques

A wearable system can monitor a user's interaction with the 3D environment and how the sensors tend to converge or diverge during use. The system can apply machine learning techniques to learn the user's behavior patterns and convergence/divergence tendencies. For example, a user may have unsteady hands (e.g., due to genetic effects, age, or disease) and therefore there may be more jitter associated with hand inputs, because the user's hand tends to shake during totem usage. The system can learn this behavior and adjust thresholds (e.g., increasing the variance threshold to determine convergence of hand input with other input(s)) or apply suitable filtering to compensate for the user's hand jitter (e.g., by adjusting a cutoff frequency in a low pass filter). For a user with more steady hands, the thresholds or filters can be set differently by the system, since the hand sensor input for that user would display less jitter. Continuing with this example, the system can learn how a particular user picks up or grasps objects, by learning the sequence and timing of sensor convergences (or divergences) that are particular to that user (see, e.g., the time sequences of head-eye-controller vergences in FIG. 58B).

Accordingly, the system can provide an improved or maximal user experience for any particular user by adaptively integrating the appropriate set of converged inputs for that particular user. Such personalization may be beneficial for users with poor coordination, illness, age, etc., by permitting the system to customize thresholds and filters to recognize input convergence (or divergence) more readily.

Transmodal input techniques can permit a wearable system to operate more efficiently. The wearable system can include numerous sensors (see, e.g., the sensors described with reference to FIG. 16) including both inward-facing and outward-facing cameras, depth cameras, IMUs, microphones, a user input device (e.g., a totem), electromagnetic tracking sensors, ultrasonic, radar, or laser sensors, electromyogram (EMG) sensors, etc. The system may have processing threads that track each sensor input. The sensor processing threads may updated at a lower rate until a convergence event is identified, and then the sensor update rate (at least for converged inputs) can be increased, which improves efficiency by having higher update rates only for the converged sensor inputs. As described above, the system can learn user behavior and predict which sensor input(s) may converge based on a time history of other sensor convergences. For example, convergence of head and eye inputs onto a target object may indicate the user is attempting to grasp or interact with the target object, and the system can accordingly predict that hand input will converge soon thereafter (e.g., a few hundred milliseconds or up to a second or so later in time). The system can increase the hand sensor thread update rate based on this prediction, prior to the hand sensor input actually converging. Such predictive abilities can provide the user with zero or little perceived latency in the response of the wearable system, because the converged—or soon to be converged—sensors have increased update rates, reducing latency or lag in the system.

As another example, the system can initiate (or wake up) certain processing routines based on the convergence (or not) of sensor inputs. For example, realistically rendering a virtual diamond in the user's environment may require processor-intensive subsurface scattering (or subsurface light transport) techniques to be applied to convey the sparkle of the virtual diamond. Performing such computationally-intensive tasks every time a user glances at or near the virtual diamond can be inefficient. Therefore, by detecting a spatial convergence (e.g., of the user's head, eye, and hand inputs) or a temporal convergence (e.g., eye fixation on the diamond for greater than a dwell time), the system can perform the computationally-intensive subsurface rendering techniques only when convergence indicates the user is interacting with the virtual diamond (e.g., by looking at it for a long time, reaching out to grasp it, etc. This can lead to improved efficiency, because these processing routines are only executed when necessary. Although described for a subsurface scattering or light transport technique, other computationally-intensive augmentation techniques can additionally or alternatively be applied such as, e.g., reflection maps, surface shimmer effects, subsurface scattering, gaseous lensing and refraction, particle counts, advanced high dynamic range (HDR) rendering or lighting methods, etc.

As yet another example, the user's head may be turning toward an object. The system can predict that the user's head will be pointed at the object at a particular time in the future, and the system can begin rendering (or preparations for rendering) virtual objects so that when the user's head has arrived at the object at the future time, the system will be able to render the virtual object(s) with little or no perceived latency.

User history, behavior, personalization, etc., can be stored as a component of the world map or model 920, e.g., locally or remotely (e.g., in the cloud). The system may start with a default set of transmodal parameters that are successively improved as the system learns and adapts to user behavior. For example, the world map or model 920 may include a transmodal interaction profile for the user with information on thresholds, variances, filters, and so forth that are particular to that user's way of interacting with the real or virtual world. Transmodal input fusion is user-centric in which the appropriate set of sensor inputs that have converged—for that particular user—are integrated together to provide improved targeting, tracking, and interactions.

Example Wearable Systems with Electromyogram (EMG) Sensors

Figure 60A:
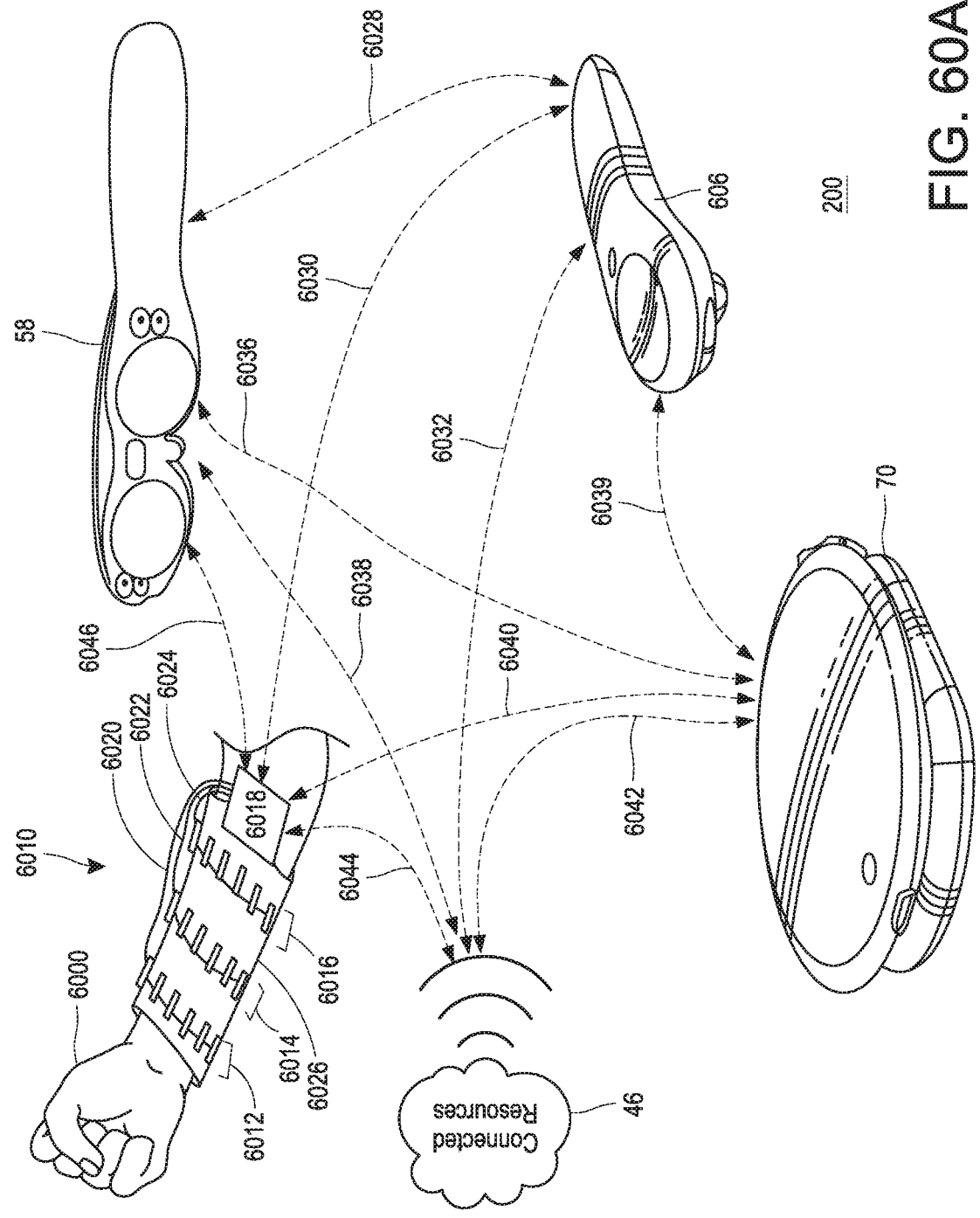
FIGS. 60A and 60B illustrate examples of a wearable system that includes at least one neuromuscular sensor such as, e.g., an electromyogram (EMG) sensor, and that can be configured to use embodiments of the transmodal input fusion techniques described herein.
Figure 60B:
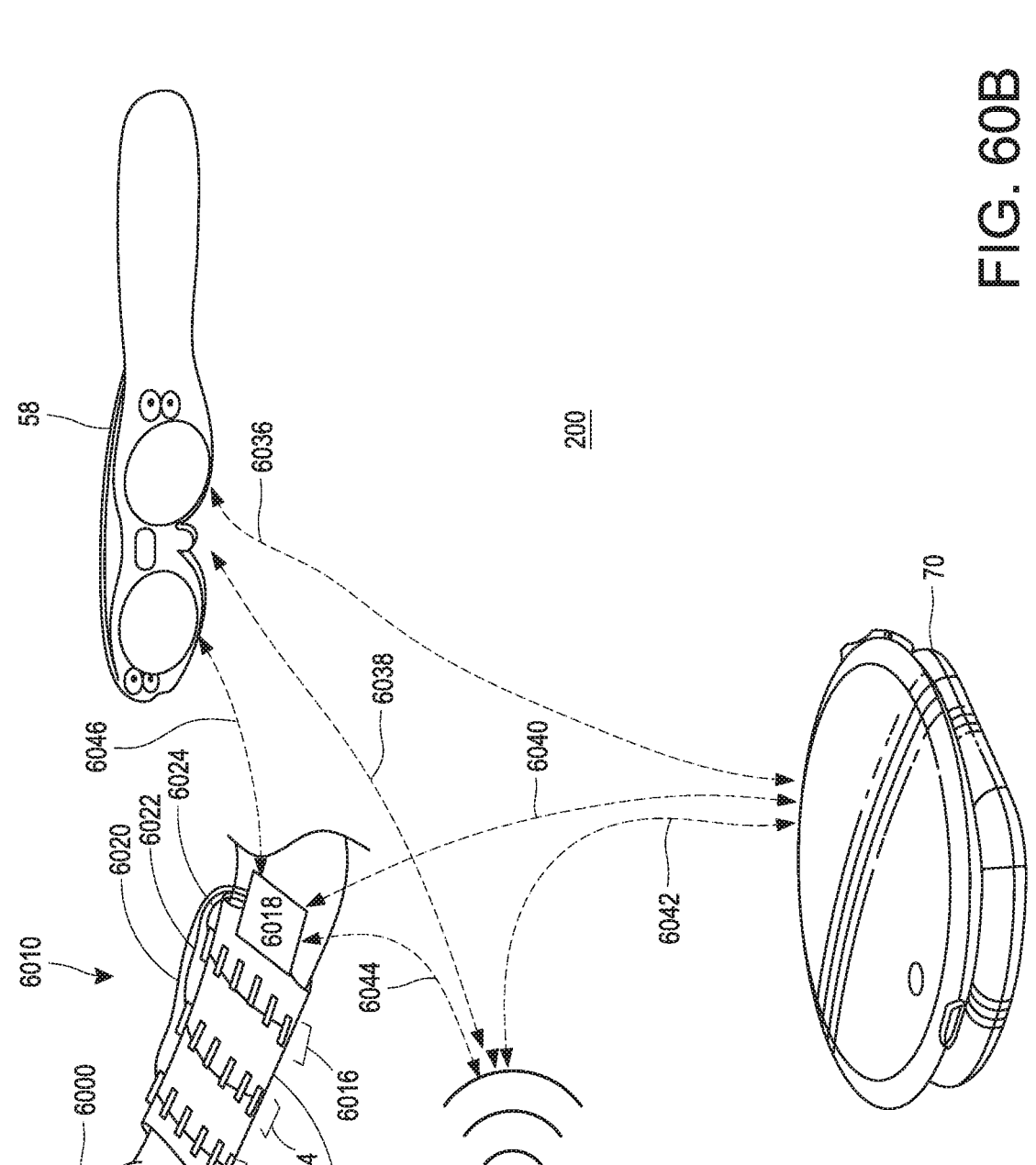

In some embodiments, fine motor control may be enabled by additional sensors, such as depicted in FIGS. 60A and 60B that provide positional feedback or additional sensor input. For example, an electromyogram (EMG) sensor system as described herein may provide controller or gesture data, which may serve as an additional or alternative input in a transmodal input system and may facilitate precise selection and user input. Like other input modes described herein, inputs received through the EMG system may be opportunistically fused with other input modes, when the inputs converge, thereby improving the speed or accuracy of the EMG inputs and any other fused inputs. Accordingly, EMG sensor input can be utilized with any of the transmodal, multimodal, or cross modal techniques described herein. EMG sensor is a broad term as used herein and may include any type of sensor configured to detect neuromuscular activity or neuromuscular signals (e.g., neural activation of spinal motor neurons to innervate a muscle, muscle activation, or muscle contraction). EMG sensors can include mechanomyography (MMG) sensors, sonomyography (SMG) sensors, etc. EMG sensors may include an electrode configured to measure electric potentials on the surface or inside the body, a vibration sensor configured to measure skin surface vibrations, an acoustic sensor configured to measure acoustic (e.g., ultrasound) signals arising from muscular activity, etc.

Referring to FIGS. 60A and 60B, additional embodiments are illustrated wherein electromyogram, or EMG, technologies may be utilized to assist in determining the position of one or more portions of the user's body, such as the positions of one or more of the fingers or thumb of the user and/or the positions of one or more of the hands of the user, when the user is operating a wearable computing system. An example of a wearable computing system is depicted in FIG. 60A, comprising a head mounted module 58, a handheld controller module 606, and a belt pack or base module 70 (modules which are further described herein, e.g., at least in connection with FIG. 2B), each of which may be operatively coupled 6028, 6032, 6034, 6036, 6038, 6042, such as via wired or wireless connectivity configuration (such as IEEE 802-11 connectivity configurations, Bluetooth wireless configurations, and the like), to each other, and to other connected resources (46, such as, e.g., cloud resources, which may also be referred to as computing resources for storage and/or processing).

EMG technologies can be utilized in various sensor configurations, such as, e.g., an in-dwelling electrode, or a surface electrode, to monitor the activation of muscles or muscle groups. With modern manufacturing and connectivity advancements, EMG electrodes may be utilized to form systems or aspects of systems which are unconventional relative to previous uses. Referring again to FIG. 60A, a cuff or other coupling platform (6026) may be utilized to couple one or more EMG electrodes against a portion of the body, such as the forearm proximal of the hand (6000). The EMG electrodes may be operatively coupled (6020, 6022, 6024; such as via direct wire lead or wireless connectivity) to a local controller module (6018), which may be configured to have on-board power, such as via a battery, a controller or processor, and various amplifiers to assist in reducing signal to noise ratio in observing information generated from associated EMG electrodes (in the depicted embodiment, three arrays, 6012, 6014, and 6016 of non-indwelling EMG surface electrodes are illustrated; however this is for illustration and is not a limitation). The EMG-related signals may be passed by the local controller module (6018), or directly from the electrodes (6012, 6014, 6016) themselves if so connected, to other modules (70, 606, 58, 46) of the operatively coupled system utilizing wired or wireless connectivity (6044, 6040, 6030, 6046) configurations, such as, e.g., IEEE 802-11 connectivity configurations, Bluetooth wireless configurations, and the like.

Referring again to FIG. 60A, the EMG electrodes may be placed relative to the user's anatomy, so that they may be utilized to track the activation of various muscles known to produce various movements in the related joints, such as by tracking the muscles that pass through the carpal tunnel of the wrist to move the various joints of the hand, to produce, for example, hand movements such as gestures. In various configurations, the EMG electrodes can be placed on or in a user's anatomy such as, e.g., on a finger, an arm, a leg, a foot, the neck or head, the torso, and so forth. Multiple EMG electrodes can be placed on or in the user's anatomy so as to detect muscular signals from multiple muscles or muscle groups. The configuration shown in FIGS. 60A and 60B is intended to be illustrative and not limiting.

In one embodiment, with all of the illustrated modules operatively coupled to each other, a central processor, which may reside, for example in the belt pack or base module 70 or on the cloud 46 may be utilized to coordinate and refine the tracking of hand 6000 gestures, which may be visible by camera elements (such as, e.g., world camera(s) 124 of the head mounted wearable 58 of FIG. 2B) of the head mounted module 58. The gestures may also be tracked in certain embodiments by features of the handheld controller module 70, which also may feature certain camera elements (such as world camera(s) 124 of the hand held component 606 of FIG. 2B) which may be capable of capturing information regarding various aspects of the hand 6000 position, depending upon the position/orientation of the various camera elements and the position/orientation of the pertinent hand 6000 of the user. In other words, in one embodiment, EMG data predictive of hand motions may be utilized alone or along with camera-based data pertaining to observations of the hand, to assist in refining the system's prediction of where the hand is in space relative to the various other modules, and what the various portions of the hand are doing.

For example, one or more camera views may be utilized to provide a prediction that the user is making the American nonverbal "OK" symbol with his or her thumb and index finger (an example of an "OK" sign is shown in FIG. 42C). The EMG data associated with the various muscles passing through the carpal tunnel of the user may be observed to further the understanding that, indeed, the thumb and index finger of the user seem to be flexed in a manner commonly correlated with making of the American nonverbal "OK" symbol—and thus the system is able to provide a more accurate prediction regarding what the user is doing. This perception of "OK" may be fed back into the system to provide an indication from the user that whatever next step, dialog box, or the like, is accepted within the software which may be operated by the user as he or she wears the various wearable computing modules 70, 606, 58, 6010—wearable EMG module. In one variation, for example, at a given operational juncture the associated software may present the user with a dialog box asking the user to select "OK" or "reject"; this dialog box may be observed by the user through the head mounted module 58 in an augmented reality or virtual reality visualization mode, for example. In this illustrative example, to select the "OK" button in the software, the user may produce the "OK" symbol with his hands, as described above. The three arrays may be utilized to assist with common mode error rejection in refining the EMG module output, and/or may be utilized to observe different muscles or portions thereof, to assist in the observation of what is going un underneath the user's skin that is likely to be correlated with a movement of, for example, the hand of the user.

Although the foregoing example is described in the context of hand gestures (and in particular an "OK" symbol), this is for illustration and is not a limitation of the EMG sensor system. As described above, EMG electrodes can be placed on or in the user's anatomy to measure signals from other muscle groups so as to determine that the user is making any form of gesture (e.g., a nonverbal symbol). Examples of gestures (or nonverbal symbols) have been described with reference to the gestures 2080 of FIG. 20 or the gestures described with reference to FIGS. 42A-42C. Thus, the EMG system can measure gestures, nonverbal symbols, positions, or movements by fingers, arms, feet, legs, the torso (e.g., twisting or bending), the neck or head, and so forth.

Referring to FIG. 60B, for illustrative purposes, an embodiment similar to that of FIG. 60A is depicted, but without an interconnected handheld module 606, as such handheld module may not be needed or desired for certain system configurations or functional paradigms.

Additional Examples of Transmodal Input Fusion Techniques

This section provides additional details regarding examples of various implementations of transmodal input fusion. Transmodal input fusion may provide opportunistic feature fusion of multimodal input using egocentric motion dynamics to improve interaction fidelity. These example implementations are intended to be illustrative and not limiting. These techniques can be performed by the wearable display systems described elsewhere in this application (see, e.g., the wearable systems 200 described with reference to FIGS. 2A and 2B). Any particular wearable system may implement one, some, or all of these functionalities and techniques or may implement additional of different functionalities and techniques.

The following provides an explanation of some of the terms used for transmodal fusion techniques described herein. These explanations are intended to be illustrative and not to be limiting:

Elements: Discrete Interactive Display Items.

Primary Targeting Vector: dominant input pose vector used to steer spatial targeting methods (e.g., raycast, conecast, ballcast, hittests or normals associated with a collider)

Input Pose Vector: A pose obtained from standard system modal inputs. This can be a head gaze pose, eye gaze pose, controller pose or hand pose. It can also be from crossmodal statically blended inputs that create statically fused pose vectors such as controller and touchpad or eye gaze and touchpad derived poses.

Interaction Field: This can be based the effective reach of the user and constrained by overlapping limits from fields of sensing, fields of display and audio fields.

Region of Intent (ROI): This can be a volume constructed from the overlapping uncertainty regions (volumes) associated with the set of targeting vector pairs or triplets.

Identification of the transmodal state: The identification of the transmodal state can be performed through the analysis of the relative convergence of all defined and available input targeting vectors. This can be achieved by first examining the angular distance between pairs of targeting vectors. Then the relative variance of each pair is examined. If the distances and variances are below defined thresholds then a bimodal state can be associated with a pair. If a triplet targeting vectors have a set of angular distances and variances below defined thresholds then an associated area can be established. In the case of a head pose targeting vector (head gaze), eye vergence targeting vector (eye gaze) and tracked controller or tracked hand (hand pointer) targeting vector triplet is created that match these requirements it is called a transmodal triangle. The relative size of the triangle sides, area of this triangle and its associated variances present characteristic traits the can be used to predict targeting and activation intent. The group motion of targeting vector pairs (bimodal), or triplets (trimodal) (or large groups of sensor inputs, e.g., 4, 5, 6, 7, or more) can be used to further define the exact subtype of transmodal coordination.

Selection and configuration of fusion methods: The appropriate fusion method can be identified based on the detailed transmodal state of the input system. This can be defined by the transmodal type, the motion type, and the interaction field type. The defined fusion type determines which of the listed input modes (and associated input vectors) should be selectively fused. The motion type and field type determine the fusion method settings.

The techniques described herein can allow the user to select smaller elements by reducing the uncertainty of the primary input targeting method. The techniques described herein can also be used to speed up and simplify the selection of elements. The techniques described herein can allow the user to improve the success of targeting moving elements. The techniques described herein can be used to speed up rich rendering of display elements. The techniques described herein can be used to prioritize and speed up the local (and cloud) processing of object point cloud data, dense meshing and plane acquisition to improve the indentation fidelity of found entities and surfaces, along with grasped objects of interest.

The techniques described herein allow, for example, a wearable system 200, to establish varying degrees of multimodal focus from the user's point of view while still preserving small motions of the head, eye and hands, greatly enhancing the system understanding of user intent.

Examples of some of the functionality that the transmodal input fusion techniques can address are described below. This functionality includes, but is not limited to: Targeting small elements; Rapidly targeting static close proximity elements; Targeting dynamically moving elements; Managing the transition between nearfield and midfield targeting methods; Managing the transition between relative targeting methods; Managing the activation of elements; Managing the manipulation of elements; Managing the transition between macro and micro manipulation methods; Managing the deactivation reintegration of elements; Managing the active physical modeling elements; Managing the active rendering of display elements; Managing the active acquisition of dense point clouds; Managing the active acquisition of dense meshes; Managing active acquisition of planar surfaces; Managing active acquisition of dynamic found entities; and Managing active modeling of grasped found entities.

(1) Targeting small elements: This technique can provide for targeting small elements (discrete interactive display items). Targeting small items at a distance may be inherently difficult. As the presented size of the target item decreases to within the limit of accuracy it may become increasingly difficult to reliably intersect with a projected targeting mechanism. Opportunistically fusing multimodal inputs can act to increase effective accuracy by decreasing uncertainty in the primary targeting vector. Embodiments of the wearable system 200 can perform any combination of the following actions: Identifies the current transmodal state; Identifies the ROI defined by transmodal vergence and fixation; Identifies the corresponding interaction field (near/mid/far); Selects the correct input fusion method and settings for the (static/pseudo-static/dynamic) primary targeting vector; Applies defined conditioning to the primary targeting vector; Communicates stabilized pose vector with increased confidence to application; Reduces targeting vector registration error, jitter and drift; and Enables confident targeting of smaller elements near or far (compared to modal targeting methods).

(2) Rapidly targeting static close proximity elements: This technique can provide for reliably targeting static elements that are in close proximity. Objects that are in close proximity can be inherently difficult to resolve and reliably target because the separation distance can be below the accuracy of the primary input vector. Using the conditioned input pose vector to target static, close proximity targets provides an improvement in accuracy with limited change in perceivable latency. Embodiments of the wearable system 200 can perform any combination of the following actions: Identifies the current transmodal state; Identifies the ROI defined by transmodal vergence and fixation; Identifies the corresponding interaction field (near/mid/far); Selects the correct input fusion methods for the (pseudo-static) primary targeting vector; Applies defined conditioning to the primary targeting vector; Presents stabilized pose vector with increased confidence to application; and Reduces time to fixation and dwell.

(3) Targeting dynamically moving elements: This technique can provide for reliably targeting moving elements. This includes translating, rotating or scaling relative to the display or relative to the world. Moving objects can be inherently difficult to pursue when in a dynamic environment. Such targeting can be more challenging when presented with the increased number of degrees of freedom offered by world distributed, dynamic 3D content and head and eye driven display methods. Embodiments of the wearable system 200 can perform any combination of the following actions: Identifies the ROI defined by transmodal vergence and fixation; Identifies the corresponding interaction field (near/mid/far); Selects the correct input fusion methods for the (dynamic) primary targeting vector; Communicates stabilized pose vector with increased confidence to application; Reduces targeting vector registration error, jitter and drift; and Enables confident targeting of smaller elements near or far, moving at greater speeds with nonlinear velocities (compared to modal targeting methods).

(4) Managing the transition between nearfield and midfield targeting methods: This technique provides for marshaling between near field targeting mechanics and midfield-farfield targeting methods. There are multiple methods for direct and indirect targeting methods. Typically direct methods occur in the near field and indirect methods target content in the midfield and farfield. Understanding if the region of intent (ROI) is in the near field or the midfield allows for selection between groups of methods it also presents an opportunity and method for identifying field transition events and handling associated transitions in interaction mechanics to reduce the need to explicitly manage mode changes in an application layer. Embodiments of the wearable system 200 can perform any combination of the following actions for active transmodal intent: Identifies the ROI defined by transmodal vergence and fixation; Identifies the corresponding interaction field (near/mid/far); Selects the correct input fusion methods for the (dynamic) primary targeting vector; and Presents stabilized pose vector increased confidence to application.

(5) Managing the transition between relative targeting methods: This technique can provide for confidently selecting the best or most likely interaction mechanic within an interaction field. Embodiments of the wearable system 200 can perform any combination of the following actions for active transmodal intent: Identifies the current transmodal state; Identifies the ROI defined by transmodal vergence and fixation; Identifies the corresponding interaction field (near/mid/far); Selects the most appropriate targeting vector beginning and end point for the primary input vector; and Manages any transition between targeting vectors (on same mode or between modes). May enforce a pre-targeting "cool down" period between targeting feedback in order to reduce any disorientation induced from target vector changes in the field of view (FOV).

(6) Managing the activation of elements: Embodiments of the wearable system 200 can perform any combination of the following actions for active transmodal intent: Identifies the current transmodal state; Identifies the ROI defined by transmodal vergence and fixation; Identifies the corresponding interaction field (near/mid/far); Presents stabilized pose vector increased confidence to application; and Enables confident activation of smaller elements near or far, moving at greater speeds with nonlinear velocities (compared to modal targeting methods).

(7) Managing the manipulation of elements: Embodiments of the wearable system 200 can perform any combination of the following actions: Identifies the current transmodal state; Identifies the ROI defined by transmodal vergence and fixation; Identifies the corresponding interaction field (near/mid/far); Presents stabilized pose vector increased confidence to application; Enables confident steering and manipulation of smaller elements near or far, moving at greater speeds with nonlinear velocities (compared to modal targeting methods); Enables confident micro-steering and manipulation of elements; and Enables confident micro-steering actions.

(8) Managing the transition macro and micro manipulation methods: Embodiments of the wearable system 200 can perform any combination of the following actions for active transmodal intent: Identifies the ROI defined by transmodal vergence and fixation; Identifies the corresponding interaction field (near/mid/far); Identifies the relevant modal macro interaction mechanic, checks to see if augmentation is enabled; Activates the relevant micro-interaction management method; Identifies if transmodal divergence has occurred; and Prepares the system for the deactivation of operating microgestures by reducing transmodal confidence.

For example: Hand Gesture Pinch. Can be actively augmented with micro-pinch manipulations such as thumb_index_joint_tap or index_thumb_slide actions, but these methods may be enabled only when in robust tracking regions, speeds and confidences along with a robust measure of user focus (e.g., fixation or dwell time exceeding a user focus threshold time of, e.g., a few hundred to a few thousand ms). Transmodal fixation serves as a more robust method to conditionally activate micro-gesture analysis.

(9) Managing the deactivation and integration of elements: Embodiments of the wearable system 200 can perform any combination of the following actions for active transmodal intent: Identifies the current transmodal state; Identifies the ROI defined by transmodal vergence and fixation; Identifies the corresponding interaction field (near/mid/far); Presents stabilized pose vector increased confidence to application; and Enables confident micro-motions that can lead to more robust modal input state changes.

For example: greater confidence for transitions from pinch_touch to pinch_hover to pinch_end lead to more predictable virtual object release and detachment behaviors.

For example: greater confidence of hand trajectories and pose transitions when partially occluded can lead to better deactivation recognition and present more reliable end state properties. This can lead to more reliable detachment behaviors, more robust throw mechanics and more realistic physical behavior.

(10) Managing the physical modeling of elements: Embodiments of the wearable system 200 can perform any combination of the following actions for active transmodal intent: Identifies the current transmodal state; Identifies the ROI defined by transmodal vergence and fixation; Identifies the corresponding interaction field (near/mid/far); Presents stabilized pose vector increased confidence to application; Enables confident custom treatment of local conditions resulting from standard (e.g., simulated) physical interactions in ROI that can lead to more robust state changes in the physics engines; and Enables efficient management and context driven optimization of advanced (e.g., simulated) physical behaviors such as hyperlocal soft body simulation inelastic collisions or liquid simulation.

For example: greater confidence of resulting behavior of thrown or placed objects presents a more predictable and intentional physical behavior.

(11) Managing the active rendering of display elements: Embodiments of the wearable system 200 can perform any combination of the following actions for passive transmodal intent: Identifies transmodal fixation point, defines an extended region of intent based on transmodal fixation time and predicted dwell time; Identifies if region of intent intersects with a rendering element and augmentation options; Identifies available augmentation that are compatible with ROI, fixation time and predicted dwell time; Activates optimal rendering augmentation options (that may require second and third rendering pass) such as level of detail (LOD) methods that can be activated during predicted dwell time; and Detects transmodal divergence and manages rendering priority. Activating such LOD methods may, for example, include increasing the resolution or quality of virtual content or other graphics that are displayed or otherwise presented to a user. Similarly, in some implementations, activating such LOD methods may include increasing the quality of audio that is output to a user.

For example: detailed reflection maps, surface shimmer effects, subsurface scattering, gaseous lensing and refraction, particle counts, advanced high dynamic range (HDR) rendering or lighting methods, etc. These proposed mechanics can be different from typical foveated rendering techniques driven by eye vergence locations and tend to use first order/first pass rendering methods to manage polygon count, pixel density and typically must work on different time scales in order to remain imperceptible. Using transmodal fixation and dwell allows for the inclusion of higher latency rendering options that are typically not attempted on mobile platforms due to compute constraints.

(12) Managing active acquisition of dense point clouds: Embodiments of the wearable system 200 can perform any combination of the following actions for passive transmodal intent: Identifies the ROI defined by transmodal vergence and fixation; Identifies the corresponding interaction field (near/mid/far); Accelerate the processing point clouds of interest; and improves object interaction fidelity by preparing for direct observation and interaction.

For example object bound dense point clouds for found entities for rich element interaction on surface of found entity (dynamic object textures).

(13) Managing active acquisition of dense meshes: Embodiments of the wearable system 200 can perform any combination of the following actions for passive transmodal intent: Identifies the ROI defined by transmodal vergence and fixation; Identifies the corresponding interaction field (near/mid/far); Accelerate the processing dense meshes of interest; and improves object interaction fidelity by preparing for direct observation and interaction.

For example: foveated meshing to improve dense mesh occlusion of objects in the near field or non-planar surface touch interactions.

(14) Managing active acquisition of planar surfaces: Embodiments of the wearable system 200 can perform any combination of the following actions for passive transmodal intent: Identifies the ROI defined by transmodal vergence and fixation; Identifies the corresponding interaction field (near/mid/far); Accelerate the processing of fast planes of interest; and Improves surface interaction fidelity by preparing for direct observation and interaction.

For example: to improve surface touch interactions and actively reduce errors in surface touch tracking.

(15) Managing active acquisition of dynamic found entities: Embodiments of the wearable system 200 can perform any combination of the following actions for active transmodal intent: Identifies the ROI defined by transmodal vergence, fixation and smooth pursuit; Identifies the corresponding interaction field (near/mid/far); Accelerate the processing of found entities of interest; and Improves found entity interaction fidelity by preparing for dynamic motion or interaction.

For example: Preemptively preparing the system for interaction with found entities can reduce the apparent latency of dynamic found entity tracking.

(16) Managing active grasping of dynamic found entities: Embodiments of the wearable system 200 can perform any combination of the following actions for active transmodal intent: Identifies the ROI defined by transmodal vergence, fixation and smooth pursuit; Identifies the corresponding interaction field (near/mid/far); Accelerate the processing of found entities of interest; Enable the local processing of found entities of interest; and Improves found entity interaction fidelity by preparing for hand grasp based dynamic interaction.

For example: Preemptively preparing the system for interaction with hand tracking with grasped objects can reduce the apparent latency of grasped object tracking, or improve real-time object segmentation methods and improve hand pose estimation when grasping objects. Frequently grasped objects can result in better segmentation models in the cloud which can be used for a personalized user specific optimizations for grasped hand tracking.

The foregoing functionalities can be provided by various implementations of the transmodal input fusion techniques and are not limiting. Wearable systems (e.g., such as the wearable system 200) can perform embodiments of one, some, or all of these techniques or may perform additional or different transmodal input fusion techniques. Many variations and combinations are possible.

Example Software Code

Appendix A includes an example of code in the C# programming language that can be used to perform an example implementation of the transmodal input fusion technology described herein. In various implementations, the program in Appendix A can be performed by the local processing and data module 260, the remote processing module 270, the central runtime server 1650, the processor 128, or other processor associated with the wearable system 200. The disclosure of Appendix A is intended to illustrate an example implementation of various features of the transmodal input fusion technology and is not intended to limit the scope of the technology. Appendix A is hereby incorporated by reference herein in its entirety so as to form a part of this specification.

Example Neurophysiological Approaches to Transmodal Input Fusion Techniques

Without intending to be bound or limited by any particular neurophysiological model or sensorimotor paradigm, certain embodiments of the transmodal input fusion systems and methods may apply or leverage teachings from such models or paradigms to, e.g., sensor convergence or divergence, transmodal input fusion techniques, sensor input filtering, identification or characterization of the transmodal state, operations to be performed using transmodally fused inputs, and so forth.

For example, many leading theories in the area of neurophysiology contend that the kinematic and dynamic properties of human motor behavior are too vast and complex to reasonably be governed by a single internal model or computational scheme. Instead, it has been postulated that the human brain employs a modular computational architecture. Examples of theoretical architectures that may be useful in describing this human sensorimotor paradigm or aspects thereof may include Multiple Paired Forward-Inverse Models ("MPFIM"), the Mixture-of-Experts architecture, the Modular Selection and Identification for Control ("MOSAIC") model, and the like. In some implementations, certain aspects of one or more of the systems and techniques described herein may be functionally similar or analogous to those of such theoretical architectures.

Within such an architecture, switching between multiple different "modules" (also referred to as "synergies" or "coordinative structures") may be performed on the basis of context. Each module may physically correspond to a neurophysiological mechanism, but may logically represent a complex dynamical system that may be described using differential equations and configured to carry out a particular motor or sensorimotor control strategy.

In some examples, each module may contain both a forward model and an inverse model. Such an inverse model may, for instance, be seen as being specialized for a particular behavioral context, while a corresponding forward model may be seen as serving to determine the "responsibility" for such an inverse model in the current context. In operation, the inverse model may receive a reference input indicative of a target sensory state, and in turn compute and provide a motor command (e.g., one or more muscle activation signals) to the "plant" or motor unit in the system (e.g., one or more muscles). The plant may then act out the motor command, which effectively yields a new sensory state. The inverse model may also provide an efference copy of the motor command to the forward model, which may in turn compute a predicted sensory state. The new sensory state may be evaluated against the predicted sensory state to generate an error signal, which may be leveraged as feedback by the inverse model to correct current movement or otherwise improve system performance. Indeed, the feedback loop formed between the forward model and the inverse model yields an inevitable mutual influence between the inputs to and outputs of the module.

In some embodiments, one or more of the transmodal input fusion systems and techniques described herein may seek to detect occurrences of switching events in which one or more modules are activated, deactivated, or a combination thereof. To do so, one or more of the systems described herein may monitor module outputs (e.g., movements and positions of muscles, joints, or other anatomical features capable of being tracked by electronic sensing components of the system) for signs of feedback stabilization processes, which may occur immediately following or relatively soon after the activation of a given module (e.g., by virtue of its respective step response), or signs of other operational bifurcation points. Such feedback stabilization processes can yield stochastic convergence between at least one pair of inputs to or outputs from the module. That is, inputs to or outputs from the module can become increasingly influential on each other as the module initially stabilizes itself upon activation. For example, changes in statistical variance, covariance, or correlation between a given pair of module outputs monitored by the system may be indicative of convergence events (e.g., module activation, increase in module control contribution, etc.), divergence events (e.g., module deactivation, decrease in module control contributions, etc.), and the like.

Additional Considerations

Although certain examples of transmodal input fusion have been described herein in the context of AR/MR/VR systems, this is for illustration and not limitation. Embodiments of the transmodal input fusion techniques described herein can be applied to, for example, robotics, drones, user-guided perception, human-machine interaction, human-computer interaction, brain-computer interfaces, user experience design, and so forth. For example, a robotic system or drone can have multiple input modes and transmodal techniques can be used to dynamically determine which of the multiple inputs have converged and utilize the converged input modes as set forth above.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. Further, the transmodal techniques can utilize dynamic monitoring of sensor inputs to detect convergence and divergence events and may utilize complex hardware processor or firmware based solutions in order to execute in real time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc., may be at least one of X, Y or Z. Thus, such conjunctive language is not generally intended to imply that certain embodiments require at least one of X, at least one of Y and at least one of Z to each be present.

The term "threshold," as used herein, refers to any possible type of threshold. As examples, the term "threshold" includes predefined thresholds, dynamically determined thresholds, dynamically adjusted thresholds, and learned thresholds (e.g., thresholds learned through user interactions, thresholds based on user preferences, thresholds based on user abilities, etc.). A threshold based on user abilities may be adjusted up or down based on individual user's ability. As an example, a touchpad force threshold that is based on user abilities may be adjusted down for user's with weaker than normal finger strength (which may be learned from prior interactions by the user or learned through user preferences).

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

EXAMPLES

Various examples of systems that dynamically fuse multiple modes of user input to facilitate interacting with virtual objects in a three-dimensional (3D) environment are described herein such as the examples enumerated below:

Example 1: A system comprising: a first sensor of a wearable system configured to acquire first user input data in a first mode of input, a second sensor of the wearable system configured to acquire second user input data in a second mode of input, the second mode of input different from the first mode of input, a third sensor of the wearable system configured to acquire third user input data in a third mode of input, the third mode of input different from the first mode of input and the second mode of input, and a hardware processor in communication with the first, second, and third sensors, the hardware processor programmed to receive multiple inputs comprising the first user input data in the first mode of input, the second user input data in the second mode of input, and the third user input data in the third mode of input, identify a first interaction vector based on the first user input data, identify a second interaction vector based on the second user input data, identify a third interaction vector based on the third user input data, determine a vergence among at least two of the first interaction vector, the second interaction vector, and the third interaction vector, identify, based at least partly on the vergence, a target virtual object from a set of candidate objects in a three-dimensional (3D) region around the wearable system, determine a user interface operation on the target virtual object based on at least one of the first user input data, the second user input data, the third user input data, and the vergence, and generate a transmodal input command that causes the user interface operation to be performed on the target virtual object.

Example 2: The system of Example 1, wherein the first sensor comprises a head pose sensor, the second sensor comprises an eye gaze sensor, and the third sensor comprises a hand gesture sensor.

Example 3: The system of Examples 1 or 2, wherein the vergence is among all three of the first interaction vector, the second interaction vector, and the third interaction vector.

Example 4: The system of any of Examples 1-3, wherein the hardware processor is programmed to determine a divergence of at least one of the first interaction vector, the second interaction vector, or the third interaction vector from the vergence.

Example 5: The system of any of Examples 1-4, wherein to determine a vergence among at least two of the first interaction vector, the second interaction vector, and the third interaction vector, the hardware processor is programmed to determine a verged data set comprising user input data associated with sensors determined to have verged.

Example 6: The system of any of Examples 1-5, wherein the third sensor comprises an electromyogram (EMG) sensor sensitive to hand motions.

Example 7: The system of any of Examples 1-5, wherein the third sensor comprises an electromyogram (EMG) sensor sensitive to muscles passing through a user's carpal tunnel.

Example 8: A method comprising: under control of a hardware processor of a wearable system: accessing sensor data from a plurality of greater than three sensors of different modalities, identifying a convergence event of a first sensor and a second sensor from the plurality of greater than three sensors of different modalities, and utilizing first sensor data from the first sensor and second sensor data from the second sensor to target an object in a three-dimensional (3D) environment around the wearable system.

Example 9: The method of Example 8, further comprising identifying a second convergence event of a third sensor fusing with the first sensor and the second sensor, the third sensor from the plurality of greater than three sensors of different modalities and wherein utilizing first sensor data from the first sensor and second sensor data from the second sensor to target an object in a three-dimensional (3D) environment around the wearable system, further comprises utilizing third sensor data from third sensor.

Example 10: The method of any of Examples 8 or 9, further comprising identifying a divergence event wherein the first sensor diverges from the second sensor or the third sensor diverges from the first sensor or the second sensor.

Example 11: The method of any of Example 10, wherein said utilizing does not include utilizing data from a diverged sensor.

Example 12: The method of Example 10, wherein said utilizing comprises weighting data from a diverged sensor less than data from converged sensors.

Example 13: The method of any of Examples 10-12, wherein the plurality of greater than three sensors of different modalities comprises a head pose sensor, an eye gaze sensor, a hand gesture sensor, and a touch sensor.

Example 14: The method of any of Examples 8-13, wherein the first sensor comprises an electromyogram (EMG) sensor sensitive to hand motions.

Example 15: The method of any of Examples 8-13, wherein the first sensor comprises an electromyogram (EMG) sensor sensitive to hand motions, wherein the second sensor comprises a camera-based gesture sensor, and wherein identifying the convergence event of the first sensor and the second sensor comprises determining, with the EMG sensor, that a user's muscles are flexed in a manner consistent with a nonverbal symbol and determining, with the camera-based hand gesture sensor, that at least a portion of a hand of the user is positioned in a manner consistent with the nonverbal symbol.

Example 16: A method comprising: under control of a hardware processor of a wearable system: accessing sensor data from at least first and second sensors of different modalities, wherein the first sensor provides sensor data having multiple potential interpretations, identifying a convergence of sensor data from the second sensor and of a given one of the potential interpretations of the sensor data from the first sensor and generating an input command to the wearable system based on the given one of the potential interpretations.

Example 17: The method of Example 16, wherein generating the input command comprises generating the input command based on the given one of the potential interpretations while discarding the remaining potential interpretations.

Example 18: The method of any of Examples 16 or 17, wherein the first sensor comprises a gesture sensor that tracks movement of a user's hand.

Example 19: The method of any of Examples 16-18, wherein the first sensor comprises a gesture sensor that tracks movement of a user's arm.

Example 20: The method of any of Examples 16-19, wherein the potential interpretations of the sensor data from the first sensor include a first raycast or conecast from a user's wrist to the user's fingertip and include a second raycast or conecast from the user's head to the user's fingertip.

Example 21: The method of any of Examples 16-20, wherein the second sensor comprises an eye tracking sensor and wherein identifying the convergence comprises determining that a user's gaze and the first raycast or conecast are approximately pointing to a common point in space.

Example 22: A method comprising: under control of a hardware processor of a wearable system: accessing sensor data from a plurality sensors of different modalities, identifying convergence events of sensor data from first and second sensors of the plurality of sensors, and during the convergence events, selectively applying a filter to the sensor data from the first sensor.

Example 23: The method Example 22, wherein selectively applying the filter to the sensor data from the first sensor during the convergence events comprises detecting an initial convergence of the sensor data from the first and second sensors and, based on the detected initial convergence, applying the filter to the sensor data from the first sensor.

Example 24: The method of any of Examples 22 or 23, wherein selectively applying the filter to the sensor data from the first sensor during the convergence events comprises detecting a convergence of the sensor data from the first and second sensors, based on the detected convergence, applying the filter to the sensor data from the first sensor, detecting a divergence of the sensor data of the first sensor from the sensor data of the second sensor, and based on the detected divergence, disabling application of the filter to the sensor data from the first sensor.

Example 25: The method of any of Examples 22-24, wherein the filter comprises a low-pass filter having an adaptive cutoff frequency.

Example 26: A wearable system comprising a hardware processor programmed to perform the method of any of Examples 8-25.

Example 27: The wearable system of Example 26, comprising at least first and second sensors of different modalities.

Example 28: A wearable system comprising: a head pose sensor configured to determine a head pose of a user of the wearable system, an eye gaze sensor configured to determine an eye gaze direction of the user of the wearable system, a gesture sensor configured to determine a hand gesture of the user of the wearable system, a hardware processor in communication with the head pose sensor, the eye gaze sensor, and the gesture sensor, the hardware processor programmed to: determine a first vergence between the eye gaze direction and the head pose of the user relative to an object, perform a first interaction command associated with the object based at least partly on inputs from the head pose sensor and the eye gaze sensor, determine a second vergence of the hand gesture with the eye gaze direction and the head pose of the user relative to the object, and perform a second interaction command associated with the object based at least partly on inputs from the hand gesture, the head pose sensor, and the eye gaze sensor.

Example 29: The wearable system of Example 28, wherein the head pose sensor comprises an inertial measurement unit (IMU), the eye gaze sensor comprise an eye-tracking camera, and the gesture sensor comprises an outward-facing camera.

Example 30: The wearable system of any of Examples 28 or 29, wherein to determine the first vergence, the hardware processor is programmed to determine that an angle between the eye gaze direction and a head pose direction associated with the head pose is less than a first threshold.

Example 31: The wearable system of any of Examples 28-30, wherein to determine the second vergence, the hardware processor is programmed to determine that a transmodal triangle associated with the hand gesture, the eye gaze direction, and the head pose is less than a second threshold.

Example 32: The wearable system of any of Examples 28-31, wherein the first interaction command comprises targeting the object.

Example 33: The wearable system of any of Examples 28-32, wherein the second interaction command comprises selecting the object.

Example 34: The wearable system of any of Examples 28-33, wherein the hardware processor is further programmed to determine a divergence of at least one of the hand gesture, the eye gaze direction, or the head pose from the object.

Example 35: The wearable system of any of Examples 28-34, wherein the first interaction command comprises applying a first filter or the second interaction command comprises applying a second filter.

Example 36: The wearable system of Example 35, wherein the first filter is different from the second filter.

Example 37: The wearable system of any of Examples 35 or 36, wherein the first filter or the second filter comprises a low-pass filter having an adaptive cutoff frequency.

Example 38: The wearable system of Example 37, wherein the low-pass filter comprises a one euro filter.

Example 39: The wearable system of any of Examples 28-38, wherein to determine the first vergence, the hardware processor is programmed to determine that a dwell time of the eye gaze direction and the head pose toward the object exceeds a first dwell time threshold.

Example 40: The wearable system of any of Examples 28-39, wherein to determine the second vergence, the hardware processor is programmed to determine that a dwell time of the eye gaze direction, the head pose, and the hand gesture relative to the object exceeds a second dwell time threshold.

Example 41: The wearable system of any of Examples 28-40, wherein the first interaction command or the second interaction command comprises providing a stabilized targeting vector associated with the object.

Example 42: The wearable system of Example 41, wherein the hardware processor provides the stabilized targeting vector to an application.

Example 43: The wearable system of any of Examples 28-42, wherein the gesture sensor comprises a handheld user input device.

Example 44: The wearable system of Example 43, wherein the hardware processor is programmed to determine a third vergence between input from the user input device and at least one of the eye gaze direction, the head pose, or the hand gesture.

Example 45: The wearable system of any of Examples 28-44, further comprising a voice sensor, and wherein the hardware processor is programmed to determine a fourth vergence between input from the voice sensor and at least one of the eye gaze direction, the head pose, or the hand gesture.

Example 46: A method comprising: under control of a hardware processor of a wearable system: identifying a current transmodal state, the current transmodal state comprising a transmodal vergence associated with an object, identifying a region of intent (ROI) associated with the transmodal vergence, identifying a corresponding interaction field based at least partly on the ROI, selecting an input fusion method based at least partly on the transmodal state, selecting settings for a primary targeting vector, applying conditioning to the primary targeting vector to provide us stabilized pose vector, and communicating the stabilized pose vector to application.

Example 47: The method of Example 46, wherein the corresponding interaction field comprises one or more of: a near field, a midfield, or a far field.

Example 48: The method of any of Examples 46 or 47, wherein applying conditioning comprises reducing registration error, jitter, or drift of the primary targeting vector.

Example 49: The method of any of Examples 46-48, further comprising targeting the object.

Example 50: The method of any of Examples 46-49, wherein identifying the current transmodal state comprises determining a fixation or a dwell.

Example 51: The method of Example 50, further comprising: determining if the fixation or the dwell exceeds a user focus threshold and, in response to a determination that the fixation or the dwell exceeds the user focus threshold, activating microgesture manipulations.

Example 52: The method of any of Examples 46-51, wherein identifying the corresponding interaction field comprises identifying a field transition event, the field transition event comprising a transition between a first interaction field and a second interaction field.

Example 53: The method of any of Examples 46-52, wherein identifying the current transmodal state comprises analyzing convergence among a plurality of input targeting vectors.

Example 54: The method of Example 53, wherein analyzing convergence comprises determining an angular distance between pairs of the plurality of input target vectors.

Example 55: The method of Example 54, further comprising determining a relative variance between each pair of the plurality of input target vectors.

Example 56: The method of Example 55, further comprising: determining that the angular distance of a pair of input target vectors is below a first threshold and the relative variance of the pair of input target vectors is below a second threshold and, in response to the determining, identifying the current transmodal state as a bimodal state associated with the pair of input target vectors.

Example 57: The method of any of Examples 53-56, wherein analyzing convergence comprises determining that a triplet of input target vectors is associated with a transmodal triangle having an area and three sides.

Example 58: The method of Example 57, comprising: determining that: the area of the transmodal triangle is below a third threshold, a variance in the area is below a fourth threshold or variances in lengths of the sides of the transmodal triangle are below a fifth threshold and, in response to the determining, identifying the current transmodal state as a trimodal state associated with the triplet of input target vectors.

Example 59: The method of any of Examples 46-58, wherein the current transmodal state comprises a bimodal state, a trimodal state, or a quadmodal state.

Example 60: A method comprising: under control of a hardware processor of a wearable system: identifying a transmodal fixation point, defining an extended region of interest (ROI) based on a transmodal fixation time or a predicted dwell time near the transmodal fixation point, determining that the ROI intersects with a rendering element, determining a rendering augmentation that is compatible with the ROI, the transmodal fixation time, or the predicted dwell time, and activating the rendering augmentation.

Example 61: The method of Example 60, wherein the rendering augmentation comprises one or more of: a reflection map, a surface shimmer affect, subsurface scattering, gaseous lensing or refraction, particle counts, or an advanced high dynamic range (HDR) rendering or lighting method.

Example 62: The method of any of Examples 60 or 61, wherein the rendering augmentation is activated only during the predicted dwell time or the transmodal fixation time.

Example 63: The method of any of Examples 60-62, further comprising: detecting a divergence of a previously converged input modality and deactivating the rendering augmentation.

Example 64: A wearable system comprising a hardware processor programmed to perform the method of any of Examples 46-63.

Example 65: The wearable system of Example 64, comprising at least first and second sensors of different modalities.

Example 66: The wearable system of Example 65, wherein the at least first and second sensors of different modalities comprise: a head pose sensor, an eye gaze sensor, a gesture sensor, a voice sensor, or a handheld user input device.

Example 67: A method comprising: under control of a hardware processor of a wearable system: receiving sensor data from a plurality sensors of different modalities; determining that data from a particular subset of the plurality of sensors of different modalities indicates that a user is initiating execution of a particular motor or sensorimotor control strategy from among a plurality of predetermined motor and sensorimotor control strategies; selecting, from among a plurality of different sensor data processing schemes that each correspond to a different one of the plurality of predetermined motor and sensorimotor control strategies, a particular sensor data processing scheme that corresponds to the particular motor or sensorimotor control strategy; and processing data received from the particular subset of the plurality of sensors of different modalities according the particular sensor data processing scheme.

Example 68: The method of Example 67, wherein determining that data from the particular subset of the plurality of sensors of different modalities indicates that the user is initiating execution of a particular motor or sensorimotor control strategy from among the plurality of predetermined motor and sensorimotor control strategies comprises: determining that data from the particular subset of the plurality of sensors of different modalities is stochastically converging.

Example 69: The method of any of Examples 67-68 further comprising: while processing data received from the particular subset of the plurality of sensors of different modalities according the particular sensor data processing scheme: determining that data from the particular subset of the plurality of sensors of different modalities indicates that the user is concluding execution of the particular motor or sensorimotor control strategy; in response to determining that data from the particular subset of the plurality of sensors of different modalities indicates that the user is concluding execution of the particular motor or sensorimotor control strategy: refraining from processing data received from the particular subset of the plurality of sensors of different modalities according the particular sensor data processing scheme.

Example 70: The method of Example 69, wherein determining that data from the particular subset of the plurality of sensors of different modalities indicates that the user is concluding execution of the particular motor or sensorimotor control strategy comprises: determining that data from the particular subset of the plurality of sensors of different modalities is stochastically diverging.

Example 71: The method of any of Examples 67-70, wherein processing data received from the particular subset of the plurality of sensors of different modalities according the particular sensor data processing scheme comprises: filtering data from one or more of the particular subset of the plurality of sensors of different modalities in a particular manner.

Example 72: The method of any of Examples 67-71, wherein processing data received from the particular subset of the plurality of sensors of different modalities according the particular sensor data processing scheme comprises: fusing data from the particular subset of the plurality of sensors of different modalities in a particular manner.

Example 73: The method of Examples 67-72, wherein determining that data from the particular subset of the plurality of sensors of different modalities indicates that the user is initiating execution of a particular motor or sensorimotor control strategy from among the plurality of predetermined motor and sensorimotor control strategies comprises: determining that one or more statistical parameters describing one or more relationships between data from the particular subset of the plurality of sensors of different modalities satisfies one or more threshold values.

Example 74: The method of Example 73, wherein one or more statistical parameters comprise one or more of a variance, covariance, or correlation.

Example 75: A method comprising: under control of a hardware processor of a wearable system: receiving sensor data from a plurality sensors of different modalities; determining that data from a particular subset of the plurality of sensors of different modalities is stochastically changing in a particular manner; in response to determining that data from the particular subset of the plurality of sensors of different modalities is stochastically changing in the particular manner, switching between: processing data received from the particular subset of the plurality of sensors of different modalities according a first sensor data processing scheme; and processing data received from the particular subset of the plurality of sensors of different modalities according a second sensor data processing scheme different from the first sensor data processing scheme.

Example 76: The method of Example 75, wherein determining that data from the particular subset of the plurality of sensors of different modalities is stochastically changing in the particular manner comprises determining that data from the particular subset of the plurality of sensors of different modalities is stochastically converging.

Example 77: The method of any of Examples 76 or 77, wherein determining that data from the particular subset of the plurality of sensors of different modalities is stochastically changing in the particular manner comprises determining that data from the particular subset of the plurality of sensors of different modalities is stochastically diverging.

Example 78: A wearable system comprising a hardware processor programmed to perform the method of any of Examples 67-77.

Any of the above Examples can be combined with any of the other Examples or any of the other features described in this application. The Examples are not intended to exclude additional elements described herein. All possible combinations and subcombinations of the Examples, with or without additional features described herein, are contemplated and considered part of this disclosure.

APPENDIX A

Copyright Notice

The following computer code and description are intended to illustrate various embodiments of the transmodal input fusion technology but are not intended to limit the scope of the transmodal input fusion technology. In various implementations, this computer code can be performed by the local processing and data module 260, the remote processing module 270, the central runtime server 1650, or other processor associated with the wearable system 200.

C# Script

The script disclosed herein illustrates how context can be derived from using 2D context fusion calculations and then used to qualify dynamic filtering of primary targeting vector (hand). Filtering to primary target vector pose can be ramped up using linear and spherical interpolation methods.

Calculation List:

Head-Hand midpoint current position

Hand-Eye midpoint current position

Head-Eye midpoint current position

Head-Hand midpoint current distance

Hand-Eye midpoint current distance

Head-Eye midpoint current distance

Head-eye-Hand triangle current center position

Head-eye-Hand triangle current area

/*used for variance calculation*/

Head (H) interaction point (gaze) Mean position: rolling window 10 frames.

Eye (E) interaction point (vergence) Mean position: rolling window 10 frames.

Hand (Ha) Interaction Point (index finger tip) Mean position: rolling window 10 frames.

Head-Hand midpoint Mean position: rolling window 10 frames.

Hand-Eye midpoint Mean position: rolling window 10 frames.

Head-Eye midpoint Mean position: rolling window 10 frames.

Head-Eye-Hand centerpoint Mean position: rolling window 10 frames.

Head-Eye-Hand mean triangle area: rolling window 10 frames.

Head interaction point (gaze) position variance: rolling window 10 frames.

Eye interaction point (vergence) position variance: rolling window 10 frames.

Hand Interaction Point (index finger tip) position variance: rolling window 10 frames.

Head-Hand midpoint position variance: rolling window 10 frames.

Hand-Eye midpoint position variance: rolling window 10 frames.

Head-Eye midpoint position variance: rolling window 10 frames.

Head-Eye-Hand centerpoint position variance: rolling window 10 frames.

Head-Eye-Hand triangle area variance: rolling window 10 frames.

Head interaction point (gaze) current velocity (xy tangential component)

Eye interaction point (vergence) current velocity (xy tangential component)

Hand Interaction Point (index finger tip) current velocity (xy tangential component)

Head-Hand midpoint current velocity (xy tangential component)

Hand-Eye midpoint current velocity (xy tangential component)

Head-Eye midpoint current velocity (xy tangential component)

Head-Eye-Hand centerpoint current velocity (xy tangential component)

Head interaction point (gaze) mean velocity: rolling window 20 frames (xy tangential component)

Eye interaction point (vergence) mean velocity: rolling window 20 frames (xy tangential component)

Hand Interaction Point (index finger tip) mean velocity: rolling window 20 frames (xy tangential component)

Head-Hand midpoint mean velocity: rolling window 10 frames (xy tangential component)

Hand-Eye midpoint mean velocity: rolling window 10 frames (xy tangential component)

Head-Eye midpoint mean velocity: rolling window 10 frames (xy tangential component)

Head-Eye-Hand centerpoint mean velocity: rolling window 10 frames (xy tangential component)

Head interaction point (gaze) Mean acceleration: rolling window 20 frames (xy tangential component)

Eye interaction point (vergence) Mean acceleration: rolling window 20 frames (xy tangential component)

Hand Interaction Point (index finger tip) Mean acceleration: rolling window 20 frames (xy tangential component)

Head interaction point (gaze) current acceleration (xy tangential component)

Eye interaction point (vergence) current acceleration (xy tangential component)

Hand Interaction Point (index finger tip) current acceleration (xy tangential component)

Head-Hand midpoint current acceleration (xy tangential component)

Hand-Eye midpoint current acceleration (xy tangential component)

Head-Eye midpoint current acceleration (xy tangential component)

Head-Eye-Hand centerpoint current acceleration (xy tangential component)

Head-Eye-Hand mean triangle center current acceleration (xy tangential component)

Dynamic Filtering First-Turn-on Pseudocode:

```
/***************************************************************/
/*classify basic vergence union feedback*/
/***************************************************************/
/*limit the max length of "fused" bimodal input vectors in feedback display*/
/* defines max allowable vergence union distance*/
if( Ha-E dist < 5 deg){
        draw bi-modal line
}
If (H-E dist < 10 deg){
        draw bi-modal line
}
If (H-Ha dist < 10 deg){
        draw bi-modal line
}
If (Ha-E dist < 5 deg && H-E dist < 10 deg && H-Ha dist < 10 deg){
        draw tri-modal triangle area fill
}
/****************************************************************/
/*classify dynamic vergence state based on motion*/
/****************************************************************/
/*tri-modally fused inputs*/
/*trimodal fixation*/
If (triangle area << Area0 && H-E-Ha-area-variance< var0 && average triangle
            velocity < V0 && mean triangle acceleration < A0){
        trimodal_vergence = true;
        timodal_fixation = true;
}
/*trimodal ballistic pursuit*/
else if (triangle area < Area1 && H-E-Ha-area-variance< var0 && average
            triangle velocity < V1 && average triangle acceleration<A2) {
        trimodal_vergence = true;
        trimodal_balistic_pursuit = true;
}
/*trimodal smooth pursuit*/
else if (triangle area < Area1 && H-E-Ha-area-variance< var0 && average
            triangle velocity < V2 && average triangle acceleration<A4) {
        trimodal_vergence = true;
        trimodal_smooth_pursuit = true;
}
Else{
        trimodal_vergence = false;
        trimodal_fixation = false;
        trimodal_smooth_pursuit = false;
        trimodal_ballisitc_pursuit = false;
}
/***************************************************************/
/*bi-modally fused inputs*/
/* hand-eye bimodal (Ha-E) fixation*/
else if (Ha-E-dist< dist1 && Ha-E-dist-variance< var1 && Ha-E average velocity
            < V2 && Ha-E average acceleration < A3){
        bimodal_vergence = true;
        bimodal_fixation = true;
}
/* head-eye bimodal (H-E) fixation*/
else if (H-E-dist< dist2 && H-E-dist-variance< var2 && H-E average velocity <
            V2 && H-E average acceleration < A3){
        bimodal_vergence = true;
        bimodal_fixation = true;
}
/*hand-eye bimodal (Ha-E) smooth pursuit*/
else if (Ha-E-dist< dist1 && H-E-dist-variance< var2 && Ha-E average velocity
            < V3 && Ha-E average acceleration < A4){
        bimodal_vergence = true;
        bimodal_smooth_pursuit = true;
}
/*head-eye bimodal (H-E) smooth pursuit*/
else if (H-E-dist< dist1 && H-E-dist-variance< var2 && H-E average velocity <
            V3 && H-E average acceleration < A4){
        bimodal_vergence = true;
        bimodal_smooth_pursuit = true;
}
/*hand-eye bimodal (Ha-E) ballistic pursuit*/
else if (Ha-E-dist< dist1 && H-E-dist-variance< var2 && Ha-E average velocity
            < V4 && Ha-E average acceleration < A5){
        bimodal_vergence = true;
        biimodal_ballistic _pursuit = true;
}
/*head-eye bimodal (H-E) ballistic pursuit*/
else if (H-E-dist< dist1 && H-E-dist-variance< var2 && H-E average velocity <
```

```
              V4 && H-E average acceleration < A5){
        bimodal_vergence = true;
        bimodal_ballisitc_pursuit = true;
}
Else{
        bimodal_vergence = false;
        bimodal_fixation = false;
        bimodal_smooth_pursuit = false;
        bimodal_ballistic_pursuit = false;
}
/*****************************************************************/
/*manage dynamic filtering based on input fusion state*/
/*****************************************************************/
/*tri-modally fused inputs*/
If (trimodal_vergence){
        If (trimodal_fixation) activate euro filter (strong) on raw hand position
                (xyz) and orientation
        Else if (trimodal_smooth_pursuit) activate euro filter (strong) on raw hand
                position (xyz) and orientation
        Else if (trimodal_balisitc_pursuit) activate euro filter (strong) on raw
                hand position (xyz) and orientation
}
If (bimodal_vergence){
        If (bimodal_fixation) {
                If (H-E) activate euro filter (medium) on raw hand position (xyz)
                        and orientation
                Else if (Ha-E) activate euro filter (medium) on raw hand position
                        (xyz) and orientation
                //Else if (H-Ha) activate euro filter (medium) on raw hand position
                        (xyz) and orientation
        }
        Else if (bimodal_smooth_pursuit) {
                If (H-E) activate euro filter (weak) on raw eye position (xyz) and
                        orientation
                Else if (Ha-E) activate euro filter (weak) on raw hand position
                        (xyz) and orientation
                //Else if (H-Ha) activate euro filter (weak) on raw hand position
                        (xyz) and orientation
        }
        Else if (bimodal_balisitc_pursuit){
                If (H-E) // do nothing
                Else if (Ha-E) // do nothing
                //Else if (H-Ha) // do nothing
        }
}
/*****************************************************************/
/*integration management*/
/*****************************************************************/
If (filter active && active-time< threshold){
        ease in
}
/**/
```

In some examples, when fusion conditions are broken the euro filter may ease out quickly and may, in some cases, snap. In other implementations, as filtered interaction points (in this case the hand input targeting vector) degrades from trimodal fusion to bimodal fusion, one filter is eased out while another is being eased in. In this respect multiple filters will be operational simultaneously in order to create a smoothly transitioning position function and avoid step functions (or discontinuities) in velocity and acceleration of the primary targeting vector (managed cursor).

Multimodal Dwell First-Turn-on Pseudocode:

```
/*****************************************************************/
/*classify basic vergence union*/
/*****************************************************************/
/*limit the max length of "fused" bimodal input vectors in feedback display*/
/* defines max allowable vergence union distance*/
if( Ha-E dist < 5 deg){
        draw bi-modal line
}
If (H-E dist < 10 deg){
        draw bi-modal line
}
If (H-Ha dist < 10 deg){
        draw bi-modal line
}
If (Ha-E dist < 5 deg && H-E dist < 10 deg && H-Ha dist < 10 deg){
```

-continued

```
    draw tri-modal triangle area fill
}
/******************************************************************/
/*identify basic motion state of bimodal or trimodal fusion point*/
/******************************************************************/
/******************************************************************/
/*classify dynamic vergence state based on motion*/
/******************************************************************/
/*tri-modally fused inputs*/
/*trimodal fixation*/
If (triangle area << Area0 && H-E-Ha-area-variance< var0 && average triangle
            velocity < V0 && mean triangle acceleration < A0){
    trimodal_vergence = true;
    timodal_fixation = true;
    trimodal_fixation_count =+1;
}
else{
    trimodal_vergence = false;
    trimodal_fixation = false;
    trimodal_fixation_count = 0;
    trimodal_smooth_pursuit = false;
    trimodal_ballisitc_pursuit = false;
}
/******************************************************************/
/*bi-modally fused inputs*/
/* hand-eye bimodal (Ha-E) fixation*/
else if (Ha-E-dist< dist1 && Ha-E-dist-variance< var1 && Ha-E average velocity
            < V2 && Ha-E average acceleration < A3){
    bimodal_vergence = true;
    bimodal_fixation = true;
    bimodal_fixation_count =+1;
}
/* head-eye bimodal (H-E) fixation*/
else if (H-E-dist< dist2 && H-E-dist-variance< var2 && H-E average velocity <
            V2 && H-E average acceleration < A3){
    bimodal_vergence = true;
    trimodal_fixation = true;
}
If (trimodal_fixation || bimodal_fixation){
    transmdoal_fixation = true;
}
else{
    transmodal_fixation = false;
    bimodal_vergence = false;
    bimodal_fixation = false;
    bimodal_fixation_count = 0;
    bimodal_smooth_pursuit = false;
    bimodal_ballistic_pursuit = false;
}
/******************************************************************/
/*manage extended fixation and dwell states*/
/******************************************************************/
If (trimodal_vergence && trimodal_fixation && trimodal_fixation_count >10){
    trmodal_dwell = true;
    trimodal_fixation_count = 0;
}
If (bimodal_vergence && bimodal_fixation && bimodal_fixation_count >10){
    bimodal_dwell = true;
    bimodal_fixation_count = 0;
}
If (trimodal_dwell || bimodal_dwell){
    transmodal_dwell = true;
}
else{
    transmodal_dwell = false
    Bimodal_dwell = false;
    Trimodal_dwell = false;
}
```

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
under control of a hardware processor of a wearable system:
identifying a current transmodal state, the current transmodal state comprising a transmodal vergence associated with an object, wherein identifying the current transmodal state comprises analyzing convergence among a plurality of input targeting vectors, and wherein analyzing convergence comprises determining an angular distance between pairs of the plurality of input target vectors;
identifying a region of intent (ROI) associated with the transmodal vergence;
identifying a corresponding interaction field based at least partly on the ROI;
selecting an input fusion method based at least partly on the current transmodal state;
selecting settings for a primary targeting vector;
applying conditioning to the primary targeting vector to provide us stabilized pose vector;
communicating the stabilized pose vector to an application;
determining a relative variance between each pair of the plurality of input target vectors;
determining that an angular distance of a pair of input target vectors is below a first threshold and the relative variance of the pair of input target vectors is below a second threshold; and
in response to the determining, identifying the current transmodal state as a bimodal state associated with the pair of input target vectors.

2. The method of claim 1, wherein the corresponding interaction field comprises one or more of: a near field, a midfield, or a far field.

3. The method of claim 1, wherein applying conditioning comprises reducing registration error, jitter, or drift of the primary targeting vector.

4. The method of claim 1, further comprising: targeting the object.

5. The method of claim 1, wherein identifying the current transmodal state comprises determining a fixation or a dwell.

6. The method of claim 5, further comprising:
determining if the fixation or the dwell exceeds a user focus threshold; and
in response to a determination that the fixation or the dwell exceeds the user focus threshold, activating microgesture manipulations.

7. The method of claim 1, wherein identifying the corresponding interaction field comprises identifying a field transition event, the field transition event comprising a transition between a first interaction field and a second interaction field.

8. A method comprising:
under control of a hardware processor of a wearable system:
identifying a current transmodal state, the current transmodal state comprising a transmodal vergence associated with an object, wherein identifying the current transmodal state comprises analyzing convergence among a plurality of input targeting vectors, and wherein analyzing convergence comprises determining that a triplet of input target vectors is associated with a transmodal triangle having an area and three sides;
identifying a region of intent (ROI) associated with the transmodal vergence;
identifying a corresponding interaction field based at least partly on the ROI;
selecting an input fusion method based at least partly on the current transmodal state;
selecting settings for a primary targeting vector;
applying conditioning to the primary targeting vector to provide us stabilized pose vector;
communicating the stabilized pose vector to an application;
determining that the area of the transmodal triangle is below a third threshold, a variance in the area is below a fourth threshold or variances in lengths of the sides of the transmodal triangle are below a fifth threshold; and
in response to the determining, identifying the current transmodal state as a trimodal state associated with the triplet of input target vectors.

9. The method of claim 1, wherein the current transmodal state comprises a bimodal state, a trimodal state, or a quadmodal state.

10. A wearable system comprising:
a plurality of sensors of different modalities; and
a hardware processor programmed to:
identify a current transmodal state, the current transmodal state comprising a transmodal vergence associated with an object;
identify a region of intent (ROI) associated with the transmodal vergence;
identify a corresponding interaction field based at least partly on the ROI;
select an input fusion method based at least partly on the current transmodal state;
select settings for a primary targeting vector;
apply conditioning to the primary targeting vector to provide us stabilized pose vector;
communicate the stabilized pose vector to an application;
identify the current transmodal state by determining if a fixation or a dwell exceeds a user focus threshold; and
in response to a determination that the fixation or the dwell exceeds the user focus threshold, activate microgesture manipulations.

11. The wearable system of claim 10, wherein the hardware processor is programmed to:
identify the corresponding interaction field by identifying a field transition event, the field transition event comprising a transition between a first interaction field and a second interaction field.

12. The wearable system of claim 10, wherein the hardware processor is programmed to:
identify the current transmodal state by analyzing convergence among a plurality of input targeting vectors.

13. The wearable system of claim 12, wherein the hardware processor is programmed to:
analyze convergence by determining an angular distance between pairs of the plurality of input target vectors.

14. The wearable system of claim 10, wherein the hardware processor is programmed to:
analyze convergence by determining that a triplet of input target vectors is associated with a transmodal triangle having an area and three sides;

determine that the area of the transmodal triangle is below a third threshold, a variance in the area is below a fourth threshold or variances in lengths of the sides of the transmodal triangle are below a fifth threshold; and in response to the area of the transmodal triangle being determined to be below a third threshold, identify the current transmodal state as a trimodal state associated with the triplet of input target vectors.

\* \* \* \* \*